United States Patent
Dryer et al.

(10) Patent No.: US 12,469,207 B2
(45) Date of Patent: Nov. 11, 2025

(54) SYSTEMS, METHODS, AND GRAPHICAL USER INTERFACES FOR SCANNING AND MODELING ENVIRONMENTS

(71) Applicant: Apple Inc., Cupertino, CA (US)

(72) Inventors: Allison W. Dryer, Tiburon, CA (US); Giancarlo Yerkes, San Carlos, CA (US); Praveen Sharma, Brooklyn, NY (US); Grant R. Paul, San Francisco, CA (US); Joseph A. Malia, Isle of Wight (GB)

(73) Assignee: APPLE INC., Cupertino, CA (US)

( * ) Notice: Subject to any disclaimer, the term of this patent is extended or adjusted under 35 U.S.C. 154(b) by 147 days.

(21) Appl. No.: 18/144,746

(22) Filed: May 8, 2023

(65) Prior Publication Data

US 2023/0368458 A1  Nov. 16, 2023

Related U.S. Application Data

(60) Provisional application No. 63/340,444, filed on May 10, 2022.

(51) Int. Cl.
*G06T 15/10*  (2011.01)
*G06F 3/04815*  (2022.01)
(Continued)

(52) U.S. Cl.
CPC .......... *G06T 15/10* (2013.01); *G06F 3/04815* (2013.01); *G06T 15/50* (2013.01);
(Continued)

(58) Field of Classification Search
CPC ... G06F 3/04815; G06T 15/10; G06T 19/006; G06T 19/20
See application file for complete search history.

(56) References Cited

U.S. PATENT DOCUMENTS 7,072,810 B2  7/2006  Ramanathan et al.
8,244,462 B1  8/2012  Zhu
(Continued)

FOREIGN PATENT DOCUMENTS

AU  2018101226 A4  9/2018
AU  2019100486 A4  6/2019
(Continued)

OTHER PUBLICATIONS

Aakash G Technical, "App Review #1 / Measure—Tango AR / How to Use", https://www.youtube.com/watch?v=fj2iiOg36KE, May 13, 2017, 2 pages.
(Continued)

*Primary Examiner* — Charles Tseng
(74) *Attorney, Agent, or Firm* — Morgan, Lewis & Bockius LLP

(57) ABSTRACT

A computer system displays a preview of a three-dimensional model of a physical environment that includes a partially completed three-dimensional model of the physical environment that is displayed with a first orientation that corresponds to a first viewpoint of a user. The computer system detects first movement that changes a current viewpoint of the user in the physical environment to a second viewpoint and updates the preview of the three-dimensional model, including adding additional information to and rotating the partially completed three-dimensional model to a second orientation. While displaying a second view of the physical environment that corresponds to the second viewpoint, the computer system, in response to detecting a first input, updates the preview of the three-dimensional model in the first user interface, including rotating the partially completed three-dimensional model to a third orientation that does not correspond to the second viewpoint of the user.

50 Claims, 58 Drawing Sheets

(51) Int. Cl.
*G06T 15/50* (2011.01)
*G06T 19/00* (2011.01)
*G06T 19/20* (2011.01)

(52) U.S. Cl.
CPC ............ *G06T 19/006* (2013.01); *G06T 19/20* (2013.01); *G06T 2200/24* (2013.01); *G06T 2219/2004* (2013.01); *G06T 2219/2016* (2013.01)

(56) References Cited

U.S. PATENT DOCUMENTS

| | | |
|---|---|---|
| 8,365,081 B1 | 1/2013 | Amacker et al. |
| 8,982,156 B2 | 3/2015 | Maggiore |
| 9,152,209 B2 | 10/2015 | Jeong et al. |
| 9,330,500 B2 | 5/2016 | Karsch et al. |
| 9,448,687 B1 | 9/2016 | McKenzie et al. |
| 9,495,794 B2 | 11/2016 | Masumoto |
| 9,661,308 B1 | 5/2017 | Wang et al. |
| 9,665,960 B1 | 5/2017 | Masters et al. |
| 9,678,651 B2 | 6/2017 | Moha et al. |
| 9,696,897 B2 | 7/2017 | Garcia |
| 9,767,606 B2 | 9/2017 | Kapinos et al. |
| 9,846,027 B2 | 12/2017 | Kimura et al. |
| 9,870,644 B2 | 1/2018 | Ha et al. |
| 9,953,434 B2 | 4/2018 | Natori et al. |
| 10,049,504 B2 | 8/2018 | Chen et al. |
| 10,074,179 B2 | 9/2018 | Arita et al. |
| 10,268,266 B2 | 4/2019 | Mathey-Owens et al. |
| 10,296,869 B2 | 5/2019 | Hulth |
| 10,347,033 B2 | 7/2019 | Masumoto |
| 10,445,867 B2 | 10/2019 | Glatfelter et al. |
| 10,540,699 B1 | 1/2020 | Prabhu et al. |
| 10,606,075 B2 | 3/2020 | Choi et al. |
| 10,606,609 B2 | 3/2020 | Energin et al. |
| 10,762,716 B1 | 9/2020 | Paul et al. |
| 10,861,241 B2 | 12/2020 | Ghaleb |
| 10,972,680 B2 | 4/2021 | Wigdor et al. |
| 10,999,629 B1 | 5/2021 | Cieslak et al. |
| 11,204,678 B1 | 12/2021 | Baker et al. |
| 11,521,063 B1 | 12/2022 | Powers et al. |
| 2008/0008361 A1 | 1/2008 | Nozaki et al. |
| 2008/0222233 A1 | 9/2008 | Shi et al. |
| 2008/0255961 A1 | 10/2008 | Livesey |
| 2009/0002719 A1 | 1/2009 | Chang et al. |
| 2010/0235726 A1 | 9/2010 | Ording et al. |
| 2011/0022942 A1 | 1/2011 | Flemings et al. |
| 2011/0107270 A1 | 5/2011 | Wang et al. |
| 2011/0216167 A1 | 9/2011 | Katz et al. |
| 2011/0249117 A1 | 10/2011 | Yoshihama et al. |
| 2011/0252405 A1 | 10/2011 | Meirman et al. |
| 2011/0279381 A1 | 11/2011 | Tong et al. |
| 2011/0279445 A1 | 11/2011 | Murphy et al. |
| 2011/0304607 A1 | 12/2011 | Ito |
| 2012/0121134 A1 | 5/2012 | Yoshizumi |
| 2012/0194544 A1 | 8/2012 | Yokohata |
| 2012/0249741 A1 | 10/2012 | Maciocci et al. |
| 2013/0044128 A1 | 2/2013 | Liu et al. |
| 2013/0127895 A1 | 5/2013 | Miller et al. |
| 2013/0215230 A1 | 8/2013 | Miesnieks et al. |
| 2013/0332892 A1 | 12/2013 | Matsuki |
| 2014/0071130 A1 | 3/2014 | Piemonte |
| 2014/0098191 A1 | 4/2014 | Rime et al. |
| 2014/0125668 A1 | 5/2014 | Steed et al. |
| 2015/0062120 A1 | 3/2015 | Reisner-Kollmann et al. |
| 2015/0062123 A1 | 3/2015 | Yuen |
| 2015/0067588 A1 | 3/2015 | Shim et al. |
| 2015/0074711 A1 | 3/2015 | Spitz et al. |
| 2015/0169525 A1 | 6/2015 | Palm et al. |
| 2015/0187119 A1 | 7/2015 | Masumoto |
| 2015/0193982 A1 | 7/2015 | Mihelich et al. |
| 2015/0221345 A1 | 8/2015 | Zhao et al. |
| 2015/0227645 A1 | 8/2015 | Childs et al. |
| 2016/0026253 A1 | 1/2016 | Bradski et al. |
| 2016/0040981 A1 | 2/2016 | Kang et al. |
| 2016/0049011 A1 | 2/2016 | Kasahara et al. |
| 2016/0063714 A1 | 3/2016 | Middleton et al. |
| 2016/0086322 A1 | 3/2016 | Arita et al. |
| 2016/0147408 A1 | 5/2016 | Bevis et al. |
| 2016/0148433 A1 | 5/2016 | Petrovskaya et al. |
| 2016/0170624 A1 | 6/2016 | Zambetti et al. |
| 2016/0189426 A1 | 6/2016 | Thomas et al. |
| 2016/0210602 A1 | 7/2016 | Siddique et al. |
| 2016/0240011 A1 | 8/2016 | Metaio et al. |
| 2016/0329006 A1 | 11/2016 | Weber et al. |
| 2016/0363990 A1 | 12/2016 | Key |
| 2017/0021273 A1 | 1/2017 | Rios |
| 2017/0053621 A1 | 2/2017 | Chen et al. |
| 2017/0061696 A1 | 3/2017 | Li et al. |
| 2017/0115488 A1 | 4/2017 | Ambrus et al. |
| 2017/0132841 A1 | 5/2017 | Morrison |
| 2017/0212585 A1 | 7/2017 | Kim et al. |
| 2017/0220887 A1 | 8/2017 | Fathi et al. |
| 2017/0230641 A1 | 8/2017 | Scavezz et al. |
| 2017/0277670 A1 | 9/2017 | Smith et al. |
| 2017/0289221 A1 | 10/2017 | Khalid et al. |
| 2017/0316576 A1 | 11/2017 | Colbert et al. |
| 2017/0358142 A1 | 12/2017 | Lee et al. |
| 2018/0004283 A1 | 1/2018 | Mathey-Owens et al. |
| 2018/0045963 A1 | 2/2018 | Hoover et al. |
| 2018/0088794 A1 | 3/2018 | Graham et al. |
| 2018/0114372 A1 | 4/2018 | Nagy et al. |
| 2018/0165888 A1 | 6/2018 | Duan et al. |
| 2018/0203561 A1 | 7/2018 | Chang et al. |
| 2018/0203581 A1 | 7/2018 | Takeda |
| 2018/0204385 A1 | 7/2018 | Sarangdhar et al. |
| 2018/0300952 A1 | 10/2018 | Evans et al. |
| 2018/0336732 A1 | 11/2018 | Schuster |
| 2018/0336737 A1 | 11/2018 | Varady et al. |
| 2019/0033058 A1 | 1/2019 | Tsurumi |
| 2019/0051054 A1 | 2/2019 | Jovanovic et al. |
| 2019/0065027 A1 | 2/2019 | Hauenstein et al. |
| 2019/0068889 A1 | 2/2019 | Lee et al. |
| 2019/0108672 A1* | 4/2019 | Ghelberg ................ G06F 21/31 |
| 2019/0172261 A1 | 6/2019 | Alt et al. |
| 2019/0180082 A1* | 6/2019 | Moravec ................ G06V 20/20 |
| 2019/0180506 A1 | 6/2019 | Gebbie et al. |
| 2019/0180512 A1 | 6/2019 | Fedosov et al. |
| 2019/0213389 A1 | 7/2019 | Peruch et al. |
| 2019/0221035 A1 | 7/2019 | Clark et al. |
| 2019/0221041 A1 | 7/2019 | Lin |
| 2019/0310757 A1 | 10/2019 | Lee et al. |
| 2019/0311512 A1 | 10/2019 | VanBlon et al. |
| 2019/0333278 A1 | 10/2019 | Palangie et al. |
| 2019/0339058 A1 | 11/2019 | Dryer et al. |
| 2019/0339839 A1 | 11/2019 | Paul, Sr. et al. |
| 2019/0340799 A1 | 11/2019 | Dryer et al. |
| 2019/0355121 A1 | 11/2019 | Nelson et al. |
| 2019/0369404 A1 | 12/2019 | Joshi et al. |
| 2020/0005538 A1 | 1/2020 | Neeter |
| 2020/0020164 A1 | 1/2020 | Coffman et al. |
| 2020/0027201 A1 | 1/2020 | Chen |
| 2020/0053318 A1 | 2/2020 | Li et al. |
| 2020/0098140 A1 | 3/2020 | Jagnow et al. |
| 2020/0106965 A1 | 4/2020 | Lam et al. |
| 2020/0143593 A1 | 5/2020 | Rudman et al. |
| 2020/0184667 A1 | 6/2020 | Miller et al. |
| 2020/0200794 A1 | 6/2020 | Niles et al. |
| 2020/0226823 A1 | 7/2020 | Stachniak et al. |
| 2020/0232783 A1 | 7/2020 | Dryer et al. |
| 2020/0261799 A1 | 8/2020 | Cahill et al. |
| 2020/0312029 A1 | 10/2020 | Heinen et al. |
| 2020/0322595 A1 | 10/2020 | Abe et al. |
| 2020/0382718 A1 | 12/2020 | Malia et al. |
| 2021/0004996 A1 | 1/2021 | Murillo et al. |
| 2021/0019946 A1 | 1/2021 | Sonasath et al. |
| 2021/0096726 A1 | 4/2021 | Faulkner et al. |
| 2021/0097768 A1 | 4/2021 | Malia et al. |
| 2021/0097776 A1 | 4/2021 | Faulkner et al. |
| 2021/0174596 A1 | 6/2021 | Zhang et al. |
| 2021/0191600 A1 | 6/2021 | Lemay et al. |
| 2021/0241483 A1 | 8/2021 | Dryer et al. |
| 2021/0241505 A1 | 8/2021 | Dryer et al. |
| 2021/0254962 A1 | 8/2021 | Dryer et al. |

(56) References Cited

U.S. PATENT DOCUMENTS

| | | |
|---|---|---|
| 2021/0286502 A1 | 9/2021 | Lemay et al. |
| 2021/0295602 A1 | 9/2021 | Scapel et al. |
| 2021/0304465 A1 | 9/2021 | Dryer et al. |
| 2022/0036648 A1 | 2/2022 | Wang |
| 2022/0091722 A1 | 3/2022 | Faulkner et al. |
| 2022/0092861 A1 | 3/2022 | Sharma et al. |
| 2022/0130118 A1 | 4/2022 | Malia et al. |
| 2022/0239842 A1 | 7/2022 | Malia et al. |
| 2022/0276041 A1 | 9/2022 | Dryer et al. |
| 2022/0335697 A1 | 10/2022 | Harding et al. |
| 2023/0199296 A1 | 6/2023 | Malia et al. |
| 2023/0386146 A1 | 11/2023 | Scapel et al. |
| 2024/0011764 A1 | 1/2024 | Dryer et al. |
| 2024/0045564 A1 | 2/2024 | Dryer et al. |
| 2024/0153219 A1 | 5/2024 | Queen et al. |
| 2024/0273832 A1 | 8/2024 | Newman et al. |
| 2024/0290051 A1 | 8/2024 | Malia et al. |

FOREIGN PATENT DOCUMENTS

| | | |
|---|---|---|
| CN | 1629888 A | 6/2005 |
| CN | 102607423 A | 7/2012 |
| CN | 103218854 A | 7/2013 |
| CN | 105103198 A | 11/2015 |
| CN | 105164999 A | 12/2015 |
| CN | 105554247 A | 5/2016 |
| CN | 105579946 A | 5/2016 |
| CN | 105589199 A | 5/2016 |
| CN | 105608746 A | 5/2016 |
| CN | 106164934 A | 11/2016 |
| CN | 106251185 A | 12/2016 |
| CN | 106575299 A | 4/2017 |
| CN | 108886601 A | 11/2018 |
| CN | 112189220 B | 1/2021 |
| EP | 1563370 A | 8/2005 |
| EP | 2 394 714 A1 | 12/2011 |
| EP | 2 983 139 A1 | 2/2016 |
| EP | 2 988 486 A1 | 2/2016 |
| EP | 3017591 A1 | 5/2016 |
| JP | 6264665 B2 | 11/2002 |
| JP | 2008-287691 A | 11/2008 |
| JP | 2011259243 A | 12/2011 |
| JP | 2013-229672 A | 11/2013 |
| JP | 2015-080199 A | 4/2015 |
| JP | 2015146173 A | 8/2015 |
| JP | 2017-111515 A | 6/2017 |
| JP | 2017-120531 A | 7/2017 |
| JP | 2017-536618 A | 12/2017 |
| JP | 2019-516180 A | 6/2019 |
| JP | 2019-145072 A | 8/2019 |
| KR | 20100003252 A | 1/2010 |
| KR | 20130108684 A | 10/2013 |
| KR | 2015-0018828 A | 2/2015 |
| KR | 101629134 B1 | 6/2016 |
| KR | 20160141688 A | 12/2016 |
| KR | 20170087501 A | 7/2017 |
| KR | 20180066276 A | 6/2018 |
| KR | 20210031894 A | 3/2021 |
| KR | 20210081904 A | 7/2021 |
| WO | WO 2011/029209 A1 | 3/2011 |
| WO | WO 2013/096052 A2 | 6/2013 |
| WO | WO 2013/099616 A1 | 7/2013 |
| WO | WO 2013/176830 A | 11/2013 |
| WO | WO 2014/013689 A1 | 1/2014 |
| WO | WO 2014/157340 A1 | 10/2014 |
| WO | WO 2014/197631 A1 | 12/2014 |
| WO | WO 2016/017254 A1 | 2/2016 |
| WO | WO 2018/164932 A | 9/2018 |
| WO | WO 2019/032736 A1 | 2/2019 |
| WO | WO 2017/213070 A1 | 4/2019 |
| WO | WO 2019/217148 A1 | 11/2019 |
| WO | WO 2020/068073 A1 | 4/2020 |
| WO | WO 2021/158427 A1 | 8/2021 |

OTHER PUBLICATIONS

Anonymous, "How to Select Surface and Image Anchors", https:helpx.adobe.com/aeor/how-to-surface-and-image-anchors.html, Oct. 20, 2020, 6 pages.

Apple, "MeasureKit—AR ruler app for iOS 11", https://measurekit.com, Sep. 15, 2017, 10 pages.

Berthiaume, "Augmented Reality Scanning Enables Retail Innovation (Video)", https://www.scandit.com/gb/augmented-reality-scanning-enables-retail-innovation-video, Oct. 3, 2017, 5 pages.

Bhalwankar, "Triple Tap to Zoom Feature in Android Phones", https://www.youtube.com/watch?v=KInbLhA2jg8, Jan. 25, 2014, 2 pages.

Burns, "Google Measure it Demo with Tango", https://www.youtube.com/watch?v=b74VtGGJPBg, May 20, 2016, 2 pages.

Jain et al., "OverLay: Practical Mobile Augmented Reality", Proceedings of the 13th Annual International conference on Mobile Systems, Applications, and Services. May 18, 2015, 14 pages.

LaanLabs, "AirMeasure—AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit", https://www.youtube.com/watch?v=9ycpvj6hbdE, Sep. 12, 2017, 2 pages.

Langlotz et al., "Sketching up the World: in Situ Authoring for Mobile Augmented reality", http://mooslechner.infor/workperformed/at/smartphone2010.pdf, Jul. 27, 2011, 8 pages.

Lenovo, Lenovo Tech World 2016—Keynote Livestream from San Francisco, https://www.youtube.com/watch?v=MBgQLraVGJQ, Jun. 9, 2016, 2 pages.

Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.

Lynch, "How to Zoom in on iPhone: The Quick Tutorial!", https://www.payetteforward.com/how-to-zoom-in-on-iphone-quck-tutorial, Feb. 26, 2018, 4 pages.

Mapletree Apps, "Apple ARKit iPhone Demo—Measure 3D Pro—Ruler on iOS (1)", https://www.youtube.com/watch?v=fzn3RsveJss, Oct. 1, 2017, 2 pages.

Mapletree Apps, "Apple ARKit iPhone Demo—Measure 3D Pro—Ruler on iOS (2)", https://www.youtube.com/watch?v=fzn3RsveJss, Oct. 1, 2017, 2 pages.

Mapletree Apps, "Measure 3D Tutorial series #1—How to Measure a Room", https://www.youtube.com/watch?v=HGV18HXXZqw, Apr. 19, 2018, 2 pages.

Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.

Mapletree Appls, "Measure 3D Tutorial #5—How to Measure Rectangle Shapes", https://www.youtube.com/watch?v=8Gg0SMwkvQU, Apr. 19, 2018, 2 pages.

Marriott, Adobe Aero: Getting Started with AR/Tutorial, https://www.youtube.com/watch?v=EU2V8Pn0GE4, Nov. 19, 2019, 3 pages.

Miller, "Apple Shares Detailed Human Interface Guidelines for Developers Building ARKit Apps", https://9to5mac.com/2017/08/29/arkit-human-interface-guidelines/, Aug. 29, 2017, 5 pages.

Nuernberger et al., "SnapToReality: Aligning Augmented Reality to the Real World", http://eyalofek.org/Papers/CHI2016_Snap2Reality.pdf., May 7-12, 2016, 12 pages.

Occipital HQ, "TapMeasure Spatial Utility to Capture and Measure Your Space", https://www.youtube.com/watch?v=Hy1Ex2MAXM, Sep. 19, 2017, 2 pages.

Perhiniak, "Yes I'm a Designer: Designing an Augmentged Reality Scene in Adobe Aero" https://wwwyoutube.com/watch?v=fo8a?G0, Jan. 27, 2020, 14 pages.

SmartPicture, "PLNAR—Your AR Measurement Tool", https://www.youtube.com/watch?v=H_cqZqKLjws, Sep. 28, 2017, 2 pages.

SmarPicture Tech, "Mobile App Design for Bay Area—Rely on the Reinvently Agency", https://appadvice.com/app/plnar/1282049921, Sep. 21, 2018, 5 pages.

YouTube, "A1 Corner & Edge Detection (beta)", https://www.youtube.com/watch?v=YSNklighUtxA, Nov. 21, 2020, 2 pages.

(56) References Cited

OTHER PUBLICATIONS

YouTube, "How Do I Use The iPhone Measure App? How Accurate Is It?", https://www.youtube.com/watch?v=RvhZ074Vs7c, Aug. 8, 2018, 3 pages.
YouTube, "Third Aurora: Adobe Aero Tutorial—How to get Started with Adobe Aero", https://www.youtube.com/watch?v=EU2v8P, Nov. 18, 2019, 3 pages.
YouTube, AR Measure—Automatic Measure in Augmented Reality, https://www.youtube.com/watch?v=70CQfH76vg4, Mar. 16, 2019, 2 pages.
YouTube, Huawei P30 Pro AR Measure / Measure length, depth, area and volume hxos plus, https;//www.youtube.com/watch?v=0OX5QaK7YY, Mar. 26, 2019, 2 pages.
YouTube, Yes, I'm a Designer: "Designing an Augmented Reality Scene in Adobe Aero", https:www.youtube.com/watch?v=fo8aGOvCY7k, Jan. 27, 2020, 3 pages.
Office Action, dated Feb. 21, 2019, received in U.S. Appl. No. 16/145,01, 34 pages.
Notice of Allowance, dated Jun. 5, 2019, received in U.S. Appl. No. 16/145,015, 12 pages.
Office Action, dated Aug. 31, 2018, received in Danish Patent Application No. 201870350, which corresponds with U.S. Appl. No. 16/145,015, 11 pages.
Office Action, dated May 28, 2019, received in Danish Patent Application No. 201870350, which corresponds with U.S. Appl. No. 16/145,015, 6 pages.
Office Action, dated Feb. 21, 2020, received in Danish Patent Application No. 201870350, which corresponds with U.S. Appl. No. 16/145,015, 8 pages.
Intention to Grant, dated Mar. 30, 2023, received in European Patent Application NO. 21178349.3, which corresponds with U.S. Appl. No. 16/145,015, 8 pages.
Office Action, dated Oct. 6, 2021, received in European Patent Application No. 21178349.3, which corresponds with U.S. Appl. No. 16/145,015, 8 pages.
Notice of Allowance, dated Nov. 22, 2019, received in U.S. Appl. No. 16/138,779, 17 pages.
Office Action, dated Jul. 7, 2021, received in Australian Patent Application No. 2019267352, which corresponds with U.S. Appl. No. 16/138,779, 5 pages.
Notice of Acceptance, dated Aug. 9, 2021, received in Australian Patent Application No. 2019267352, which corresponds with U.S. Appl. No. 16/138,779, 3 pages.
Patent, dated Dec. 2, 2021, received in Australian Patent Application No. 2019267352, which corresponds with U.S. Appl. No. 16/138,779, 3 pages.
Office Action, dated Aug. 31, 2018, received in Danish Patent Application No. 201870351, which corresponds with U.S. Appl. No. 16/138,779, 11 pages.
Office Action, dated Feb. 13, 2020, received in Danish Patent Application No. 201870351, which corresponds with U.S. Appl. No. 16/138,779, 10 pages.
Office Action, dated Mar. 21, 2019, received in U.S. Appl. No. 16/145,025, 14 pages.
Final Office Action, dated Sep. 19, 2019, received in U.S. Appl. No. 16/145,025, 15 pages.
Office Action, dated Jun. 12, 2020, received in U.S. Appl. No. 16/145,025, 17 pages.
Final Office Action, dated Dec. 18, 2020, received in U.S. Appl. No. 16/145,025, 17 pages.
Notice of Allowance, dated Mar. 17, 2021, received in U.S. Appl. No. 16/145,025, 5 pages.
Innovation Patent, dated May 22, 2019, received in Australian Patent Application No. 2019100486, which corresponds with U.S. Appl. No. 16/138,779, 3 pages.
Certificate of Examination, dated Jul. 19, 2019, received in Australian Patent Application No. 2019100486, which corresponds with U.S. Appl. No. 16/138,779, 5 pages.
Office Action, dated Aug. 3, 2020, received in Chinese Patent Application No. 201910261469.3, which corresponds with U.S. Appl. No. 16/138,779, 5 pages.
Office Action, dated Jan. 20, 2021, received in Chinese Patent Application No. 201910261469.3, which corresponds with U.S. Appl. No. 16/138,779, 11 pages.
Notice of Allowance, dated Apr. 20, 2021, received in Chinese Patent Application No. 201910261469.3, which corresponds with U.S. Appl. No. 16/138,779, 6 pages.
Patent, dated Jul. 13, 2021, received in Chinese Patent Application No. 201910261469.3, which corresponds with U.S. Appl. No. 16/138,779, 6 pages.
Office Action, dated Sep. 28, 2018, received in Danish Patent Application No. 201870352, which corresponds with U.S. Appl. No. 16/145,025, 7 pages.
Office Action, dated Jan. 31, 2019, received in Danish Patent Application No. 201870352, which corresponds with U.S. Appl. No. 16/145,025, 4 pages.
Office Action, dated Sep. 16, 2019, received in Danish Patent Application No. 201870352, which corresponds with U.S. Appl. No. 16/145,025, 3 pages.
Office Action, dated Aug. 27, 2020, received in Danish Patent Application No. 201870352, which corresponds with U.S. Appl. No. 16/145,025, 2 pages.
Intention to Grant, dated Mar. 10, 2021, received in Danish Patent Application No. 201870352, which corresponds with U.S. Appl. No. 16/145,025, 2 pages.
Decision to Grant, dated Jul. 2, 2021, received in Danish Patent Application No. 201870352, which corresponds with U.S. Appl. No. 16/145,025, 2 pages.
Patent, dated Nov. 9, 2021, received in Danish Patent Application No. 201870352, which corresponds with U.S. Appl. No. 16/145,025, 3 pages.
Office Action, dated Jul. 17, 2019, received in European Patent Application No. 19159743.4, which corresponds with U.S. Appl. No. 16/145,025, 8 pages.
Office Action, dated Oct. 5, 2020, received in European Patent Application No. 19159743.4, which corresponds with U.S. Appl. No. 16/145,025, 6 pages.
Decision to Grant, dated Jun. 24, 2021, received in European Patent Application No. 19159743.4, which corresponds with U.S. Appl. No. 16/145,025, 2 pages.
Certificate of Grant, dated Aug. 13, 2021, received in European Patent Application No. 19159743.4, which corresponds with U.S. Appl. No. 16/145,025, 3 pages.
Office Action, dated Dec. 13, 2021, received in Japanese Patent Application No. 2020-562126, which corresponds with U.S. Appl. No. 16/145,025, 2 pages.
Notice of Allowance, dated May 30, 2022, received in Japanese Patent Application No. 2020-562126, which corresponds with U.S. Appl. No. 16/145,025, 2 pages.
Patent, dated Jun. 30, 2022, received in Japanese Patent Application No. 2020-562126, which corresponds with U.S. Appl. No. 16/145,025, 3 pages.
Office Action, dated Oct. 26, 2022, received in Korean Patent Application No. 2020-7032392, which corresponds with U.S. Appl. No. 16/145,025, 5 pages.
Office Action, dated Sep. 20, 2022, received in Indian Patent Application No. 202017052984, which corresponds with U.S. Appl. No. 16/145,025, 11 pages.
Notice of Allowance, dated May 15, 2020, received in U.S. Appl. No. 16/574,029, 10 pages.
Office Action, dated Jan. 20, 2022, received in Australian Patent Application No. 2019349408, which corresponds with U.S. Appl. No. 16/574,029, 3 pages.
Notice of Acceptance, dated Jul. 29, 2022, received in Australian Patent Application No. 2019349408, which corresponds with U.S. Appl. No. 16/574,029, 3 pages.
Notice of Allowance, dated Mar. 2, 2022, received in Chinese Patent Application No. 202110369762.9, which corresponds with U.S. Appl. No. 16/574,029, 7 pages.

(56) References Cited

OTHER PUBLICATIONS

Patent, dated Mar. 29, 2022, received in Chinese Patent Application No. 202110369762.9, which corresponds with U.S. Appl. No. 16/574,029, 6 pages.
Notice of Allowance, dated Apr. 25, 2022, received in Japanese Patent Application No. 2021-510765, which corresponds with U.S. Appl. No. 16/574,029, 2 pages.
Patent, dated May 12, 2022, received in Japanese Patent Application No. 2021-510765, which corresponds with U.S. Appl. No. 16/574,029, 3 pages.
Office Action, dated Dec. 29, 2022, received in Indian Patent Application No. 202117008282, which corresponds with U.S. Appl. No. 16/574,029, 10 pages.
Office Action, dated Feb. 24, 2023, received in Indian Patent Application No. 202118009402, which corresponds with U.S. Appl. No. 16/574,029, 7 pages.
Office Action, dated Jul. 6, 2022, received in Korean Patent Application No. 2021-7005584, which corresponds with U.S. Appl. No. 16/574,029, 13 pages.
Notice of Allowance, dated Mar. 22, 2023, received in Korean Patent Application No. 2021-7005584, which corresponds with U.S. Appl. No. 16/574,029, 2 pages.
Patent, dated Apr. 11, 2023, received in Korean Patent Application No. 2021-7005584, which corresponds with U.S. Appl. No. 16/574,029, 4 pages.
Office Action, dated Apr. 30, 2021, received in U.S. Appl. No. 17/030,209, 27 pages.
Office Action, dated Jan. 8, 2021, received in U.S. Appl. No. 17/018,958, 27 pages.
Notice of Allowance, dated Apr. 20, 2021, received in U.S. Appl. No. 17/018,958, 12 pages.
Office Action, dated Aug. 13, 2021, received in Australian Patent Application No. 2020239688, which corresponds with U.S. Appl. No. 17/018,958, 4 pages.
Office Action, dated Nov. 5, 2021, received in Australian Patent Application No. 2020239688, which corresponds with U.S. Appl. No. 17/018,958, 4 pages.
Notice of Allowance, dated Feb. 22, 2022, received in Australian Patent Application No. 2020239688, which corresponds with U.S. Appl. No. 17/018,958, 3 pages.
Certificate of Grant, dated Jun. 23, 2022, received in Australian Patent Application No. 2020239688, which corresponds with U.S. Appl. No. 17/018,958, 4 pages.
Office Action, dated Dec. 18, 2020, received in Danish Patent Application No. 202070602, which corresponds with U.S. Appl. No. 17/018,958, 10 pages.
Office Action, dated Mar. 14, 2022, received in Danish Patent Application No. 202070602, which corresponds with U.S. Appl. No. 17/018,958, 5 pages.
Office Action, dated Nov. 14, 2022, received in Danish Patent Application No. 202070602, which corresponds with U.S. Appl. No. 17/018,958, 2 pages.
Office action, dated Dec. 3, 2021, received in Indian Patent Application No. 202014041448, which corresponds with U.S. Appl. No. 17/018,958, 10 pages.
Notice of Allowance, dated Dec. 20, 2021, received in Japanese Patent Application No. 2020-159787, which corresponds with U.S. Appl. No. 17/018,958, 2 pages.
Notice of Allowance, dated Feb. 18, 2022, received in Japanese Patent Application No. 2022-005327, which corresponds with U.S. Appl. No. 17/018,958, 2 pages.
Patent, dated Mar. 14, 2022, received in Japanese Patent Application No. 2022-005327, which corresponds with U.S. Appl. No. 17/018,958, 3 pages.
Office Action, dated Nov. 8, 2021, received in Korean Patent Application No. 2020-0124085, which corresponds with U.S. Appl. No. 17/018,958, 9 pages.
Notice of Allowance, dated Jul. 13, 2022, received in Korean Patent Application No. 2020-0124085, which corresponds with U.S. Appl. No. 17/018,958, 2 pages.
Patent, dated Jul. 22, 2022, received in Korean Patent Application No. 2020-0124085, which corresponds with U.S. Appl. No. 17/018,958, 4 pages.
Office Action, dated Aug. 13, 2021, received in U.S. Appl. No. 17/202,233, 19 pages.
Final Office Action, dated Feb. 15, 2022, received in U.S. Appl. No. 17/202,233, 24 pages.
Office Action, dated Aug. 16, 2022, received in U.S. Appl. No. 17/202,233, 25 pages.
Notice of Allowance, dated Mar. 22, 2023, received in U.S. Appl. No. 17/202,233, 8 pages.
Office Action, dated Feb. 21, 2021, received in U.S. Appl. No. 16/841,550, 8 pages.
Notice of Allowance, dated May 4, 2021, received in U.S. Appl. No. 16/841,550, 12 pages.
Notice of Allowance, dated Dec. 7, 2021, received in U.S. Appl. No. 16/997,860, 10 pages.
Office Action, dated Jan. 22, 2021, received in U.S. Appl. No. 17/018,980, 17 pages.
Office Action, dated May 14, 2021, received in U.S. Appl. No. 17/018,980, 4 pages.
Notice of Allowance, dated May 28, 2021, received in U.S. Appl. No. 17/018,980, 5 pages.
Office Action, dated Aug. 20, 2021, received in Australian Patent Application No. 2020239675, which corresponds with U.S. Appl. No. 17/018,980, 4 pages.
Office Action, dated Dec. 16, 2021, received in Australian Patent Application No. 2020239675, which corresponds with U.S. Appl. No. 17/018,980, 2 pages.
Notice of Allowance, dated Jan. 21, 2022, received in Australian Patent Application No. 2020239675, which corresponds with U.S. Appl. No. 17/018,980, 3 pages.
Certificate of Grant, dated May 26, 2022, received in Australian Patent Application No. 2020239675, which corresponds with U.S. Appl. No. 17/018,980, 3 pages.
Office Action, dated Dec. 18, 2020, received in Danish Patent Application No. 202070603, which corresponds with U.S. Appl. No. 17/018,980, 9 pages.
Office Action, dated Feb. 25, 2022, received in Danish Patent Application No. 202070603, which corresponds with U.S. Appl. No. 17/018,980, 2 pages.
Office Action, dated Feb. 17, 2023, received in Danish Patent Application No. 202070603, which corresponds with U.S. Appl. No. 17/018,980, 4 pages.
Office Action, dated Aug. 10, 2021, received in Indian Patent Application No. 202014040937, which corresponds with U.S. Appl. No. 17/018,980, 7 pages.
Office Action, dated Dec. 20, 2021, received in Japanese Patent Application No. 2020-159788, which corresponds with U.S. Appl. No. 17/018,980, 2 pages.
Notice of Allowance, dated Feb. 18, 2022, received in Japanese Patent Application No. 2022-005328, which corresponds with U.S. Appl. No. 17/018,980, 2 pages.
Patent, dated Mar. 14, 2022, received in Japanese Patent Application No. 2022-005328, which corresponds with U.S. Appl. No. 17/018,980, 3 pages.
Office Action, dated Jan. 7, 2021, received in U.S. Appl. No. 17/018,994, 7 pages.
Notice of Allowance, dated Feb. 23, 2021, received in U.S. Appl. No. 17/018,994, 8 pages.
Office Action, dated Aug. 13, 2021, received in Australian Patent Application No. 2020239691, U.S. Appl. No. 17/018,994, 5 pages.
Office Action, dated Nov. 15, 2021, received in Australian Patent Application No. 2020239691, U.S. Appl. No. 17/018,994, 4 pages.
Notice of Allowance, dated Mar. 2, 2022, received in Australian Patent Application No. 2020239691, U.S. Appl. No. 17/018,994, 3 pages.
Office Action, dated Jan. 12, 2021, received in Danish Patent Application No. 2020-70604, which corresponds with U.S. Appl. No. 17/018,994, 8 pages.
Office Action, dated Feb. 4, 2022, received in Danish Patent Application No. 2020-70604, which corresponds with U.S. Appl. No. 17/018,994, 3 pages.

(56) References Cited

OTHER PUBLICATIONS

Office Action, dated Nov. 2, 2022, received in Danish Patent Application No. 2020-70604, which corresponds with U.S. Appl. No. 17/018,994, 3 pages.
Office Action, dated Dec. 2, 2021, received in Indian Patent Application No. 202014041104, which corresponds with U.S. Appl. No. 17/018,994, 7 pages.
Office Action, dated Jan. 7, 2022, received in Japanese Patent Application No. 2020-159789, which corresponds with U.S. Appl. No. 17/018,994, 5 pages.
Notice of Allowance, dated Aug. 8, 2022, received in Japanese Patent Application No. 2020-159789, which corresponds with U.S. Appl. No. 17/018,994, 1 page.
Patent, dated Sep. 9, 2022, received in Japanese Patent Application No. 2020-159789, which corresponds with U.S. Appl. No. 17/018,994, 3 pages.
Office Action, dated Apr. 5, 2022, received in U.S. Appl. No. 17/307,957, 10 pages.
Notice of Allowance, dated May 4, 2022, received in U.S. Appl. No. 17/307,957, 12 pages.
Office Action, dated Aug. 31, 2022, received in Australian Patent Application No. 2021240284, which corresponds with U.S. Appl. No. 17/307,957, 2 pages.
Notice of Allowance, dated Sep. 14, 2022, received in Australian Patent Application No. 2021240284, which corresponds with U.S. Appl. No. 17/307,957, 3 pages.
Patent, dated Jan. 19, 2023, received in Australian Patent Application No. 2021240284, which corresponds with U.S. Appl. No. 17/307,957, 3 pages.
Office Action, dated Nov. 2, 2022, received in Chinese Patent Application No. 202110660753.5, 2 pages.
Office Action, dated Jul. 22, 2022, received in U.S. Appl. No. 17/344,846, 8 pages.
Final Office Action, dated Dec. 23, 2022, received in U.S. Appl. No. 17/344,846, 8 pages.
Notice of Allowance, dated Apr. 28, 2023, received in U.S. Appl. No. 17/344,846, 5 pages.
Office Action, dated Mar. 29, 2023, received in Australian Patent Application No. 2022202851, which corresponds with U.S. Appl. No. 17/344,846, 3 pages.
Office Action, dated Feb. 3, 2023, received in U.S. Appl. No. 17/568,624, 44 pages.
Noticed of Allowance, dated Dec. 7, 2022, received in U.S. Appl. No. 17/716,984, 10 pages.
European Search Report, dated Sep. 23, 2021, received in European Patent Application No. 21178349.3, which corresponds with U.S. Appl. No. 16/145,015, 4 pages.
Invitation to Pay Additional Fees, dated Jul. 15, 2019, received in International Patent Application No. PCT/US2019/029904, which corresponds with U.S. Appl. No. 16/145,015, 29 pages.
International Search Report and Written Opinion, dated Sep. 9, 2019, received in International Patent Application No. PCT/US2019/029904, which corresponds with U.S. Appl. No. 16/145,015, 31 pages.
European Search Report, dated Jul. 4, 2019, received in European Patent Application No. 19158743.4, which corresponds with U.S. Appl. No. 16/145,025, 4 pages.
Invitation to Pay Additional Fees, dated Dec. 12, 2019, received in International Patent Application No. PCT/US2019052140, which corresponds with U.S. Appl. No. 16/574,029, 18 pages.
International Search Report and Written Opinion, dated Feb. 5, 2020, received in International Patent Application No. PCT/US2019052140, which corresponds with U.S. Appl. No. 16/574,029, 22 pages.
Invitation to Pay Additional Fees, dated Jan. 19, 2021, received in International Patent Application No. PCT/US2020/052641, which corresponds with U.S. Appl. No. 17/030,209, 15 pages.
International Search Report and Written Opinion, dated Mar. 12, 2021, received in International Patent Application No. PCT/US2020/052641, which corresponds with U.S. Appl. No. 17/030,209, 21 pages.
Invitation to Pay Additional Fees, dated Jun. 23, 2021, received in International Patent Application No. PCT/US2021/022378, which corresponds with U.S. Appl. No. 17/200,676, 15 pages.
International Search Report and Written Opinion, dated Aug. 13, 2021, received in International Patent Application No. PCT/US2021/022378, which corresponds with U.S. Appl. No. 17/200,676, 19 pages.
Invitation to Pay Additional Fees, dated May 17, 2021, received in International Patent Application No. PCT/US2021/015556, which corresponds with U.S. Appl. No. 17/018,958, 19 pages.
International Search Report and Written Opinion, dated Jul. 8, 2021, received in International Patent Application No. PCT/US2021/015556, which corresponds with U.S. Appl. No. 17/018,958, 26 pages.
Invitation to Pay Additional Fees, dated Jul. 26, 2022, received in International Patent Application No. PCT/US2022/024894, which corresponds with U.S. Appl. No. 17/720,227, 34 pages.
Fukiage et al., "Reduction of Contradictory Partial Occlusion in Mixed Reality by Using Characteristics of Transparency Perception", 2012 IEEE International Symposium on, IEEE, Nov. 5, 2012, 11 pages.
Joaquim, et al., "Dynamic Occlusion Handling for Real-Time AR Applications", https://doi.org/10.1145335/99973365700, Nov. 2019, 10 pages.
Office Action, dated May 23, 2024, received in European Patent Application No. 21717681.7, which corresponds with U.S. Appl. No. 17/202,233, 6 pages.
Office Action, dated Dec. 22, 2023, received in Korean Patent Application No. 2020-0123687, which corresponds with U.S. Appl. No. 17/018,980, 9 pages.
Notice of Allowance, dated Mar. 5, 2024, received in Japanese Patent Application No. 2022-103836, which corresponds with U.S. Appl. No. 17/307,957, 1 page.
Final Office Action, dated Jul. 5, 2024, received in Korean Patent Application No. 2023-7019367, which corresponds with U.S. Appl. No. 17/307,957, 3 pages.
Notice of Allowance, dated Mar. 25, 2024, received in Australian Patent Application No. 2022202851, which corresponds with U.S. Appl. No. 17/344,846, 3 pages.
Office Action, dated Dec. 8, 2023, received in Japanese Patent Application No. 2022-142210, which corresponds with U.S. Appl. No. 17/344,846, 5 pages.
Patent, dated May 13, 2024, received in Japanese Patent Application No. 2022-142210, which corresponds with U.S. Appl. No. 17/344,846, 3 pages.
Notice of Allowance, dated Feb. 15, 2024, received in U.S. Appl. No. 17/568,624, 8 pages.
Notice of Allowance, dated Mar. 25, 2024, received in Australian Patent Application No. 2022235625, which corresponds with U.S. Appl. No. 17/568,624, 3 pages.
Office Action, dated Dec. 11, 2023, received in Korean Patent Application No. 2023-7012345, which corresponds with U.S. Appl. No. 17/716,984, 10 pages.
Notice of Allowance, dated Feb. 9, 2024, received in Australian Patent Application No. 2022231686, which corresponds with U.S. Appl. No. 17/750,133, 3 pages.
Certificate of Grant, dated Jun. 13, 2024, received in Australian Patent Application No. 2022231686, which corresponds with U.S. Appl. No. 17/750,133, 3 pages.
Office Action, dated Apr. 24, 2024, received in U.S. Appl. No. 18/372,606, 8 pages.
Office Action, dated Jun. 20, 2024, received in U.S. Appl. No. 18/382,444, 14 pages.
Extended European Search Report, dated Apr. 26, 2024, received in European Patent Application No. 24151350.6, which corresponds with U.S. Appl. No. 17/750,133, 8 pages.
IPhoneWave, "How to Use iPhone, [online]", http://web.archive.org/web/20111012000236/http:www.ipodwave.com:80/iphone/howt o/camera_video.html, Oct. 12, 2011, 5 pages.

(56) References Cited

OTHER PUBLICATIONS

Notice of Allowance, dated May 19, 2023, received in Korean Patent Application No. 2020-7032392, which corresponds with U.S. Appl. No. 16/145,025, 2 pages.
Patent, dated Jun. 8, 2023, received in Korean Patent Application No. 2020-7032392, which corresponds with U.S. Appl. No. 16/145,025, 4 pages.
Patent, dated Jun. 20, 2023, received in Chinese Patent Application No. 202110660753.5, 7 pages.
Office Action, dated Jun. 2, 2023, received in Japanese Patent Application No. 2022-077644, which corresponds with U.S. Appl. No. 17/716,984, 6 pages.
Office Action, dated May 17, 2023, received in U.S. Appl. No. 17/750,133, 23 pages.
Notice of Allowance, dated Jun. 28, 2023, received in U.S. Appl. No. 17/750,133, 10 pages.
Office Action, dated Jul. 5, 2023, received in Australian Patent Application No. 2022231686, which corresponds with U.S. Appl. No. 17/750,133, 2 pages.
Notice of Allowance, dated Jul. 6, 2023, received in U.S. Appl. No. 18/107,381, 24 pages.
Office Action, dated Nov. 24, 2023, received in Korean Patent Application No. 2023-7019367, which corresponds with U.S. Appl. No. 17/307,957, 7 pages.
International Search Report and Written Opinion, dated Dec. 14, 2023, received in International Patent Application No. PCT/US2023/021563, which corresponds with U.S. Appl. No. 18/144,746, 29 pages.
Grant Certificate, dated Jul. 25, 2024, received in Australian Patent Application No. 2022235625, which corresponds with U.S. Appl. No. 17/344,846, 3 pages.
Grant Certificate, dated Jul. 25, 2024, received in Australian Patent Application No. 2022235625, which corresponds with U.S. Appl. No. 17/568,624, 3 pages.
Notice of Allowance, dated Aug. 7, 2024, received in U.S. Appl. No. 18/372,606, 7 pages.
Office Action, dated Sep. 6, 2024, received in U.S. Appl. No. 18/219,627, 17 pages.
Notice of Allowance, dated Jun. 13, 2024, received in U.S. Appl. No. 18/388,176, 10 pages.
Office Action, dated Aug. 14, 2024, received in U.S. Appl. No. 18/412,251, 10 pages.
Patent, dated Mar. 11, 2025, received in Indian Patent Application No. 202017052984, which corresponds with U.S. Appl. No. 16/145,025, 4 pages.
Office Action, dated Dec. 23, 2024, received in Indian Patent Application No. 202118009402, which corresponds with U.S. Appl. No. 16/574,029, 3 pages.
Office Action, dated Jan. 16, 2025, received in Chinese Patent Application No. 202210629947.3, which corresponds with U.S. Appl. No. 17/030,209, 2 pages.
Office action, dated Sep. 30, 2024, received in Indian Patent Application No. 202014041448, which corresponds with U.S. Appl. No. 17/018,958, 8 pages.
Patent, dated Feb. 27, 2025, received in Indian Patent Application No. 202014041448, which corresponds with U.S. Appl. No. 17/018,958, 6 pages.
Office Action, dated Mar. 4, 2025, received in Japanese Patent Application No. 2024-026846, which corresponds with U.S. Appl. No. 16/997,860, 7 pages.
Notice of Allowance, dated Dec. 5, 2024, received in Korean Patent Application No. 2020-0123687, which corresponds with U.S. Appl. No. 17/018,980, 3 pages.
Patent, dated Sep. 23, 2024, received in Indian Patent Application No. 202014041104, which corresponds with U.S. Appl. No. 17/018,994, 6 pages.
Notice of Allowance, dated Nov. 7, 2024, received in Korean Patent Application No. 2023-7019367, which corresponds with U.S. Appl. No. 17/307,957, 3 pages.
Patent, dated Feb. 6, 2025, received in Korean Patent Application No. 2023-7019367, which corresponds with U.S. Appl. No. 17/307,957, 4 pages.
Office Action, dated Nov. 5, 2024, received in Japanese Patent Application No. 2022-077644, which corresponds with U.S. Appl. No. 17/716,984, 17 pages.
Office Action, dated Sep. 23, 2024, received in Korean Patent Application No. 2023-7012345, which corresponds with U.S. Appl. No. 17/716,984, 5 pages.
Intent to Grant, dated Oct. 14, 2024, received in European Patent Application No. 24151350.6, 11 pages.
Decision to Grant, dated Feb. 20, 2025, received in European Patent Application No. 24151350.6, 7 pages.
Final Office Action, dated Jan. 17, 2025, received in U.S. Appl. No. 18/219,627, 19 pages.
Notice of Allowance, dated Jan. 10, 2025, received in U.S. Appl. No. 18/382,444, 6 pages.
Office Action, dated Feb. 27, 2025, received in U.S. Appl. No. 18/656,318, 15 pages.
Office Action, dated Jun. 3, 2025, received in Indian Patent Application No. 202318041184, which corresponds with U.S. Appl. No. 16/138,779, 8 pages.
Office Action, dated Mar. 24, 2025, received in Japanese Patent Application No. 2024-060325, which corresponds with U.S. Appl. No. 16/138,779, 5 pages.
Office Action, dated Apr. 28, 2025, received in European Patent Application No. 19783191.0, which corresponds with U.S. Appl. No. 16/574,029, 6 pages.
Patent, dated Mar. 21, 2025, received in Indian Patent Application No. 202118009402, which corresponds with U.S. Appl. No. 16/574,029, 4 pages.
Office Action, dated Jun. 3, 2025, received in Indian Patent Application No. 202318041182, 9 pages.
Notice of Allowance, dated May 27, 2025, received in Chinese Patent Application No. 202210629947.3, which corresponds with U.S. Appl. No. 17/030,209, 5 pages.
Office Action, dated Apr. 16, 2025, received in European Application No. 20789374.4, which corresponds with U.S. Appl. No. 17/030,209, 14 pages.
Office Action, dated Jun. 6, 2023, received in Indian Patent Application No. 202318041185, 8 pages.
Patent, dated Apr. 1, 2025, received in European Patent Application No. 24151350.6, 7 pages.
Office Action, dated Jun. 2, 2025, received in U.S. Appl. No. 18/219,627, 26 pages.
Office Action, dated Jul. 7, 2025, received in Australian Patent Application No. 2024204720, which corresponds with U.S. Appl. No. 18/388,176, 2 pages.
Office Action, dated May 13, 2025, received in Japanese Patent Application No. 2024-076652, which corresponds with U.S. Appl. No. 18/382,444, 4 pages.
Notice of Allowance, dated Jun. 10, 2025, received in U.S. Appl. No. 18/412,251, 8 pages.
Office Action, dated Apr. 29, 2025, received in Australian Patent Application No. 2024202935, 5 pages.
Notice of Allowance, dated May 16, 2025, received in U.S. Appl. No. 18/656,318, 11 pages.
Patent, dated Jul. 5, 2025, received in Japanese Patent Application No. 2024-060325, which corresponds with U.S. Appl. No. 16/138,779, 4 pages.
Patent, dated Aug. 19, 2025, received in Chinese Patent Application No. 202210629947.3, which corresponds with U.S. Appl. No. 17/030,209, 4 pages.
Notice of Allowance, Aug. 22, 2025, received in Japanese Patent Application No. 2024-026846, which corresponds with U.S. Appl. No. 16/997,860, 2 pages.
Notice of Allowance, dated Jul. 28, 2025, received in Japanese Patent Application No. 2024-076652, which corresponds with U.S. Appl. No. 18/382,444, 2 pages.
Patent, dated Aug. 21, 2025, received in Japanese Patent Application No. 2024-076652, which corresponds with U.S. Appl. No. 18/382,444, 4 pages.

* cited by examiner

662 While displaying the first user interface, including the representation of the field of view and the preview of three-dimensional model, add, to the representation of the field of view, respective graphical objects at positions that correspond to one or more physical features that have been detected in a respective portion of the physical environment that is visible in the representation of the field of view 664 The one or more physical features include at least a first physical object, and the respective graphical objects include at least a first graphical object that is displayed at a first position on the representation of the field of view that corresponds to the first physical object 666 The one or more physical features include at least a first physical surface, and the respective graphical objects include at least a second graphical object that is displayed at a second position on the representation of the field of view that corresponds to the first physical surface 668 After the partially completed three-dimensional model is rotated to the third orientation in accordance with the first input, detect a termination of the first input. In response to detecting the termination of the first input, update the preview of the three-dimensional model in the first user interface, including, rotating the partially completed three-dimensional model from the third orientation to a fourth orientation that corresponds to a current viewpoint of the user 670 While displaying the first user interface, with the representation of the field of view including the second view of the physical environment that corresponds to the second viewpoint of the user, and with the preview of the three-dimensional model including the partially completed model with the second orientation, detect second input directed to the preview of the three-dimensional model in the first user interface.
In response to detecting the second input directed to the preview of the three-dimensional model in the first user interface, update the preview of the three-dimensional model in the first user interface in accordance with the second input, including, in accordance with a determination that the second input meets second criteria different from the first criteria, changing a scale of the partially completed three-dimensional model relative to representation of the field of view in accordance with the second input

Figure 6B

672 The preview of the three-dimensional model of the physical environment includes respective three-dimensional representations of one or more surfaces that have been detected in the physical environment 674 The preview of the three-dimensional model of the physical environment includes respective representations of one or more physical objects that have been detected in the physical environment 676 After adding the additional information to the partially completed three-dimensional model in the preview of the three-dimensional model, in accordance with a determination that the partially completed three-dimensional model of the physical environment meets preset criteria, replace display of the partially completed three-dimensional model in the preview of the three-dimensional model with display of a first view of a completed three-dimensional model of the physical environment, wherein the first view of the completed three-dimensional model includes an enlarged copy of the partially completed three-dimensional model that meets the preset criteria 678 While displaying the first view of the completed three-dimensional model in the first user interface, detect third input directed to the first view of the completed three-dimensional model in the first user interface.
In response to detecting the third input directed to the first view of the completed three-dimensional model in the first user interface, update the first view of the completed three-dimensional model in the first user interface in accordance with the third input, including, in accordance with a determination that the third input meets the first criteria, rotating the completed three-dimensional model from a fourth orientation to a fifth orientation different from the fourth orientation in accordance with the third input 680 After the completed three-dimensional model is rotated to the fifth orientation in accordance with the third input, detect a termination of the third input.
In response to detecting the termination of the third input, forgo updating the first view of the completed three-dimensional model in the first user interface, including, maintaining the completed three-dimensional model in the fifth orientation .

┌─────────────────────────────────────────────────────────────────────────┐
| 678                                                                     |
|                              (A)                                        |
|   ┌───────────────────────────────────────────────────────────────┐     |
|   | 682 The completed three-dimensional model includes a respective graphical |
|   | representation of a first structural element that is detected in the physical |
|   | environment and respective graphical representations of one or more physical |
|   | objects that are detected in the physical environment.        |     |
|   | Displaying the first view of the completed three-dimensional model includes: |
|   |     in accordance with a determination that a current orientation of the |
|   | completed three-dimensional model in the first user interface would cause the |
|   | respective graphical representation of the first structural element to occlude a |
|   | view of the respective graphical representations of the one or more objects, |
|   | forgoing display of the respective graphical representation of the first structural |
|   | element with the respective representations of the one or more objects in the |
|   | first view of the three-dimensional model; and               |     |
|   |     in accordance with a determination that the current orientation of the |
|   | completed three-dimensional model would not cause the respective graphical |
|   | representation of the first structural element to occlude the view of respective |
|   | graphical representations of one or more objects, concurrently display the |
|   | respective graphical representation of the first structural element with the |
|   | respective representations of the one or more objects in the first view of the |
|   | three-dimensional model                                       |     |
|   └───────────────────────────────────────────────────────────────┘     |
└─────────────────────────────────────────────────────────────────────────┘

┌─────────────────────────────────────────────────────────────────────────┐
| 684 Prior to displaying the first user interface, display a respective user interface of |
|                         a third-party application.                      |
| While displaying the respective user interface of the third-party application, detect a |
|   respective input that is directed to the respective user interface of the third-party |
| application, wherein the first user interface is displayed in response to detecting the |
|   respective input that is directed to the respective user interface of the third-party |
|      application and in accordance with a determination that the respective input |
|            corresponds to a request to scan the physical environment    |
|                                                                         |
|   ┌───────────────────────────────────────────────────────────────┐     |
|   |     686 In accordance with a determination that generation of the three- |
|   |  dimensional model meets preset criteria, redisplay the third-party application |
|   └───────────────────────────────────────────────────────────────┘     |
└─────────────────────────────────────────────────────────────────────────┘

Figure 6D

688 Displaying the preview of the three-dimensional model including the partially completed three-dimensional model includes displaying a graphical representation of a first structural element that is detected in the physical environment in a first direction relative to respective graphical representations of one or more objects that have been detected in the physical environment.
Rotating the partially completed three-dimensional model includes, in accordance with a determination that, a respective rotation of the partially completed three-dimensional model to be executed by the partially completed three-dimensional model would cause the graphical representation of the first structural element to occlude a view of the respective graphical representations of the one or more objects in the preview of the three-dimensional model, reducing an opacity of or ceasing to display the graphical representation of the first structural element while displaying the respective representations of the one or more objects in the preview of the three-dimensional model when executing the respective rotation of the partially completed three-dimensional model

690 Ceasing to display the graphical representation of the first structural element while displaying the respective representations of the one or more objects in the preview of the three-dimensional model when executing the respective rotation of the partially completed three-dimensional model includes, replacing display of the graphical representation of the first structural element with display of a first visual indication at a location of the graphical representation of the first structural element, wherein the first visual indication causes less visual occlusion of the respective graphical representations of the one or more objects in the preview of the three-dimensional model during the respective rotation of the partially completed three-dimensional model, as compared to an amount of visual occlusion that would have been caused by the graphical representation of the first structural element

692 Ceasing to display the graphical representation of the first structural element while displaying the respective representations of the one or more objects in the preview of the three-dimensional model when executing the respective rotation of the partially completed three-dimensional model includes, in accordance with a determination that the first structural element include one or more openings , ceasing to display respective graphical representations of the one or more openings in the first structural element , while displaying the respective representations of the one or more objects in the preview of the three-dimensional model when executing the respective rotation of the partially completed three-dimensional model

Figure 6E

694 Display the preview of the three-dimensional model with virtual lighting that is generated based on detected lighting in the physical environment 696 Display the preview of the three-dimensional model with preset virtual lighting that is different from detected lighting in the physical environment 698 In response to detecting the first movement of the one or more cameras, update the representation of the field of view in the first user interface in accordance with the first movement of the one or more cameras, including augmenting the representation of the field of view with respective graphical objects that correspond to the additional information that is added to the partially completed three-dimensional model

Figure 6F

712 The first time and the second time are different time points during a scan of the physical environment that obtains depth information in the physical environment using the one or more cameras.
Prior to the first time:
    display a first portion, less than all, of the first representation of the first object based on first depth information available from the scan of the physical environment; and
    after displaying the first portion, less than all, of the first representation of the first object, display a second portion, less than all, of the first representation of the first object based on second depth information available from the scan of the physical environment, wherein the second portion of the first representation includes the first portion of the first representation and additional portion of the first representation, and wherein the second depth information includes the first depth information and additional depth information obtained after the first depth information during the scan 714 Replacing display of the first representation of the first object with display of the second representation of the first object in the representation of the field of view includes fading out the first representation of the first object after the second representation of the first object is displayed, wherein the second representation of the first object identifies the first object 716 The first representation of the first object is displayed while the representation of the field of view in the first user interface includes a first view of the physical environment that corresponds to a first viewpoint of the user in the physical environment.
The second representation of the first object is displayed while the representation of the field of view in the first user interface includes a second view of the physical environment that corresponds to a second viewpoint of the user in the physical environment.
The first object is identified based, at least partially, on depth information obtained during movement of the one or more cameras that changed the current viewpoint of the user from the first viewpoint to the second viewpoint 718 The second representation of the first object indicates an object type of the first object 720 The second representation of the first object includes an icon or image that does not spatially indicate the one or more spatial dimensions of the first object

Figure 7B

722 The second representation of the first object is smaller than the first object 724 While displaying the first user interface including the representation of the field of view of the one or more cameras and including the second representation of the first object, detect first movement of the one or more cameras that changes the current viewpoint of the user from a first viewpoint to a second viewpoint.
In response to detecting the first movement of the one or more cameras that changes the current viewpoint of the user from the first viewpoint to the second viewpoint, move the second representation of the first object from a first position to a second position relative to the representation of the field of view, wherein the first position relative to the field of view and the second position relative to the field of view correspond to substantially the same location in the physical environment 726 While displaying the first user interface, in accordance with a determination that a second object different from the first object has been detected in the field of view of the one or more cameras:
    display, at a third time, a third representation of the second object at a position in the representation of the field of view that corresponds to a location of the second object in the physical environment, wherein one or more spatial properties of the third representation of the second object have values that correspond to one or more spatial dimensions of the second object in the physical environment; and
    at a fourth time later than the third time, replace display of the third representation of the second object with display of a fourth representation of the second object in the representation of the field of view, wherein the fourth representation of the first object does not spatially indicate the one or more spatial dimensions of the second object in the physical environment 728 The second representation of the first object and the fourth representation of the second object have the same appearance if the first object and the second object are of the same object type 730 The second representation of the first object and the fourth representation of the second object have different appearances if the first object and the second object are of different object types (B)

732 While displaying the first user interface including the representation of the field of view of the one or more cameras and including the fourth representation of the second object, detect second movement of the one or more cameras that changes the current viewpoint of the user from a third viewpoint to the fourth viewpoint.
In response to detecting the second movement of the one or more cameras that changes the current viewpoint of the user from the third viewpoint to the fourth viewpoint, move the fourth representation of the second object from a third position to a fourth position relative to the representation of the field of view, wherein the third position relative to the field of view and the fourth position relative to the field of view correspond to substantially the same location in the physical environment 734 The second representation of the first object changes its orientation during movement of the one or more cameras that changes the current viewpoint of the user 736 The first user interface concurrently includes the representation of the field of view and respective representations of a plurality of objects that are detected in the physical environment, and the respective representations of the plurality of objects do not spatially indicate respective physical dimensions of the plurality of objects.
The respective representations of the plurality of objects change their respective orientations to face toward the current viewpoint of the user during movement of the one or more cameras that changes the current viewpoint of the user

Figure 7D

812 The determination that there is a respective portion of the physical environment that has not been scanned that is between a first portion of the physical environment that has been scanned and a second portion of the physical environment that has been scanned includes:

a determination that first depth information that has been obtained during the first movement of the one or more cameras meets first criteria with respect to the first portion of the physical environment and the second portion of the physical environment;

a determination that the first depth information indicates existence of a third portion of the physical environment between the first portion and the second portion of the physical environment; and a determination that depth information that has been obtained during the scan does not meet the first criteria with respect to the third portion of the physical environment

---

814 The first visual indication overlaying the representation of the field of view of the one or more cameras includes an graphical objects that points out a direction of the location of the respective portion of the physical environment relative to other objects in the field of view of the one or more cameras

---

816 In response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, display, in the first user interface, a second visual indication in a preview of a three-dimensional model of the physical environment, wherein the second visual indication indicates the location of the respective portion of the physical environment in the preview of the three-dimensional model > 818 The first visual indication and the second visual indication are concurrently displayed in the first user interface

---

820 Displaying the first visual indication overlaying the representation of the field of view of the one or more cameras includes animating the first visual indication with movements that are independent of movement of the field of view of the one or more cameras

Figure 8B

822 Displaying the first visual indication overlaying the representation of the field of view of the one or more cameras includes displaying the first visual indication at a respective position overlaying the representation of the field of view, wherein the respective position corresponds to a respective depth of the respective portion of the physical environment from the second viewpoint in the physical environment 824 Scanning the first portion of the physical environment during a first period of time to obtain respective depth information corresponding to the first portion of the physical environment.
Scanning the second portion of the physical environment during a second period of time after the first period of time to obtain respective depth information corresponding to the second portion of the physical environment, wherein the first visual indication overlaying the representation of the field of view is displayed after scanning the first portion of the physical environment and scanning the second portion of the physical environment 826 Displaying the first visual indication includes:
 displaying the first graphical object at a first position relative to the representation of the field of view, wherein the first position corresponds to a first spatial region at a first depth from a current viewpoint of the user in the physical environment; and
 forgoing display of a respective portion of the first graphical object in accordance with a determination that a respective portion of the first spatial region is behind a first physical feature that is currently visible in the representation of the field of view of the one or more cameras, relative to the current viewpoint of the user in the physical environment 828 In response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, display, in the first user interface, a third visual indication overlaying the representation of the field of view of the one or more cameras, wherein the third visual indication indicates a location from which the respective portion of the physical environment will become visible in the field of view of the one or more cameras

Figure 8C

830 In response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, display, in the first user interface, a fourth visual indication in a preview of a three-dimensional model of the physical environment, wherein the fourth visual indication indicates, in the preview of the three-dimensional model, a location from which the respective portion of the physical environment will become visible in the field of view of the one or more cameras 832 The third visual indication and the fourth visual indication are concurrently displayed in the first user interface 834 In response to detecting the movement of the one or more cameras in the physical environment that includes the first movement that changes the current viewpoint of the user from the first viewpoint in the physical environment to the second viewpoint in the physical environment, in accordance with the determination that there is a portion of the physical environment that has not been scanned that is between a first portion of the physical environment that has been scanned and a second portion of the physical environment that has been scanned, display, in the first user interface, one or more prompts that guide a user to move to a location from which the respective portion of the physical environment will become visible in the field of view of the one or more cameras

Figure 8D

914 The first graphical object includes a first filled area that represents the one or more estimated spatial properties of the first physical feature, and the second graphical object includes a second filled area that represents the one or more estimated spatial properties of the second physical feature 916 Changing the one or more visual properties of the first graphical object in accordance with the variations in the respective predicted accuracy of the estimated spatial properties of the first physical feature includes changing a respective opacity of the first graphical object in accordance with changes in the respective predicted accuracy of the estimated spatial properties of the first physical object 918 Changing the one or more visual properties of the first graphical object in accordance with the variations in the respective predicted accuracy of the estimated spatial properties of the first physical feature includes changing a respective amount of feathering applied to edges of the first graphical object in accordance with changes in the respective predicted accuracy of the estimated spatial properties of the first physical object 920 Changing the respective amount of feathering applied to edges of the first graphical object in accordance with changes in the respective predicted accuracy of the estimated spatial properties of the first physical feature includes:
    in accordance with a determination that scanning of a corner corresponding to the first graphical object meets first criteria , decreasing the respective amount of feathering applied to the edges of the first graphical object; and
    in accordance with a determination that scanning of the corner corresponding to the first graphical object has not met the first criteria , increasing the respective amount of feathering applied to the edges of the first graphical object 922 Increasing the respective amount of feathering and decreasing the respective amount of feathering the first criteria are executed in accordance with a determination that the first graphical object includes a structural object and not a non-structural object

Figure 9B

924 Changing the one or more visual properties of the first graphical object in accordance with the variations in the respective predicted accuracy of the estimated spatial properties of the first physical feature includes changing a respective sharpness of the first graphical object in accordance with changes in the respective predicted accuracy of the estimated spatial properties of the first physical object 926 Changing the one or more visual properties of the first graphical object in accordance with variations in the respective predicted accuracy of the estimated spatial properties of the first physical feature includes:
    at a first time:
        in accordance with a determination that the respective predicted accuracy of the estimated spatial properties of the first physical feature is a first accuracy value for a first portion of the first physical feature, displaying a first portion of the first graphical object with a first property value for a first visual property of the one or more visual properties; and
    at a second time later than the first time:
        in accordance with a determination that the respective predicted accuracy of the estimated spatial properties of the first physical feature is a second accuracy value for the first portion of the first physical feature, displaying the first portion of the first graphical object with a second property value for the first visual property of the one or more visual properties , wherein the second accuracy value is different from the first accuracy value, and the second property value is different from the first property value 928 At a third time, in accordance with a determination that the respective predicted accuracy of the estimated spatial properties of the first physical feature is a third accuracy value for a third portion of the first physical feature, and a fourth accuracy value for a fourth portion of the first physical feature, display a third portion of the first graphical object with a third property value for a second visual property of the one or more visual properties, and display a fourth portion of the first graphical object with a fourth property value for the second visual property of the one or more visual properties, wherein the fourth portion of the first physical feature is different from the third portion of the first physical feature, the fourth accuracy value is different from the third accuracy value, and the fourth property value is different from the third property value

Figure 9C

930 The first physical feature includes a fifth portion of the first physical feature and a sixth portion of the first physical feature.
The fifth portion of the first physical feature is not visually occluded by another object in the field of view of the one or more cameras, and the sixth portion of the first physical feature is visually occluded by another object in the field of view of the one or more cameras.
Displaying the first graphical object includes:
    displaying a fifth portion of the first graphical object corresponding to the fifth portion of the first physical feature with a fifth property value that corresponds to a fifth accuracy value of the respective predicted accuracy of the one or more estimated spatial properties of the first physical feature; and
    displaying a sixth portion of the first graphical object corresponding to the sixth portion of the first physical feature with a sixth property value corresponding to a sixth accuracy value of the respective predicted accuracy of the one or more estimated spatial properties of the first physical feature;
    wherein the sixth property value corresponds to a lower visibility than the fifth property value does in the first user interface 932 In accordance with a determination that scanning of the first physical feature is completed :
    display a respective change in the one or more visual properties of the first graphical object to indicate completion of the scan for the first physical feature; and
    cease to change the one or more visual properties of the first graphical object in accordance with the variations in the respective predicted accuracy of the estimated spatial properties of the first physical feature 934 Displaying the respective change in the one or more visual properties of the first graphical object includes:
    in accordance with a determination that the first physical feature is of a first feature type, displaying a first type of change in the one or more visual properties of the first graphical object to indicate completion of the scan of the first physical feature; and
    in accordance with a determination that the first physical feature is of a second feature type different from the first feature type, displaying a second type of changes, different from the first type of changes, in the one or more visual properties of the first graphical object to indicate completion of the scan of the first physical feature 936 The first graphical object includes a set of one or more lines, and displaying the first type of change in the one or more visual properties of the first graphical object to indicate completion of the scan of the first physical feature includes reducing an amount of feathering (C)

Figure 9D

SYSTEMS, METHODS, AND GRAPHICAL USER INTERFACES FOR SCANNING AND MODELING ENVIRONMENTS

RELATED APPLICATIONS

This application claims priority to U.S. Provisional Patent Application No. 63/340,444, filed May 10, 2022, which is hereby incorporated by reference in its entirety.

TECHNICAL FIELD

This relates generally to computer systems for augmented and/or virtual reality, including but not limited to electronic devices for scanning and modeling environments, such as physical environments, and/or objects therein using augmented and/or virtual reality environments.

BACKGROUND

The development of computer systems for augmented and/or virtual reality has increased significantly in recent years. Augmented reality environments are useful for annotating and modeling physical environments and objects therein. Before a model of a physical environment is generated, a user needs to scan the physical environment using depth and/or image sensing devices. Conventional methods of scanning and modeling using augmented and/or virtual reality are cumbersome, inefficient, and limited. In some cases, conventional methods of scanning and modeling using augmented reality are limited in functionality, by not providing sufficient feedback and requiring the user to specify what type of features are being scanned. In some cases, conventional methods of scanning using augmented reality do not provide sufficient guidance to help the user scan the environment successfully and efficiently. In some cases, conventional methods of scanning and modeling using augmented reality do not provide user with sufficient feedback regarding the progress, quality, and result of the scan while the scan is in progress. In addition, conventional methods take longer than necessary, thereby wasting energy. This latter consideration is particularly important in battery-operated devices.

SUMMARY

Accordingly, there is a need for computer systems with improved methods and interfaces for scanning and modeling environments using augmented and/or virtual reality environments. Such methods and interfaces optionally complement or replace conventional methods for scanning and modeling environments using augmented and/or virtual reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for augmented and/or virtual reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touchscreen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to an augmented reality-based measurement function, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system that is in communication with a display generation component, one or more input devices, and one or more cameras. The method includes displaying, via the display generation component, a first user interface, wherein the first user interface concurrently includes: a representation of a field of view of one or more cameras, the representation of the field of view including a first view of a physical environment that corresponds to a first viewpoint of a user in the physical environment, and a preview of a three-dimensional model of the physical environment. The preview includes a partially completed three-dimensional model of the physical environment that is displayed with a first orientation that corresponds to the first viewpoint of the user. The method includes, while displaying the first user interface, detecting first movement of the one or more cameras in the physical environment that changes a current viewpoint of the user in the physical environment from the first viewpoint to a second viewpoint. The method further includes, in response to detecting the first movement of the one or more cameras: updating the preview of the three-dimensional model in the first user interface in accordance with the first movement of the one or more cameras, including adding additional information to the partially completed three-dimensional model and rotating the partially completed three-dimensional model from the first orientation that corresponds to the first viewpoint of the user to a second orientation that corresponds to the second viewpoint of the user. The method includes, while displaying the first user interface, with the representation of the field of view including a second view of the physical environment that corresponds to the second viewpoint of the user, and with the preview of the three-dimensional model including the partially completed model with the second orientation, detecting first input directed to the preview of the three-dimensional model in the first user interface. The method includes, in response to detecting the first input directed to the preview of the three-dimensional model in the first user interface: updating the preview of the three-dimensional model in the first user interface in accordance with the first input, including, in accordance with a determination that the first input meets first criteria, rotating the partially completed three-dimensional model from the second orientation that corresponds to the second viewpoint of the user to a third orientation that does not correspond to the second viewpoint of the user.

In accordance with some embodiments, a method is performed at a computer system that is in communication with a display generation component, one or more input devices, and one or more cameras. The method includes displaying, via the display generation component, a first user interface. The first user interface includes a representation of a field of view of one or more cameras, and the representation of the field of view includes a respective view of a physical environment that corresponds to a current viewpoint of a user in the physical environment. The method includes, while displaying the first user interface, in accordance with a determination that a first object has been detected in the field of view of the one or more cameras, displaying, at a first time, a first representation of the first object at a position in the representation of the field of view that corresponds to a location of the first object in the physical environment. One or more spatial properties of the first representation of the first object have values that correspond to one or more spatial dimensions of the first object in the physical environment. The method includes, at a second time later than the first time, replacing display of the first representation of the first object with display of a second representation of the first object in the representation of the field of view. The second representation of the first object does not spatially indicate the one or more spatial dimensions of the first object in the physical environment.

In accordance with some embodiments, a method is performed at a computer system that is in communication with a display generation component, one or more input devices, and one or more cameras. The method includes, during a scan of a physical environment to obtain depth information of at least a portion of the physical environment: displaying, via the display generation component, a first user interface. The first user interface includes a representation of a field of view of one or more cameras, and the representation of the field of view includes a respective view of a physical environment that corresponds to a current viewpoint of a user in the physical environment. The method includes, while displaying the first user interface, detecting movement of the one or more cameras in the physical environment, including detecting first movement that changes the current viewpoint of the user from a first viewpoint in the physical environment to a second viewpoint in the physical environment. The method further includes, in response to detecting the movement of the one or more cameras in the physical environment that includes the first movement that changes the current viewpoint of the user from the first viewpoint in the physical environment to the second viewpoint in the physical environment, in accordance with a determination that there is a respective portion of the physical environment that has not been scanned that is between a first portion of the physical environment that has been scanned and a second portion of the physical environment that has been scanned, displaying, in the first user interface, a first visual indication overlaying the representation of the field of view of the one or more cameras, wherein the first visual indication indicates a location of the respective portion of the physical environment in the field of view of the one or more cameras, while the respective portion of the physical environment is not visible in representation of the field of view of the one or more cameras.

In accordance with some embodiments, a method is performed at a computer system that is in communication with a display generation component, one or more input devices, and one or more cameras. The method includes, during a scan of a physical environment to obtain depth information of at least a portion of the physical environment, displaying, via the display generation component, a first user interface, wherein the first user interface includes a representation of a field of view of one or more cameras. The method includes displaying a plurality of graphical objects overlaying the representation of the field of view of the one or more cameras, including displaying at least a first graphical object at a first location that represents one or more estimated spatial properties of a first physical feature that has been detected in a respective portion of the physical environment in the field of view of the one or more cameras, and a second graphical object at a second location that represents one or more estimated spatial properties of a second physical feature that has been detected in the respective portion of the physical environment in the field of view of the one or more cameras. The method includes, while displaying the plurality of graphical objects overlaying the representation of the field of view of the one or more cameras, changing one or more visual properties of the first graphical object in accordance with variations in a respective predicted accuracy of the estimated spatial properties of the first physical feature, and changing the one more visual properties of the second graphical object in accordance with variations in a respective predicted accuracy of the estimated spatial properties of the second physical feature.

In accordance with some embodiments, a computer system includes (and/or is in communication with) a display generation component (also called a display device, e.g., a display, a projector, a head-mounted display, a heads-up display, or the like), one or more cameras (e.g., video cameras that continuously, or repeatedly at regular intervals, provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or one or more cameras tracking the position of one or more features of the user such as the user's hands), optionally one or more depth sensors, optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, in accordance with any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for annotating, measuring, and modeling environments, such as physical environments, and/or objects therein using augmented and/or virtual reality environments, thereby increasing the effectiveness, efficiency, and user satisfaction with such computer systems. Such methods and interfaces may complement or replace conventional methods for annotating, measuring, and modeling environments, such as physical environments, and/or objects therein using augmented and/or virtual reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams of a method of displaying a preview of a three-dimensional model of an environment during scanning and modeling of the environment, in accordance with some embodiments.

FIGS. 7A-7D are flow diagrams of a method of displaying representations of objects identified in an environment during scanning and modeling of the environment, in accordance with some embodiments.

FIGS. 8A-8D are flow diagrams of a method of providing guidance indicating location of a missed portion of a presumably completed portion of an environment during scanning and modeling of the environment, in accordance with some embodiments.

FIGS. 9A-9E are flow diagrams of a method of displaying scan progress indication during scanning and modeling of an environment, in accordance with some embodiments.

DESCRIPTION OF EMBODIMENTS

As noted above, augmented reality environments are useful for facilitating scanning and modeling physical environments and objects therein, by providing different views of the physical environments and objects therein and guiding the user to move through the physical environments to capture the data necessary to generate the models of the physical environments. Conventional methods of scanning and modeling using augmented and/or virtual reality environments are often limited in functionality. In some cases, conventional methods of scanning and modeling physical environments using augmented reality do not provide a preview of a three-dimensional model that is generated based on the scan until the scan is fully completed. In some cases, conventional methods of scanning and modeling physical environments using augmented reality display a three-dimensional representation of the physical environment during the scan of the physical environment, but do not allow the user to manipulate or view the three-dimensional representation from a different angle during the scan of the physical environment. In some cases, conventional methods of scanning and modeling physical environments do not scan and model structural and nonstructural elements of the physical environment simultaneously during the same scan and do not display annotations based on recognition of the structural elements and nonstructural elements in the augmented reality environment and the preview of the three-dimensional model of the physical environment. The embodiments disclosed herein provide an intuitive way for a user to scan and model an environment using augmented and/or virtual reality environments (e.g., by providing more intelligent and sophisticated functionality, by enabling the user to perform different operations in the augmented reality environment with fewer inputs, and/or by simplifying the user interface). Additionally, the embodiments herein provide improved feedback that provide additional information to the user about the physical objects being scanned or modeled and about the operations being performed in the virtual/augmented reality environment.

The systems, methods, and GUIs described herein improve user interface interactions with augmented and/or virtual reality environments in multiple ways. For example, they make it easier to scan and model a physical environment, by providing automatic detection of features in the physical space and annotate different types of detected features, improved guidance, . . . by providing the user with improved feedback about the progress of the modeling process while modeling an environment.

Figure 4A:
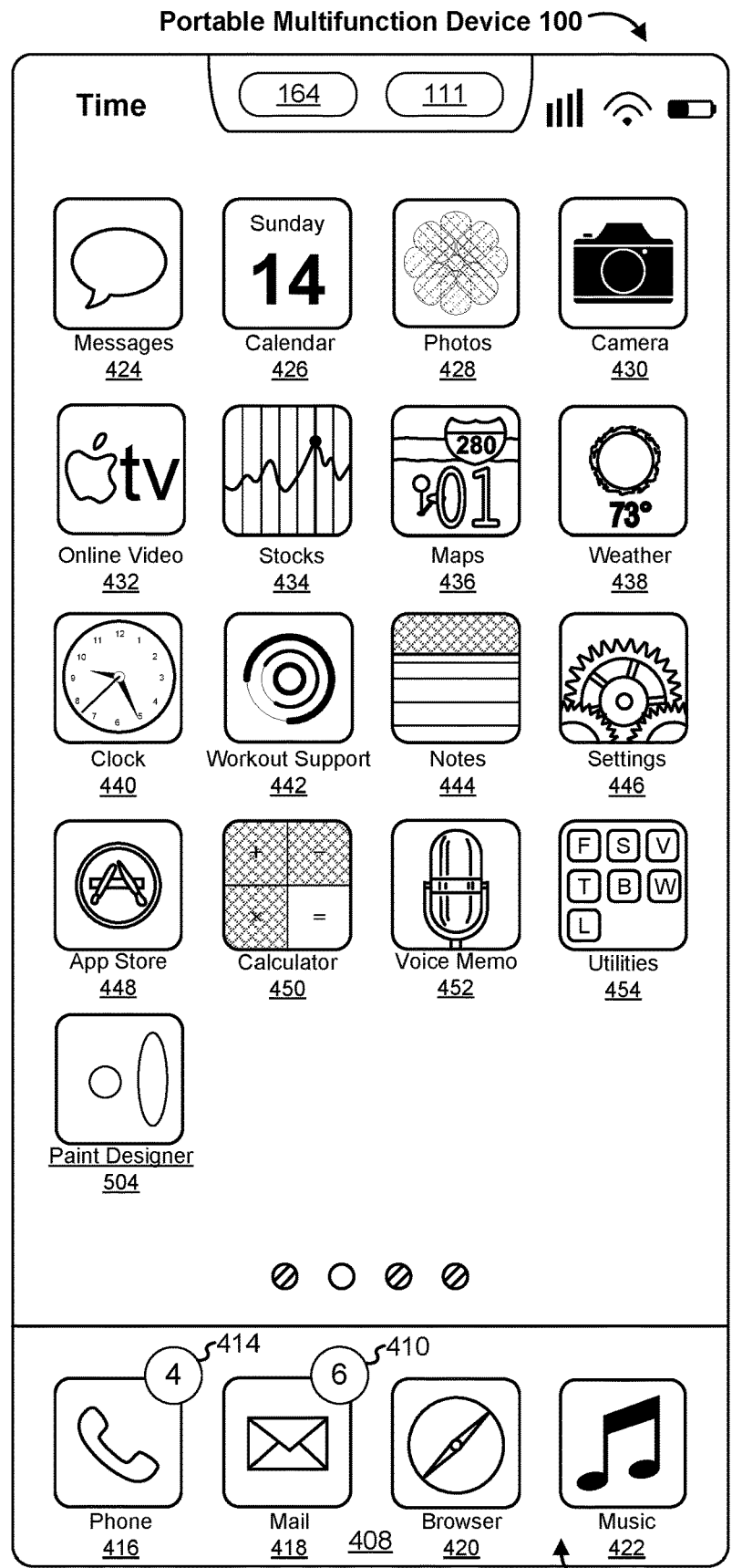
FIG. 4A illustrates an example user interface for presenting a menu of applications on a portable multifunction device in accordance with some embodiments.
Figure 4B:
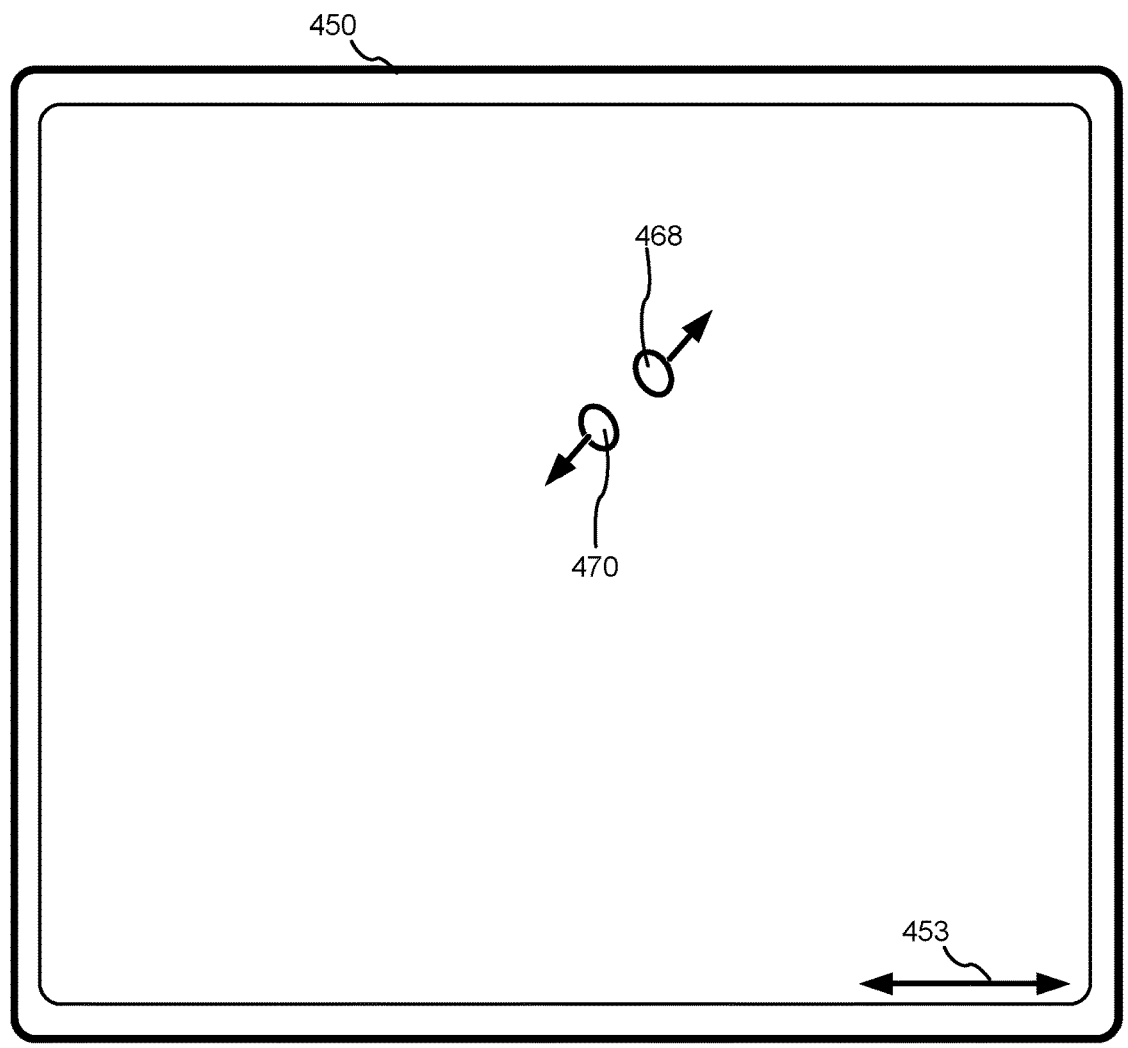
FIG. 4B illustrates an example user interface for a multifunction device with a touch-sensitive surface that is separate from the display in accordance with some embodiments.
Figure 4B:
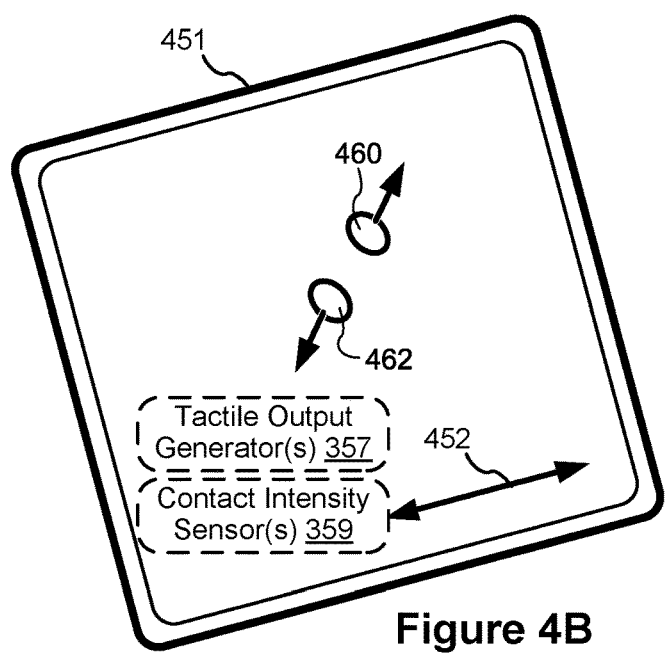
Figure 5A:
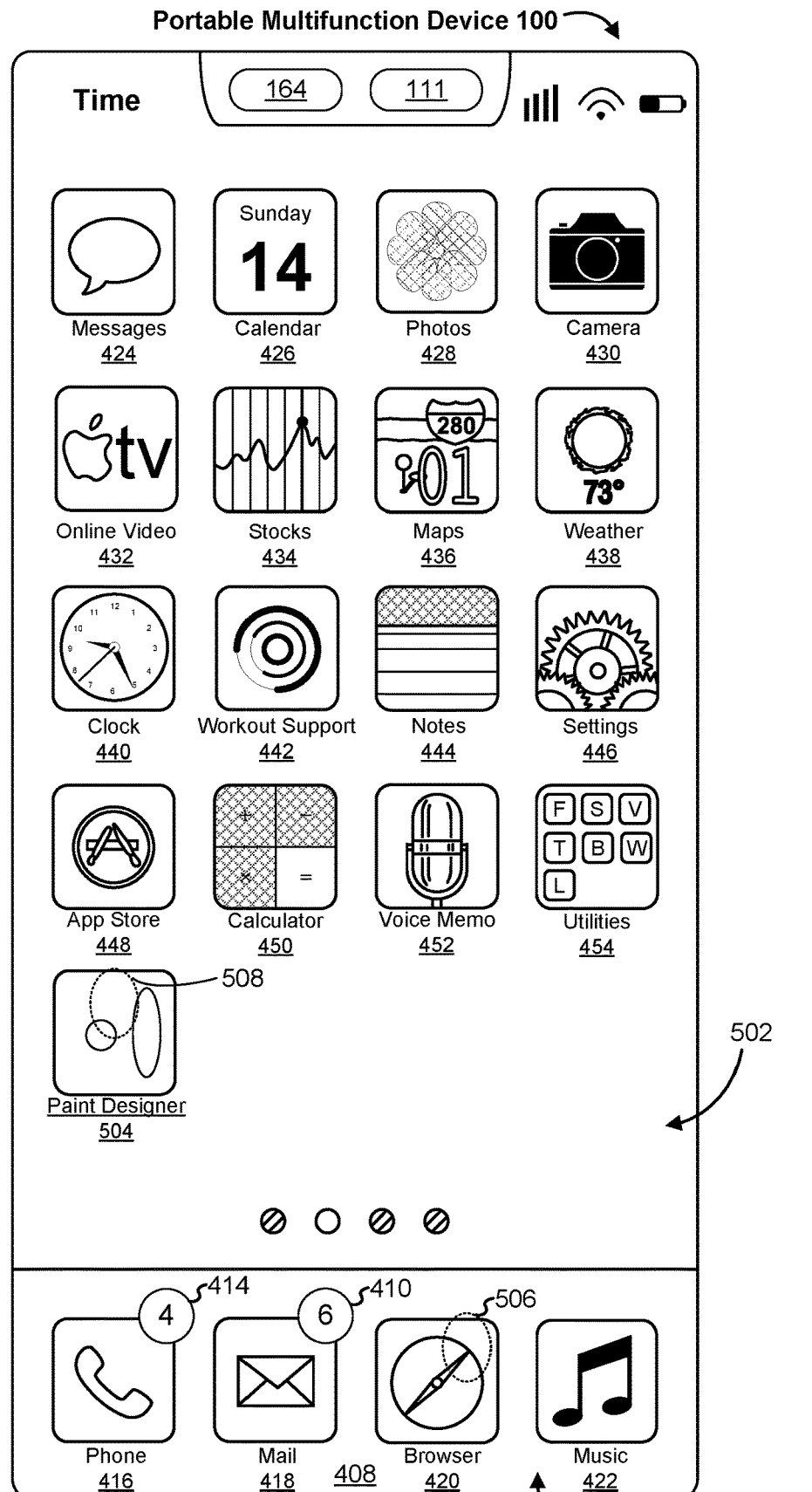
FIGS. 5A-5AD illustrate example user interfaces for scanning and modeling an environment and interacting with a generated schematic representation thereof in accordance with some embodiments.

Below, FIGS. 1A-1B, 2A-2B, and 3A-3C provide a description of example devices. FIGS. 4A-4B and 5A-5AD illustrate example user interfaces for interacting with, annotating, scanning, and modeling environments, such as augmented reality environments. FIGS. 6A-6F are flow diagrams of a method of displaying a preview of a three-dimensional model of an environment during scanning and modeling of the environment, in accordance with some embodiments. FIGS. 7A-7D are flow diagrams of a method of displaying representations of objects identified in an environment during scanning and modeling of the environment, in accordance with some embodiments. FIGS. 8A-8D are flow diagrams of a method of providing guidance indicating location of a missed portion of a presumably completed portion of an environment during scanning and modeling of the environment, in accordance with some embodiments. FIGS. 9A-9E are flow diagrams of a method of displaying scan progress indication during scanning and modeling of an environment, in accordance with some embodiments. The user interfaces in FIGS. 5A-5AD are used to illustrate the processes in FIGS. 6A-6F, 7A-7D, 8A-8D, and 9A-9E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for augmented and/or virtual reality include electronic devices that produce augmented and/or virtual reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
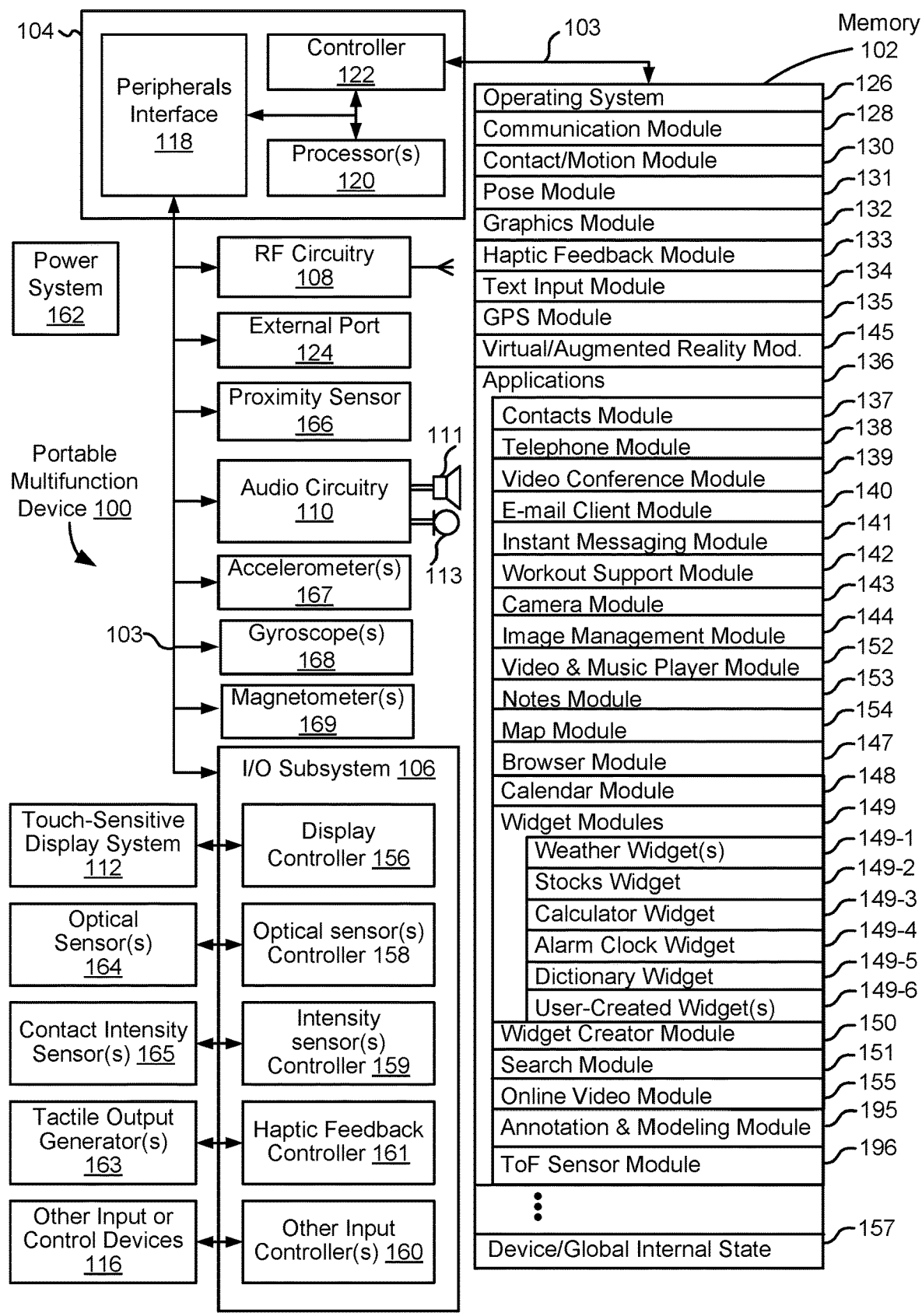
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture)

and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:
 contacts module 137 (sometimes called an address book or contact list);
 telephone module 138;
 video conferencing module 139;
 e-mail client module 140;
 instant messaging (IM) module 141;
 workout support module 142;
 camera module 143 for still and/or video images;
 image management module 144;
 browser module 147;
 calendar module 148;
 widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
 widget creator module 150 for making user-created widgets 149-6;
 search module 151;
 video and music player module 152, which is, optionally, made up of a video player module and a music player module;
 notes module 153;
 map module 154; and/or
 online video module 155;
 annotation and modeling module 195; and/or
 time-of-flight ("ToF") sensor module 196.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed.

As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with touch-sensitive display system 112, display controller 156, contact module 130, graphics module 132, camera module 143, image management module 152, video & music player module 152, and virtual/augmented reality module 145, annotation and modeling module 195 includes executable instructions that allow the user to model physical environments and/or physical objects therein and to annotate (e.g., measure, draw on, and/or add virtual objects to and manipulate virtual objects within) a representation (e.g., live or previously-captured) of a physical environment and/or physical objects therein in an augmented and/or virtual reality environment, as described in more detail herein.

In conjunction with camera module 143, ToF sensor module 196 includes executable instructions for capturing depth information of a physical environment. In some embodiments, ToF sensor module 196 operates in conjunction with camera module 143 to provide depth information of a physical environment.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
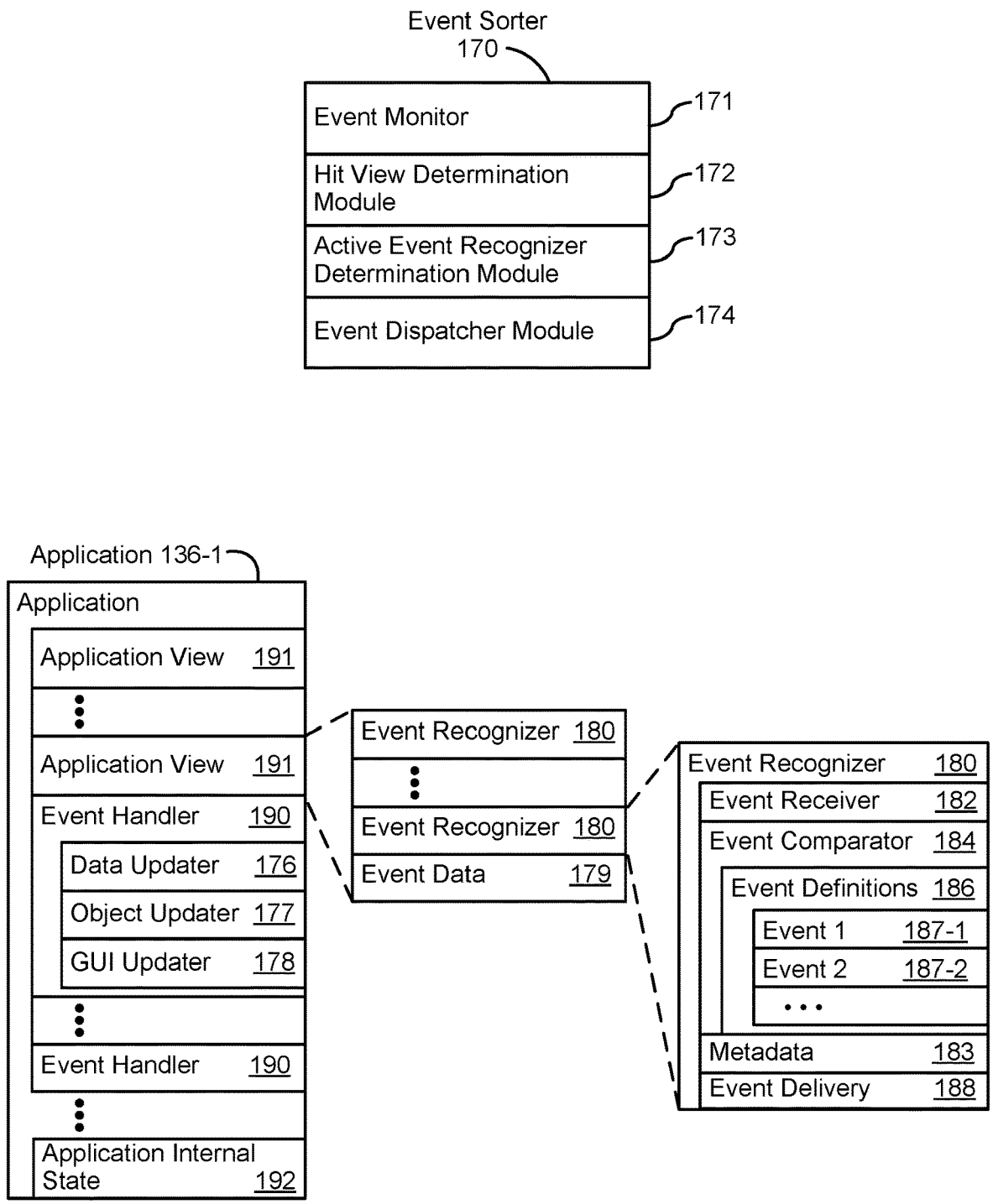
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2A:
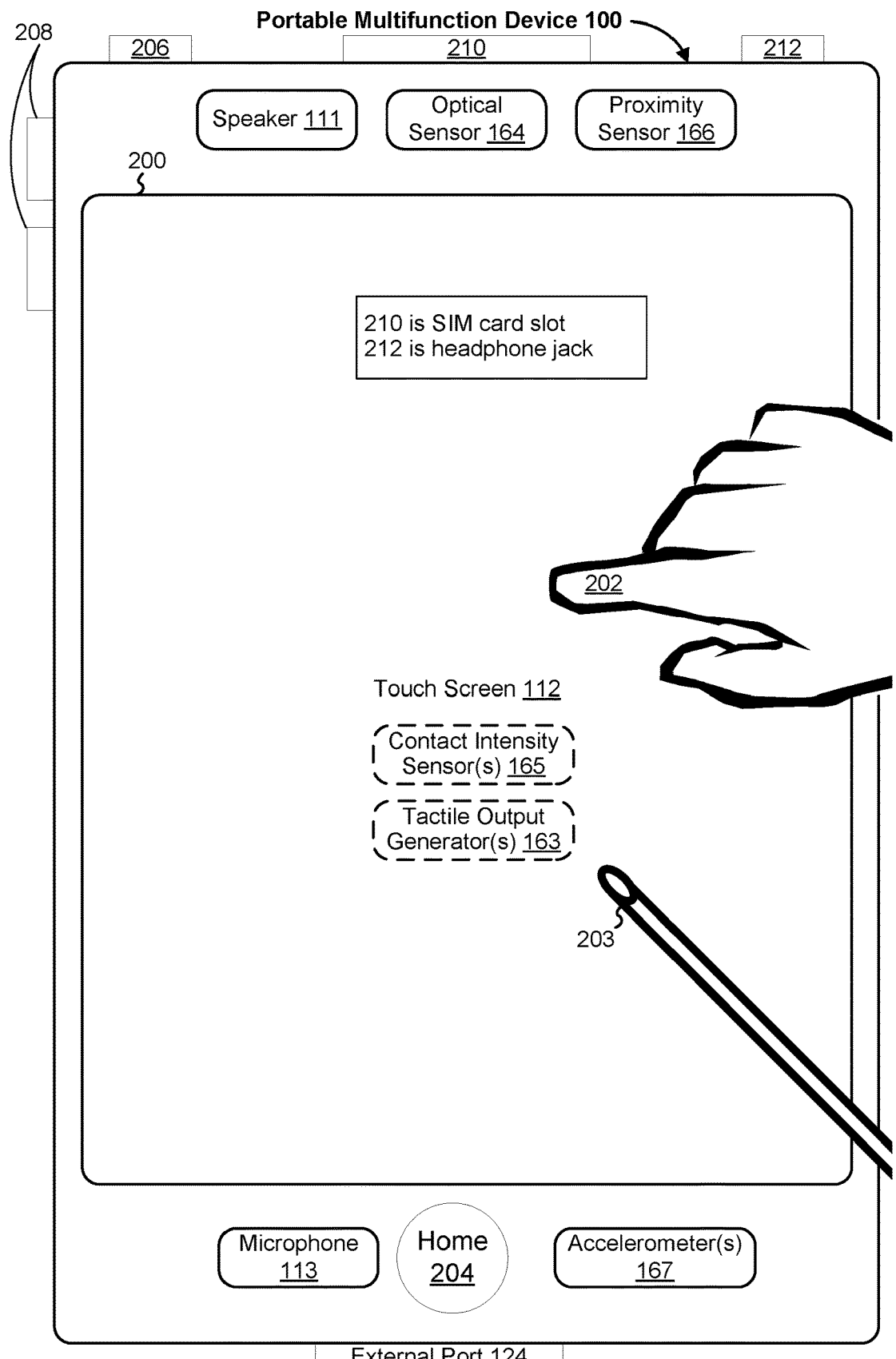
FIG. 2A illustrates a portable multifunction device having a touch screen in accordance with some embodiments.

FIG. 2A illustrates a portable multifunction device 100 (e.g., a view of the front of device 100) having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 2B:
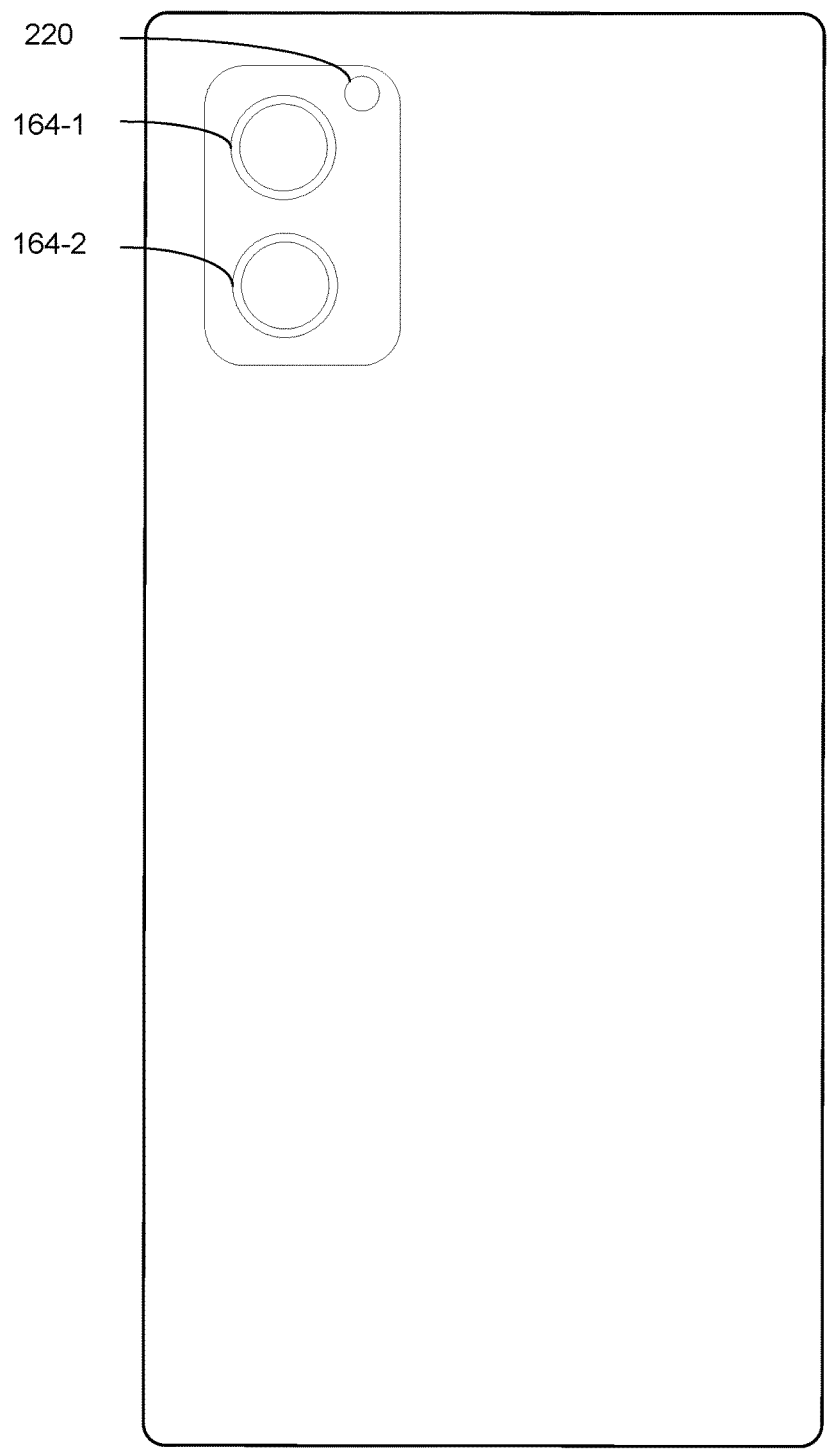
FIG. 2B illustrates a portable multifunction device having optical sensors and a time-of-flight sensor in accordance with some embodiments.

FIG. 2B illustrates a portable multifunction device 100 (e.g., a view of the back of device 100) that optionally includes optical sensors 164-1 and 164-2, and time-of-flight ("ToF") sensor 220. When optical sensors (e.g., cameras) 164-1 and 164-2 concurrently capture a representation of a physical environment (e.g., an image or a video), the portable multifunction device can determine depth information from the disparity between the information concurrently captured by the optical sensors (e.g., disparities between the captured images). Depth information provided by (e.g., image) disparities determined using optical sensors 164-1 and 164-2 may lack accuracy, but typically provides high resolution. To improve the accuracy of depth information provided by the disparity between images, time-of-flight sensor 220 is optionally used in conjunction with optical sensors 164-1 and 164-2. ToF sensor 220 emits a waveform (e.g., light from a light emitting diode (LED) or a laser), and measures the time it takes for the reflection(s) of the waveform (e.g., light) to return back to ToF sensor 220. Depth information is determined from the measured time it takes for the light to return back to ToF sensor 220. A ToF sensor typically provides high accuracy (e.g., accuracy of 1 cm or better with respect to measured distances or depths), but may lack high resolution (e.g., ToF sensor 220 optionally has a resolution that is one quarter of the resolution of optical sensors 164, or less than one quarter of the resolution of optical sensors 164, or one sixteenth of the resolution of optical sensors 164, or less than one sixteenth of the resolution of optical sensors 164). Therefore, combining depth information from a ToF sensor with depth information provided by (e.g., image) disparities determined using optical sensors (e.g., cameras) provides a depth map that is both accurate and has high resolution.

Figure 3A:
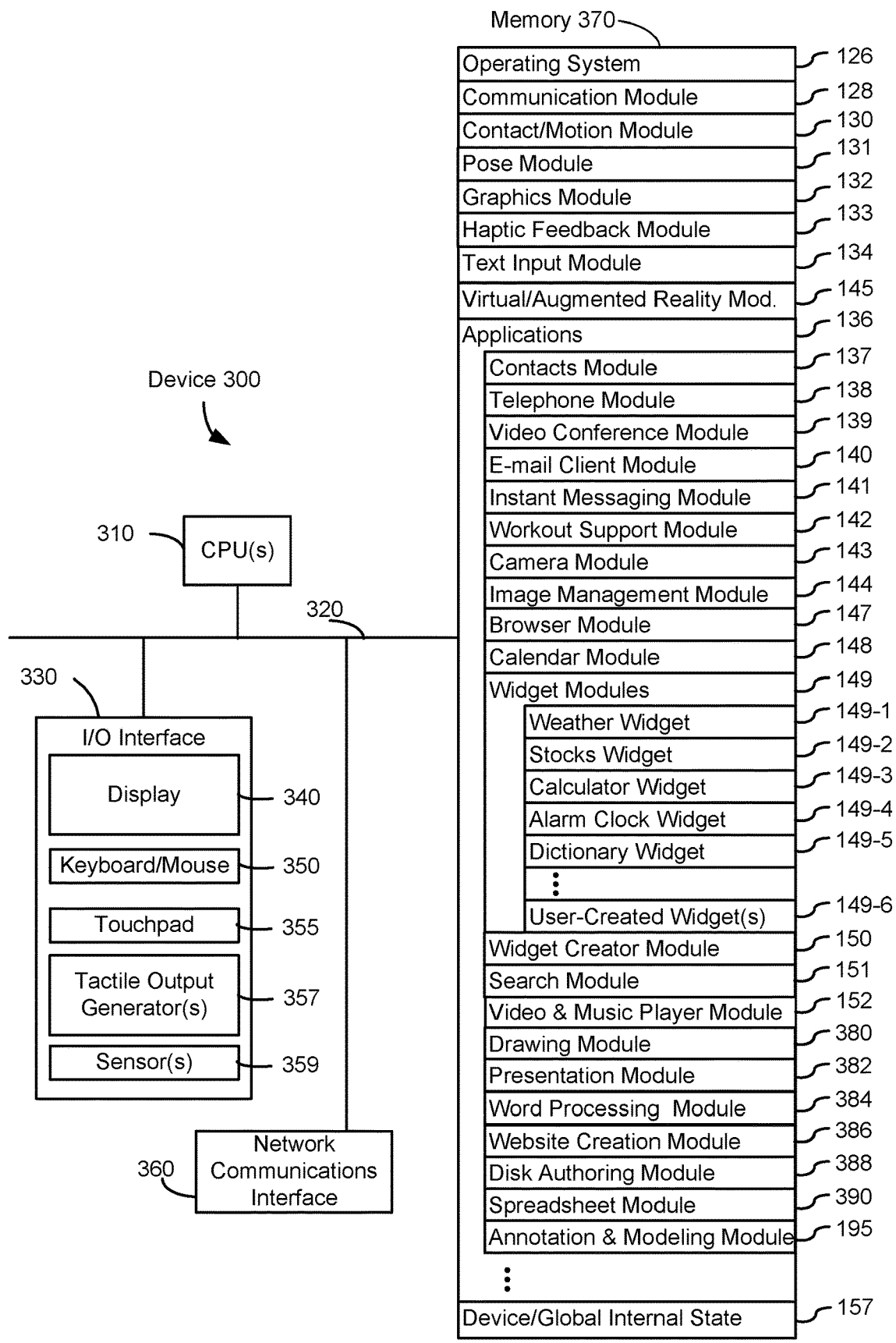
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to analogous described above with reference to FIG. 1A, and optionally a time-of-flight sensor 220 described above with reference to FIG. 2B). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
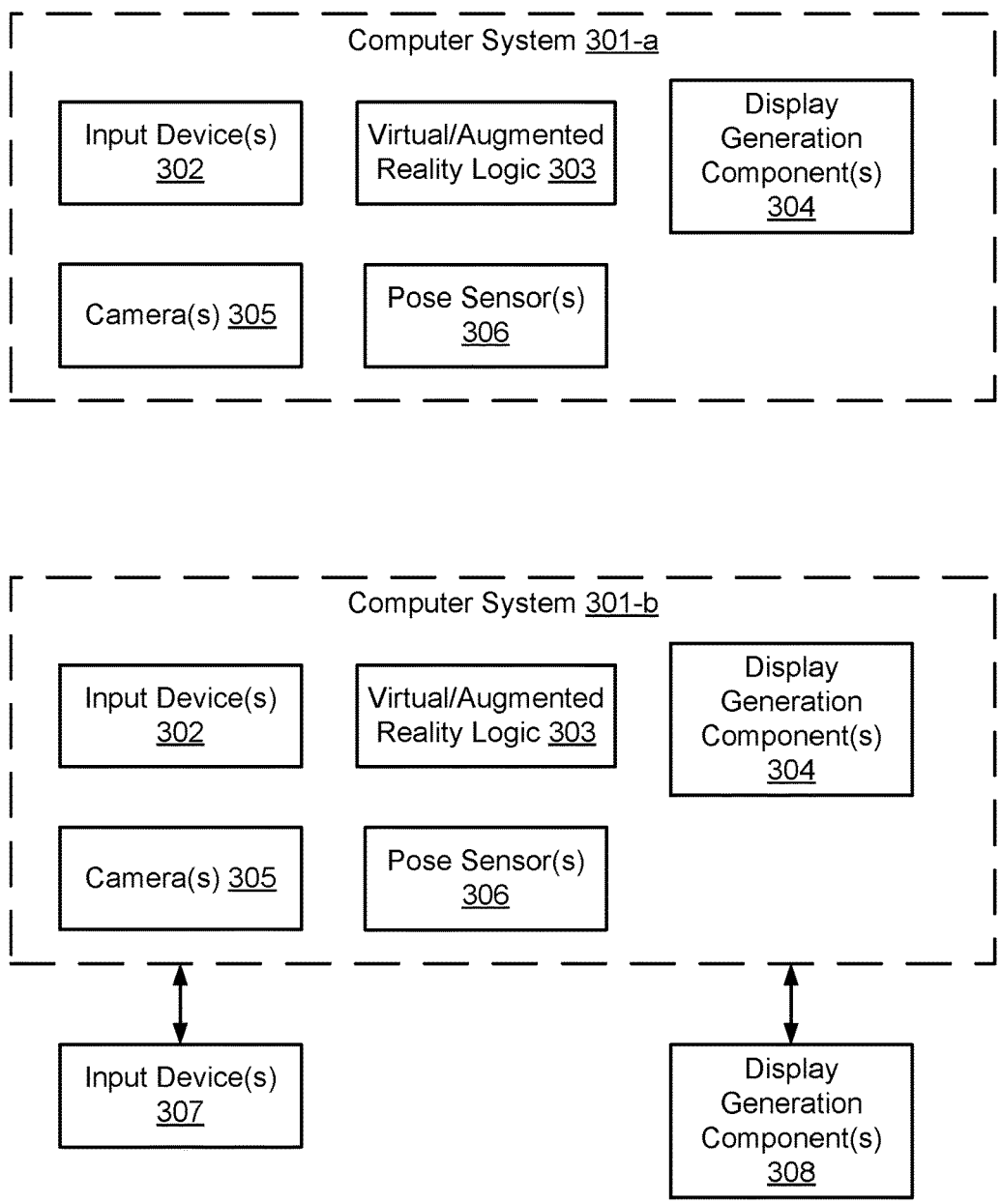
FIGS. 3B-3C are block diagrams of example computer systems in accordance with some embodiments.
Figure 3C:
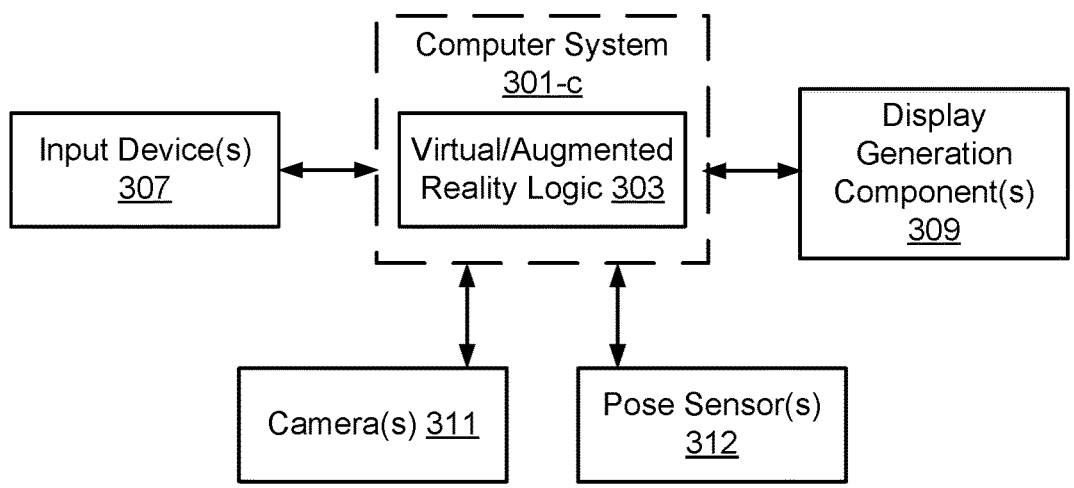

FIGS. 3B-3C are block diagrams of example computer systems 301 in accordance with some embodiments.

In some embodiments, computer system 301 includes and/or is in communication with:
- input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
- virtual/augmented reality logic 303 (e.g., virtual/augmented reality module 145);
- display generation component(s) (304 and/or 308, e.g., a display, a projector, a head-mounted display, a heads-up display, or the like) for displaying virtual user interface elements to the user;
- camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and
- pose sensor(s) (e.g., 306 and/or 311) for determining a pose of the device relative to the physical environment and/or changes in pose of the device.

In some embodiments, computer system 301 (e.g., camera(s) 305 and/or 311) includes and/or is in communication with a time-of-flight sensor (e.g., time-of-flight sensor 220, FIG. 2B) for capturing depth information as described above with reference to FIG. 2B.

In some computer systems (e.g., 301-*a* in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-*b*), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A-5AD are performed on a single computing device with virtual/augmented reality logic 303 (e.g., computer system 301-a described below with reference to FIG. 3B). However, it should be understood that frequently multiple different computing devices are linked together to perform the operations described below with reference to FIGS. 5A-5AD (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5AD is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-a in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2A).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-c in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and Icons for other applications, such as:
Icon 424 for IM module 141, labeled "Messages";
Icon 426 for calendar module 148, labeled "Calendar";

Icon 428 for image management module 144, labeled "Photos";

Icon 430 for camera module 143, labeled "Camera";

Icon 432 for online video module 155, labeled "Online Video";

Icon 434 for stocks widget 149-2, labeled "Stocks";

Icon 436 for map module 154, labeled "Maps";

Icon 438 for weather widget 149-1, labeled "Weather";

Icon 440 for alarm clock widget 149-4, labeled "Clock";

Icon 442 for workout support module 142, labeled "Workout Support";

Icon 444 for notes module 153, labeled "Notes"; and

Icon 446 for a settings application or module, labeled "Settings," which provides access to settings for device 100 and its various applications 136;

Icon 448 for an online store for applications;

Icon 450 for a calculator application;

Icon 452 for a recording application;

Icon 454 for a utilities application; and

Icon 504 for a paint designer application.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input, movement of the device or of one or more cameras of the device relative to a surrounding physical environment), and/or user movement relative to the device that is tracked using one or more cameras). For example, a swipe gesture is, optionally, replaced with a mouse click (e.g., instead of a contact) followed by movement of the cursor along the path of the swipe (e.g., instead of movement of the contact), or by a hand gesture involving a user moving his or her hand in a particular direction. As another example, a tap gesture is, optionally, replaced with a mouse click while the cursor is located over the location of the tap gesture (e.g., instead of detection of the contact followed by ceasing to detect the contact) or by a corresponding hand gesture that is representative of a tap gesture. Similarly, when multiple user inputs are simultaneously detected, it should be understood that multiple input devices of a particular type are, optionally, used simultaneously, or multiple input devices of different types are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

User Interfaces and Associated Processes

Attention is now directed towards embodiments of user interfaces ("UI") and associated processes that may be implemented on a computer system (e.g., portable multifunction device 100 (FIG. 1A), device 300 (FIG. 3A), or computer system 301 (FIG. 3B)) that includes (and/or is in communication with) a display generation component (e.g., a display device, such as a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A-5AD illustrate example user interfaces for scanning and modeling environments such as physical environments in accordance with some embodiments. The user interfaces in these figures are used to illustrate the processes described below, including the processes in FIGS. 6A-6F, 7A-7D, 8A-8D, and 9A-9E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5AD illustrate example user interfaces for scanning and modeling a physical environment using augmented reality in accordance with some embodiments.

FIG. 5A shows an example home screen user interface (e.g., home screen 502) that includes a plurality of application icons corresponding to different applications, including at least application icon 420 for a browser application and application icon 504 for a paint design application. As disclosed herein, the browser application and the paint design application are illustrative examples of applications published by different application vendors that utilize an application programming interface (API) or developer tool kit that provides some or all of the scanning and modeling functions described herein. The different applications provided by the different application vendors may have different functionality and/or user interfaces in addition to the scanning and modeling functionality and user interfaces described herein. The different applications provided by the different application vendors may provide additional user interfaces for interacting with various representations (e.g., a two-dimensional map, a three-dimensional model, and/or image and depth data) of a physical environment that have been obtained using the scanning and modeling user interfaces described herein.

Figure 5B:
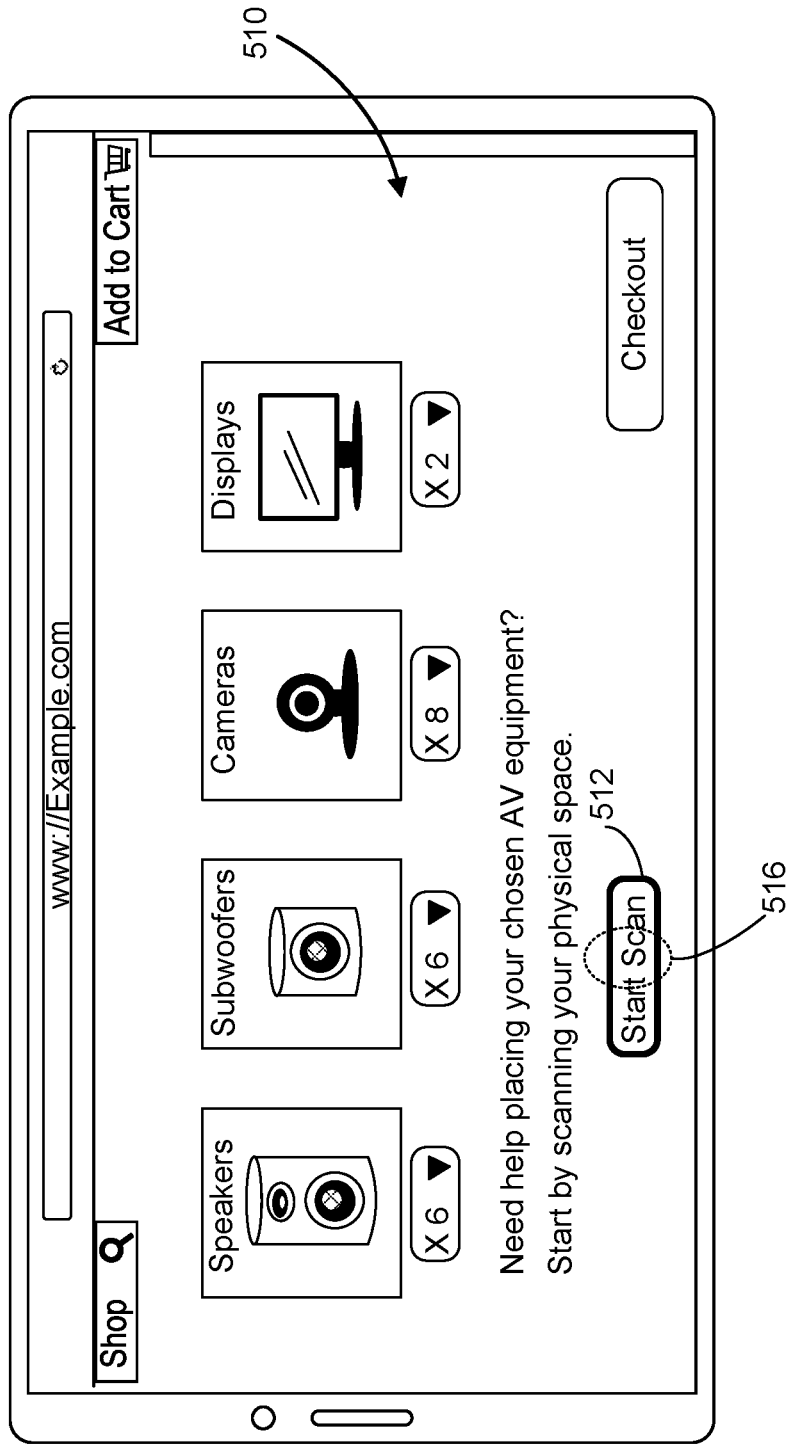

As shown in FIG. 5A, a respective input that meets selection criteria is detected on an application icon of a respective application in the home screen user interface (e.g., tap input 506 is detected on application icon 420, tap input 508 is detected on application icon 504, an in-air gesture directed to an application icon in a virtual or augmented reality environment, or another selection input that activates a corresponding application). In response to detecting the respective input that meets the selection criteria, a user interface of the respective application is displayed. For example, in response to tap input 506 on application icon 420, a user interface of the browser application is displayed (e.g., as shown in FIG. 5B). In response to tap input 508 on application icon 504, a user interface of the paint design application is displayed (e.g., as shown in FIG. 5C).

In some embodiments, a user may interact with the user interface of the respective application to cause changes in the user interface of the respective application. For example, as shown in FIG. 5B, in response to user interactions with the user interface of the browser application, user interface 510 of the browser application displays a webpage (e.g., with a URL of "www://example.com") corresponding to a seller of audio/visual equipment (e.g., an online store called "Example Store") that provides functions for selecting the type(s) and quantities of different audio/visual equipment (e.g., speakers, subwoofers, cameras, and/or displays) for purchase. As shown in FIG. 5C, in response to user interactions with the user interface of the paint design application, user interface 514 of the paint design applications displays user selected interior surfaces (e.g., accent wall, wall with windows, wall behind TV, and/or wall behind couch) and corresponding paint/wallpaper selections.

Figure 5C:
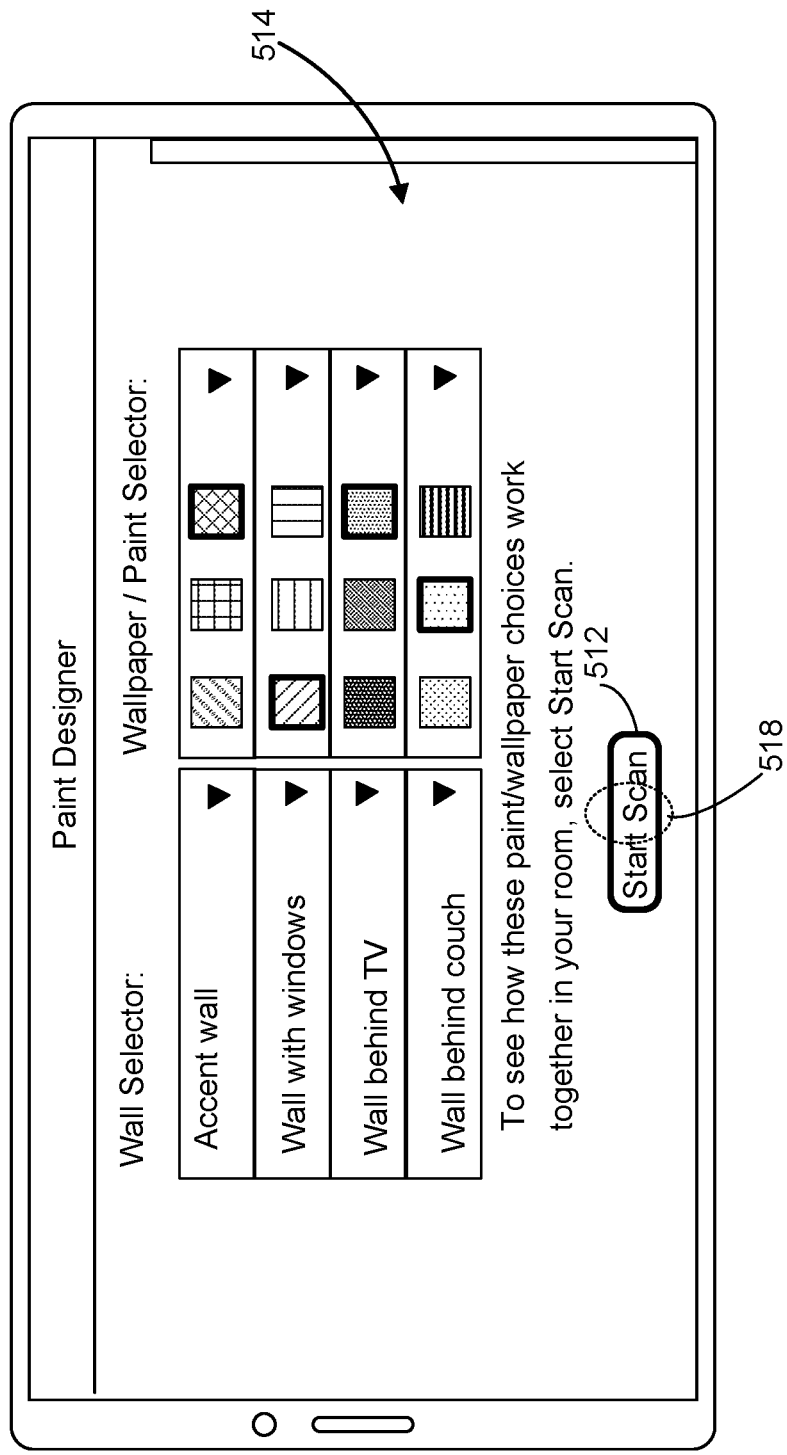

FIGS. 5B and 5C illustrate examples of how the scanning and modeling user interfaces described herein may be utilized through the application programming user interface or developer tool kit. In some embodiments, as shown in FIG. 5B, the webpage shown in user interface 510 of the browser application has an embedded user interface object 512 that, when selected, causes display of the scanning and modeling user interfaces described here. Similarly, as shown in FIG. 5C, user interface 514 of the paint design application also include user interface object 512 that, when selected, causes display of the scanning and modeling user interfaces described herein. In some embodiments, the appearance of user interface object 512 does not have to be identical in the user interfaces of different applications, as long as it is configured to trigger the same application programming user interface and/or developer tool kit for the same scanning and modeling function (e.g., "start scan"). In some embodiments, different applications may utilize different application programming interfaces or developer's tool kit to trigger different scanning and modeling user interfaces that share some or all of the features described herein.

Figure 5D:
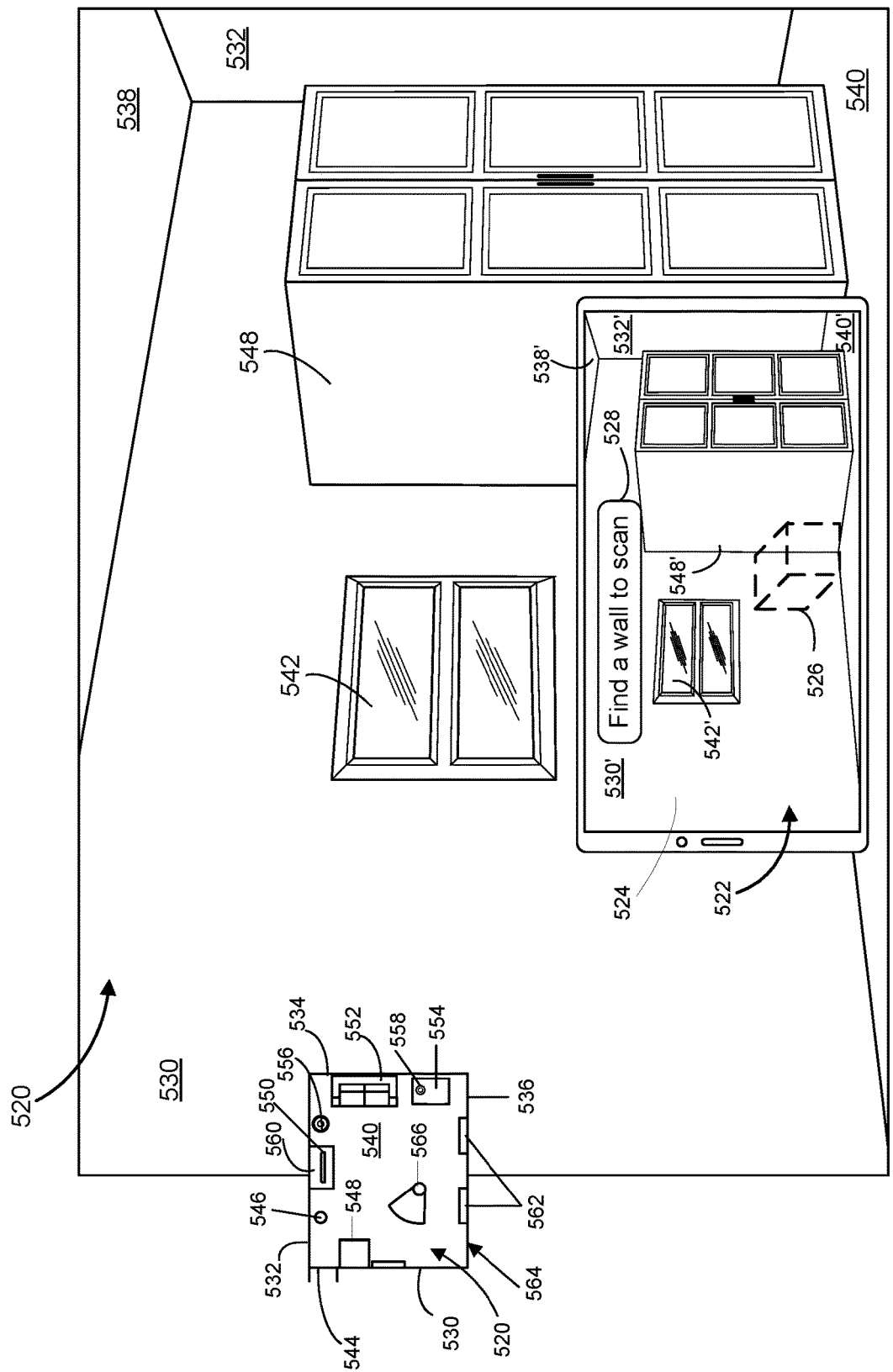

In some embodiments, as shown in FIGS. 5B and 5C, in response to detecting a respective input that activates user interface object 512 (e.g., tap input 516 on user interface object 512 in FIG. 5B, or tap input 518 on user interface object 512 in FIG. 5C), device 100 displays, as shown in FIG. 5D, an initial state of the scanning and modeling user interfaces described herein.

In FIG. 5D, device 100 is located in a physical environment (e.g., room 520 or another three-dimensional environment, that includes structural elements (e.g., walls, ceiling, floor, windows, and/or doors) and nonstructural elements (e.g., pieces of furniture, appliances, physical objects, pets, and/or people)). The camera(s) of device 100 (e.g., optical sensors 164, TOF sensor 220, and/or other imaging and/or depth sensors) are facing toward a first portion of room 520, and the field of view of the camera(s) includes the first portion of the room 520 that corresponds to the current viewpoint of the camera(s) (e.g., the current viewpoint is determined based on the current location and the current pan/tilt/yaw angles of the camera(s) relative to the physical environment). As the camera(s) move in the physical environment, the viewpoint and the field of view of the camera(s) change accordingly, and user interface 522 would show a different portion of the physical environment corresponding to the updated viewpoint and updated field of view. In this example, the initial state of user interface 522 includes camera view 524, and user interface object 526 that is overlaid on camera view 524. In some embodiments, user interface object 526 is optionally animated to indicate movement executed by the camera(s) relative to the physical environment 520. In some embodiments, user interface object 526 is animated in a respective manner to prompt the user to start moving the camera(s) in the physical environment in a corresponding manner (e.g., executing back and forth sideways motion, or figure-8 motion) that helps device 100 to identify one or more cardinal directions (e.g., horizontal direction, and/or vertical direction) and/or one or more planes (e.g., horizontal planes, and/or vertical planes) in the physical environment. In some embodiments, the initial state of user interface 522 further includes a prompt (e.g., banner 528, or another type of alert or guide) that provides textual instruction (e.g., "Find a wall to scan", or another instruction) and/or graphical guidance (e.g., animated illustration of how to move the device, or another type of illustrative guide) to the user regarding how to start the scanning process.

In this example, room 520 includes a number of structural elements, including four walls (e.g., wall 530, 532, 534, and 536), a ceiling (e.g., ceiling 538), a floor (e.g., floor 540), a window (e.g., window 542), and an entryway (e.g., entryway 544). Room 520 further includes a number of non-structural elements, including various pieces of furniture (e.g., stool 546, cabinet 548, TV stand 550, couch 552, and side table 554), physical objects (e.g., floor lamp 556, and table lamp 558), and other physical objects (e.g., TV 560, and boxes 562). For illustration purposes, FIG. 5C includes a top view 564 of room 520 that illustrates relative positions of the structural elements and non-structural elements of room 520, as well as a respective position (as indicated by the circular pointy end of object 566) and facing direction of the camera(s) (e.g., as represented by the arc side of the object 566) of device 100.

As shown in FIG. 5D, camera view 524 included in user interface 522 includes a representation of a first portion the physical environment that includes representation 530' of wall 530, representation 532' of wall 532, representation 538' of ceiling 538, representation 540' of floor 540, representation 548' of cabinet 548, and representation 542' of window 542. The representation of the first portion of the physical environment corresponds to the current viewpoint of the user, as indicated by the position and facing direction of object 566 in the top view 564 of room 520. Although user interface 522 in this example includes a camera view of the physical environment as the representation of the field of view of the one or more cameras, in some embodiments, the representation of the field of view included in user interface 522 is, optionally, a pass-through view of the physical environment as seen through a transparent or semi-transparent display generation component that displays the user interface 522. In some embodiments, the touch-screen display of device 100 in this example is optionally replaced with another type of display generation component, such as a head-mounted display, a projector, or a heads-up display, that displays the user interface 522. In some embodiments, touch input described in these examples are replaced with in-air gestures or other types of user inputs. For ease of illustration, the representations of objects, structural elements, nonstructural elements that appear in the representation of field of view (e.g., camera view 524, or a pass-through view as seen through a transparent or semi-transparent display generation component) are referred to using the same reference numbers of their counterparts in the physical environment, rather than the primed version of the reference numbers.

Figure 5E:
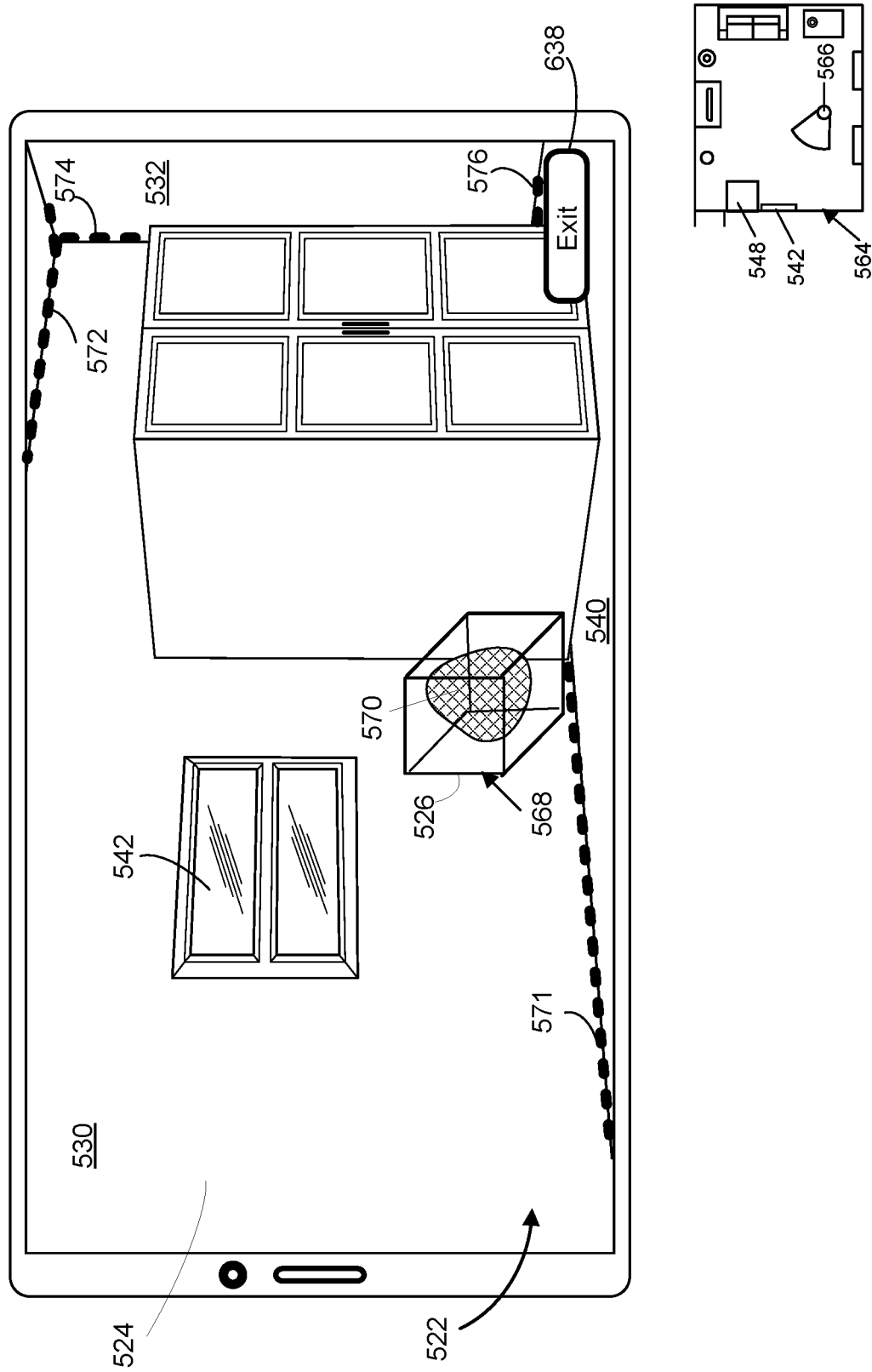
Figure 5F:
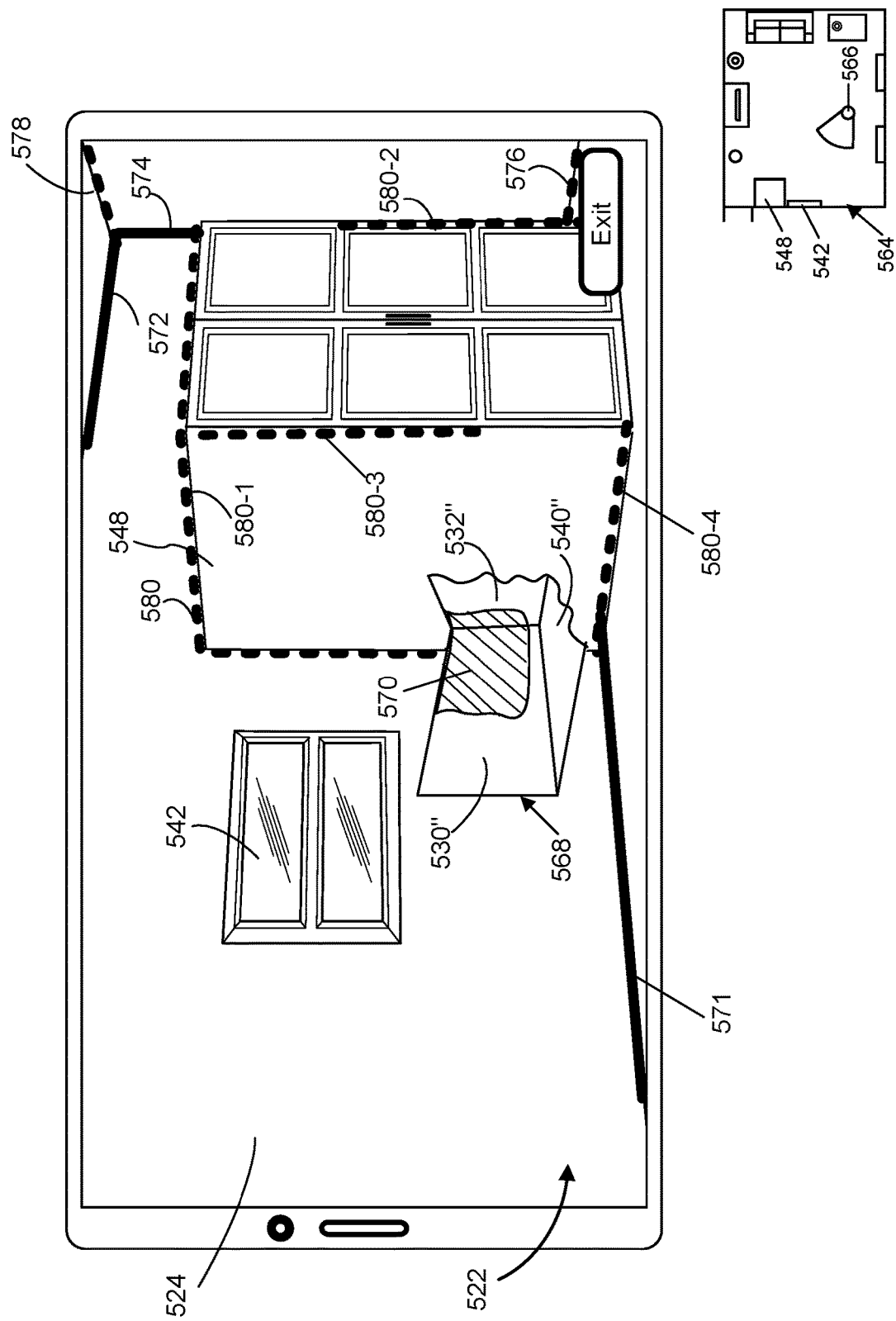
Figure 5G:
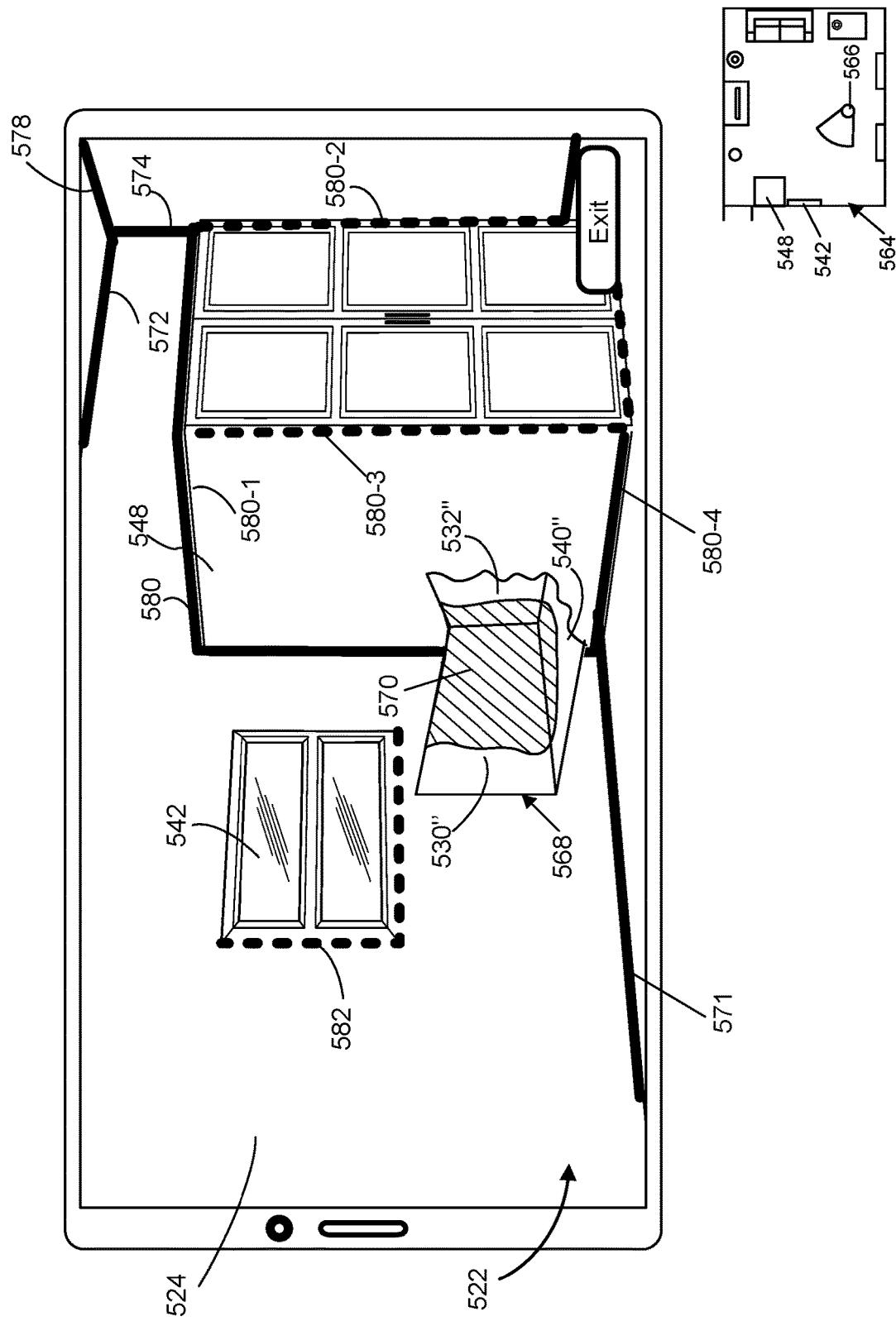
Figure 5H:
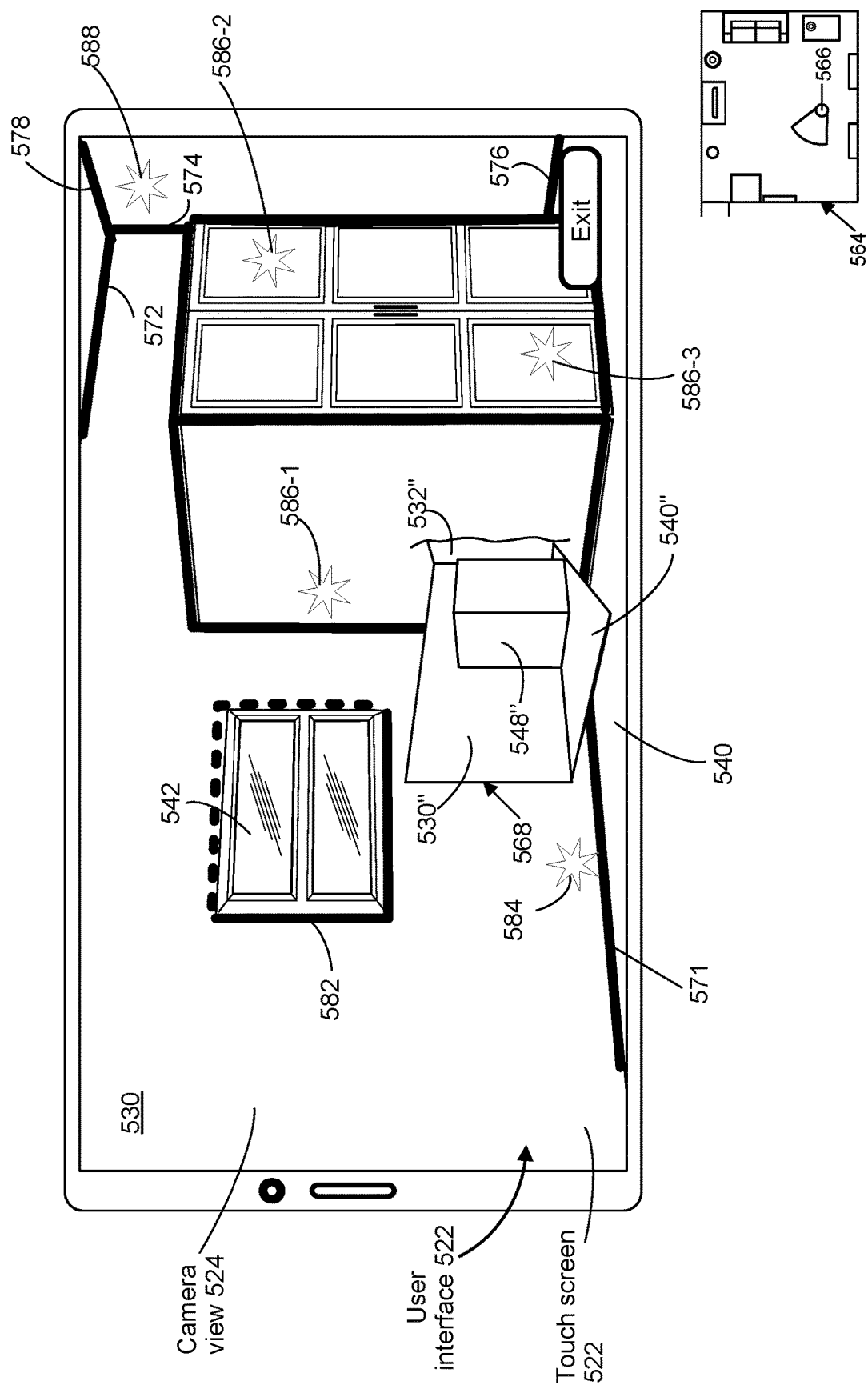
Figure 5I:
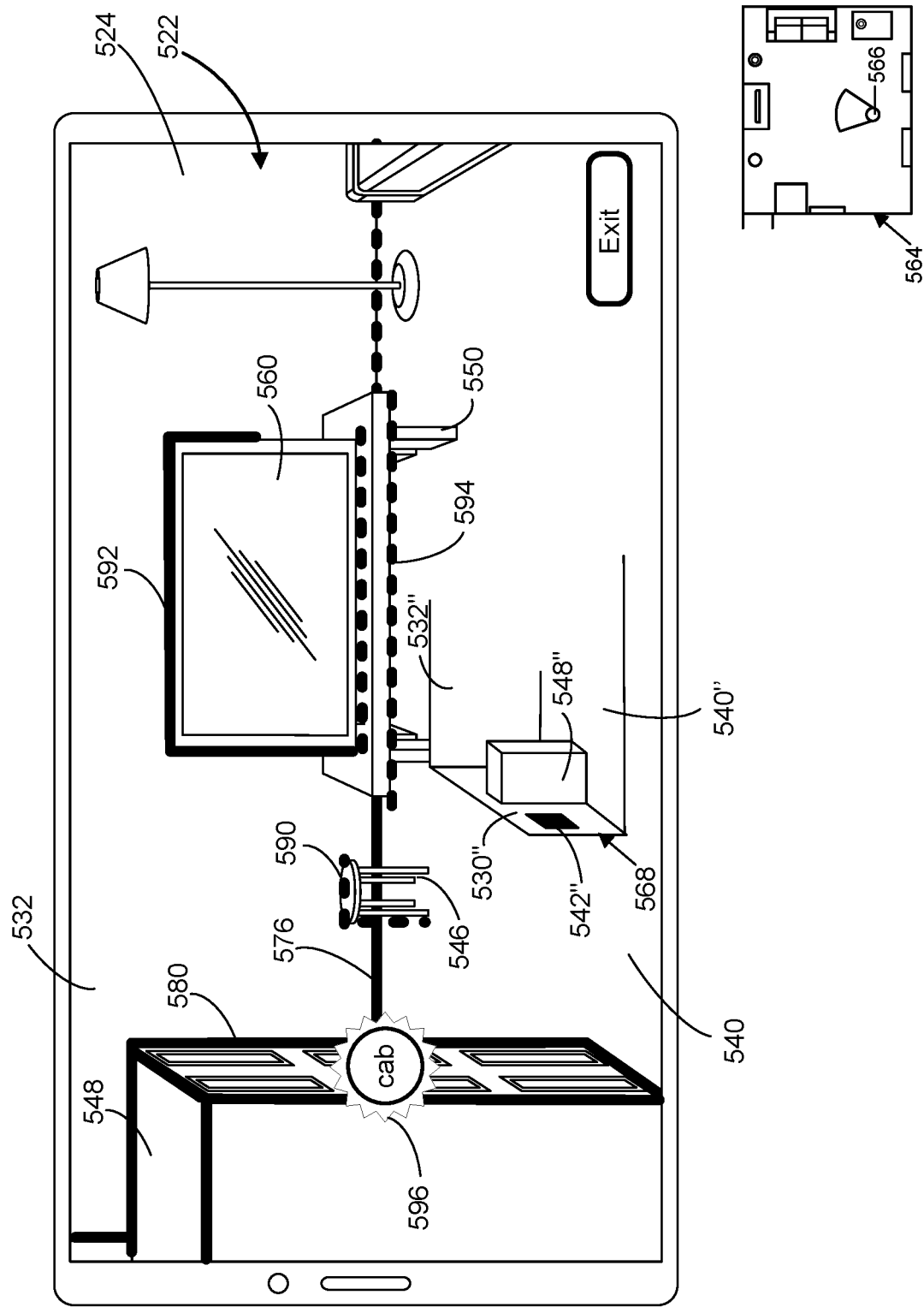
Figure 5J:
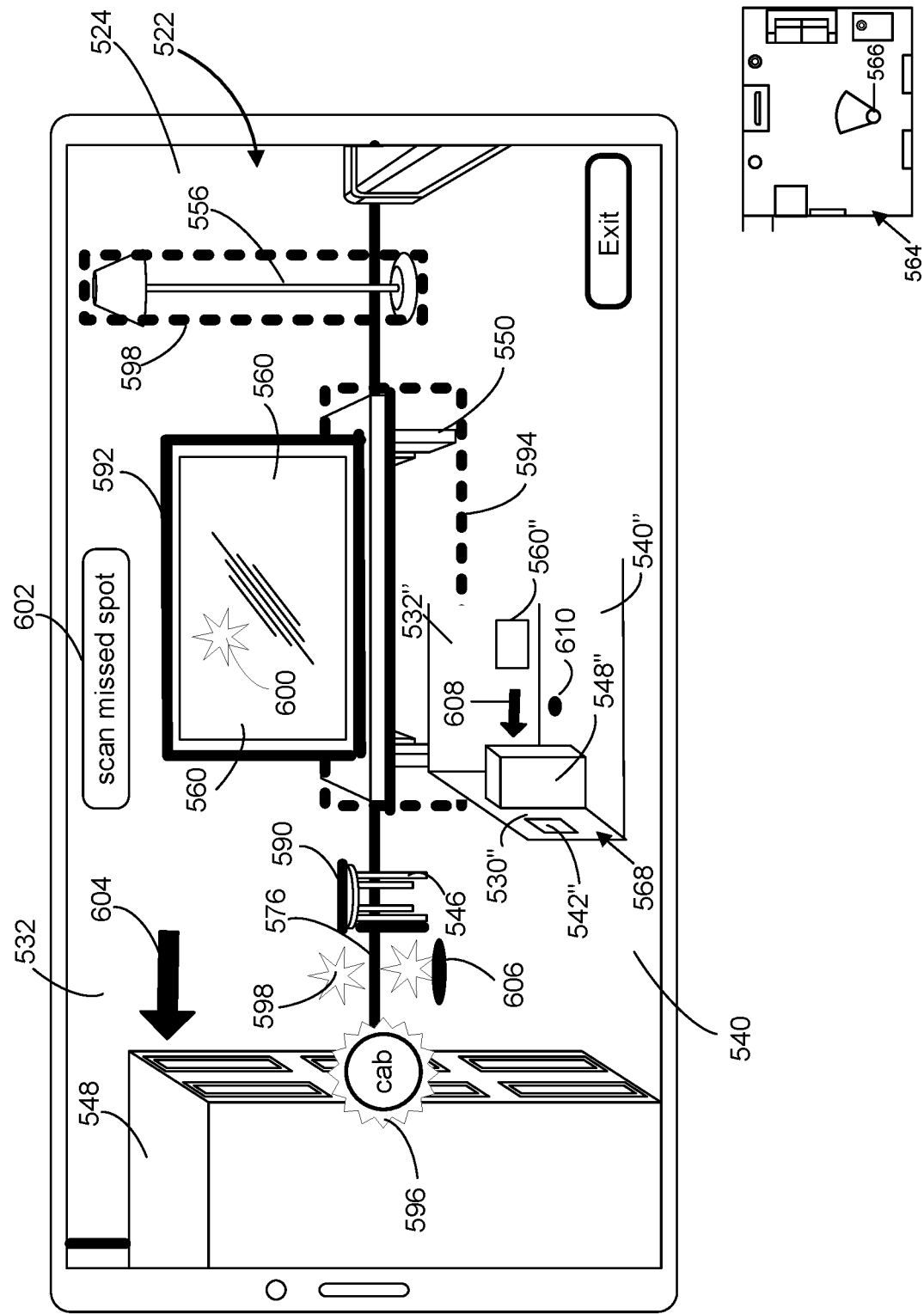
Figure 5K:
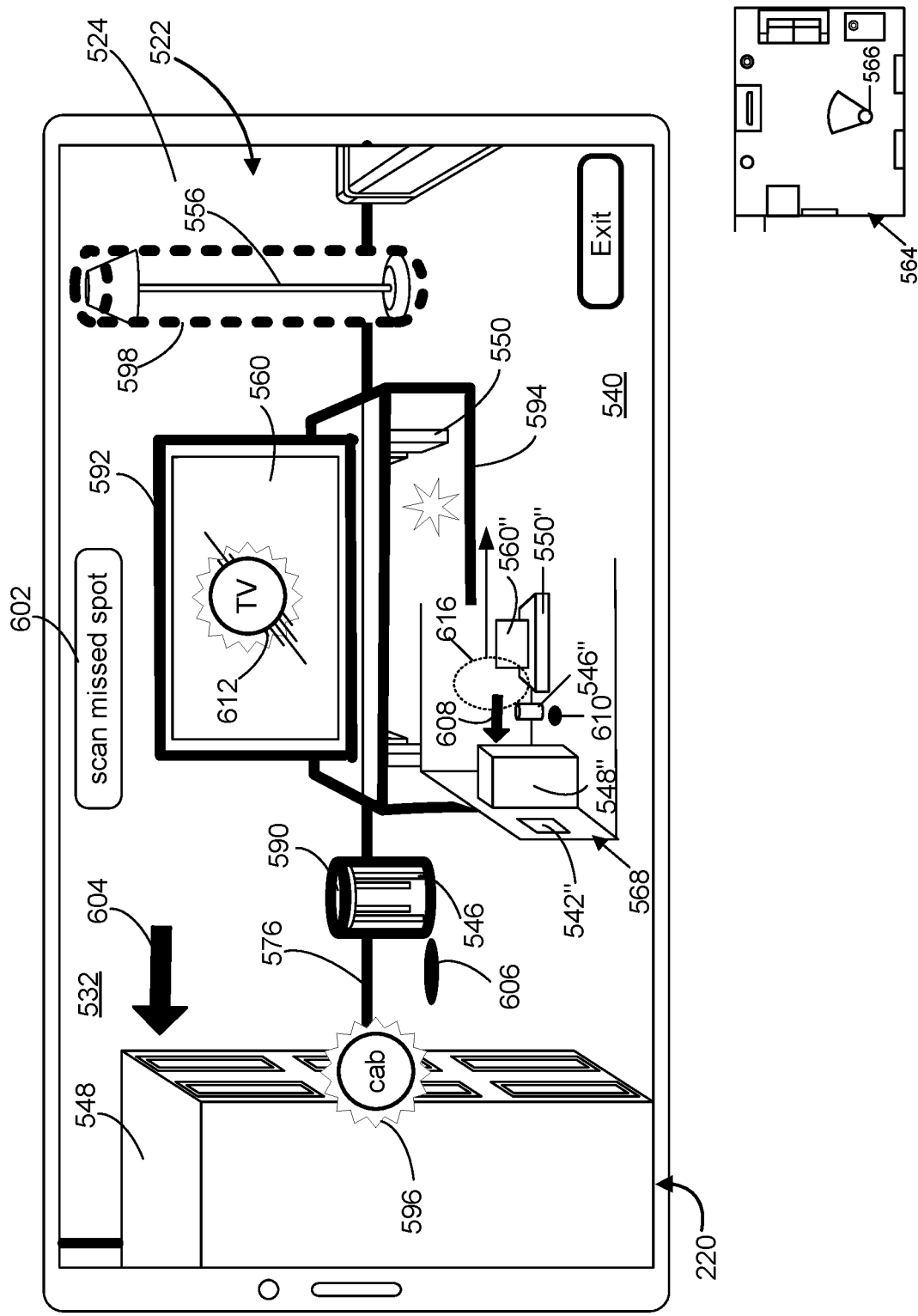
Figure 5L:
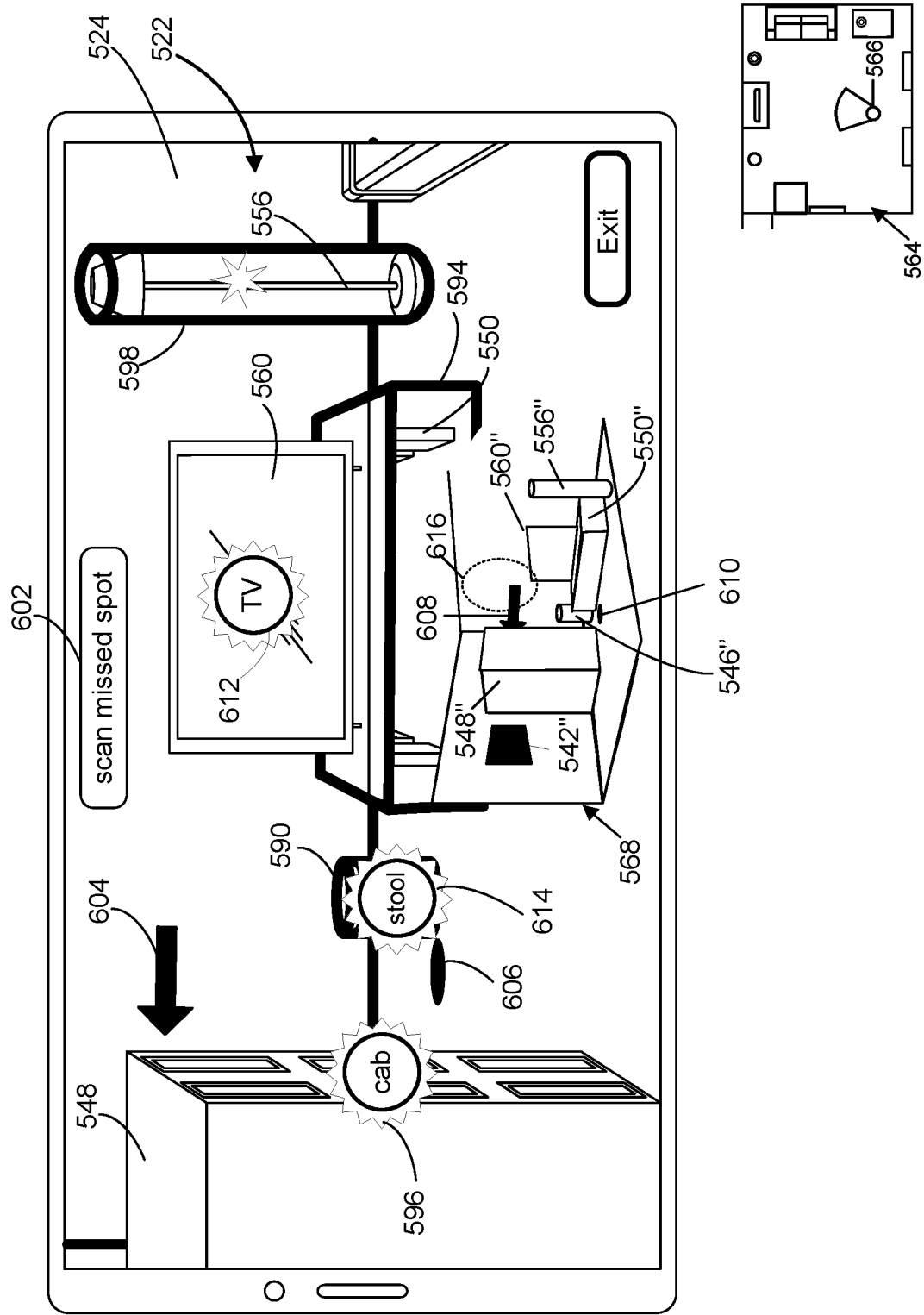
Figure 5M:
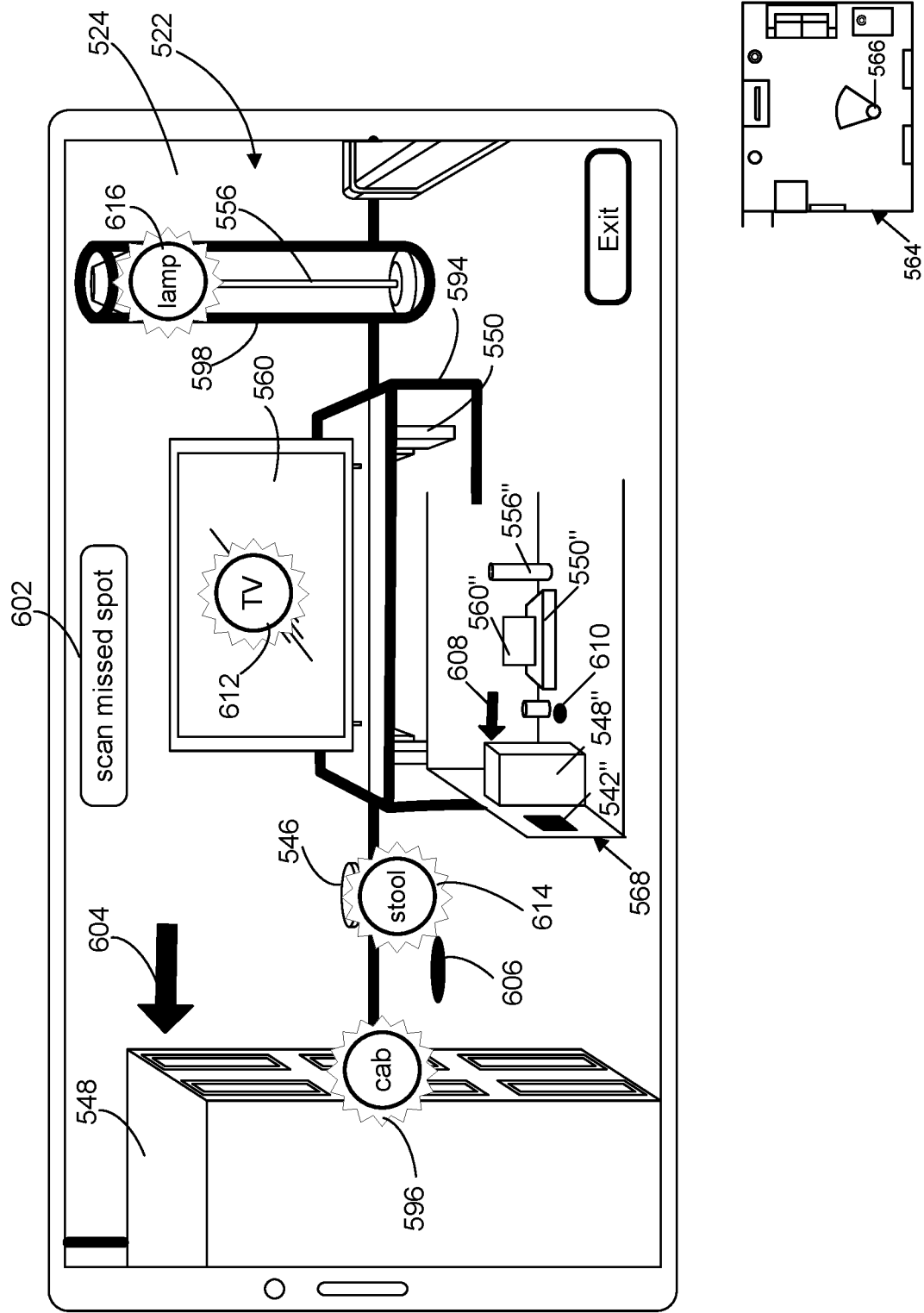
Figure 5N:
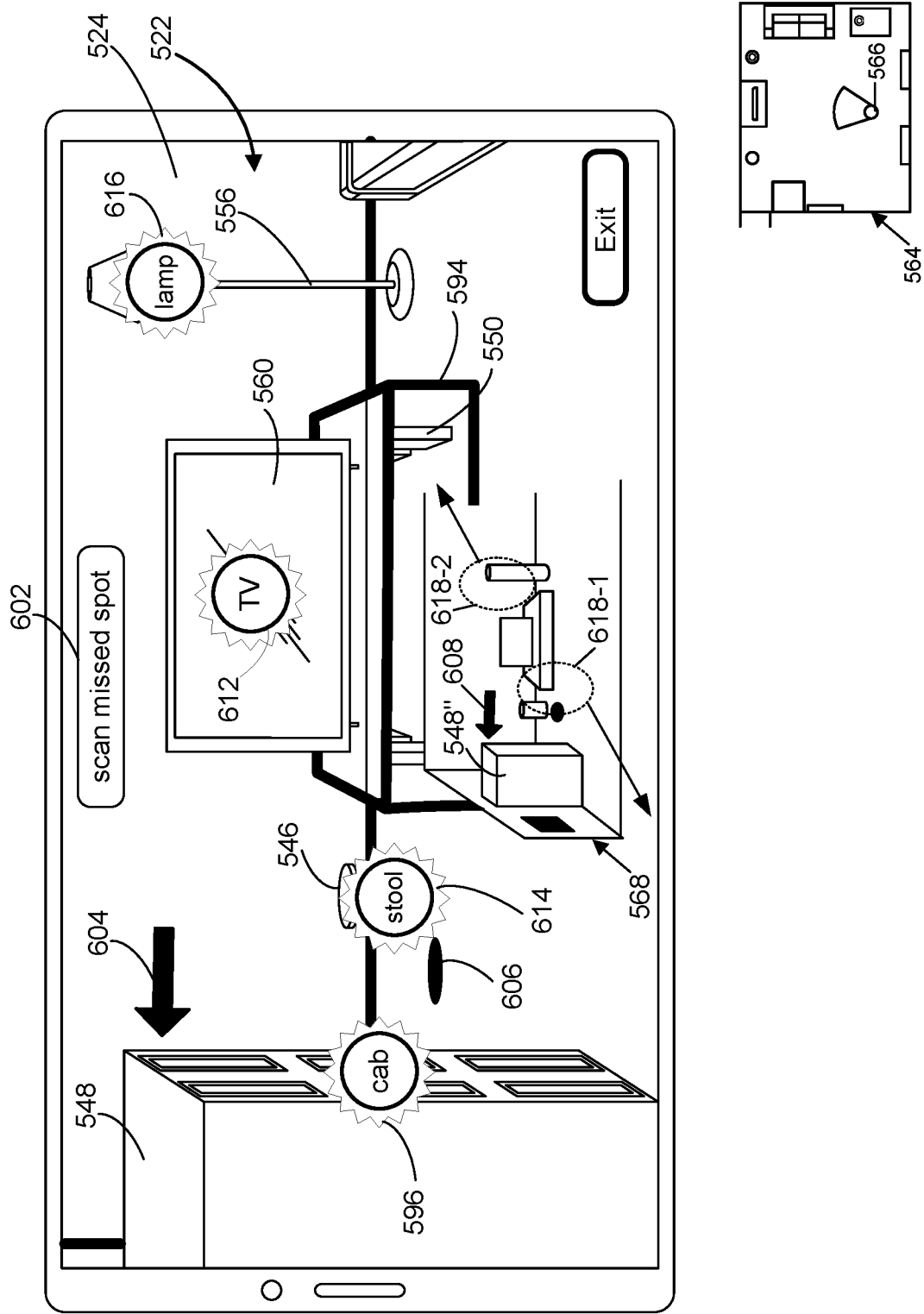
Figure 5O:
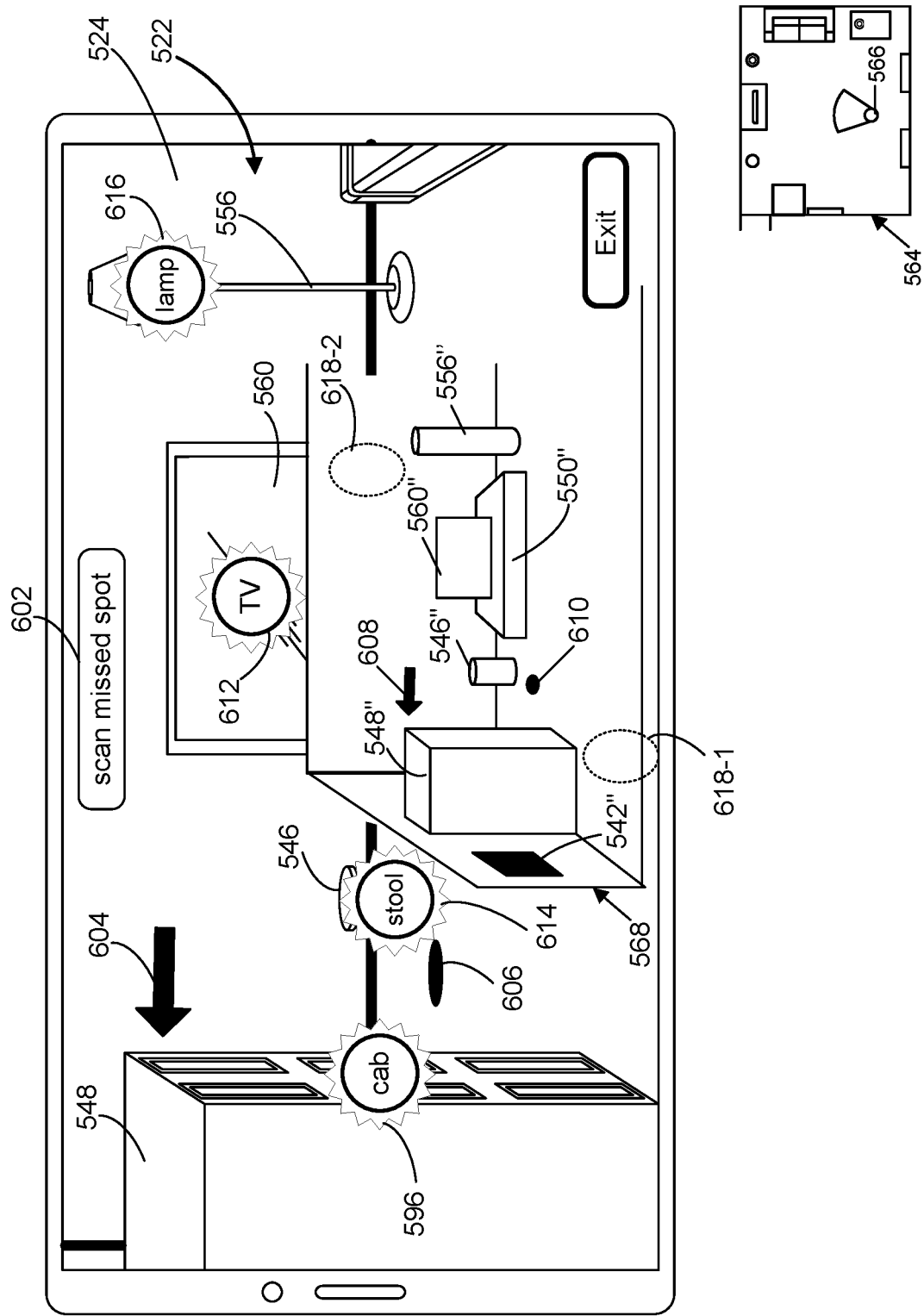
Figure 5P:
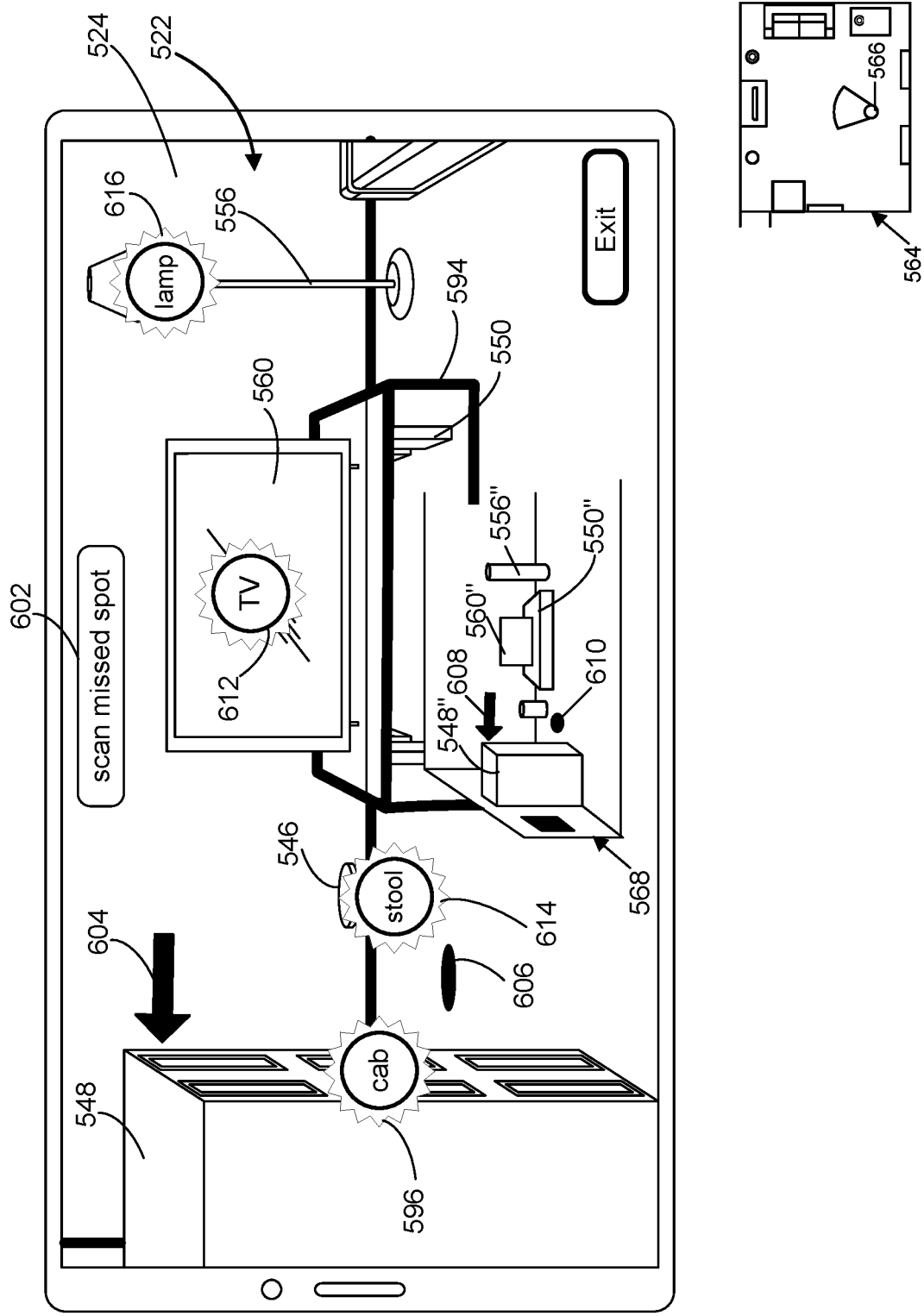
Figure 5Q:
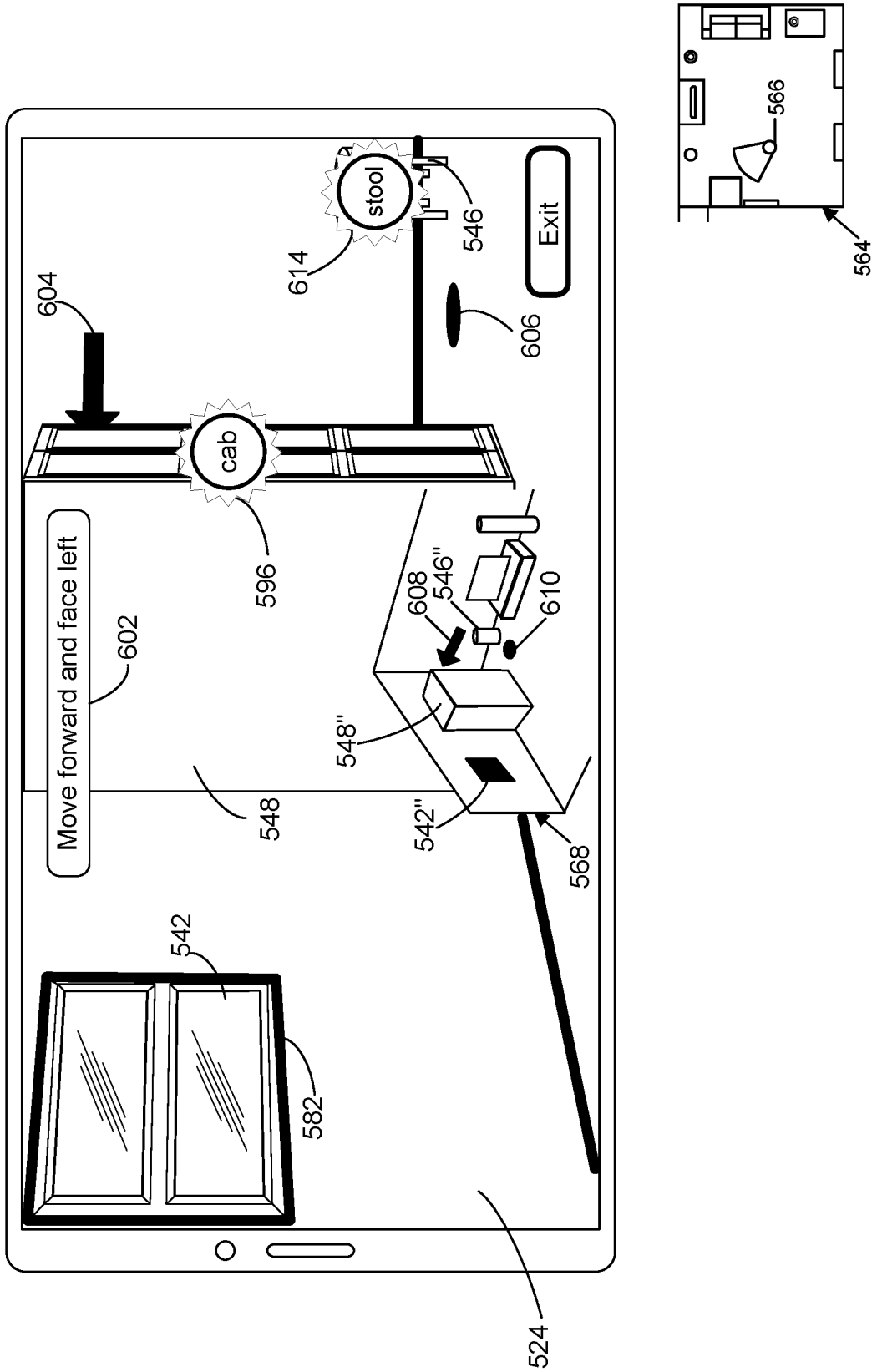
Figure 5R:
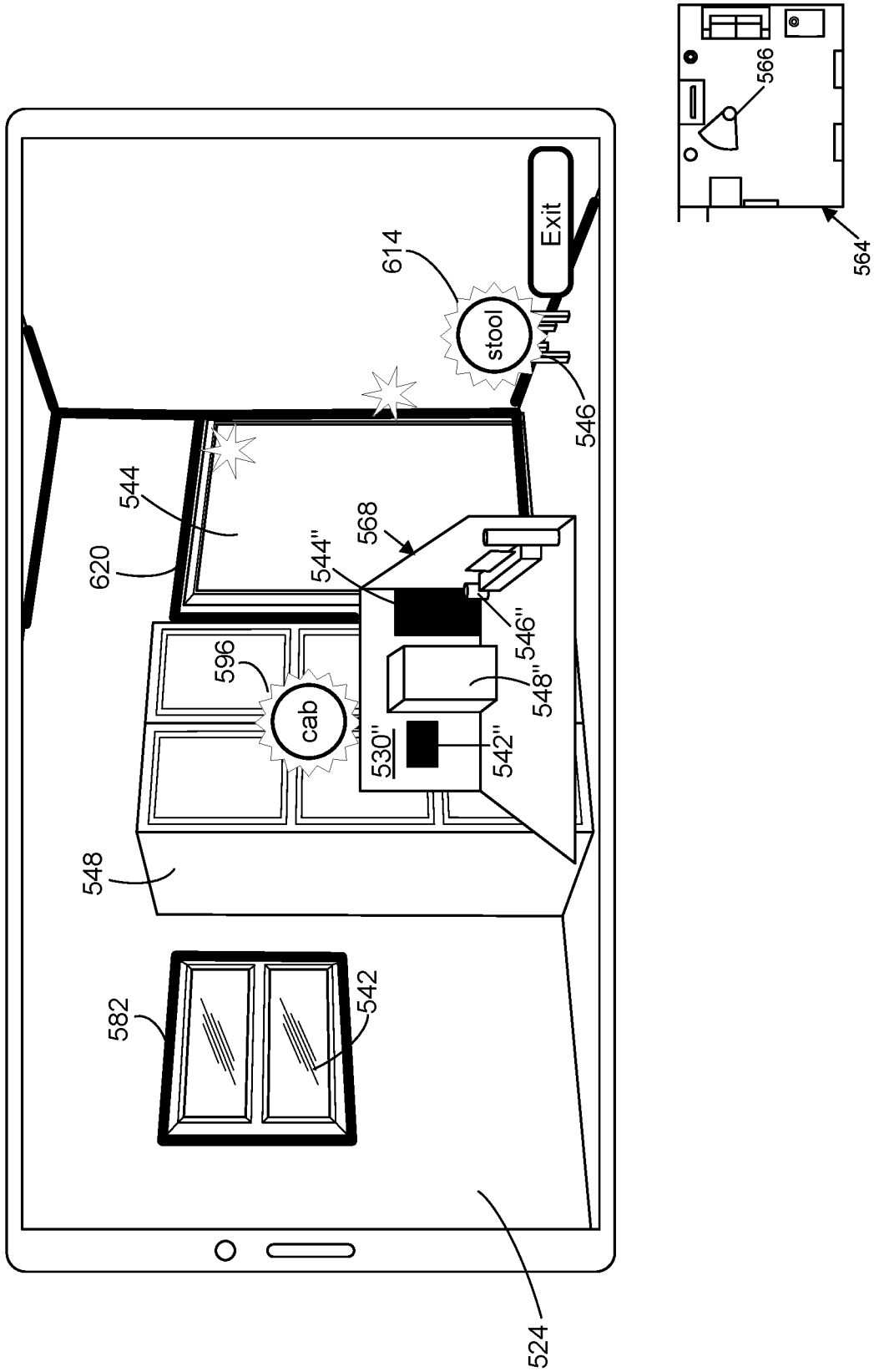
Figure 5S:
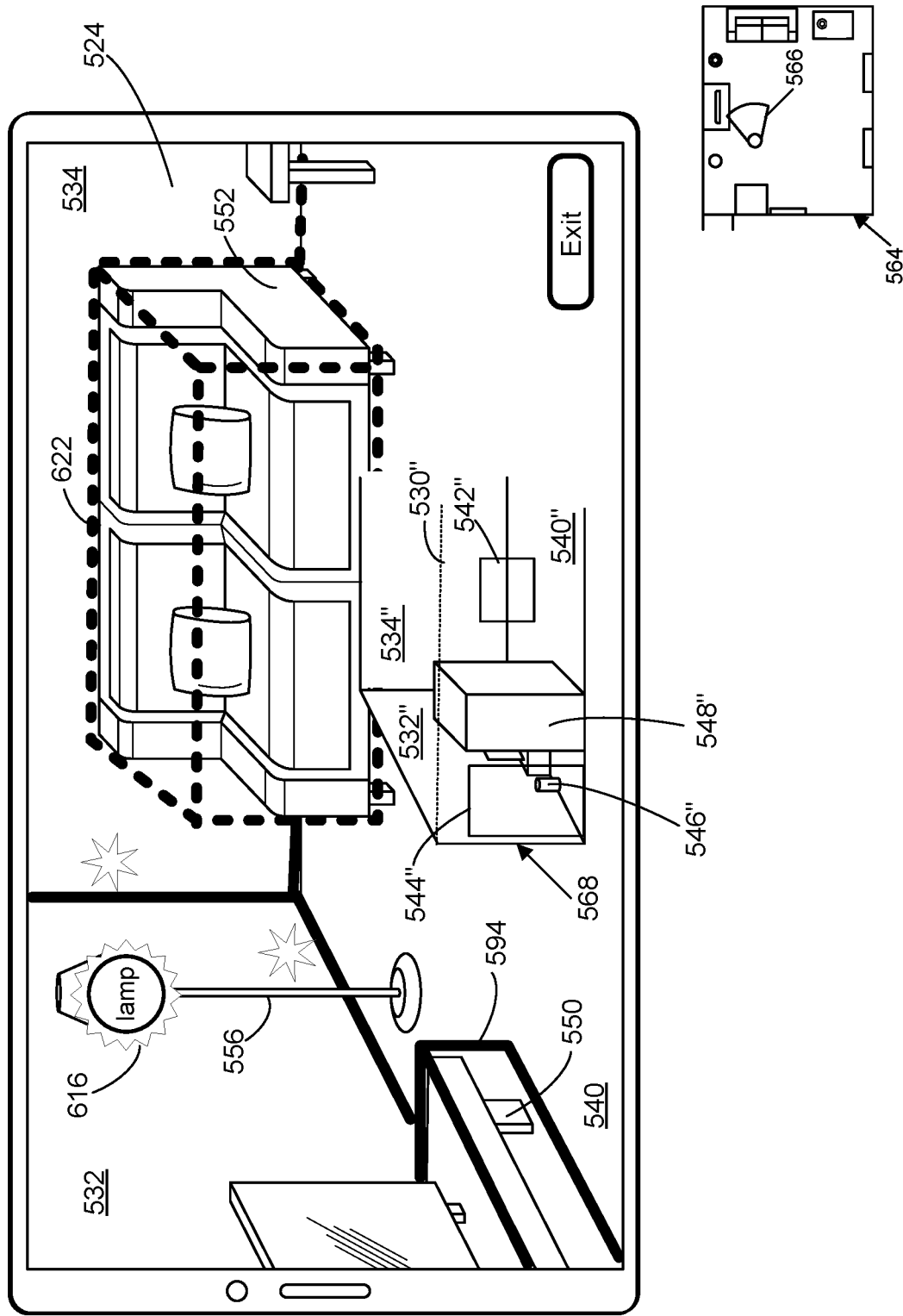
Figure 5T:
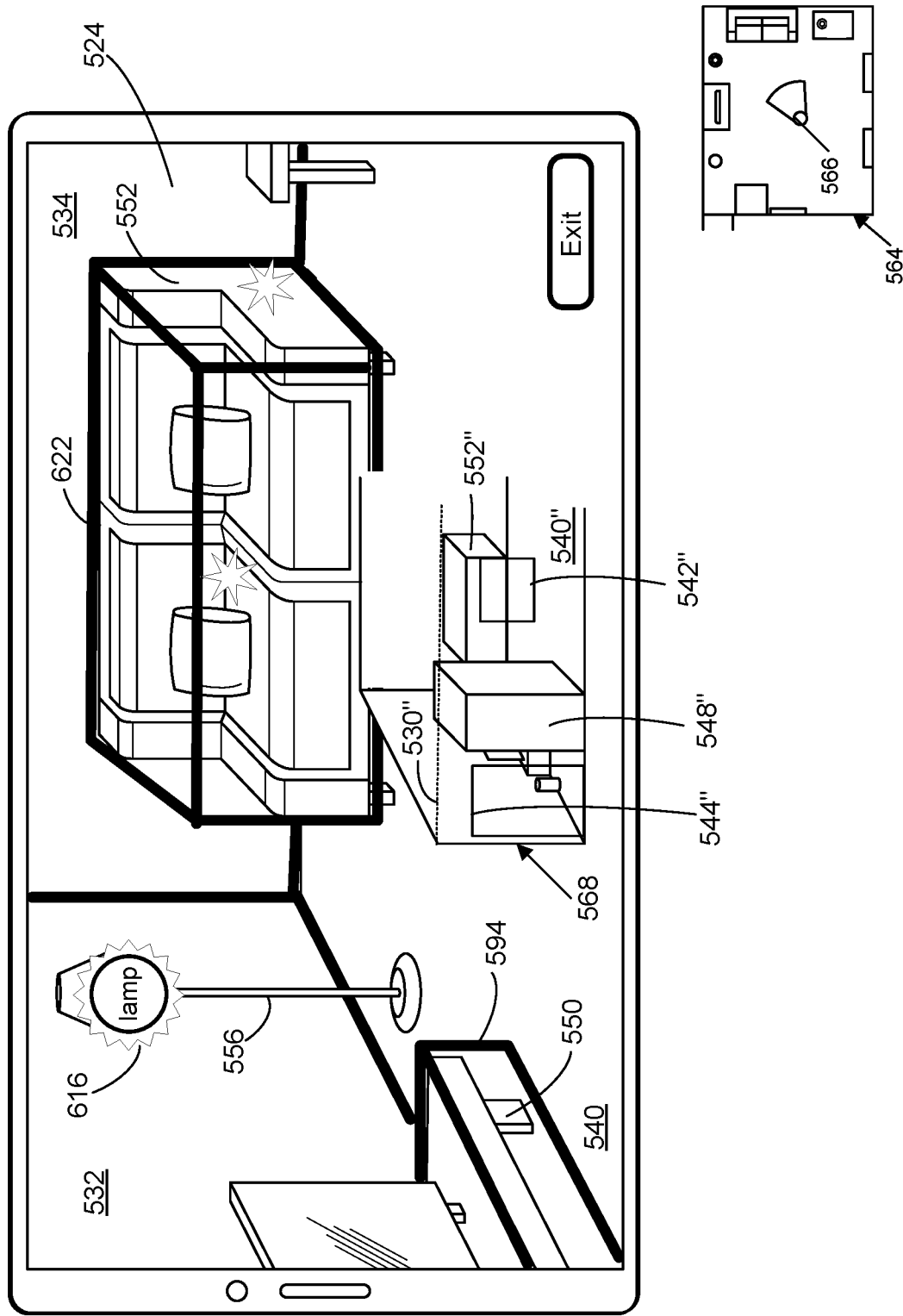
Figure 5U:
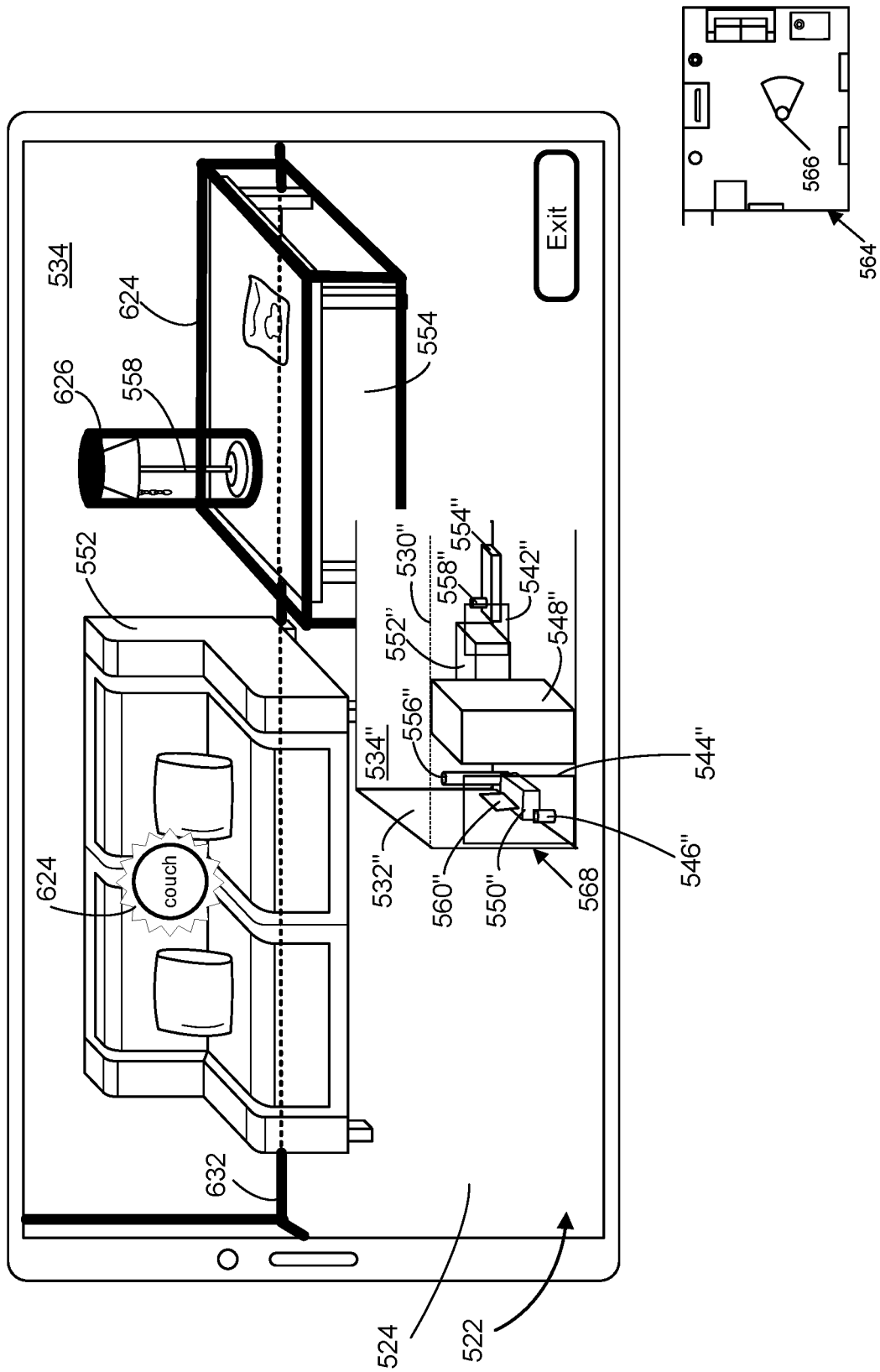
Figure 5V:
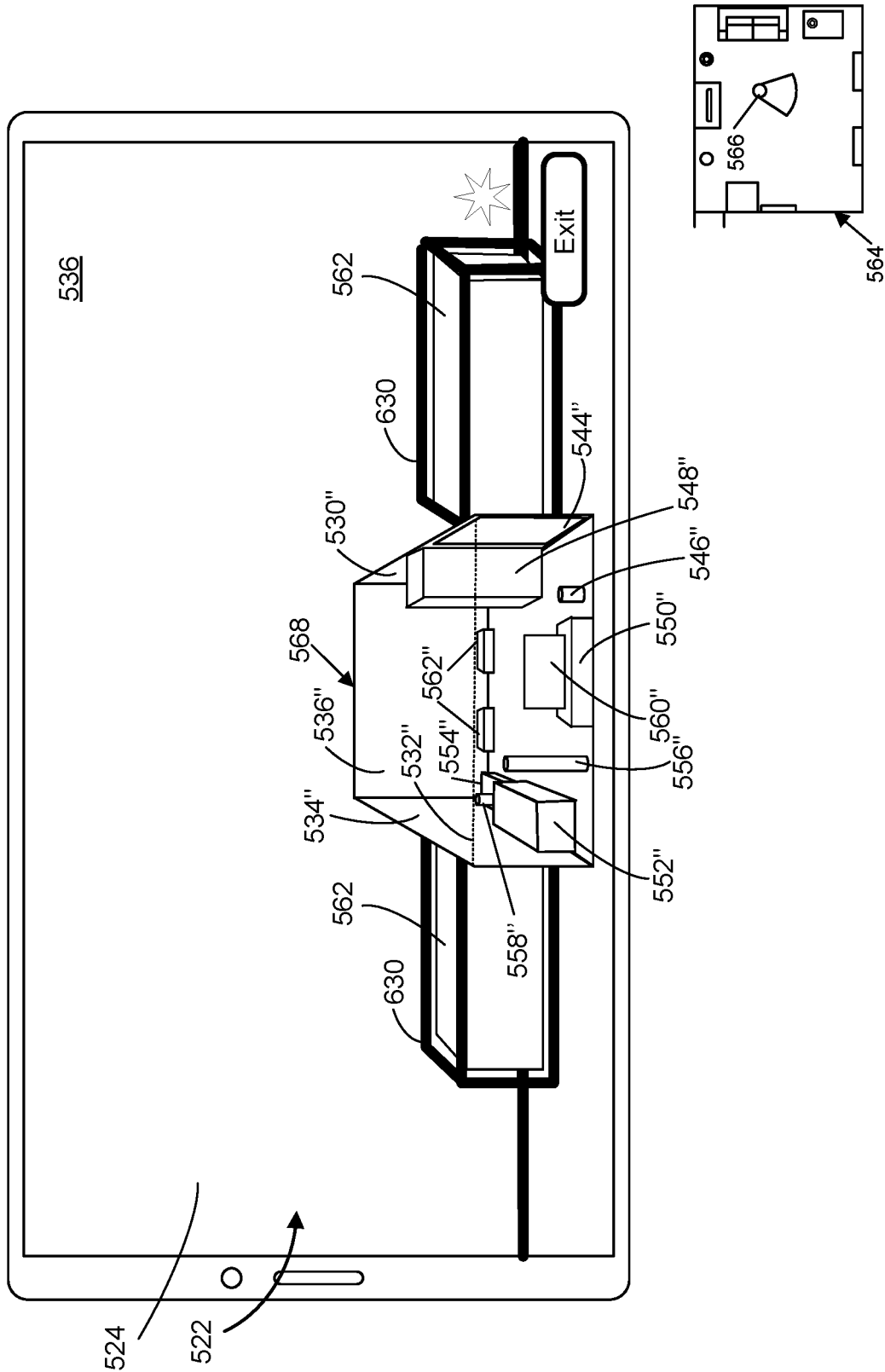
Figure 5W:
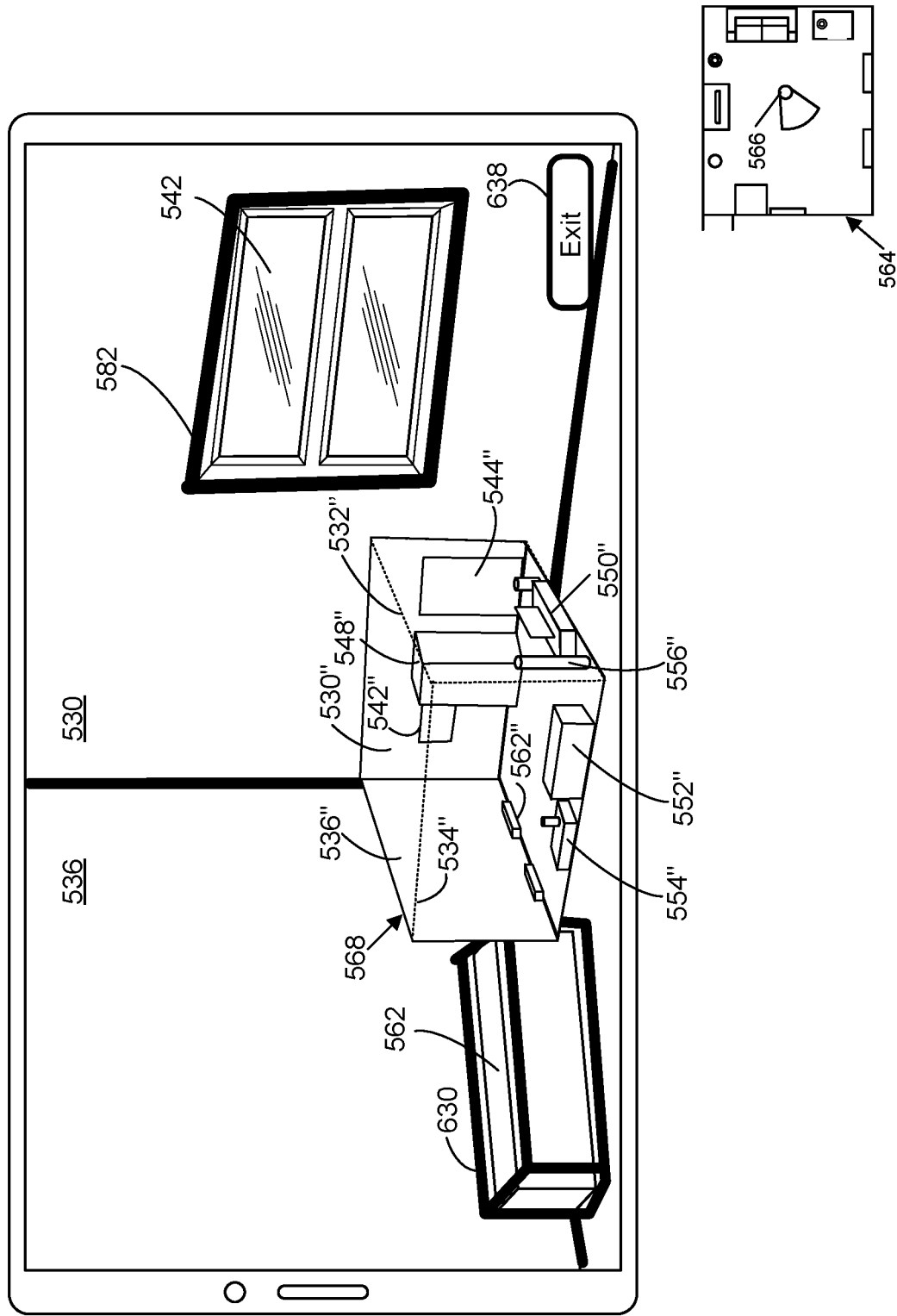

FIGS. 5E-5W illustrate changes in user interface 522 during the scanning and modeling of room 520, in accordance with some embodiments. FIGS. 5E-5W show device 100 displaying an augmented reality view of room 520, including a representation of the field of view of the one or more camera(s) (e.g., camera view 524 or a view of the environment through a transparent or semi-transparent display generation component) and a preview of a three-dimensional model of room 520 that is being generated based on the scan of room 520 (e.g., preview 568, or another preview that includes a partially completed three-dimensional model of the physical environment). In some embodiments, the preview of the three-dimensional model of room 520 is overlaid on the representation of the field of view of the one or more camera(s) in user interface 522, e.g., as shown in FIGS. 5E-5W. In some embodiments, the preview of the three-dimensional model of room 520 is optionally displayed in a separate region of user interface 522 from the representation of the field of view. In some embodiments, the augmented reality view of room 520 further includes various prompts, alerts, annotations, and/or visual guides (e.g., textual and/or graphical objects for prompting and guiding the user to change the viewpoint, moving slowly, moving faster, going back to rescan a missed spot, and/or performing another action to facilitate the scan) that are overlaid on and/or separately displayed the representation of the field of view.

FIG. 5E illustrates the changes in user interface 522 at the beginning of the scan of the first portion of the physical environment. As the camera(s) of device 100 starts to capture image and depth data of the first portion of the physical environment, user interface object 526 is transformed into preview 568 of the three-dimensional model that is being generated based on the captured image and depth data. In the beginning, the data is limited, and the progress of scanning and model generation is illustrated by an expanding graphical indication (e.g., indication 570, or another graphical indication) within preview 568. In some embodiments, preview 568 has a three-dimensional shape that is typical of the physical environment (e.g., a cubic shape for a room, or a rectangular cuboid for a house). In some embodiments, the three-dimensional shape is modified (e.g., expanded, and/or adjusted) as the shape of the physical environment is explored and ascertained based on the captured image and/or depth data during the scan. In some embodiments, device 100 performs edge detection and surface detection (e.g., plane detection and/or detection of curved surfaces) in the first portion of the physical environment based on the captured image and/or depth data; and as edge(s) and surfaces are detected and characterized in the first portion of the physical environment, device 100 displays respective graphical representations of the detected edges and/or surfaces in user interface 522. As shown in FIG. 5E, graphical object 571 (e.g., a line, and/or a linear graphical object) is displayed at a location that corresponds to a detected edge between wall 530 and floor 540; graphical object 572 (e.g., a line, and/or a linear graphical object) is displayed at a location that corresponds to a detected edge between wall 530 and ceiling 538; graphical object 574 (e.g., a line, and/or a linear graphical object) is displayed at a location that corresponds to a detected edge between wall 530 and wall 532; and graphical object 576 (e.g., a line, and/or a linear graphical object) is displayed at a location that corresponds to a detected edge between wall 532 and floor 540. In some embodiments, the respective graphical representations of the detected edges (e.g., graphical objects 571, 572, 574, and 576) are extended in lengths and/or thickness as additional portions of the detected edges are detected and/or ascertained based on the progress of scan and model generation. In some embodiments, the positions of the respective graphical representations are adjusted (e.g., shift and/or dither) as the precise locations of the detected edges are adjusted based on the progress of scan and model generation.

In FIG. 5F, as the scan and model generation continue over time and/or based on additional captured image and/or depth data, more details of the spatial characteristics of the first portion of the physical environment are ascertained. The progress of the scan and model generation (e.g., changes in the predicted accuracies of the estimated spatial properties of the detected edges and/or surfaces) is shown by the changes in the visual characteristics (e.g., lengths, shapes, thicknesses, amount of featuring, luminance, translucency, opacity, and/or sharpness) of the graphical objects that are displayed at the locations of the detected edges and surfaces. In some embodiments, as shown in FIGS. 5E and 5F, as more of the edge between wall 532 and floor 540 is detected, graphical object 576 is extended in length along the edge between wall 532 and floor 540. In some embodiments, as shown in FIGS. 5E and 5F, as the predicted accuracy of the estimated spatial properties (e.g., position, orientation, shape, size, and/or spatial extent) of the edge between wall 530 and ceiling 538 increases (e.g., due to additional data processing and/or additional captured image and/or depth data), the visual characteristics (e.g., lengths, shapes, thicknesses, amount of featuring, luminance, translucency, opacity, and/or sharpness) of graphical object 572 changes accordingly (e.g., extended in length, more details or more crisp in shape, reduced in thickness, reduced feathering on the boundaries, increasing opacity, increasing luminance, reduced translucency, and/or increasing sharpness). Similarly, as the predicted accuracy of the estimated spatial properties (e.g., position, orientation, shape, size, and/or spatial extent) of other edges (e.g., the edge between wall 530 and floor 540, the edge between wall 530 and wall 532) increase (e.g., due to additional data processing and/or additional captured image and/or depth data), the visual characteristics (e.g., lengths, shapes, thicknesses, amount of featuring, luminance, translucency, opacity, and/or sharpness) of their corresponding graphical objects (e.g., graphical object 571 and graphical object 574) change accordingly (e.g., extended in length, more details or more crisp in shape, reduced in thickness, reduced feathering on the boundaries, increasing opacity, increasing luminance, reduced translucency, and/or increasing sharpness). In some embodiments, as more edges and/or surfaces are detected in the first portion of the physical environment, additional graphical objects (e.g., graphical object 578, and graphical object 580) are displayed at the respective locations of the detected edges and/or surfaces. In some embodiments, an overlay (e.g., a color overlay, and/or a texture overlay), other types of graphical objects (e.g., point cloud, wireframe, and/or texture), and/or visual effects (e.g., blur, change in saturation, change in opacity, and/or change in luminance) are displayed at locations of detected surfaces. In some embodiments, the area covered by the overlay, other types of graphical objects and/or visual effects is expanded as the scan and model generation progress and more of the surfaces are detected and characterized. For example, in some embodiments, as the scan and model generation progress, an overlay, point cloud, wireframe, texture and/or visual effect gradually expand across the detected surfaces corresponding to wall 530 and 532 in FIGS. 5E and 5F. In some embodiments, as the predicted accuracies of the estimated spatial properties of the detected surfaces change (e.g., increase or decrease), the visual properties (e.g., intensity, saturation, luminance, density, opacity, fill material type, and/or sharpness) of the overlay, point cloud, wireframe, texture and/or visual effect applied to the locations of the detected surfaces also change accordingly (e.g., increase, decrease, or change in other manners).

As shown in FIG. 5F, in addition to detecting edges and surfaces of structural elements (e.g., walls, ceiling, floor, windows, entryway, and/or doors), device 100 also detect non-structural elements (e.g., furniture, fixtures, physical objects, and/or other types of non-structural elements) at the same time during the scan. In this example, edges and/or surfaces of cabinet 548 have been detected but the cabinet has not been recognized, and device 100 displays graphical object 580 at the location of the detected cabinet 548 (e.g., including displaying segments 580-1, 580-2, 580-3, and 580-4 at the locations of the detected edges) to convey the spatial characteristics that have been estimated for the detected edges and/or surfaces of cabinet 548. In some embodiments, at a given moment in time (e.g., the moment captured in FIG. 5F, a moment captured in another figure, or another moment during the scan), the degrees of progress and predicted accuracies for the spatial properties of edges, surfaces, and/or objects that are detected in different subportions of the first portion of the physical environment may be different. For example, the predicted accuracy for the spatial properties of the edge between wall 530 and floor 540 is greater than the predicted accuracy for the spatial properties of the edge between wall 532 and ceiling 538, and greater than the predicted accuracy for the spatial properties of the detected edges of cabinet 548. Accordingly, the visual properties (e.g., lengths, shapes, thicknesses, amount of featuring, luminance, translucency, opacity, and/or sharpness) of the graphical objects 571 are made different from those corresponding visual properties for the graphical objects 578 and 580, to reflect the differences in their respective predicted accuracy of the spatial properties of the detected edges and/or surfaces of their corresponding physical features (e.g., edge between wall 530 and floor 540, edge between wall 532 and ceiling 538, and cabinet 548, respectively). In some embodiments, different portions of a graphical object that are displayed for different portions of a detected physical feature (e.g., an edge, a surface, and/or an object), optionally, have different values for one or more visual properties at a given moment, where the values of the one or more visual properties are determined based on the respective predicted accuracies for the spatial properties of the different portions of the detected physical feature. For example, at a given moment in time, different portions of the graphical object 580 for different portions of the detected edges and/or surfaces of cabinet 548 have different values for one or more visual properties (e.g., thickness, sharpness, amount of featuring, and/or luminance) depending on the respective predicted accuracies of the spatial properties of the different portions of the detected edges and/or surfaces of the cabinet.

In FIG. 5F, preview 568 of the three-dimensional model of room 520 is updated to show portions of wall 530, wall 532, and floor 540 that have been detected based on the scanned image and/or depth data. The spatial relationship between the detected walls 530, wall 532, and floor 540 is shown in preview 568 by the spatial relationship between their corresponding representations 530", 532" and 540". In some embodiments, a graphical object (e.g., overlay 570, or another graphical object) is displayed in preview 568 to indicate real-time progress of the scan and model generation (e.g., overlay 570 expands across the surfaces of the representations 530", 532", and 540" as the spatial properties of their corresponding physical features are estimated with better and better accuracy). In some embodiments, as shown in FIG. 5F, preview 568 includes a partially completed three-dimensional model of room 520, and the partially completed three-dimensional model of room 520 is oriented relative to the viewpoint of the cameras in accordance with the orientation of room 520 relative to the viewpoint of the camera(s). In other words, the portion of the physical environment in the field of view of the cameras (e.g., the camera view of the physical environment, the augmented reality view of the physical environment, and/or the pass-through view of the physical environment) that faces toward the viewpoint of the user corresponds to the portion of the partially completed three-dimensional model that faces toward the viewpoint of the user. In some embodiments, as the camera(s) move (e.g., translates and/or rotates in three dimensions) in the physical environment, camera view 524 and the orientation of the partially completed three-dimensional model in preview 568 are updated accordingly to reflect to movement of the viewpoint of the user.

In FIG. 5G, as the scan and model generation continue overtime, more edges and/or surfaces are detected in the first portion of the physical environment, and respective graphical objects are displayed at locations of the detected edges and/or surfaces to represent their spatial properties (e.g., graphical object 582 is displayed at location of window 542). In addition, as the scan and model generation progress over time, spatial characteristics of additional portions of detected edges, surfaces, and/or objects are estimated, and the visual properties of their corresponding graphical objects are updated in accordance with the changes in the spatial characteristics and their estimated accuracies (e.g., segments 580-2 and 580-3 are extended in length as additional portions of the edges of cabinet 548 are detected and characterized, and visual properties of segment 580-1 and 580-4 are updated in accordance with changes in the estimated accuracies of the corresponding edges of cabinet 548). In FIG. 5G, expansion of overlay 570 across the representations 530", 532" and 540" indicate the progress of the scan and model generation.

In FIG. 5H, as the scan and model generation continue overtime, more edges and/or surfaces are detected in the first portion of the physical environment. Respective graphical objects are displayed at locations of the detected edges and/or surfaces to represent their spatial properties (e.g., a new surface corresponding to the front surface of cabinet 548 is detected, and/or a new surface corresponding to the left side surface of cabinet 548 is detected) and/or existing graphical objects are expanded and/or extended along newly detected portions of previously detected edges and/or surfaces (e.g., graphical object 582 is extended along newly detected edges of window 542).

In FIG. 5H, as the scan and model generation continue, detection and characterization of one or more edges and/or surfaces of one or more structural elements and non-structural elements of room 520 are completed. As illustrated in FIG. 5H, in response to detecting that detection and characterization of the edge between wall 530 and floor 540 are completed (e.g., in accordance with a determination that the predicted accuracy of one or more spatial properties of the edge is above a completion threshold, and/or in accordance with a determination that an entire extent of the edge has been detected), a final state of graphical object 571 is displayed. In some embodiments, the final state of a graphical object that is displayed in response to detecting completion of the detection and characterization of its corresponding edge or surface in the physical environment has a set of predetermined values for one or more visual properties (e.g., shape, thickness, amount of featuring, luminance, translucency, opacity, and/or sharpness) of the graphical object. As shown in FIG. 5H, before completion of the detection and characterization of the edge between wall 530 and floor 540, graphical object 571 is, optionally, a line that is broken at places, has a higher luminance, has a higher degree of feathering along its boundaries, and/or is semi-transparent; and in response to detecting the completion of the detection and characterization of the edge between wall 530 and floor 540, the final state of graphical object 571 is displayed which is, optionally, a solid line without broken pieces, has a lower luminance, has no feathering or reduced degree of feathering along its boundaries, and/or is opaque. As shown in FIG. 5H, before completion of the detection and characterization of the edges of cabinet 548, graphical object 580 is, optionally, multiple broken or dashed lines, has multiple levels of luminance along different edges and/or different portions of the same edge, have multiple degrees of feathering along the boundaries of different edges and/or different portions of the same edge, and/or are of different levels of translucencies along different edges and/or different portions of the same edge; and in response to detecting the completion of the detection and characterization of the edges of cabinet 548, the final state of graphical object 580 is displayed which is, optionally, a set of solid lines (e.g., a two-dimensional bounding box, a three-dimensional bounding box, or other types of outlines), have a uniform and lower luminance, have no feathering or reduced degree of feathering along all edges, and/or are uniformly opaque. In FIG. 5H, before completion of the detection and characterization of a surface (e.g., wall 530, or surfaces of cabinet 548), an overlay or other types of graphical object (e.g., wireframe, point cloud, and/or texture) that is displayed at the location of the surface, optionally, is of uneven luminance, includes broken patches, is evolving and flickering, and/or is more transparent; and in response to detecting the completion of the detection and characterization of the surface, the final state of the graphical object is displayed which is, optionally, of uniform luminance, is of a continuous shape, has a stable appearance with no flickering, and/or is more opaque.

In some embodiments, completion of detection and characterization of a surface is visually indicated by an animation (e.g., a sudden increase of luminance followed by a decrease of luminance of the overlay and/or graphical object displayed at the location of the surface) and/or a quick change in a set of visual properties of the overlay and/or graphical object displayed at the location of the detected surface. In some embodiments, completion of detection and characterization of an edge is visually indicated by a change from a line with varying visual characteristics (e.g., varying luminance, varying thickness, varying lengths, varying amount of feathering, and/or varying levels of sharpness) (e.g., based on changes and variations of predicted accuracies of the estimated spatial properties of the detected edge or different portions of the detected edge) to a line that is stable, uniform, and solid, is with a preset luminance, thickness, and/or sharpness, and/or is without feathering. In the example shown in FIG. 5H, completion of detecting and characterizing the edge between wall 530 and floor 540 is indicated by display of animation and/or visual effect 584 that is different from the changes in the appearance of graphical object 571 that were displayed in accordance with progress of the scan at or near the wall 530, floor 540, and the edge therebetween and/or in accordance with the changes in the predicted accuracies of the estimated spatial properties of the detected edge. In some embodiments, the speed by which graphical object 571 is extended along the detected edge is based on the predicted accuracy of the estimated spatial properties of the detected edge, e.g., graphical object 571 extends along the edge with a slower speed initially, and graphical object 571 extends with a faster speed as the scan progresses and the predicted accuracy of the estimated spatial properties of the detected edge improves over time. In the example shown in FIG. 5H, completion of detecting and characterizing the surfaces of cabinet 548 is indicated by display of animation and/or visual effect 586 (e.g., animations and/or visual effects 586-1, 586-2, and 586-3 shown on different surfaces of cabinet 548) that is different from the expansion and changes in the appearance of the overlay on the cabinet 548 that were displayed in accordance with progress of the scan of cabinet 548 and/or in accordance with the changes in the predicted accuracies of the estimated spatial properties of the detected surfaces and edges of cabinet 548.

In some embodiments, the scanning progress indication (e.g., an overlay and/or visual effect) that is display at the location of a detected surface has an enhanced visual property (e.g., higher luminance, higher opacity, and/or higher color saturation) that is reduced over time as predicted accuracy of the estimated spatial properties of the detected surface increases. In some embodiments, completion of the scan and modeling of the detected surface is visually indicated by an animated change that shows an accelerated enhancement of the visual property followed by a decrease of the enhancement (e.g., an increase in luminance followed by a decrease in luminance, an increase in opacity followed by a decrease in opacity, and/or an increase in color saturation followed by a decrease in color saturation).

In some embodiments, the scanning progress indication (e.g., a linear graphical object, and/or a bounding box) that is display at the location of a detected edge has an enhanced visual property (e.g., higher luminance, higher opacity, and/or higher color saturation) that is reduced over time as predicted accuracy of the estimated spatial properties of the detected edge increases. In some embodiments, completion of the scan and modeling of the detected edge is visually indicated by an animated change that shows an accelerated enhancement of the visual property followed by a decrease of the enhancement (e.g., an increase in luminance followed by a decrease in luminance, an increase in opacity followed by a decrease in opacity, and/or an increase in color saturation followed by a decrease in color saturation).

In some embodiments, when a corner in the physical environment (e.g., the corner of wall 530, wall 532, and ceiling 538) is detected during the scan, the predicted accuracies of the spatial properties of three edges that meet at the corner is improved; and consequently, an amount of feathering and/or other visual effect that is applied to the graphical objects displayed at the locations of the detected edges (e.g., graphical objects 572, 574, and 578 in FIG. 5H) to indicate the predicted accuracies of the detected edges (e.g., animated flickering, and/or shifting of textures) is reduced (e.g., as shown by visual effect 588 in FIG. 5H). In some embodiments, when three detected edges intersect at the same corner (e.g., a point, or a threshold area around a position), completion of the three detected edges are confirmed if the predicted accuracies of three detected edges meet a preset threshold accuracy; and if the detected edges do not intersect at the same corner, the predicted accuracies of the detected edges will be reduced.

In this example, the edge between wall 530 and floor 540 is partially behind cabinet 548, and optionally, graphical object 571 is extended along the predicted location of the edge behind cabinet 548 based on the imaging and depth data captured of wall 530 and floor 540. In some embodiments, the portion of graphical object 571 that is supposedly behind cabinet 548 is optionally displayed with reduced visual prominence as compared to other portions of graphical object 571 that is displayed along an unobscured portion of the edge. In some embodiments, the reduced visual prominence (e.g., reduced luminance, reduced opacity, increased feathering, and/or reduced sharpness) of the portion of graphical object 571 that is displayed along a portion of the edge behind cabinet 548 corresponds to a reduced predicted accuracy of the spatial properties of the portion of the edge behind cabinet 548.

As shown in FIGS. 5G-5H, as the scan of the first portion of room 520 continues, graphical object 580 that is displayed along the detected edges and/or surfaces of cabinet 548 gradually forms a three-dimensional bounding box around the view of cabinet 548 in user interface 522. The spatial characteristics (e.g., size, length, height, thickness, spatial extent, dimensions, and/or shape) of graphical object 580 correspond to the spatial characteristics (e.g., size, length, height, thickness, spatial extent, dimensions, and/or shape) of cabinet 548. When the edges and surfaces of cabinet 548 are completely detected, object 548" that represents cabinet 548 in the three-dimensional model of room 520 is displayed in preview 568 as part of the partially completed three-dimensional model of room 520. The spatial relationships between object 548" and representations 530" for wall 530, representation 532" for wall 530, and representation 540" for floor 540 in the partially completed model of room 520 in preview 568 corresponds to the spatial relationships between cabinet 548 and wall 530, wall 532, and floor 540 in room 520. The shape and size of object 548" relative to the partially completed three-dimensional model in preview 568 correspond to the shape and size of cabinet 548 relative to room 520. In some embodiments, object 548" is a three-dimensional object that is simplified relative to cabinet 548 (e.g., detailed surface textures and decorative patterns on the surface of cabinet 548 are not represented in object 548"). In FIG. 5H, the surface and edges of wall 530, the surface and edges of wall 532, and the surface and edges of floor 540 are also represented by their corresponding representations 530", 532", and 540" in preview 568. The orientation of the partially completed model of room 520 in preview 568 and the camera view 524 of the first portion of room 520 in user interface 522 correspond to the same viewpoint of the user (e.g., the viewpoint represented by the position and facing direction of object 566 in top view 564 of room 520).

In some embodiments, after detection and modeling of the edges and surfaces in the first portion of the physical environment have been completed (e.g., including at least three edges and surface of wall 530, edges and surface of window 542, and edges and surfaces of cabinet 548), device 100, optionally, displays a prompt that guide the user to continue to move the one or more cameras to scan a new portion of the environment. As shown in FIG. 5I, after scanning the first portion of room 520, the user turns the cameras to face a second portion of room 520 adjacent to the first portion of room 520. The current viewpoint of the user is indicated by the position and facing direction of object 566 in top view 564 of room 520 in FIG. 5I. Corresponding to the updated viewpoint of the user, camera view 524 of the physical environment included in user interface 522 is updated to include the second portion of room 520, including wall 532 and furniture and physical objects in front of wall 532 (e.g., stool 546, TV stand 550, TV 560, and floor lamp 556). As shown in FIG. 5I, window 542 has been shifted out of the current field of view of the cameras, and cabinet 548 has been shifted to the left side of the field of view of the cameras. After the movement of the one or more cameras and changes in the viewpoint of the user, more image and depth information corresponding to the second portion of the physical environment is captured by the one or more cameras, and the model for the second portion of the physical environment is being generated based on the newly captured image and/or depth data. As shown in FIG. 5I, graphical object 576 for the edge between wall 532 and floor 540 is extended along the edge between wall 532 and floor 540 based on newly captured image and depth data from the second portion of the physical environment. The earlier displayed portion of graphical object 576 (e.g., the left portion) is optionally displayed with less visual enhancement (e.g., lower luminance, lower color saturation, and/or less opacity) but more definiteness (e.g., more stable, more solid, more sharpness, less flickering, and/or less feathering) to indicate a greater predicted accuracy for the spatial characteristics of the left portion of the edge between wall 532 and floor 540; and the later displayed portion of graphical object 576 (e.g., the right portion) is optionally displayed with more visual enhancement (e.g., greater luminance, greater color saturation, and/or greater opacity) but less definiteness (e.g., more patchy, more broken, less sharpness, more flickering, and/or more feathering) to indicate a lower predicted accuracy for the spatial characteristics of the right portion of the edge between wall 532 and floor 540. In addition, graphical object 590 is displayed at a location of stool 546 to indicate an outline of stool 546, graphical object 592 is displayed at a location of TV 560 to indicate edges and surface of TV 560, and graphical object 594 is displayed at a location of TV stand 550 to indicate an outline of TV stand 550. In some embodiments, graphical objects 590, 592, 594 are displayed with different values or sets of values for one or more visual properties (e.g., luminance, thickness, texture, feathering, blur, sharpness, density, and/or opacity) in accordance with respective predicted accuracies of the estimated spatial properties of the edges and surfaces of stool 546, TV 560, and TV stand 550. As the scan continues to progress, the appearances of graphical objects 590, 592, 594 are continuously updated (e.g., expanded and/or updated in values for the one or more visual properties) in accordance with detection of new portions of the edges and surfaces of stool 546, TV 560, and TV stand 550 and in accordance with updates to the respective predicted accuracies of the estimated spatial properties of the edges and surfaces of stool 546, TV 560, and TV stand 550.

In FIG. 5I, in accordance with a change in the current viewpoint of the user (e.g., from that shown in FIG. 5H) and in conjunction with the update to the camera view 524 based on the change in the viewpoint of the user, preview 568 is also updated to show the partially completed model with a different orientation that corresponds to the current viewpoint of the user. For example, the partially completed model of room 520 is rotated around a vertical axis to the left by a first angular amount, in response to a rotation of the camera's field of view around a vertical axis to the right by the first angular amount. As shown in FIG. 5I, object 548" that represents cabinet 548, representation 530" for wall 530, and representation 542" (e.g., a hollowed out area, a transparent area, or another type of representation) for window 542 are rotated to the left side of preview 568, while cabinet 548 and wall 530 are shifted to the left side of the camera view 524 in user interface 522. In FIG. 5I, representation 530" of wall 530, representation 532" of wall 532, and representation 540" of floor 540 in the partially completed three-dimensional model of room 520 displayed in preview 568 are expanded as more image and depth data of wall 530, wall 532, and floor 540 are captured by the one or more cameras and processed by device 100.

In FIG. 5I, after cabinet 548 is identified (e.g., recognized to be of a known type of object, recognized to have a respective label or name, recognized to belong to a known group, and/or can otherwise been identified with a label, icon, or another similar representation) (e.g., based on the scanned data, and/or the spatial characteristics of the cabinet), the previously displayed graphical object 580 at the location of cabinet 548 is gradually replaced by another representation 596 of cabinet 548 (e.g., a label, an icon, an avatar, a textual object, and/or a graphical object) that does not spatially indicate the one or more spatial characteristics (e.g., size, length, height, thickness, dimensions, and/or shape) of cabinet 548. For example, as shown in FIG. 5I, graphical object 580 spatially indicates the one or more spatial characteristics of cabinet 548 (e.g., the size, length, height, thickness, dimensions, and/or shape of graphical object 580 corresponds to the size, length, height, thickness, dimensions, and/or shape of cabinet 548, and/or graphical object 580 is a bounding box or outline of cabinet 548). Graphical object 580 is gradually faded out from the location of cabinet 548, when another representation 596 is displayed at the location of cabinet 548. In some embodiments, the spatial characteristics of representation 596 are independent of the spatial characteristics of cabinet 548 (e.g., the size, length, height, thickness, dimensions, and/or shape of representation 596 of cabinet 548 do not correspond to the size, length, height, thickness, dimensions, and/or shape of cabinet 548). In some embodiments, representation 596 is smaller (e.g., occupies less area, and/or has a smaller spatial extent) than graphical object 580. In some embodiments, representation 596 indicates a type of object that has been identified (e.g., representation 596 includes a name of cabinet 548, a model number of cabinet 548, a type of furniture that cabinet 548 is, a brand name of cabinet 548, and/or an owner or maker of cabinet 548). In some embodiments, representation 596 is an icon or image that indicates the object type of cabinet 548. In some embodiments, after representation 596 is displayed, graphical object 580 is no longer displayed (e.g., as shown in FIG. 5J). In some embodiments, after representation 596 is displayed, graphical object 580 is displayed in a translucent and/or dimmed state, or another state with reduced visual prominence. In some embodiments, the spatial relationship between graphical object 580 and cabinet 548 is fixed after scanning and modeling of cabinet 548 is completed, regardless of the orientation of cabinet 524 relative to the current viewpoint of the user (e.g., when the viewpoint changes, graphical object 580 and cabinet 548 move and turn in the same manner in the camera view 524). In some embodiments, the spatial relationship between representation 596 and cabinet 548 is not fixed and may change depending on the current viewpoint of the user (e.g., when the viewpoint changes, representation 596 and cabinet 548 may translate together (e.g., representation 596 is attached to a detected front surface of cabinet 548), but representation 596 will turn to face toward the current viewpoint irrespective of the facing direction of cabinet 548 relative to the viewpoint).

In FIG. 5J, as the scan of the second portion of the physical environment continues, graphical object 580 ceases to be displayed at the location of cabinet 548 in camera view 524, and representation 596 remains displayed at the location of cabinet 548 (e.g., representation 596 is attached to the front surface of cabinet 548 and is turned to face toward the viewpoint of the user). In FIG. 5J, as more edges and/or surfaces are scanned and modeled, graphical objects corresponding to the newly detected edges and/or surfaces are displayed at the respective locations of these newly detected edges and/or surfaces in camera view 524 (e.g., graphical object 598 is displayed at the location of floor lamp 556). In FIG. 5J, as additional portions of known edges and/or surfaces are scanned and modeled, graphical objects corresponding to these known edges and/or surfaces are expanded in camera view 524 (e.g., graphical object 592 corresponding to TV 560 and graphical object 594 corresponding to TV stand 550 are expanded). In FIG. 5J, as predicted accuracies of the spatial properties of the detected edges and/or surfaces continue to change and/or improve, one or more display properties of the graphical objects corresponding to the detected edges and/or surfaces are updated according to the changes in the predicted accuracies of the spatial properties of their corresponding edges and surfaces (e.g., the display properties of graphical object 590 corresponding to stool 546, of graphical object 594 corresponding to TV stand 550, and of graphical object 576 for the edge between wall 532 and floor 540, are updated based on the changes in the predicted accuracies of the spatial characteristics of their corresponding structural and/or nonstructural elements). In FIG. 5J, as detection and modeling of an edge and/or surface is completed, a final state of the graphical object representing the edge and/or surface is displayed (e.g., final state of graphical object 592 for TV 560 is displayed), and optionally, an animated change in the appearance of the graphical object is displayed to indicate the completion of the scan and modeling of the edge and/or surface (e.g., visual effect 598 is displayed for the completion of the scan of the edge between wall 532 and floor 540, and visual effect 600 is displayed for the completion of the scan of the surface of TV 560).

In FIG. 5J, based on the scan of the first portion of the physical environment, and, optionally, the scan of the second portion of the physical environment, device 100 determines that an unscanned portion of room 520 exists between the first portion of the physical environment that has been modeled and the second portion of the physical environment that has been modeled. In some embodiments, device 100 determines that an unscanned portion of the physical environment exists between two scanned portions of the physical environment based on a determination that the models of the two scanned portions of the physical environment cannot be joined together satisfactorily. In this example, when the first portion of the room 520 is being scanned (e.g., as shown in FIGS. 5F-5H), cabinet 548 is in a position that blocks a portion of wall 530 from being captured by the cameras; and when the viewpoint changes and the second portion of the room is being scanned, cabinet 548 still blocks the view of the missed portion of wall 530, and the missed portion of wall 530 is almost completely moved out of the field of view of the cameras when the second portion of room 520 is in the field of view of the cameras. It should be clarified that the missed portion of wall 530 that has not been scanned refers to the portion of wall 530 that includes entryway 544 which is visually obscured by cabinet 548 from certain viewing angles, and not the portion of wall 530 that is directly behind the back surface of cabinet 548 which would not be visible from any viewing angle. Device 100 determines, e.g., based on the above information, that the user may have presumed that scan and modeling of the first wall 530 of the physical environment has been completed and that the user has moved on to scan the second portion of the physical environment. Based on the above determination, device 100 displays a prompt (e.g., banner 602, and/or another alert or notification) for the user to scan a missed spot in the presumably completed portion of the physical environment. In some embodiments, the prompt is updated to provide more detailed and up-to-date guidance about how the user may move to scan the missed portion of the presumably completed portion of the physical environment (e.g., updated banner that reads "move forward," "move left," "turn to face the camera to the left," and/or other appropriate instructions). In some embodiments, in addition to the prompt, device 100 also displays one or more visual guides to help the user to find the location of the missed portion of the already scanned portion of the physical environment. For example, as shown in FIG. 5J, a visual indication (e.g., arrow 604, and/or another type of visual indication or graphical object) is displayed to indicate the location of the missed portion of wall 530 hidden behind cabinet 548 (e.g., arrow 604 points toward the location of the missed portion of wall 530 that is behind cabinet 548 from the current viewing angle). In some embodiments, the visual indication is an animated object (e.g., animated arrow, and/or animated icon), and the animation (e.g., movement direction of the animated object, and/or movement pattern of the animated object) indicates the location of the missed portion of wall 530 that is behind cabinet 548 as viewed from the current viewing angle. In some embodiments, device 100 displays the visual indication at a location that is on the side of the camera view that is closest to the missed portion of wall 530. In some embodiments, as the field of view of the camera changes, the visual indication is optionally updated depending on the relative spatial positions of the missed portion of wall 530 and the currently displayed portion of the physical environment. In some embodiments, the visual indication is displayed at a visual depth that corresponds to the missed portion of the presumably completed portion of the physical environment (e.g., arrow 604 is displayed at a depth corresponding to the depth of the missed portion of wall 530 hidden behind cabinet 548 from the current viewing angle).

In some embodiments, device 100 further displays a visual indication (e.g., dot 606 or another type of visual indication) at a location in the camera view that corresponds to a location from where the missed portion of wall 530 can be captured by the cameras. For example, dot 606 is displayed overlaying camera view 524 at a location on floor 540 to indicate that if the user were to stand close to stool 546 and point the cameras in the direction indicated by arrow 604, image and depth data for the missed portion of wall 530 would be captured. In some embodiments, the visual indication is an animated object (e.g., a bouncing ball, another type of animated object or visual effect). In some embodiments, the visual indication is displayed at a visual depth that corresponds to the location from which the missed portion of the presumably completed portion of the physical environment can be scanned (e.g., dot 606 is displayed at a depth corresponding to the depth of the location from which the missed portion of wall 530 behind cabinet 548 can be scanned).

In some embodiments, a visual indication that indicates the location of the missed portion of wall 530 is displayed in preview 568 of the three-dimensional model of room 520. As shown in FIG. 5J, arrow 608 is displayed in the partially completed model of room 520 at a location next to representation 548" for cabinet 548 and pointing toward a portion of representation 530" for wall 530 that has not been scanned and modeled (e.g., the unscanned portion of wall 530 is shown as a flat portion, irrespective of what structural and/or nonstructural elements exist in the unscanned portion of wall 530 and the space in front of it). In some embodiments, the appearance of visual indication 608 corresponds to the appearance of visual indication 604. In some embodiments, the appearance of visual indication 608 is different from visual indication 604, where the respective appearances of visual indication 608 and visual indication 604 are, optionally, tailored to their respective surrounding environments to enhance visibility of the visual indications.

In some embodiments, a visual indication that indicates the location from where a user can place the cameras to capture of the missed portion of wall 530 is displayed in preview 568 of the three-dimensional model of room 520. As shown in FIG. 5J, dot 610 is displayed in the partially completed model of room 520 at a location on the representation 540" of floor 540, next to representation 548" for cabinet 548. In some embodiments, the appearance of visual indication 610 corresponds to the appearance of visual indication 606. In some embodiments, the appearance of visual indication 610 is different from visual indication 606, where the respective appearances of visual indication 610 and visual indication 606 are, optionally, tailored to their respective surrounding environments to enhance visibility of the visual indications. In some embodiments, visual indication 608 and/or visual indication 610 are animated. In some embodiments, visual indication 608 and/or visual indication 610 are stationary relative to preview 568 of the three-dimensional model of room 520.

In FIG. 5J, as the scan and modeling of the second portion of the physical environment continue, representations of newly detected objects are added to the partially completed three-dimensional model of room 520 in preview 568. For example, object 560" for TV 560 is added to a location in the partially completed three-dimensional model that corresponds to the location of TV 560 in the physical environment. In some embodiments, before detection and characterization of a nonstructural element, such as a piece of furniture, a physical object, and/or an appliance, are completed, a representation of the nonstructural element is not added into the partially completed model in preview 568 (e.g., representations for stool 546, TV stand 550, and floor lamp 598 are not added to the model yet).

FIGS. 5K-5P illustrate interaction with the partially completed three-dimensional model of room 520 in preview 568, while the scan of the second portion of the physical environment is ongoing and progressing. For example, during the scan of the second portion of the physical environment, more objects are identified and their corresponding spatial representations (e.g., bounding boxes, or other graphical objects that spatially indicate the spatial dimensions of the objects) are replaced by their corresponding nonspatial representations (e.g., icons, labels, and/or other graphical objects that do not spatially indicate the spatial dimensions of the objects). In addition, spatial characteristics and/or predicted accuracies of spatial characteristics of one or more edges and/or surfaces have changed, and the spatial characteristics and the visual properties of their spatial representations have been updated accordingly. In some embodiments, as the detection and modeling of edges and/or surfaces are completed, corresponding visual effects are displayed to indicate the completion of the detection and modeling of these edges and/or surfaces. In addition, as detection and modeling of an object is completed, its corresponding representation (e.g., a three-dimensional representation, or a two-dimensional representation) is added to the partially completed three-dimensional model in preview 568.

For example, in FIG. 5K, when the scanning and modeling of stool 546 is completed, graphical object 590 of stool 546 is updated to its final state that spatially represents the spatial characteristics of stool 546 (e.g., graphical object 590 is displayed as a bounding box, or another shape that represents the spatial extent of stool 546), and a corresponding three-dimensional representation 546" of stool 546 (e.g., a cylinder that represents the shape and spatial extent of stool 546) is added to the partially completed model of room 520 at a location left of representation 560" for TV 560. In addition, in FIG. 5K, when the scanning and modeling of TV stand 550 is completed, graphical object 594 of TV stand 550 is updated to its final state that spatially represents the spatial characteristics of TV stand 550 (e.g., graphical object 594 is displayed as a bounding box, or another shape that represents the spatial extent of TV stand 550), and a corresponding three-dimensional representation 550" of TV stand 550 (e.g., a cuboid that represents the shape and spatial extent of TV stand 550) is added to the partially completed model of room 520 at a location below of representation 560" for TV 560.

In FIG. 5K, when TV 560 is identified (e.g., recognized to be of a known type of object, recognized to have a respective label or name, recognized to belong to a known group, and/or can otherwise been identified with a label, icon, or another similar representation) (e.g., based on the scanned data, and/or the spatial characteristics of the TV), the previously displayed graphical object 592 at the location of TV 560 is gradually replaced by another representation 612 of TV 560 (e.g., a label, an icon, an avatar, a textual object, and/or a graphical object) that does not spatially indicate the one or more spatial characteristics (e.g., size, length, height, thickness, dimensions, and/or shape) of TV 560. For example, as shown in FIG. 5J, graphical object 592 spatially indicates the one or more spatial characteristics of TV 560 (e.g., the size, length, height, thickness, dimensions, and/or shape of graphical object 592 corresponds to the size, length, height, thickness, dimensions, and/or shape of TV 560, and/or graphical object 592 is a bounding box or outline of TV 560). Graphical object 592 is gradually faded out from the location of TV 560, when another representation 612 is displayed at the location of TV 560. In some embodiments, the spatial characteristics of representation 612 are independent of the spatial characteristics of TV 560 (e.g., the size, length, height, thickness, dimensions, and/or shape of graphical object 612 do not correspond to the size, length, height, thickness, dimensions, and/or shape of TV 560). In some embodiments, representation 612 is smaller (e.g., occupies less area, and/or has a smaller spatial extent) than graphical object 592 and smaller than TV 560. In some embodiments, representation 612 indicates a type of object that has been identified (e.g., representation 612 includes a name of TV 560, a model number of TV 560, a type of appliance that TV 560 is, a brand name of TV 560, and/or an owner or maker of TV 560). In some embodiments, representation 612 is an icon or image that indicate the object type of TV 560. In some embodiments, after representation 612 is displayed, graphical object 592 is no longer displayed (e.g., as shown in FIG. 5L). In some embodiments, after representation 612 is displayed, graphical object 592 is displayed in a translucent and/or dimmed state, or another state with reduced visual prominence. In some embodiments, the spatial relationship between graphical object 592 and TV 560 is fixed after scanning and modeling of TV 560 is completed, regardless of the orientation of TV 560 relative to the current viewpoint of the user (e.g., when the viewpoint changes, graphical object 592 and TV 560 move and turn in the same manner in the camera view 524). In some embodiments, the spatial relationship between representation 612 and TV 560 is not fixed and may change depending on the current viewpoint of the user (e.g., when the viewpoint changes, representation 612 and TV 560 may translate together (e.g., representation 612 is attached to a detected front surface of TV 560), but representation 612 will turn to face toward the current viewpoint irrespective of the facing direction of TV 560).

In some embodiments, as shown in FIG. 5K, for different types of objects that have been identified, their non-spatial representations are different. In some embodiments, for the same type of objects that have been identified, their non-spatial representations are, optionally, the same, irrespective of how their spatial representations may be different. For example, the non-spatial representation of a large chair and the non-spatial representation of a small chair are optionally the same (e.g., both are a label with a stylized chair icon, or a textual label "chair"), even though their spatial representations are different (e.g., one is a bigger bounding box and the other is a small bounding box, or one is a large cylinder for a big round chair, and one is a small cube for a small desk chair). In some embodiments, non-spatial representations of smart home devices (e.g., a smart speaker, a smart home device, and/or a smart lamp) optionally have similar appearances but different visual properties other than spatial properties (e.g., visual properties such as colors and/or textual or graphical content) to represent the different types of smart home devices.

In FIG. 5K, the non-spatial representation 596 of cabinet 548 and the non-spatial representation 612 of TV 560 are respectively displayed at locations of their corresponding objects, but both are turned to face toward the current viewpoint of the user. In some embodiments, as the viewpoint of the user moves, the positions and perspectives of cabinet 548 and TV 560 would change in camera view 524 according to the movement of the viewpoint (e.g., non-spatial representation 596 of cabinet 548 would translate with the front surface of cabinet 548 while turning to continue to face toward the viewpoint, and non-spatial representation 612 of TV 560 would translated with the front surface of TV 560 while turning to continue to face toward the viewpoint (e.g., optionally turning by a different amount and/or toward a different direction from the amount and/or direction executed by the non-spatial representation 596)).

In FIG. 5L, as the scan and modeling of the second portion of the physical environment continue, scan and modeling of floor lamp 556 is completed, and a final state of graphical object 598 is displayed to indicate the spatial characteristics of floor lamp 556. In addition, representation 556" of floor lamp 556 is added to the partially completed model of room 520 in preview 568 to a position to the right of representation 550" of TV stand 550. In FIG. 5L, in response to detecting that stool 546 has been identified, non-spatial representation 614 of stool 546 (e.g., a label, an icon, an avatar, a textual object, and/or a graphical object) that indicates the identity of stool 546 (e.g., object type, model number, name, owner, maker, and/or textual description) is displayed at the location of stool 546 facing toward the viewpoint, where the non-spatial representation 614 of stool 546 does not spatially indicate the spatial dimensions of stool 546. In some embodiments, after the non-spatial representation 614 of stool 546 is displayed, the spatial representation 590 of stool 546 cease to be displayed or is reduced in visual prominence (e.g., displayed with less luminance, and/or color saturation, and/or more translucency). In some embodiments, after the scan and modeling of an object is completed, but the object is not identified for a period of time, the spatial representation of the object remains displayed without being replaced by a non-spatial representation (e.g., the spatial representation 594 of TV stand 550 remains displayed and is not replaced with a corresponding non-spatial representation because the TV stand 550 has not been identified by device 100). In some embodiments, after the scan and modeling of an object is completed, but the object is not identified for a period of time, the spatial representation of the object fades out after the period of time even if no non-spatial representation replaces it.

In FIG. 5M, the spatial representation 590 of stool 546 is replaced by the non-spatial representation 614 of stool 546 and ceases to be displayed in camera view 524. In FIG. 5M, non-spatial representation 616 of floor lamp 556 is displayed at a location of the floor lamp 556 in camera view 524 facing toward the viewpoint. Non-spatial representation 616 identifies floor lamp 556 (e.g., identifies the name, object type, owner, group, maker, and/or model number of floor lamp 556). In some embodiments, the spatial representation 598 of floor lamp 556 is reduced in visual prominence or ceases to be displayed when the non-spatial representation 616 of floor lamp 556 is displayed at the location of floor lamp 556 in camera view 524. In FIG. 5N, scan and modeling of the second portion of the physical environment is completed, and non-spatial representations of identified objects in the first portion of the physical environment and the second portion of the physical environment are displayed in camera view 524 at locations of their corresponding objects, all facing toward the viewpoint. In FIG. 5N, the non-spatial representation 598 of floor lamp 556 is no longer displayed in camera view 524. In some embodiments, one or more additional edges, surfaces, and/or objects in the second portion of the physical environment may still be in the process of being detected and modeled in FIG. 5K-5P (e.g., when the partially completed model in preview 568 is being manipulated by the user as described below).

In FIG. 5K, while the scanning and modeling of the second portion of the physical environment is ongoing and while camera view 24 and preview 568 are being updated with graphical objects, non-spatial representations, spatial representations, and/or three-dimensional representations of detected edges, surfaces, and/or objects, device 100 detects the start of an input directed to preview 568. In some embodiments, as shown in FIG. 5K, detecting the start of the input includes detecting contact 616 at a location on touch screen 220 that corresponds to a portion of the partially completed three-dimensional model in preview 568. In FIG. 5K, device 100 further detects movement of contact 616 in a first direction across touch screen 220 (e.g., a swipe input or a drag input on the partially completed model in preview 568 to the right).

In FIG. 5L, in response to detecting the input that includes the movement in the first direction (e.g., in response to detecting the swipe input or drag input on the partially completed model in preview 568 in the first direction), device 100 moves the partially completed model in preview 568 in a first manner in accordance with the first input (e.g., rotating and/or translating the partially completed model in the first direction). In this example, in response to a rightward swipe on the partially completed model, device 100 rotates the partially completed model around a vertical axis (e.g., an axis in the direction of gravity, and/or an axis that points in a downward direction of the preview 568 and/or user interface 522). In some embodiments, the amount and/or speed of rotation of the partially completed model is based on the distance and/or speed of the swipe input detected on the partially completed model. In some embodiments, during the rotation of the partially completed model in preview 568, objects and/or surfaces within the partially completed model may become visually occluded by other objects and/or surfaces in the partially completed model (e.g., representation 550" of TV stand 550 occludes representation 546" of stool 546, and representation 556" of floor lamp 556 occludes representation 550" of TV stand 550) as a result of the rotation. In some embodiments, visual indications for guiding the user to rescan a missed spot in a presumably completed portion of the physical environment (e.g., object 608 and object 610) may become visually occluded by other objects and/or surfaces in the partially completed model as a result of the rotation (e.g., arrow 608 becomes occluded by representation 548" of cabinet 548), and/or may visually occlude other objects and/or surfaces in the partially completed model as a result of the rotation.

In FIG. 5L, after the partially completed model of room 520 in preview 568 is rotated in accordance with the drag input by contact 616, and before termination of the drag input (e.g., before liftoff of contact 616, or before detecting other types of termination depending on the input type), the partially completed model of room 520 in preview 568 is shown with an orientation that is different from the orientation of the physical environment relative to the viewpoint of the user. In FIG. 5M, when termination of the drag input is detected, device 100 restores the orientation of the partially completed model in preview 568, such that the orientation of the partially completed model again matches the orientation of the physical environment relative to the current viewpoint. In some embodiments, if the viewpoint of the user moves relative to the physical environment while the partially completed model is being rotated and/or moved in preview 568 in accordance with a user's input directed to the partially completed model, device 100 updates the camera view 524 such that the view of the physical environment in user interface 522 continues to correspond to the current viewpoint, where the orientation of the partially completed model after the rotation and/or movement of the partially completed model by the user input is not based on the current viewpoint as long as the termination of the input has not been detected. In FIG. 5M, as soon as the termination of the drag input (e.g., liftoff of contact 616, or another type of termination depending on the input type) is detected, device 100 displays the partially completed model with an orientation that corresponds to the current viewpoint, e.g., the same orientation as the physical environment in the camera view 524.

In FIG. 5N, another user input (e.g., a depinch gesture by two contacts 618-1 and 618-2 moving away from each other after touching down on the partially completed model in preview 568, or another scaling input of a different input type) is detected at the location of the partially completed model in preview 568. In response to detecting the user input, device 100 rescales the partially completed model in preview 568 in accordance with the user input (e.g., increases the scale of the partially completed model in accordance with the movement of the contacts in the depinch gesture, and/or decrease the scale of the partially completed model in accordance with the movement of the contacts in a pinch gesture). In some embodiments, the direction and magnitude of the rescaling of the partially completed model is based on the direction and magnitude of the relative movement of the user input (e.g., contacts moving apart causes enlargement of the model, contacts moving together causes shrinking of the model, and/or center of contacts moving in a respective direction causes translation of the model while the model is being rescaled). In FIG. 5O, in response to detecting the user input that corresponds to a request to rescale the partially completed model in preview 568, the partially completed model of room 520 is enlarged. In some embodiments, before termination of the user input is detected (e.g., liftoff of contacts 618-1 and 618-2, or another type of termination depending on the input type), the changed scale of the partially completed model in preview 568 is maintained, e.g., obscuring a larger portion of the camera view 524 than before the input was detected. In FIG. 5P, after the termination of the user input is detected, device 100 displays the partially completed model with the original scale that was used before the user input was detected.

FIGS. 5Q-5R illustrate rescan of the missed portion of wall 530 and the region in front of it (e.g., visually occluded by cabinet 548 and/or behind cabinet 548 along the line of sight from the viewpoints of the user, when scanning the first portion and the second portion of room 520), in accordance with the guidance provided by object 604 and 606, in accordance with some embodiments. As shown in FIG. 5Q, if the user, at the prompt of banner 602, and in accordance with the guidance provided by arrow 604 and dot 606 in the camera view 524 (and/or in accordance with the guidance provided by arrow 608 and dot 610 in preview 568), the user moves the cameras toward the location indicated by dot 606 and/or dot 610. In some embodiments, as shown in FIG. 5Q, banner 602 is optionally updated to show updated instructions to guide the user to move the cameras to the desired location and/or face the desired direction to scan the missed portion of the physical environment. In FIG. 5Q, the updated viewpoint of the user is indicated by the position and facing direction of object 566 in top view 564 of room 520. As shown in FIG. 5Q, camera view 524 is updated to show a closer view of cabinet 548, as the cameras are moving toward the location in the physical environment that marked by dot 606 in the camera view 524. In some embodiments, arrow 604 is shown to be visually occluded (e.g., the tip of the arrow 604 is not drawn, or shown as translucent) by the cabinet 548, if the location of the arrow 604 in the physical environment would be visually occluded by the cabinet 548 from the current viewpoint of the user. In FIG. 5Q, the non-spatial representations of identified objects (e.g., representation 596 for cabinet 548 and representation 614 for stool 546) are shown at the locations of their corresponding objects and are respectively turned to face toward the current viewpoint.

In FIG. 5R, the user has moved to a location indicated by dot 606 and/or dot 610 and pointed the cameras toward the location indicated by arrow 604 and/or arrow 610 (e.g., the current location and facing direction of the user is indicated by object 566 in top view 564 of room 520), and camera view 524 is updated to show the missed portion of wall 530 and the region in front of it. After a period of scanning and modeling, image and/or depth data for the missed portion of wall 530 and the region in front of it are captured by the cameras and processed by device 100, and edges, surfaces, and/or objects in this portion of the physical environment are detected and modeled and are optionally identified. In this example, a structural element (e.g., entryway 544, and/or another structural element) is detected and modeled, and graphical object 620 is displayed at the location of the structural element in camera view 524 to spatially represent the spatial characteristics of the structural element (e.g., graphical object 620 is an outline and/or an overlay that indicates a shape, size, and/or an outline of entryway 544). In some embodiments, the spatial representation of the structural element may optionally be replaced with a non-spatial representation (e.g., an icon, a label, or another type of non-spatial representation) that does not spatially represent to spatial characteristics of the identified structural element and that indicates an identity of the structural element (e.g., a type of the structural element, a name of the structural element, and/or a style of the structural element). In some embodiments, the scanning and modeling of a missed portion of the physical environment are analogous to the scanning and modeling of an unscanned, new portion of the physical environment described with respect to FIGS. 5F-5P above.

In FIGS. 5Q and 5R, as the viewpoint of the user changed, the sizes of the non-spatial representations of identified objects (e.g., representation 596 for cabinet 548, and representation 614 for stool 546) remain unchanged, even though their corresponding objects may appear closer or father away in camera view 524 as a result of the movement of the viewpoint. In FIGS. 5Q and 5R, as the viewpoint of the user changed, the non-spatial representations of identified objects (e.g., representation 596 for cabinet 548, and representation 614 for stool 546) are rotated to continue to face toward the viewpoint, even though they may translate with their corresponding objects in camera view 524 as a result of the movement of the viewpoint.

In FIGS. 5Q and 5R, as the viewpoint of the user changed, the camera view is updated to show the physical environment from a different perspective and position, while the partially completed model of room 520 in preview 568 is rotated to correspond to the current viewpoint. In FIG. 5Q, the entryway 544 is represented by a hollowed out area or a transparent region 544" in the representation 530" of wall 530 that has a size corresponding to that size of the entryway 544 in the physical environment. In some embodiments, the portion of the camera view 524 that is located behind the representation 542" for window 542, and representation 544" for entryway 544 is visible through representation 542" for window 542 and representation 544" for entryway 544 in the partially completed three-dimensional model in preview 568.

In FIGS. 5S-5W, after scanning the first portion of the physical environment and the second portion of the physical environment, including the initially missed portion of the physical environment, the user continues to scan a third portion of the physical environment by translating the one or more cameras in room 520 and changing the facing direction of the one or more cameras (e.g., as shown by the position and facing direction of object 566 in top view 564 of room 520).

In FIG. 5S, after rescanning the missed portion of the physical environment in front of entryway 544, the cameras are turned to face toward the corner between wall 532, wall 534, and floor 540. In response to detecting the movement of the one or more cameras and corresponding movement of the viewpoint of the user, device 100 updates the camera view 524 to include a third portion of the physical environment that corresponds to the current viewpoint of the user, the third portion of the physical environment including floor lamp 556, wall 534, and couch 552. In addition to updating the camera view 524, device 100 also rotates the partially completed three-dimensional model in preview 568 to a new orientation that corresponds to the current viewpoint of the user.

As shown in FIG. 5S-5T, as image and/or depth data of the third portion of the physical environment are captured and processed, graphical objects corresponding to the edges, surfaces, and/or objects in the third portion of the physical environment are displayed. For example, graphical object 622 is displayed at the location of couch 552 overlaying camera view 524 in response to detection of one or more edges and/or surfaces of couch 552. Graphical object 622 is a spatial representation that spatially indicates the spatial characteristics of couch 552 in camera view 524. During the scan, graphical object 622 is expanded as additional edges and/or surfaces or additional portions of detected edges and/or surfaces are detected and characterized; and the values of one or more visual properties of graphical object 622 are updated in real-time in accordance with changes in the predicted accuracies of the spatial characteristics of the corresponding edges and/or surfaces represented by graphical object 622. In FIG. 5S, a final state of graphical object 622 is displayed in response to determining that detection and spatial characterization of couch 552 is completed, where the final state of graphical object 622 is a solid three-dimensional outline and/or bounding box of couch 552. In some embodiments, completion of the scan and spatial characterization of couch 552 is indicated by an animated change (e.g., a sudden increase in luminance followed by a reduction in luminance of an overlay on the edges and/or surfaces of couch 552, and/or cessation of applied visual effect (e.g., feathering, and/or flickering) on the edges and/or surfaces of couch 552).

In FIGS. 5S and 5T, when the partially completed three-dimensional model of room 520 in preview 568 is rotated to an orientation that corresponds to the current viewpoint of the user and that corresponds to the currently displayed portion of the physical environment, representation 530" of wall 530 is rotated to a position that would visually obscure more than a threshold portion of the representations of other objects and/or surfaces inside the three-dimensional model (e.g., representation 532" of wall 532, representations 534" of wall 534, representation 550" of TV stand 550, representation 560" of TV 560, and/or other representations of structural elements and/or nonstructural elements). In some embodiments, representation 530" of wall 530 is made more translucent or removed completely, so that all or part of the representations of other portions of the partially completed three-dimensional model that would otherwise be visually obscured by representation 530" of wall 530 become visible in preview 568. As shown in FIG. 5S, representation 532" of wall 532 and representation 534" of wall 534 are visible, while representation 530" of wall 530 is removed or is made transparent, partially transparent or translucent. In some embodiments, the outlines of representation 544" of entryway 544 and representation 542" of window 542 remain displayed as a transparent, partially transparent, partially transparent, or hollowed out area in the partially completed three-dimensional model of room 520 (e.g., objects inside the partially completed model is visible through the transparent, partially transparent, or hollowed out area), even though representation 530" of wall 530 has been removed (e.g., optionally with an outline remaining) or has been made transparent, partially transparent or translucent in preview 568. In FIG. 5T, in response to detecting the completion of the scanning and modeling of couch 552, device 100 displays representation 552" of couch 552 in the partially completed model in preview 568, where the location of representation 552" of couch 552 in the partially completed model of room 520 corresponds to the location of couch 552 in room 520.

In FIG. 5U, after scanning the third portion of the physical environment, the cameras are turned to face toward side table 554 in room 520. In response to detecting the movement of the one or more cameras and corresponding movement of the viewpoint of the user, device 100 updates the camera view 524 to include a fourth portion of the physical environment that corresponds to the current viewpoint of the user, the fourth portion of the physical environment including wall 534, couch 552, side table 554, and table lamp 558. In addition to updating the camera view 524, device 100 also rotates the partially completed three-dimensional model in preview 568 to a new orientation that corresponds to the current viewpoint of the user.

As shown in FIG. 5U, as image and/or depth data of the fourth portion of the physical environment are captured and processed, graphical objects corresponding to the edges, surfaces, and/or objects in the fourth portion of the physical environment are displayed. For example, graphical object 624 is displayed at the location of side table 554 overlaying camera view 524 in response to detection of one or more edges and/or surfaces of side table 554. Graphical object 624 is a spatial representation that spatially indicates the spatial characteristics of side table 554 in camera view 524. During the scan, graphical object 624 is expanded as additional edges and/or surfaces or additional portions of detected edges and/or surfaces are detected and characterized; and the values of one or more visual properties of graphical object 624 are updated in real-time in accordance with changes in the predicted accuracies of the spatial characteristics of the corresponding edges and/or surfaces represented by graphical object 624. In FIG. 5U, a final state of graphical object 624 is displayed in response to determining that detection and spatial characterization of side table 554 is completed, where the final state of graphical object 624 is a solid three-dimensional outline and/or bounding box of side table 554. In some embodiments, completion of the scan and spatial characterization of side table 554 is indicated by an animated change (e.g., a sudden increase in luminance followed by a reduction in luminance of an overlay on the edges and/or surfaces of side table 554, and/or cessation of applied visual effect (e.g., feathering, and/or flickering) on the edges and/or surfaces of side table 554). Similarly, in FIG. 5U, graphical object 626 is displayed at the location of table lamp 558 overlaying camera view 524 in response to detection of one or more edges and/or surfaces of table lamp 558. Graphical object 626 is a spatial representation that spatially indicates the spatial characteristics of table lamp 558 in camera view 524. During the scan, graphical object 626 is expanded as additional edges and/or surfaces or additional portions of detected edges and/or surfaces are detected and characterized; and the values of one or more visual properties of graphical object 626 are updated in real-time in accordance with changes in the predicted accuracies of the spatial characteristics of the corresponding edges and/or surfaces represented by graphical object 626. In FIG. 5U, a final state of graphical object 626 is displayed in response to determining that detection and spatial characterization of table lamp 558 is completed, where the final state of graphical object is a solid three-dimensional outline and/or bounding box of table lamp 558. In some embodiments, completion of the scan and spatial characterization of table lamp 558 is indicated by an animated change (e.g., a sudden increase in luminance followed by a reduction in luminance of an overlay on the edges and/or surfaces of side table 554, and/or cessation of applied visual effect (e.g., feathering, and/or flickering) on the edges and/or surfaces of table lamp 554).

In FIG. 5U, after the spatial representation of couch 552, e.g., graphical object 622 or another graphical object, is displayed at the location of couch 552 in camera view 524, device 100 identifies couch 552, e.g., determines an object type, a model number, a style, an owner, and/or a category of couch 552. In response to identifying couch 552, device 100 replaces the spatial representation of couch 552 (e.g., graphical object 624, or another spatial representation that spatially indicates spatial dimensions of couch 552) with a non-spatial representation of couch 552 (e.g., object 628, or another object that does not spatially indicate spatial dimensions of couch 552).

In FIG. 5U, graphical object 632 that is displayed at a location of an edge between wall 534 and floor 540 includes a portion that is behind couch 552 and side table 554; and in accordance with lower predicted accuracies of the spatial characteristics of the portion of the edge behind couch 552 and side table 554, the portion of graphical object 632 corresponding to the portion of the edge behind couch 552 and side table 554 is displayed with reduced visibility (e.g., has a higher translucency, reduced luminance, reduced sharpness, more feathering, and/or has a greater blur radius) as compared to the portion of the edge that is not occluded by couch 552 and side table 554.

In FIG. 5U, when the partially completed three-dimensional model of room 520 in preview 568 is rotated to an orientation that corresponds to the current viewpoint of the user and that corresponds to the currently displayed portion of the physical environment, representation 530" of wall 530 is still in a position that would visually obscure more than a threshold portion of the representations of other objects and/or surfaces inside the three-dimensional model (e.g., representation 532" of wall 532, representations 534" of wall 534, representation 546" of stool 546, representation 550" of TV stand 550, representation 560" of TV 560, representation 556" of floor lamp 556, representation 552" of couch 552, representation 554" of side table 554, representation 558" of table lamp 558, and/or other representations of structural elements and/or nonstructural elements). In some embodiments, representation 530" of wall 530 is made more translucent or removed completely, so that all or part of the representations of other portions of the partially completed three-dimensional model that would otherwise be visually obscured by representation 530" of wall 530 become visible in preview 568. As shown in FIG. 5U, representation 532" of wall 532 and representation 534" of wall 534 are visible, while representation 530" of wall 530 is removed (optionally with an outline remaining) or is made transparent, partially transparent or translucent. In some embodiments, the outlines of representation 544" of entryway 544 and representation 542" of window 542 remain displayed as a transparent, partially transparent, or hollowed out area in the partially completed three-dimensional model of room 520 (e.g., objects inside the partially completed model is visible through the transparent, partially transparent, or hollowed out area), even though representation 530" of wall 530 has been removed or has been made transparent, partially transparent or translucent in preview 568. In FIG. 5U, in response to detecting the completion of the scanning and modeling of side table 554 and table lamp 558, device 100 displays representation 554" of side table 554 and representation 558" of table lamp 558 in the partially completed model in preview 568, where the locations of representation 554" of side table 554 and representation 558" of table lamp 558 in the partially completed model of room 520 correspond respectively to the location of side table 554 and table lamp 558 in room 520.

In FIG. 5V, after scanning the fourth portion of the physical environment, the cameras are moved and turned to face toward the last unscanned wall of room 520, namely, wall 536. The current position and facing direction of the cameras are indicated by the position and facing direction of object 566 in top view 564 of room 520. In response to detecting the movement of the one or more cameras and corresponding movement of the viewpoint of the user, device 100 updates the camera view 524 to include a fifth portion of the physical environment that corresponds to the current viewpoint of the user, the fourth portion of the physical environment including wall 536, and boxes 562. In addition to updating the camera view 524, device 100 also rotates the partially completed three-dimensional model in preview 568 to a new orientation that corresponds to the current viewpoint of the user.

As shown in FIG. 5V, as image and/or depth data of the fifth portion of the physical environment are captured and processed, graphical objects corresponding to the edges, surfaces, and/or objects in the fifth portion of the physical environment are displayed. For example, graphical objects 630 is displayed at the location of boxes 562 overlaying camera view 524 in response to detection of one or more edges and/or surfaces of boxes 562. Graphical objects 630 are spatial representations that spatially indicate the spatial characteristics of boxes 562 in camera view 524. During the scan, graphical objects 630 are expanded as additional edges and/or surfaces or additional portions of detected edges and/or surfaces are detected and characterized; and the values of one or more visual properties of graphical objects 630 are updated in real-time in accordance with changes in the predicted accuracies of the spatial characteristics of the corresponding edges and/or surfaces represented by graphical objects 630. In FIG. 5V, a final state of graphical objects 630 is displayed in response to determining that detection and spatial characterization of boxes 562 is completed, where the final state of graphical objects 630 include solid three-dimensional outlines and/or bounding boxes of boxes 562. In some embodiments, completion of the scan and spatial characterization of boxes 562 is indicated by an animated change (e.g., a sudden increase in luminance followed by a reduction in luminance of an overlay on the edges and/or surfaces of boxes 562, and/or cessation of applied visual effect (e.g., feathering, and/or flickering) on the edges and/or surfaces of boxes).

In FIG. 5V, after the spatial representation of boxes 562 (e.g., graphical objects 630 or another graphical object) is displayed at the location of boxes 562 in camera view 524, device 100 is not able to identify boxes 562 (e.g., determines an object type, a model number, a style, an owner, and/or a category, of boxes 562). Consequently, the spatial representation of boxes 562 remains displayed in camera view 524, as long as boxes 562 are still in the field of view. In some embodiments, graphical objects 630 cease to be displayed after a period of time or become less visible (e.g., become more translucent and/or reduced in luminance) even if boxes 562 are not identified.

In FIG. 5V, when the partially completed three-dimensional model of room 520 in preview 568 is rotated to an orientation that corresponds to the current viewpoint of the user and that corresponds to the currently displayed portion of the physical environment, representation 532" of wall 532 is moved into a position that would visually obscure more than a threshold portion of the representations of other objects and/or surfaces inside the three-dimensional model (e.g., representation 530" of wall 530, representations 534" of wall 534, representation 550" of TV stand 550, representation 560" of TV 560, representation 546" of stool 546, representation 556" of floor lamp 556, representation 552" of couch 552, representation 554" of side table 554, representation 558" of table lamp 558, representation 562" of boxes 562, representation 548" of cabinet 548, representation 544" of entryway 547, and/or other representations of structural elements and/or nonstructural elements). In some embodiments, representation 532" of wall 532 is made more translucent or removed completely, so that all or part of the representations of other portions of the partially completed three-dimensional model that would otherwise be visually obscured by representation 532" of wall 532 become visible in preview 568. As shown in FIG. 5V, representation 530" of wall 530 and representation 534" of wall 534 are visible, while representation 532" of wall 532 is removed (optionally with an outline remaining) or is made transparent, partially transparent or translucent. In some embodiments, an outline of representation 532" of wall 532 remains displayed, while representation 532" of wall 532 is removed or made more translucent. In FIG. 5V, in response to detecting the completion of the scanning and modeling of boxes 562, device 100 displays representation 562" of boxes 562 in the partially completed model in preview 568, where the locations of representation 562" of boxes 562 in the partially completed model of room 520 correspond respectively to the location of boxes 562 in room 520.

After scanning and modeling the fifth portion of the physical environment, the user turns the cameras to a sixth portion of the physical environment, where the sixth portion of the physical environment includes at least a portion of the previously scanned and modeled first portion of the physical environment. In FIG. 5W, device 100 scans and models the sixth portion of the physical environment and determines that the user has completed a loop to capture all walls of the room 520, and an edge between wall 530 and wall 536 have been detected and modeled. In FIG. 5W, device 100 also detects and models the edge between wall 536 and floor 540, as well as the edge between wall 530 and floor 540. Once a corner of wall 530, wall 536, and floor 540 is detected and a position of the corner is consistent with the positions of intersecting edges of wall 536, wall 530, and floor 540, the amount of feathering that is applied to the graphical objects corresponding to the different edges is reduced to indicate completion of the scanning and modeling of the edges and/or surfaces of wall 530, 536, and floor 540.

In FIG. 5W, the partially completed three-dimensional model of room 520 in preview 568 is rotated to an orientation that corresponds to the current viewpoint of the user and that corresponds to the currently displayed portion of the physical environment. Representation 532" of wall 532 and representation 534" of wall 534 are moved into a position that would visually obscure more than a threshold portion of the representations of other objects and/or surfaces inside the three-dimensional model (e.g., representation 530" of wall 530, representations 536" of wall 536, and/or other representations of structural elements and/or nonstructural elements in room 520). In some embodiments, representation 532" of wall 532 and representation 534" of wall 534 are made more translucent or removed completely, so that all or part of the representations of other portions of the partially completed three-dimensional model that would otherwise be visually obscured by representation 532" of wall 532 and representation 534" of wall 534 become visible in preview 568. In some embodiments, outlines of representation 532" of wall 532 and representation 534" of wall 534 remain displayed, while representations 532" and 534" are removed or made more translucent. In FIG. 5V, the edge between representations 532" and 534" remains displayed in preview 568 to indicate the position of the edge between wall 532 and 534 in the physical environment.

Figure 5X:
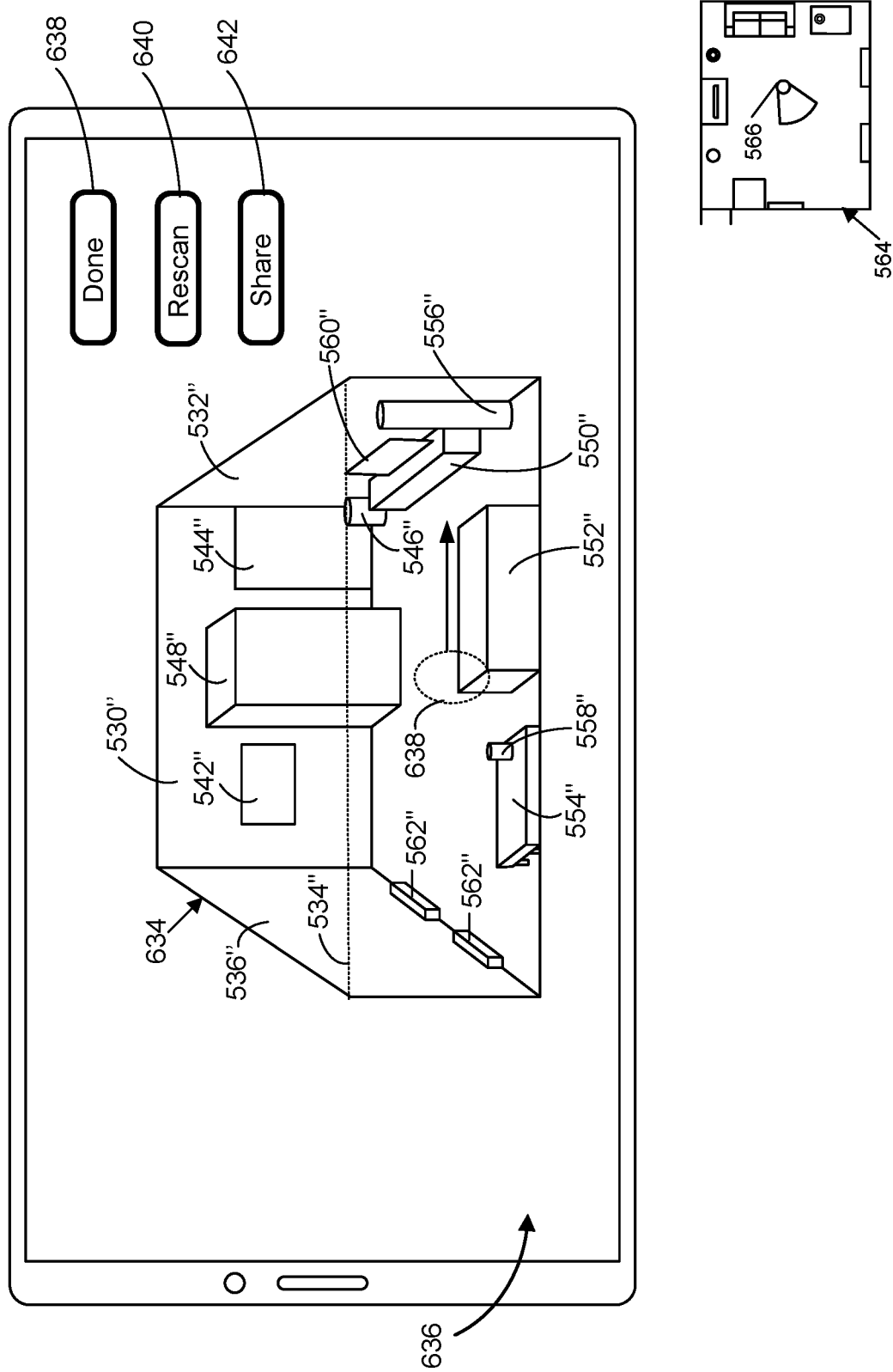

In FIG. 5X, in response to detecting the completion of the scanning and modeling of the entire room (e.g., all four walls and its interior, or another set of required structural elements and/or nonstructural elements), device 100 ceases to display the partially completed three-dimensional model of room 520 and displays an enlarged three-dimensional model 634 of room 520 that has been generated based on the completed scan and modeling of room 520. In some embodiments, the completed three-dimensional model 634 of room 520 is displayed in a user interface 636 that does not include camera view 524. In some embodiments, if user interface 522 includes a passthrough view of the physical environment as seen through a transparent or semi-transparent display, device 100 optionally displays an opaque or semi-transparent background layer that blocks and/or blurs the view of the physical environment when displaying the three-dimensional model 634 in user interface 636. In some embodiments, user interface 522 includes an affordance (e.g., "exit" button 638, or another user interface object that can be selected to terminate or pause the scanning and modeling process) that, when selected, causes display of user interface 636 before device 100 determines, based on predetermined rules and criteria, that scanning and modeling of room 520 is completed. In some embodiments, if the user selects the affordance (e.g., "exit" button 638, or another analogous user interface object) to terminate the scan before the device determines that the scan and modeling of the physical environment is completed, device 100 stops the scan and modeling process and displays an enlarged version of the partially completed three-dimensional model available at that time in user interface 636, and device 100 stores and displays the partially completed three-dimensional model as the completed three-dimensional mode of room 520 at that point.

In some embodiments, as shown in FIG. 5X, device 100 displays the completed three-dimensional model 634 (or the partially completed three-dimensional model, if scan is terminated early by the user) in an orientation that does not necessarily correspond to the current position and facing direction of the cameras (e.g., as indicated by the position and facing direction of object 566 in top view 564 of room 520). For example, in some embodiments, the orientation of the three-dimensional model 634 is chosen by device 100 to enable better viewing of the objects detected in the physical environment. In some embodiments, the orientation of the three-dimensional model 634 is chosen based on the initial viewpoint of the user when the scan is first started or based on the final viewpoint of the user when the scan is ended (e.g., the representation of the first wall that is scanned by the user faces toward the user in user interface 636, or the representation of the last wall that is scanned by the user faces toward the user in user interface 636).

In some embodiments, while user interface 636 including the completed three-dimensional model 634 of room 520 is displayed, device 100 detects the start of a user input directed to the three-dimensional model 634. In some embodiments, as shown in FIG. 5X, detecting the start of the input includes detecting contact 638 at a location on touch screen 220 that corresponds to a portion of the three-dimensional model 634 in user interface 636. In FIG. 5X, device 100 further detects movement of contact 638 in a first direction across touch screen 220 (e.g., a swipe input or a drag input on the completed model 634 in user interface 636).

Figure 5Y:
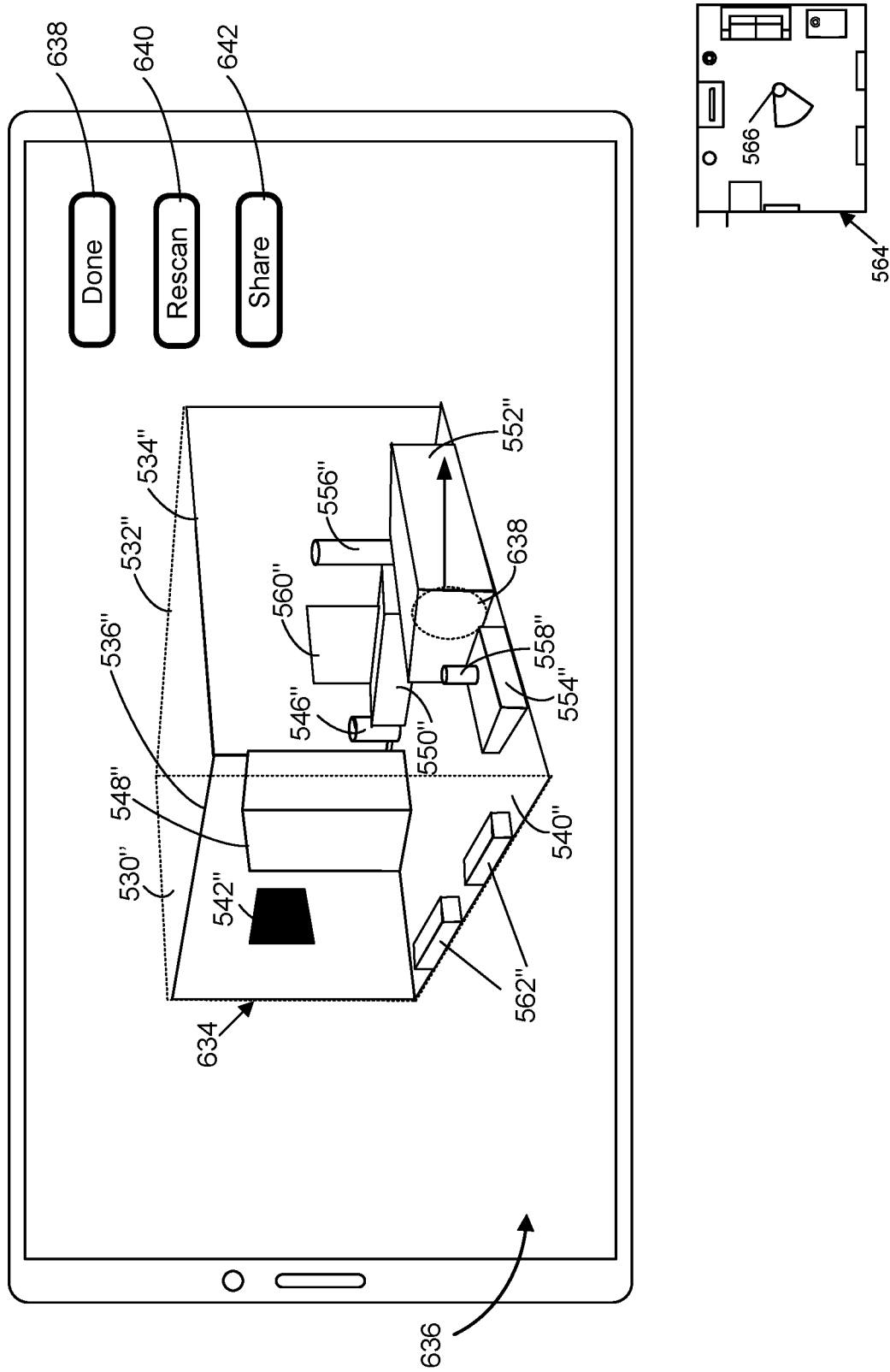

In FIG. 5Y, in response to detecting the input that includes the movement in the first direction (e.g., in response to detecting the swipe input or drag input on the completed model 634 in user interface in the first direction), device 100 moves the completed three-dimensional model 634 in a first manner in accordance with the input (e.g., rotating and/or translating the completed model 634 in the first direction). In this example, in response to a rightward swipe on the completed model 634, device 100 rotates the completed model around a vertical axis (e.g., an axis in the direction of gravity, and/or an axis that points in a downward direction of the model 634 and/or user interface 636). In some embodiments, the amount and/or speed of rotation of the completed model is based on the distance and/or speed of the swipe input detected on the completed model. In some embodiments, during the rotation of the completed model in user interface 636, objects and/or surfaces within the completed model may become visually occluded by other objects and/or surfaces in the partially completed model as a result of the rotation.

Figure 5Z:
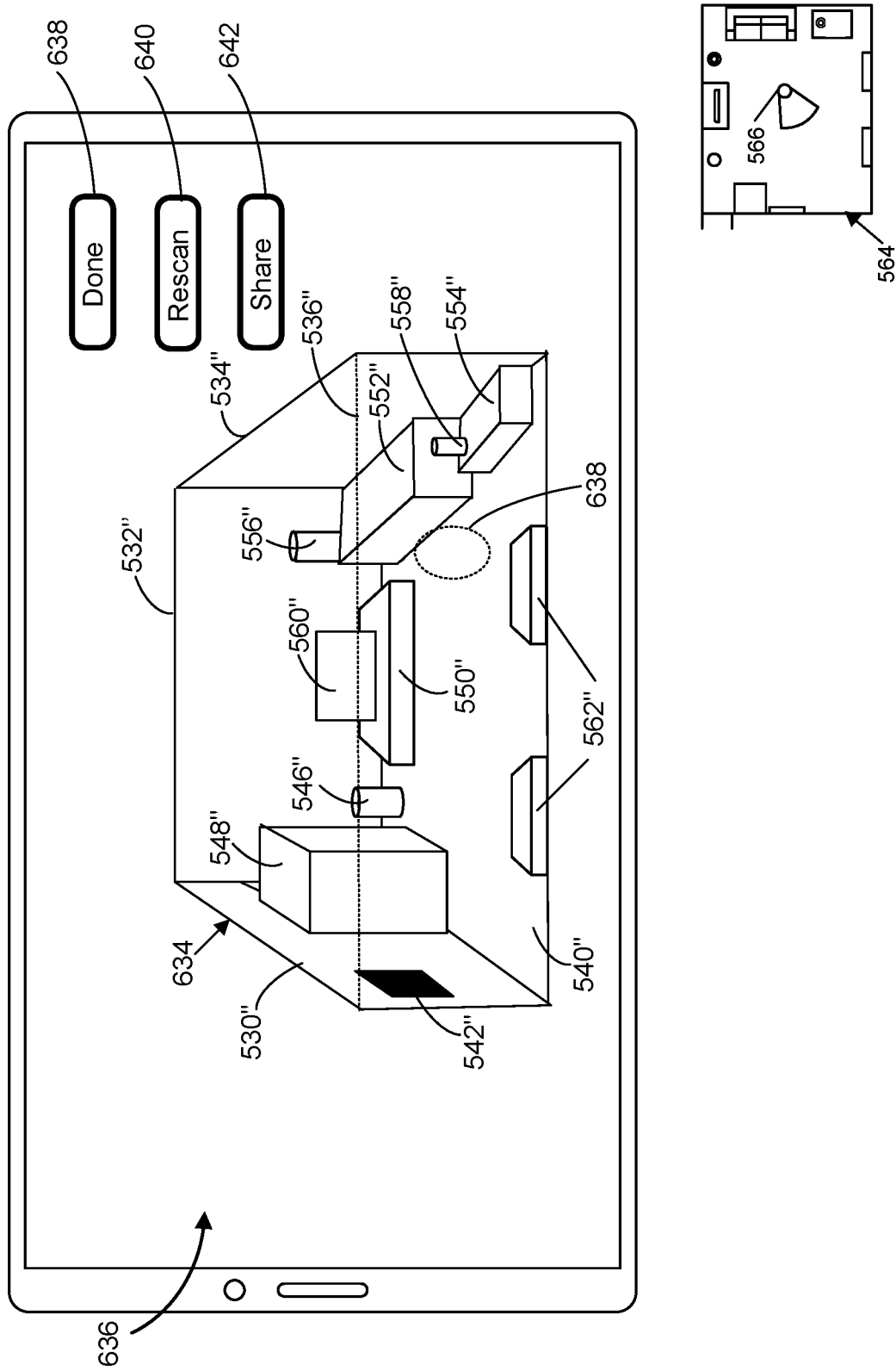
Figure 5A:
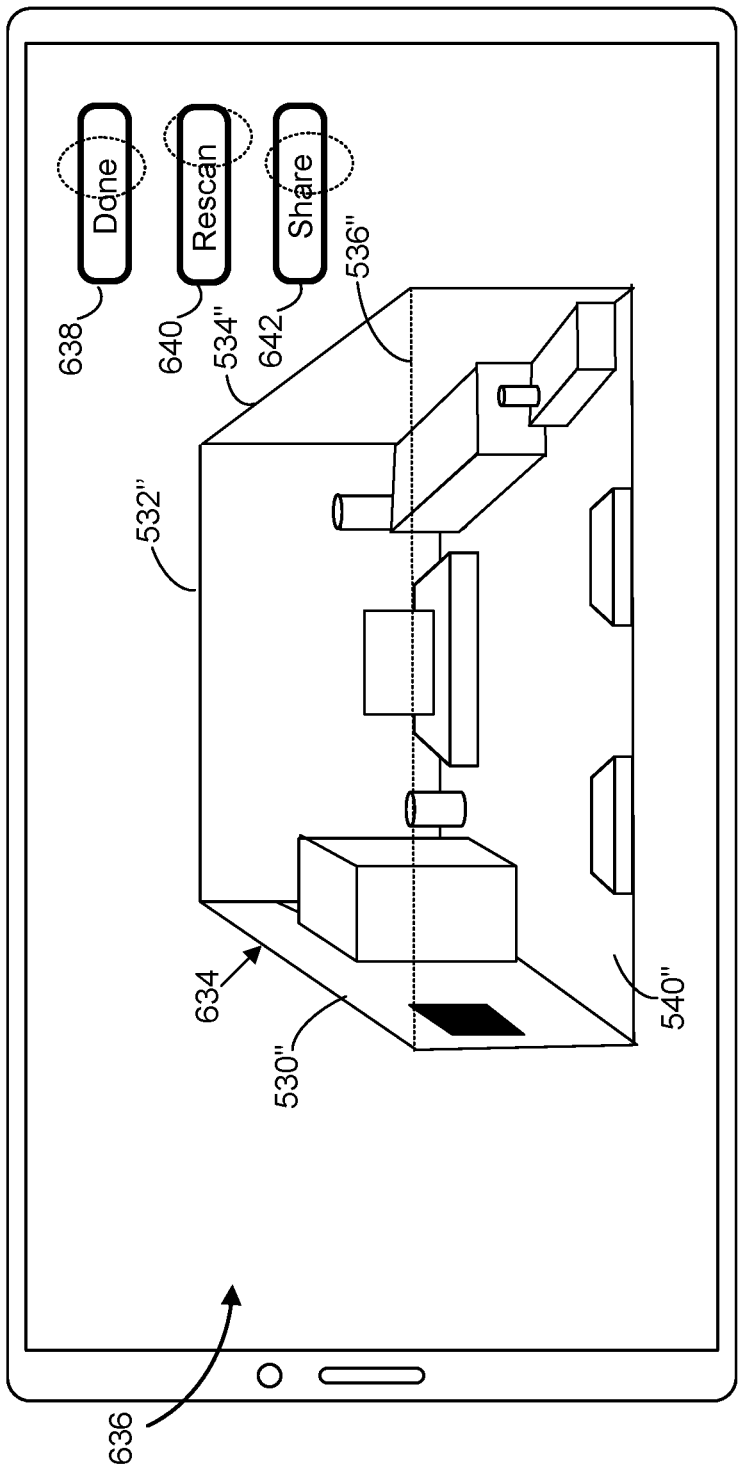
Figure 5A:
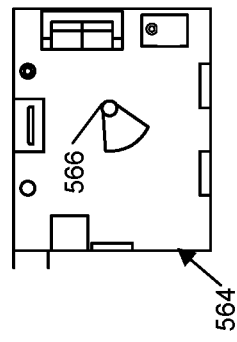
Figure 5A:
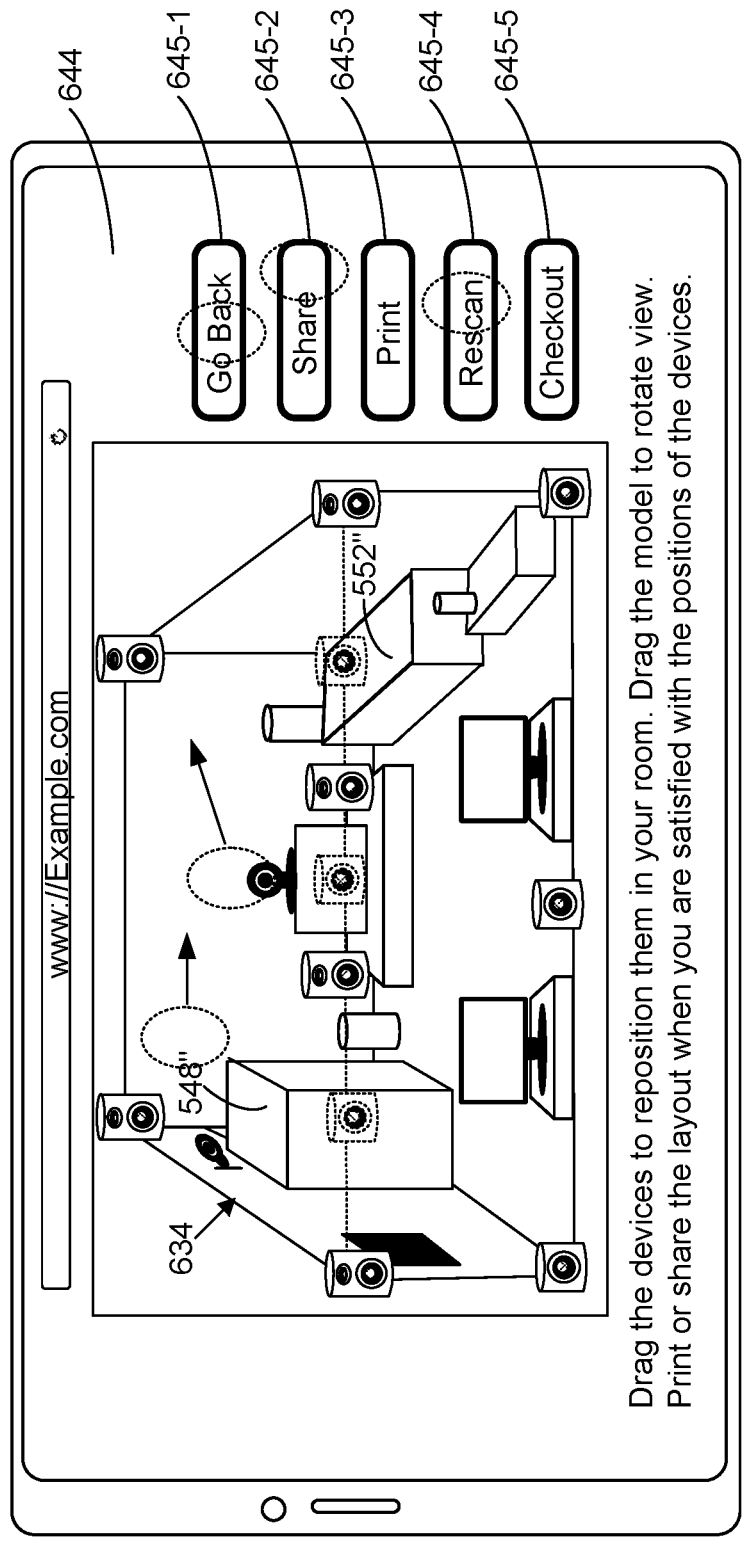
Figure 5A:
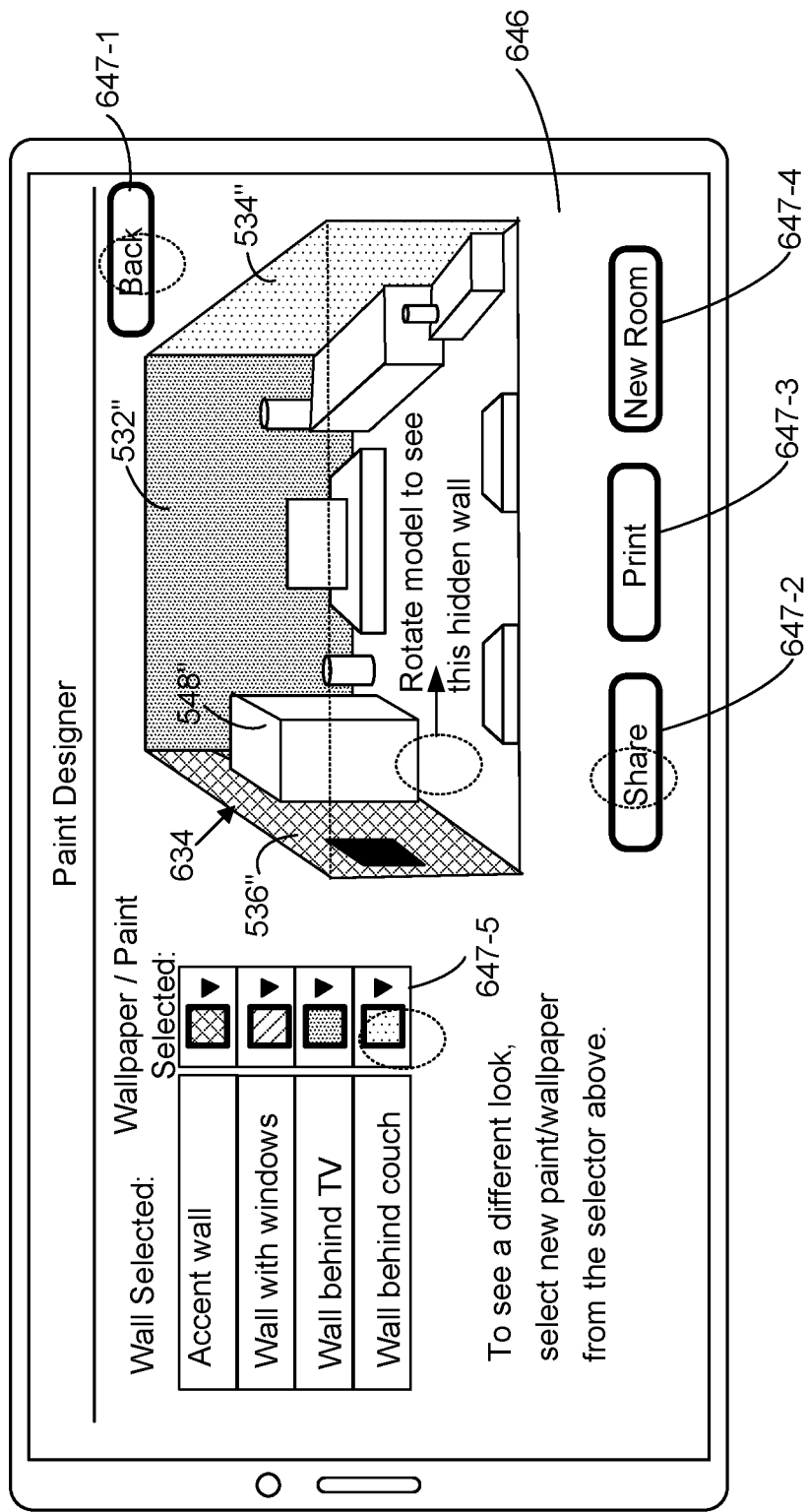
Figure 5A:
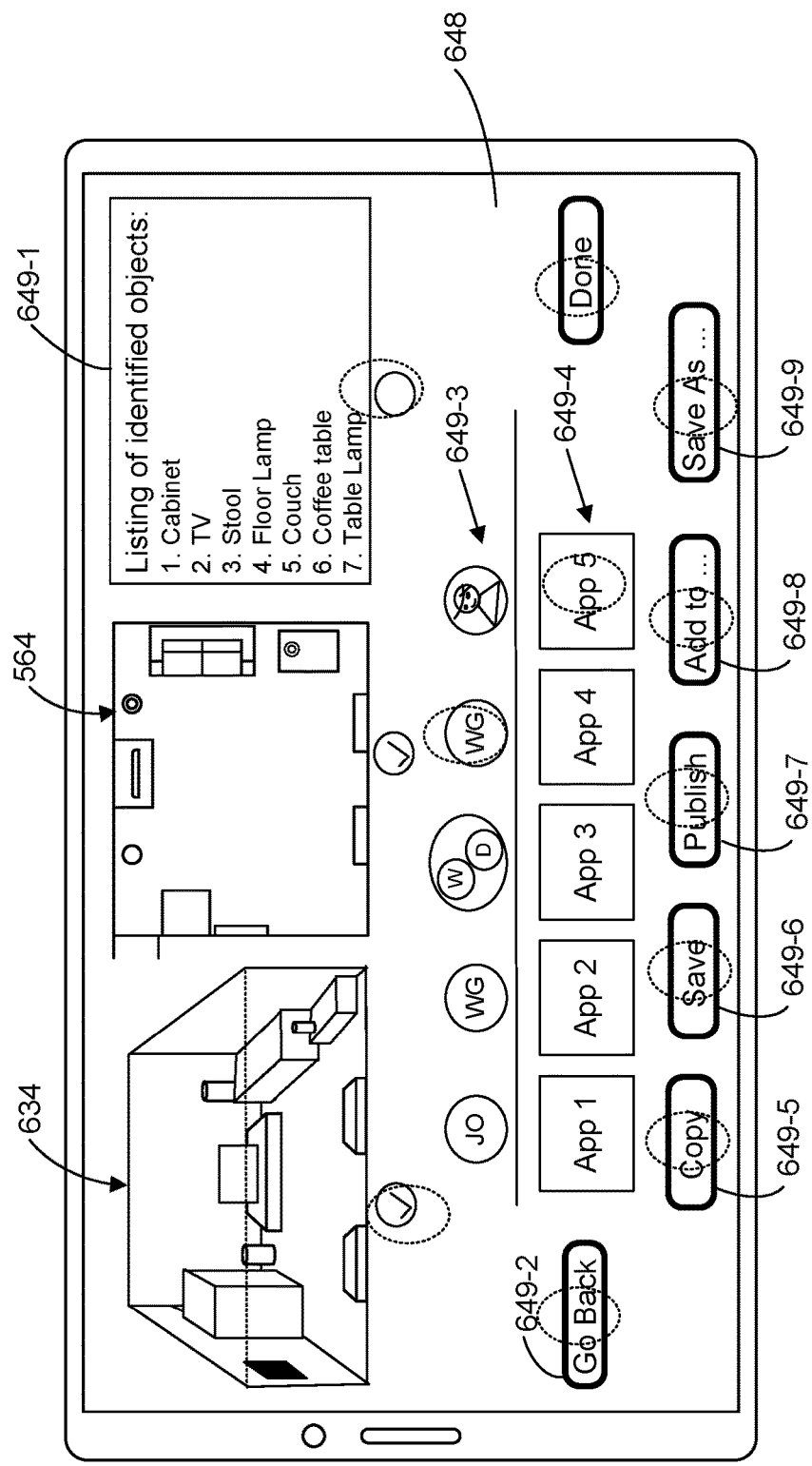
Figure 6A:
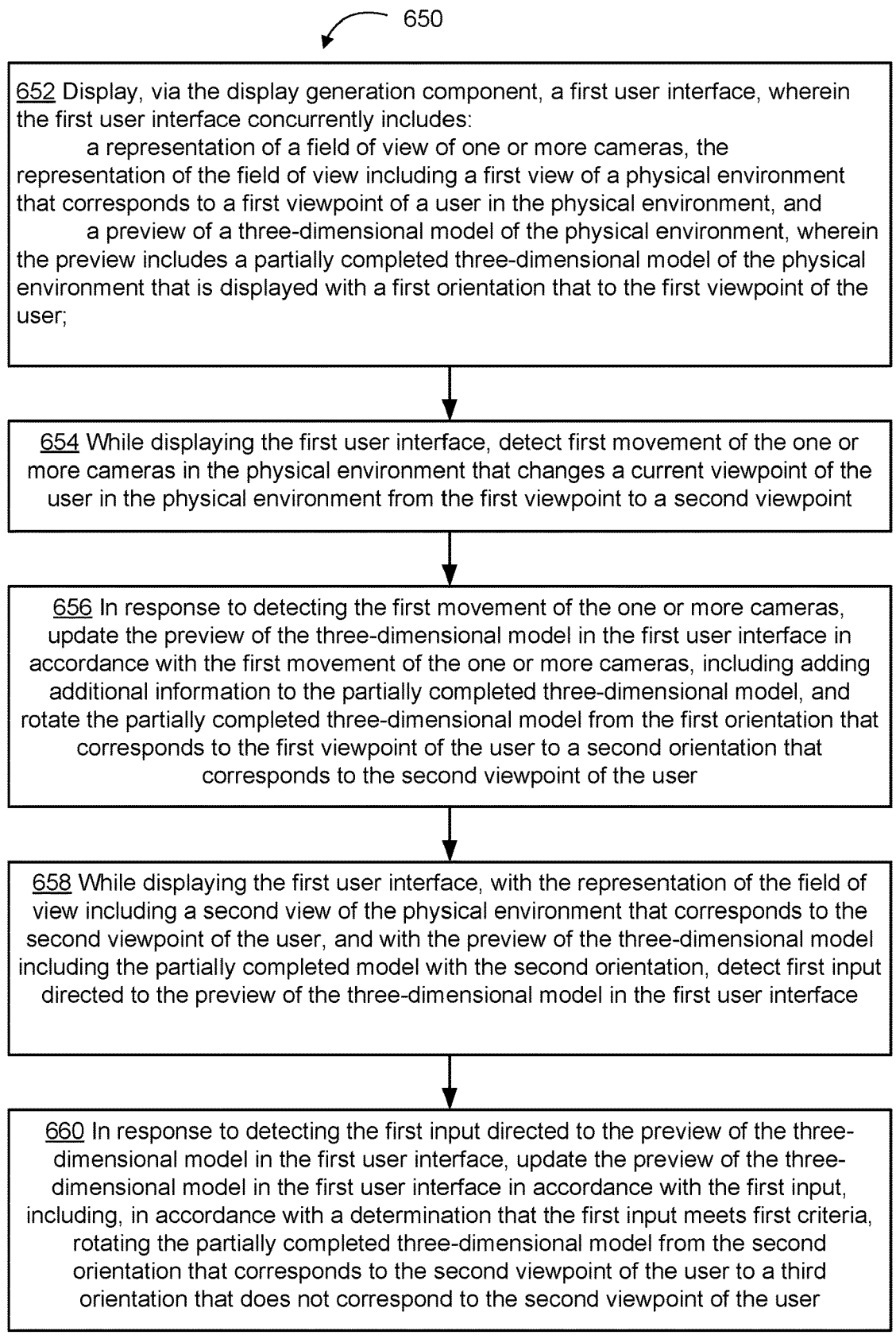
Figure 7A:
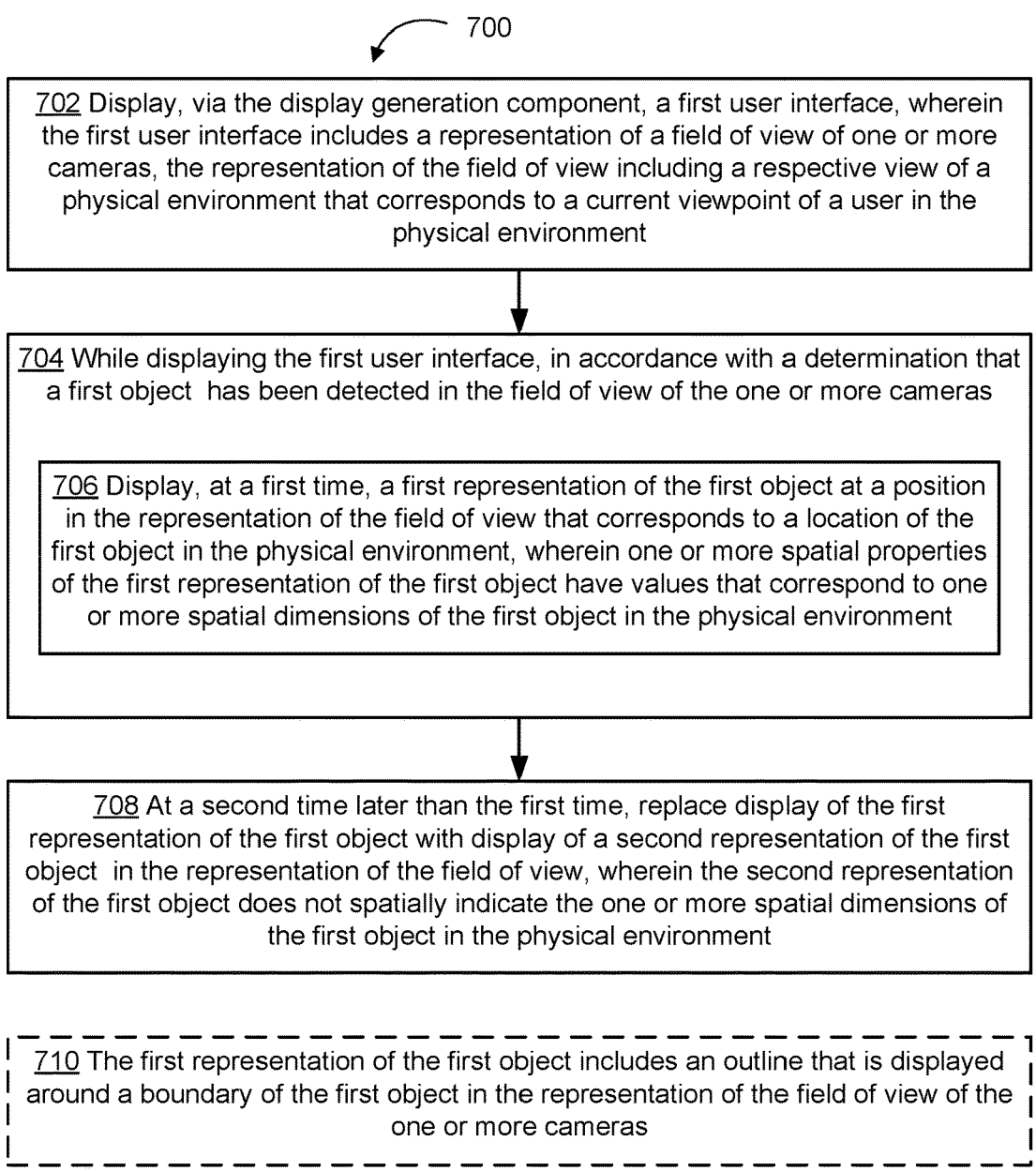
Figure 8A:
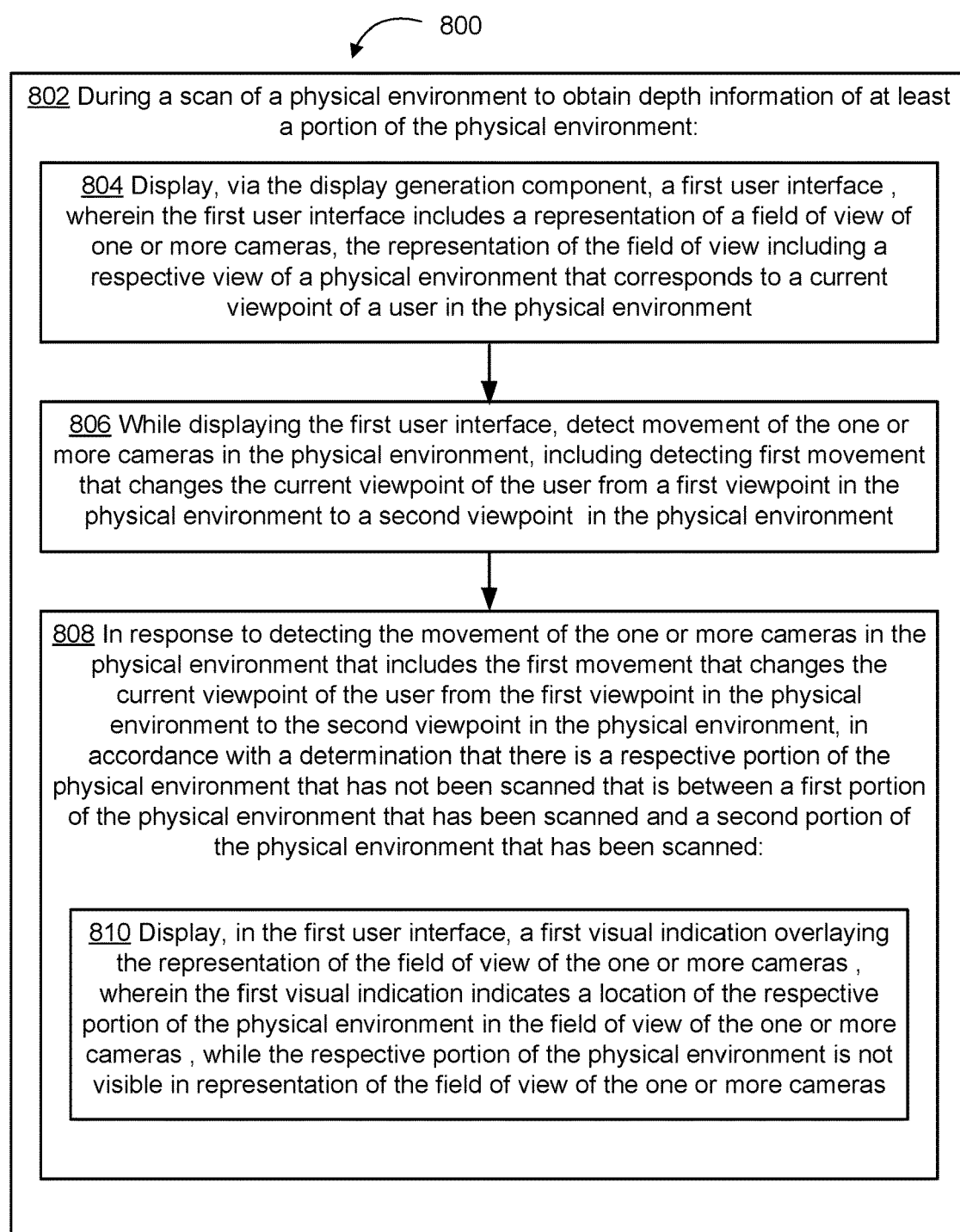
Figure 9A:
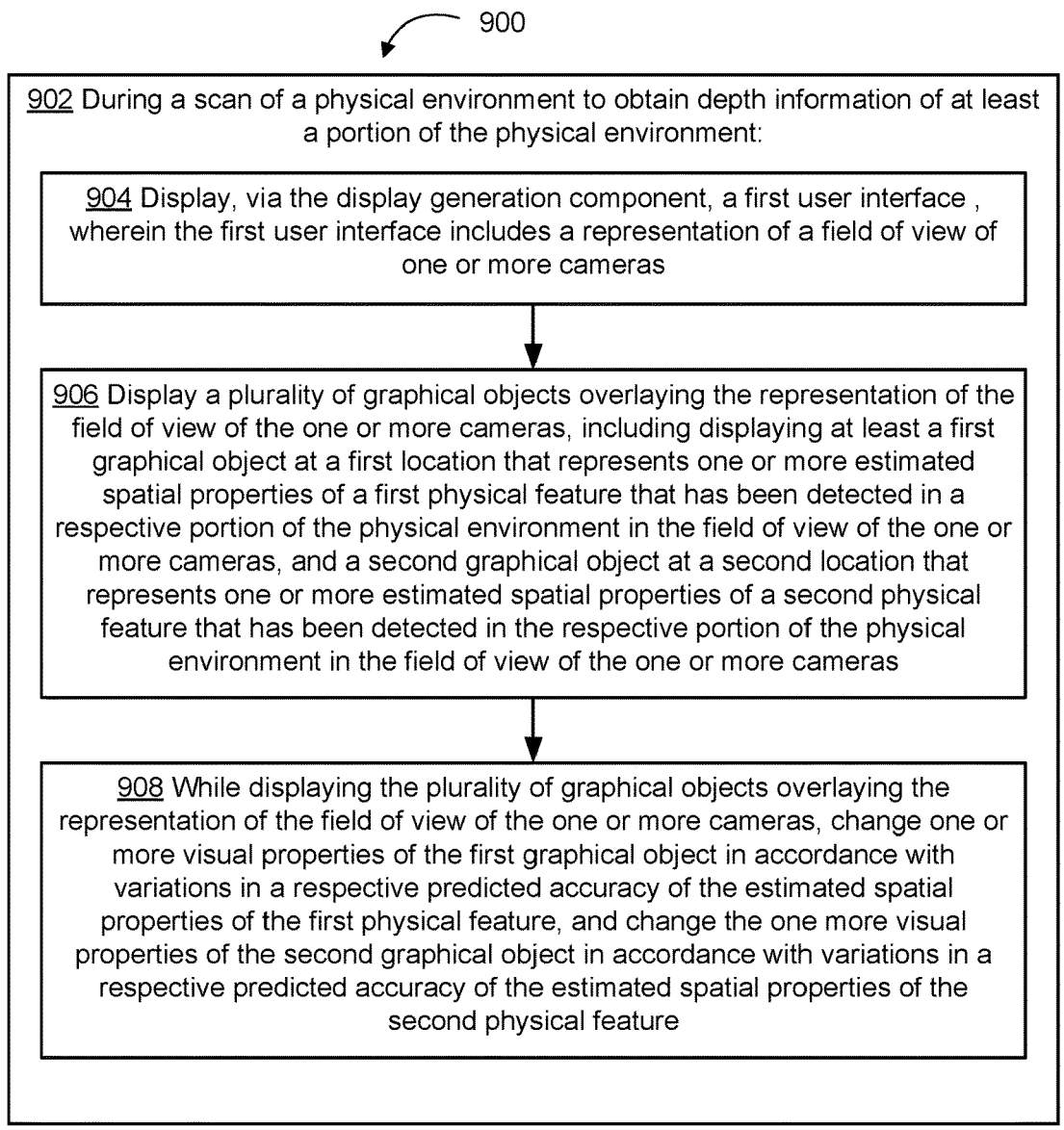
Figure 9E:
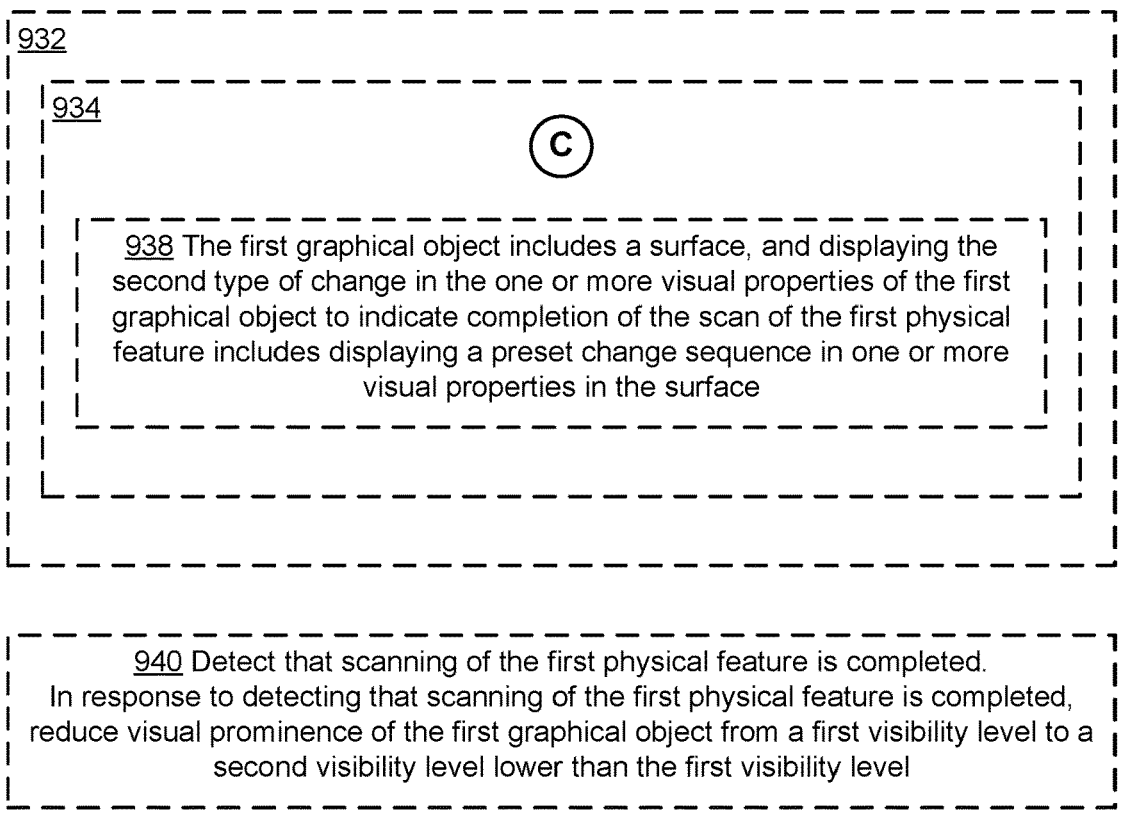

In FIG. 5Z, after the completed model of room 520 in user interface 636 is rotated in accordance with the drag input by contact 638 and before termination of the drag input (e.g., before liftoff of contact 638, or before detecting other types of termination depending on the input type), the completed model 634 of room 520 in user interface 636 is shown with the orientation that is specified by the user input. In FIG. 5AA, when termination of the drag input is detected, device 100 does not restore the orientation of the completed model 634 in user interface 636, such that the orientation of the completed model continues to be displayed with the orientation that was specified by the user input (e.g., different from that shown in FIG. 5X). This is in contrast to the behavior of the partially completed model in preview 568, as described with respect to FIGS. 5K-5M above.

In some embodiments, if another user input (e.g., a depinch gesture by two contacts moving away from each other after touching down on the completed model 634 in user interface 636, or another scaling input of a different input type) is detected at the location of the completed model 634 in user interface 636, device 100 rescales the completed model in user interface 636 in accordance with the user input (e.g., increases the scale of the completed model in accordance with the movement of the contacts in the depinch gesture, and/or decrease the scale of the completed model in accordance with the movement of the contacts in a pinch gesture). In some embodiments, the direction and magnitude of the rescaling of the completed model 634 is based on the direction and magnitude of the relative movement of the user input (e.g., contacts moving apart causes enlargement of the model, contacts moving together causes shrinking of the model, and/or center of contacts moving in a respective direction causes translation of the model while being rescaled). In some embodiments, in response to detecting the user input that corresponds to a request to rescale the completed model 634 in user interface 636, the completed model 634 of room 520 is rescaled. In some embodiments, before termination of the user input is detected (e.g., liftoff of contacts, or another type of termination depending on the input type), the changed scale of the completed model 634 in user interface 636 is maintained (e.g., the rescaled model may even be partially out of the display area of the display generation component). After the termination of the user input is detected, device 100 displays the completed model with the last scale that was used before the user input was terminated.

As shown in FIG. 5AA, user interface 636 optionally includes a plurality of selectable user interface objects corresponding to different operations related to the scanning process and/or operations related to the model and/or data that has been generated. For example, in some embodiments, user interface 636 includes an affordance (e.g., "Done" button 638, or another type of user interface object) that, when selected by a user input (e.g., a tap input, an air tap gesture, and/or another type of selection input), causes device 100 to terminate the scanning and modeling process described herein, and return to the application from which the scanning and modeling process was initiated. For example, in response to activation of button 638, device 100 ceases to display user interface 636, and displays user interface 644 of the browser application (e.g., as shown in FIG. 5AB) if the scanning and modeling process was started from user interface 510 of the browser application (e.g., in response to selection of button 516 in FIG. 5B). In another example, in response to activation of button 638, device 100 ceases to display user interface 636, and displays user interface 646 of the paint design application (e.g., as shown in FIG. 5AC) if the scanning and modeling process was started from user interface 514 of the paint design application (e.g., in response to selection of button 516 in FIG. 5C).

In some embodiments, user interface 636 includes an affordance (e.g., "Rescan" button 640, or another type of user interface object) that, when selected by a user input (e.g., a tap input, an air tap gesture, and/or another type of selection input), causes device 100 to return to user interface 522, and allow the user to restart the scanning and modeling process and/or rescan one or more portions of the physical environment. For example, in response to activation of button 640, device 100 ceases to display user interface 636, and displays user interface 522 with preview 568 (e.g., including the currently completed three-dimensional model of room 520 to be updated further, or including a brand new partially completed three-dimensional model to be built from scratch) and camera view 524 (e.g., updated based on the current viewpoint). In some embodiments, the redisplayed user interface 522 includes one or more user interface objects for the user to specify which portion of the model needs to be updated and/or rescanned. In some embodiments, the redisplayed user interface 522 includes one or more visual guide to indicate which portion of the model has lower predicated accuracies.

In some embodiments, user interface 636 includes an affordance (e.g., "Share" button 642, or another type of user interface object) that, when selected by a user input (e.g., a tap input, an air tap gesture, and/or another type of selection input), causes device 100 to display a user interface with selectable options to interact with the generated model and corresponding data, such as sharing, storing, and/or opening using one or more applications (e.g., an application from which the scanning and modeling process was initiated, and/or applications that are different from the application from which the scanning and modeling process was first initiated). For example, in some embodiments, in response to activation of button 642, device 100 ceases to display user interface 636 and displays user interface 648 (e.g., as shown in FIG. 5AD), where the user may interact with one or more selectable user interface object to review the model and/or corresponding data and perform one or more operations with respect to the model and/or corresponding data.

In some embodiments, as shown in FIG. 5AB, user interface 644 of the browser application includes a representation of the completed three-dimensional model 634 that is optionally augmented with other information and graphical objects. For example, the three-dimensional model 634 of room 520 is used to show how user-selected AV equipment can be placed inside room 520. In some embodiments, user interface 644 allows the user to drag the three-dimensional model and rescale the three-dimensional model using various inputs (e.g., using a drag input, a pinch input, and/or a depinch input). In some embodiments, user interface 644 includes an affordance 645-1 (e.g., "Go back" button, or other analogous user interface object) that, when selected, causes device 100 to cease to display user interface 644 and redisplay user interface 636. In some embodiments, user interface 644 includes an affordance 645-2 (e.g., "Share" button, or other analogous user interface object) that, when selected, causes device 100 to display a plurality of selectable options for sharing the model 634, corresponding data of model 634, the layout of the AV equipment (e.g., selected, and/or recommended) that is generated based on model 634, a listing of AV equipment that has been selected by the user as well as their placement locations in room 520, a listing of recommended AV equipment generated based on the model of room 520, scanned data of room 520, and/or a listing of objects identified in room 520. In some embodiments, device 100 also provides different options for sharing the above data and information, such as options for choosing one or more recipients, and/or using one or more applications for sharing the above data and information (e.g., examples are provided with respect to FIG. 5AD). In some embodiments, user interface 644 of the browser application includes an affordance (e.g., "Print" button 654-3, or another analogous user interface object) that, when selected, cause the current view of the three-dimensional model 634 (optionally including the augmentations applied to the model) to be printed to a file or a printer. In some embodiments, the device optionally displays a plurality of selectable options to configure the printing of the model 634 (e.g., choosing a printer, choosing the subject matter and data for printing, and/or choosing the format for printing). In some embodiments, user interface 644 includes an affordance (e.g., "Rescan" button 645-4, or another analogous user interface object) that, when selected, causes device 100 to cease to display user interface 644 and displays user interface 522 (e.g., as shown in FIGS. 5D and 5E, or 5W) or user interface 636 (e.g., as shown in FIG. 5X) for the user to rescan room 520 (e.g., to improve the model 634 or to build a new model of room 520 from scratch). In some embodiments, user interface 644 includes an affordance (e.g., "Checkout", or another analogous user interface object) that, when selected, causes device 100 to generate a payment interface to pay for the AV equipment and services provided through the user interface of the browser application (e.g., the scanning and modeling services, and/or the layout and recommendation services).

In some embodiments, as shown in FIG. 5AC, user interface 646 of the paint design application includes a representation of the completed three-dimensional model 634 that is optionally augmented with other information and graphical objects. For example, the three-dimensional model 634 of room 520 is used to show room 520 would look if paint and/or wallpaper selected by the user are applied. In some embodiments, user interface 646 allows the user to drag and rotate the three-dimensional model and rescale the three-dimensional model using various inputs (e.g., using a drag input, a pinch input, and/or a depinch input). In some embodiments, user interface 646 includes an affordance 647-1 (e.g., "Back" button, or other analogous user interface object) that, when selected, causes device 100 to cease to display user interface 646 and redisplay user interface 636. In some embodiments, user interface 646 includes an affordance 647-2 (e.g., "Share" button, or other analogous user interface object) that, when selected, causes device 100 to display a plurality of selectable options for sharing the model 634, corresponding data of model 634, the rendered views of room 520 with selected or recommended paint and wallpaper that are generated based on model 634, a listing of selected paint and wallpaper that have been selected by the user as well as their placement locations in room 520, a listing of recommended paint and/or wallpaper generated based on the model of room 520, scanned data of room 520, and/or a listing of objects identified in room 520. In some embodiments, device 100 also provides different options for sharing the above data and information, such as options for choosing one or more recipients, and/or using one or more applications for sharing the above data and information (e.g., examples are provided with respect to FIG. 5AD). In some embodiments, user interface 646 includes an affordance (e.g., "Print" button 657-3, or another analogous user interface object) that, when selected, cause the current view of the three-dimensional model 634 (optionally including the augmentations applied to the model) to be printed to a file or a printer. In some embodiments, the device optionally displays a plurality of selectable options to configure the printing of the model 634 (e.g., choosing a printer, choosing the subject matter and data for printing, and/or choosing the format for printing). In some embodiments, user interface 644 includes an affordance (e.g., "New Room" button 647-4, or another analogous user interface object) that, when selected, causes device 100 to cease to display user interface 646 and displays user interface 522 (e.g., as shown in FIGS. 5D and 5E) for the user to scan another room or rescan room 520 from scratch. In some embodiments, user interface 646 includes paint selection summary for the different walls of room 520, and includes affordances 647-5 for changing the paint and/or wallpaper selections for the different walls. In some embodiments, once the paint/wallpaper selections are changed using affordances 647-5, model 634 in user interface 646 is automatically updated by device 100 to show the newly selected paint/wallpaper on their respective surfaces.

FIG. 5AD shows an example user interface 648 that are associated with the "Sharing" function of user interface 636, user interface 644, and/or user interface 646. In some embodiments, user interface 648 is optionally a user interface of an operating system and/or a native application that provides the scanning and modeling functions described herein (e.g., an application of a vendor that provides the API or developer tool kit of the scanning and modeling function). In some embodiments, user interface 648 provides a listing of subject matter than can be shared. For example, a representation of model 634 of room 520, a representation of a top view 564 of room 520, and/or a listing of identified objects in room 520 (e.g., listing 649-1, or another analogous user interface object) are displayed in user interface 648, along with corresponding selection controls (e.g., checkboxes, radial buttons, and/or other selection controls). In some embodiments, subsequent sharing functions are applied to one or more of the model 634, top view 564, and listing 649-1, based on their respective selection state as specified by the selection controls. In some embodiments, user interface 648 includes an affordance (e.g., "Go Back" button 649-2, or other analogous user interface object) that, when selected, causes device 100 to cease to display user interface 648 and redisplay the user interface from which user interface 648 was triggered (e.g., user interface 636 in FIG. 5AA, user interface 644 in FIG. 5AB, or user interface 646 in FIG. 5AC). In some embodiments, user interface 648 displays a plurality of selectable representations of contacts or potential recipients 649-3 for sending the selected subject matter (e.g., model 634, top view 564, and/or listing 649-1). In some embodiments, selection of one or more of the representations of contacts or potential recipients 649-3 causes display of a communication user interface (e.g., instant messaging user interface, email user interface, network communication user interface (e.g., WiFi, P2P, and/or Bluetooth transmission interface), and/or a shared network device user interface) for sending and/or sharing the selected subject matter (e.g., model 634, top view 564, and/or listing 649-1). In some embodiments, user interface 648 displays a plurality of selectable representations of applications 649-4 for opening and/or sending the selected subject matter (e.g., model 634, top view 564, and/or listing 649-1). In some embodiments, selection of one or more of the representations of applications 649-4 causes device 100 to display respective user interfaces of the selected applications in which the selected subject matter (e.g., model 634, top view 564, and/or listing 649-1) can be viewed, stored, and/or shared with another user of the selected applications. In some embodiments, user interface 648 includes an affordance (e.g., "copy" button 649-5, or another analogous user interface object) that, when selected, causes device 100 to make a copy of the selected subject matter (e.g., model 634, top view 564, and/or listing 649-1) in a clipboard or memory, so that it can be pasted into another application and/or user interface that is opened later. In some embodiments, user interface 648 includes an affordance (e.g., "Publish" button 649-6, or another analogous user interface object) that, when selected, causes device 100 to display user interface for publishing the selected subject matter (e.g., model 634, top view 564, and/or listing 649-1) to an online location (e.g., a website, an online bulletin board, a social network platform, and/or a public and/or private sharing platform) so other users can see the selected subject matter remotely from another device. In some embodiments, user interface 648 includes an affordance (e.g., "Add to" button 649-8, or another analogous user interface object) that, when selected, causes device 100 to display user interface for inserting the selected subject matter (e.g., model 634, top view 564, and/or listing 649-1) to an existing model (e.g., model of a house including room 520 and other rooms, and/or an existing collection of models) of a physical environment. In some embodiments, user interface 648 includes an affordance (e.g., "Save As" button 649-9, or another analogous user interface object) that, when selected, causes device 100 to display user interface for saving the selected subject matter (e.g., model 634, top view 564, and/or listing 649-1) in a different format that is more suitable for sharing with another user or platform.

FIGS. 6A-6F are flow diagrams illustrating a method 650 of displaying a preview of a three-dimensional model of an environment during scanning and modeling of the environment, in accordance with some embodiments. Method 650 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 800 are, optionally, combined and/or the order of some operations is, optionally, changed.

As described below, the method 650 is a method for displaying a preview of a three-dimensional model of an environment during scanning and modeling of the environment, and adding additional information to the preview of the three-dimensional model as the scan progresses. The preview of the three-dimensional model can be manipulated (e.g., rotated, or otherwise oriented) independently of the field of view of one or more cameras of the computer system. Displaying the preview of the three-dimensional model, and allowing manipulation independent of the field of view of the computer system's cameras, increases the efficiency of computer system by reducing the number of inputs the user needs to interact with the preview of the three-dimensional model. For example, the user can freely rotate the preview of the three-dimensional model to a desired orientation, without having to constantly readjust the orientation of the preview (e.g., as would be required if the preview always attempted to re-align the orientation to match the field of view of the one or more cameras of the computer system). This also provides improved visual feedback to the user (e.g., improved visual feedback regarding the progress of the scan), as the preview of the three-dimensional environment can be updated with additional information as the scan progresses.

In method 650, the computer system (e.g., device 100, device 300, or another computer system described herein) displays (652), via the display generation component, a first user interface (e.g., a scan user interface that is displayed to show progress of an initial scan of a physical environment to build a three-dimensional model of the physical environment, a camera user interface, and/or a user interface that is displayed in response to a user's request to perform a scan of a physical environment or to start an augmented reality session in a physical environment), wherein the first user interface concurrently includes (e.g., in an overlaying manner, or an adjacent manner): a representation of a field of view of one or more cameras (e.g., images or video of a live feed from the camera(s), or a view of the physical environment through a transparent or semitransparent display), the representation of the field of view including a first view of a physical environment that corresponds to a first viewpoint of a user in the physical environment (e.g., the first viewpoint of the user corresponds to a direction, position and/or vantage point from which the physical environment is being viewed by the user either via a head mounted XR device or via a handheld device such as a smartphone or tablet that displays a representation of the field of view of the one or more cameras on a display of the handheld device for a handheld device, the viewpoint of the handheld device is a proxy for the viewpoint of the user and shifting the handheld device in the physical environment shifts the viewpoint of the user), and a preview of a three-dimensional model of the physical environment (e.g., the model that is being generated and/or updated based on depth information that is being captured by the one or more cameras during the scan), wherein the preview includes a partially completed three-dimensional model of the physical environment that is displayed with a first orientation that corresponds to the first viewpoint of the user (e.g., the partially completed model of the physical environment is generated based on depth information captured by the cameras while the field of view of the cameras includes the first view of the physical environment, and the preview includes a view of the partially completed three-dimensional model of the physical environment from the perspective of a virtual user located at or close to the first viewpoint relative to the three-dimensional model). In some embodiments, the partially completed model is oriented so that the model and the physical environment have the same or substantially similar orientations relative to the first viewpoint of the user. For example, in FIGS. 5E-5H, the first user interface (e.g., user interface 520) includes camera view 524 capturing a first view of room 520 that corresponds to a first viewpoint of a user (e.g., as represented by object 566 in the top view 564 of room 520), and a preview of a three-dimensional model of room 520 (e.g., preview 568 that includes a partially completed three-dimensional model of a first portion of room 520).

In the method 650, while displaying the first user interface (e.g., while the scan is ongoing, and/or not completed), the computer system detects (654) first movement of the one or more cameras in the physical environment that changes a current viewpoint of the user in the physical environment from the first viewpoint to a second viewpoint (e.g., movement of the one or more cameras include translation and/or rotation in three-dimensions in the physical environment) (e.g., movement of the one or more cameras include panning movements and/or tilting movements that change the direction that the camera faces; horizontal movements and/or vertical movements that change the x, y, z positions of the camera relative to the physical environment, and/or various combinations of the above). For example, as shown in FIGS. 5H-5I, while the first user interface (e.g., user interface 522 including camera view 524 and preview 568) is displayed, the one or more cameras of device 100 are moved and turned (e.g., as represented by the movement and rotation of object 566 in top view 564 in FIG. 5I relative to FIG. 5J).

In the method 650, in response to detecting the first movement of the one or more cameras: the computer system updates (656) the preview of the three-dimensional model (and, optionally, updating the representation of the field of view of the cameras) in the first user interface in accordance with the first movement of the one or more cameras, including adding additional information to the partially completed three-dimensional model (e.g., based on depth information captured by the one or more cameras) and rotating the partially completed three-dimensional model from the first orientation that corresponds to the first viewpoint of the user to a second orientation that corresponds to the second viewpoint of the user. For example, the preview includes a view of the updated, partially completed three-dimensional model of the physical environment from the perspective of a virtual user located at or close to the second viewpoint relative to the three-dimensional model. In some embodiments, the updated, partially completed model is oriented so that the model and the physical environment have the same or substantially similar orientations relative to the second viewpoint of the user. In some embodiments, updating the preview of the three-dimensional model includes scaling the view of the three-dimensional model to accommodate more portions of the model in the same display region as the portions are added to the model. For example, as shown in FIG. 5I, in response to detecting the movement of the one or more cameras of device 100 (as indicated by the movement and rotation of object 566 in top view 564 of room 520), device 100 updates the camera view 524 to show a second portion of the physical environment and rotates preview 568 to a second orientation that corresponds to the updated viewpoint of the user.

In the method 650, while displaying the first user interface (e.g., while the scan is ongoing, and/or not completed), with the representation of the field of view including a second view of the physical environment that corresponds to the second viewpoint of the user (e.g., the second viewpoint of the user corresponds to a direction, position and/or vantage point from which the physical environment is being viewed by the user), and with the preview of the three-dimensional model including the partially completed model with the second orientation, the computer system detects (658) first input directed to the preview of the three-dimensional model in the first user interface (e.g., a swipe input on a touch-sensitive surface, and/or in the air; and/or an air gesture that specifies a direction of movement or rotation) (e.g., the first input is determined to be directed to the preview because the preview has input focus, and/or the location of the first input corresponds to the position of the preview in the first user interface). For example, as shown in FIG. 5K, while displaying the user interface 522 with the camera view 524 showing the second portion of room 520 and the preview 568 of the three-dimensional model of room 520, device 100 detects a swipe input by a contact 616 in a first direction on the partially completed three-dimensional model in preview 568, where the partially completed three-dimensional model in preview 568 is shown with the second orientation that corresponds to the orientation of the room 520 relative to the current viewpoint (e.g., viewpoint as indicated by object 566 in top view 564 of room 520 in FIG. 5K, same as that shown in FIGS. 5I-5J).

In the method 650, in response to detecting the first input directed to the preview of the three-dimensional model in the first user interface: the computer system updates (660) the preview of the three-dimensional model in the first user interface in accordance with the first input, including, in accordance with a determination that the first input meets first criteria (e.g., the first input includes a swipe input in a first direction, a pinch and drag air gesture, or another analogous input of other input types, while the preview of the three-dimensional model has input focus), rotating the partially completed three-dimensional model from the second orientation that corresponds to the second viewpoint of the user to a third orientation that does not correspond to the second viewpoint of the user (e.g., while the representation of the field of view continues to show the second view of the physical environment that corresponds to the second viewpoint of the user, or while the representation of the field of view continues to be updated in accordance with movement of the one or more cameras that is executed during the first input). For example, as shown in FIGS. 5K-5L, in response to the swipe input by contact 616, the computer system rotates the partially completed three-dimensional model of room 520 in preview 568 to a new orientation (as shown in FIG. 5L) that is different from the second orientation (shown in FIG. 5K) that corresponds to the orientation of room 520 relative to the current viewpoint of the user. In some embodiments, in response to detecting the first input directed to the preview of the three-dimensional model in the first user interface, the computer system updates the partially completed three-dimensional model based on depth information of a respective portion of the physical environment that is in the current field of view of the one or more cameras (e.g., the field of view is continuously updated based on the movement of the one or more cameras, and the model is continuously updated based on newly acquired depth information of the portion of the physical environment in the field of view). For example, in some embodiments, the three-dimensional model is generated using at least first depth information of a first portion of the physical environment that corresponds to the first viewpoint and second depth information of a second portion of the physical environment that corresponds to the second viewpoint. In some embodiments, depth information includes data that is needed to detect and/or determine respective distances to various objects and/or surfaces in a portion of the physical environment that is in the field of view of the cameras. In some embodiments, depth information is used to determine spatial relationships and spatial characteristics of physical features (e.g., objects, surfaces, edges, and/or lines) in the physical environment. In some embodiments, the movement of cameras that change the viewpoint of the user is not a required condition for enabling the manual rotation of the preview of the three-dimensional model set forth above. For example, while the cameras are capturing depth information of a respective portion of the physical environment that is in the field of view corresponding to the current viewpoint of the user (e.g., the first viewpoint, the second viewpoint, or another viewpoint different from the first or second viewpoint), the computer system detects another input directed to the preview of the three-dimensional model; and in response to detecting the new input directed to the preview of the three-dimensional model in the first user interface, the computer system updates the three-dimensional model based on the depth information and updates the preview of the three-dimensional model in the first user interface in accordance with the new input, wherein updating the preview includes, in accordance with a determination that the new input meets the first criteria (e.g., the new input includes a swipe input in the first direction, a pinch and drag air gesture, or another analogous input of a different input type, while the preview of the three-dimensional model has input focus), rotating the partially completed three-dimensional model from the respective orientation that corresponds to the current viewpoint of the user to a new orientation that does not correspond to the current viewpoint of the user (e.g., while the representation of the field of view continues to show the respective view of the physical environment that corresponds to the current viewpoint of the user, or while the representation of the field of view continues to be updated in accordance with movement of the one or more cameras that is executed during the first input). In some embodiments, the orientation of the partially completed three-dimensional model is changed in a direction and/or by an amount that is determined based on one or more characteristics (e.g., direction, duration, distance, speed, and/or velocity of the input that meets the first criteria).

In some embodiments, while displaying the first user interface, including the representation of the field of view and the preview of three-dimensional model, the computer system adds (662), to the representation of the field of view, respective graphical objects at positions (e.g., overlaying the positions on the representation of the field of view) that correspond to one or more physical features (e.g., physical objects, physical surfaces, physical planes, physical boundaries, and/or physical edges) that have been detected in a respective portion of the physical environment that is visible in the representation of the field of view. For example, as shown in FIGS. 5F, graphical objects 572, 578, 576, and 571 are added to locations of various structural elements such as edges between wall 530, wall 532, ceiling 538, and floor 540 in camera view 524. In addition, graphical objects 580 is added to a location of a nonstructural element, such as cabinet 548 in camera view 524 in FIG. 5F. In another example, as shown in FIG. 5J, graphical object 576 is added to a location of an edge between wall 532 and floor 540 in camera view 524, and graphical objects 598 and 594 are added to locations of floor lamp 556 and TV stand 550 in camera view. For example, in some embodiments, during the scan of a portion of the physical environment, when a physical object, surface, and/or plane is detected (e.g., when various spatial characteristics (e.g., lengths, sizes, widths, shapes, boundaries, surfaces, and/or a combination of two or more of the above) and/or identity information (e.g., object type, category, grouping, ownership, category, and/or a combination of two or more of the above) have been estimated and determined beyond a certain threshold level of accuracy, at least partially based on the information (e.g., image and/or depth information) obtained during the scan) in the physical environment, the computer system displays visual feedback to visually indicate the progress of the scan in the form of outlines or overlays that convey the estimated spatial characteristics and identity information of the detected object and, optionally, the predicted accuracy of the estimated spatial characteristics and identity information of the detected object. In some embodiments, the visual feedback is dynamically updated based on the changes in the predicted accuracy of the estimated spatial characteristics of the detected objects (more details of this visual feedback are described with respect to FIGS. 9A-9E and accompanying descriptions). Adding respective graphical objects at positions that correspond to one or more physical features that have been detected in respective portions of the physical environment provides improved visual feedback to the user (e.g., improved visual feedback regarding locations of physical features in the physical environment, and/or improved visual feedback regarding which physical features in the physical environment the computer system has detected).

In some embodiments, the one or more physical features include (664) at least a first physical object (e.g., a piece of furniture, an appliance, a piece of equipment, a piece of home décor, a person, a pet, and so on), and the respective graphical objects include at least a first graphical object that is displayed at a first position on the representation of the field of view that corresponds to the first physical object. For example, in FIG. 5H, graphical object 580 is displayed at a location of cabinet 548 in camera view 524, once one or more edges and surfaces of cabinet 548 have been detected. In another example, in FIG. 5J, graphical object 592 is displayed at the location of TV 560 in camera view 524, once one or more edges and surfaces of TV 560 have been detected. In some embodiments, the first graphical object is of a first type that includes an outline, a bounding box, and/or an overlay with the shape of, the first physical object, where the first graphical object of the first type has spatial characteristics that indicate the spatial characteristics of the first physical object. In some embodiments, the first graphical object is of a second type that includes a label, an icon, and/or an avatar of the first physical object that indicates the type, nature, grouping, and/or category of the first physical object, but the spatial characteristics of the first graphical object (other than the displayed position of the first graphical object) do not necessarily correspond to the spatial characteristics of the first physical object. In some embodiments, the first graphical object transforms from the first type to the second type during the scan as more information is determined about the physical object and the object type is recognized from the physical characteristics of the physical object. In some embodiments, the computer system concurrently displays both the graphical object of the first type and the graphical object of the second type, e.g., at least for a period of time, for a respective physical object, during the scan. Adding, to the representation of the field of view, at least a first graphical object that is displayed at a first position on the representation of the field of view that corresponds to the first physical object, provides improved visual feedback to the user (e.g., improved visual feedback regarding a location of the first physical object, and/or improved visual feedback that the computer system has detected the first physical object).

In some embodiments, the one or more physical features include (666) at least a first physical surface (e.g., a curved surface, and/or a plane) (e.g., a wall, a window, a door, an entryway, a floor, a ceiling, and/or a tabletop), and the respective graphical objects include at least a second graphical object (e.g., an outline, a bounding box, a filled area, an overlay, a color filter, and/or a transparency filter) that is displayed at a second position on the representation of the field of view that corresponds to the first physical surface. In some embodiments, as shown in FIG. 5H, an overlay is optionally displayed on the surface of wall 530 and wall 532 in camera view 524, once the surfaces of wall 530 and wall 532 are detected and characterized. In some embodiments, as shown in FIG. 5H, an overlay is optionally displayed on the surfaces of cabinet 548 in camera view 524, once the surfaces of cabinet 524 are detected and characterized. In some embodiments, the second graphical object is of a first type that includes an outline, a bounding box, and/or an overlay with the shape of, the first physical surface, where the second graphical object of the first type has spatial characteristics that indicate the spatial characteristics of the first physical surface. In some embodiments, the second graphical object is of a second type that includes a label, an icon, and/or an avatar of the first physical surface that indicates the type, nature, grouping, and/or category of the first physical surface, but the spatial characteristics of the second graphical object (other than the displayed position of the second graphical object) do not necessarily correspond to the spatial characteristics of the first physical surface. In some embodiments, the second graphical object transforms from the first type to the second type during the scan as more information is determined about the physical surface and the surface type is recognized from the physical characteristics of the physical surface. In some embodiments, the computer system concurrently displays both the graphical object of the first type and the graphical object of the second type, e.g., at least for a period of time, for a respective physical surface, during the scan. Adding, to the representation of the field of view, at least a second graphical object that is displayed at a second position on the representation of the field of view that corresponds to the first physical surface, provides improved visual feedback to the user (e.g., improved visual feedback regarding a location of the first physical surface, and/or improved visual feedback that the computer system has detected the first physical surface).

In some embodiments, after the partially completed three-dimensional model is rotated to the third orientation in accordance with the first input (e.g., in accordance with a magnitude, duration, and/or direction of the first input), the computer system detects (668) a termination of the first input. In response to detecting the termination of the first input: the computer system updates the preview of the three-dimensional model in the first user interface, including, rotating the partially completed three-dimensional model from the third orientation to a fourth orientation that corresponds to a current viewpoint of the user (e.g., the three-dimensional model is rotated so that the view of the three-dimensional model from the viewpoint of the user is the same as or similar to a view of the physical environment from the viewpoint of the user relative to the physical environment) (e.g., the partially completed three-dimensional model automatically rotates to an orientation that corresponds to an orientation of the physical environment relative to the current viewpoint of the user, after the influence of the first input is terminated) (e.g., the current viewpoint of the user is still the second viewpoint of the user and the representation of the field of view continues to show the second view of the physical environment that corresponds to the second viewpoint of the user, or the current viewpoint is a continuously updated viewpoint of the user while the representation of the field of view continues to be updated in accordance with movement of the one or more cameras that is executed during the first input and after the end of the first input). For example, in FIGS. 5L-5M, after the partially completed three-dimensional model in preview 568 is rotated in accordance with the swipe input by contact 616 (as shown in FIG. 5L), device 100 detects termination of the swipe input. In response to detecting the termination of the swipe input by contact 616, device 100 rotates the partially completed three-dimensional model to its original orientation that corresponds to the orientation of room 200 relative to the current viewpoint (e.g., viewpoint as indicated by object 566 in top view 564 of room 520) (as shown in FIG. 5M). Rotating the partially completed three-dimensional model from the third orientation to a fourth orientation that corresponds to a current viewpoint of the user, after the partially completed three-dimensional model is rotated to the third orientation, reduces the number of inputs needed to display the partially completed three-dimensional model with the appropriate orientation (e.g., the user does not need to perform additional user inputs to re-align the partially completed three-dimensional model with the current viewpoint of the user).

In some embodiments, while displaying the first user interface (e.g., while the scan is ongoing, and/or not completed), with the representation of the field of view including the second view of the physical environment that corresponds to the second viewpoint of the user (e.g., the second viewpoint of the user corresponds to a direction, position and/or vantage point from which the physical environment is being viewed by the user), and with the preview of the three-dimensional model including the partially completed model with the second orientation, the computer system detects (670) second input directed to the preview of the three-dimensional model in the first user interface (e.g., a pinch input or reverse pinch input on a touch-sensitive surface, or in the air; and/or an air gesture that specifies a type and magnitude of scaling) (e.g., the second input is determined to be directed to the preview because the preview has input focus, and/or the location of the second input corresponds to the position of the preview in the first user interface). In response to detecting the second input directed to the preview of the three-dimensional model in the first user interface: the computer system updates the preview of the three-dimensional model in the first user interface in accordance with the second input, including, in accordance with a determination that the second input meets second criteria different from the first criteria (e.g., the second input includes a pinch or reverse pinch input on a touch-sensitive surface, a pinch and flick air gesture, or another analogous input of a different input type, while the preview of the three-dimensional model has input focus), changing a scale of the partially completed three-dimensional model (e.g., enlarging or shrinking the partially completed three-dimensional model) relative to the representation of the field of view in accordance with the second input (e.g., based on direction and/or magnitude of second input). For example, as shown in FIGS. 5N-5O, in response to detecting the depinch gesture by contacts 618-1 and 618-2, device 100 enlarges the partially completed three-dimensional model in preview 568 relative to the camera view 524 in user interface 522. For example, in some embodiments, in accordance with a determination that the second input includes a movement in a first direction (e.g., movement to the right, movement in the clockwise direction, and/or movement to reduce a gap between two fingers), the computer system reduces the scale of the partially completed three-dimensional model (e.g., in an amount that corresponds to a magnitude of the movement of the second input); and in accordance with a determination that the second input includes a movement in a second direction (e.g., movement to the left, movement in the counter-clockwise direction, and/or movement to increase a gap between two fingers), the computer system increases the scale of the partially completed three-dimensional model (e.g., in an amount that corresponds to a magnitude of the movement of the second input). In some embodiments, a first input that rotates the partially completed three-dimensional model and a second input that scales the partially completed three-dimensional model, relative to the representation of the field of view are optionally detected as parts of the same gesture (e.g., a pinch or depinch gesture that also include a translational movement of the whole hand), and as a result, the rotation and scaling of the partially completed three-dimensional model are executed concurrently in accordance with the gesture. Changing a scale of the partially completed three-dimensional model relative to the representation of the field of view in accordance with a second input that meets second criteria, provides additional control options without cluttering the UI with additional display controls (e.g., additional displayed controls for rotating the partially completed three-dimensional model and/or additional displayed controls for changing a scale of the partially completed three-dimensional model).

In some embodiments, wherein the preview of the three-dimensional model of the physical environment (e.g., the model that is being generated and/or updated based on depth information that is being captured by the one or more cameras during the scan) includes (672) respective three-dimensional representations of one or more surfaces that have been detected in the physical environment (e.g., the respective three-dimensional representations of the one or more surfaces include representations of a floor, one or more walls, surfaces of one or more pieces of furniture laid out in three-dimensional space with spatial relationships and spatial characteristics corresponding to their spatial relationships and spatial characteristics). For example, as shown in FIG. 5H, preview 568 of the three-dimensional model of room 520 includes three-dimensional representations 530", 530" and 540" for wall 530, wall 532, and floor 540, and three-dimensional representation 548" for cabinet 548 that include multiple surfaces corresponding to the surfaces of cabinet 548. In another example, in FIG. 5S, as an additional surface of wall 534 is detected, representation 534" of wall 534 is added to the partially completed model in the preview 568. In some embodiments, the respective representations of the one or more surfaces that have been detected in the physical environment include virtual surfaces, bounding boxes, and/or wireframes in the three-dimensional model that have spatial characteristics (e.g., size, orientation, shape, and/or spatial relationships) that correspond to (e.g., reduced in scaled relative to) the spatial characteristics (e.g., size, orientation, shape, and/or spatial relationships) of the one or more surfaces that have been detected in the physical environment. Displaying a preview of the three-dimensional model, including respective three-dimensional representation of one or more surfaces that have been detected in the physical environment, provides improved visual feedback to the user (e.g., improved visual feedback regarding the detected surfaces in the physical environment).

In some embodiments, the preview of the three-dimensional model of the physical environment (e.g., the model that is being generated and/or updated based on depth information that is being captured by the one or more cameras during the scan) includes (674) respective representations of one or more physical objects that have been detected in the physical environment (e.g., the respective representations of the one or more objects include representations of one or more pieces of furniture, physical objects, people, pets, windows, and/or doors that are in the physical environment). For example, as shown in FIG. 5V, preview 568 of the three-dimensional model of room 520 includes respective representations 548" for cabinet 548, representation 546" for stool 546, and/or representation 552" for couch 552, and other representations for other objects detected in room 520. In some embodiments, the representations of the objects are three-dimensional representations. In some embodiments, the respective representations of the one or more objects that have been detected in the physical environment includes outlines, wireframes, and/or virtual surfaces in the three-dimensional preview that have spatial characteristics (e.g., size, orientation, shape, and/or spatial relationships) that correspond to (e.g., reduced in scaled relative to) the spatial characteristics (e.g., size, orientation, shape, and/or spatial relationships) of the one or more objects that have been detected in the physical environment. In some embodiments, the representations of the objects have reduced structural and visual details in the three-dimensional model as compared to their corresponding objects in the physical environment. Displaying a preview of the three-dimensional model of the physical environment, including respective representation of one or more physical objects that have been detected in the physical environment, provides improved visual feedback to the user (e.g., improved visual feedback regarding the detected physical objects in the physical environment).

In some embodiments, after adding the additional information to the partially completed three-dimensional model in the preview of the three-dimensional model, in accordance with a determination that the partially completed three-dimensional model of the physical environment meets preset criteria (e.g., criteria for determining when the scan of the physical environment is completed, e.g., because sufficient information has been obtained from the scan and preset conditions regarding detecting surfaces and objects in the physical environment are fulfilled; or because the user has requested that the scan be completed right away), the computer system replaces (676) display of the partially completed three-dimensional model in the preview of the three-dimensional model with display of a first view of a completed three-dimensional model of the physical environment, wherein the first view of the completed three-dimensional model includes an enlarged copy (and optionally, rotated to a preset orientation that does not correspond to the current viewpoint of the user) of the partially completed three-dimensional model that meets the preset criteria. For example, as shown in FIGS. 5W-5X, after the scan of the room 520 is completed (e.g., in FIG. 5W, all four walls of room 520 have been scanned and modeled), device 100 replaces display of user interface 522 with user interface 636 (as shown in FIG. 5X), where user interface 636 includes an enlarged version of the completed three-dimensional model 634 of room 520. For example, when the computer system determines that the scan is completed and the model of the physical environment meets preset criteria, the computer system replaces the preview of the three-dimensional model with a view of the completed three-dimensional model, where the view of the completed three-dimensional model is larger than the partially completed model shown in the preview. In some embodiments, the view of the completed three-dimensional model shows the three-dimensional model with a preset orientation (e.g., the orientation of the partially completed model shown at the time that the scan is completed, a preset orientation that is independent of the orientation of the partially completed model shown at the time that the scan is completed and independent of the current viewpoint). Replacing display of the partially completed three-dimensional model in the preview of the three-dimensional model with display of a first view of a completed three-dimensional model of the physical environment that includes an enlarged copy of the partially completed three-dimensional model, after adding the additional information to the partially completed three-dimensional model in the preview of the three-dimensional model, reduces the number of inputs needed to display the completed three-dimensional model of the physical environment at the appropriate size (e.g., the user does not need to perform additional user inputs to enlarge the completed three-dimensional model of the physical environment, after the computer system adds the additional information to the partially completed three-dimensional model in the preview of the three-dimensional model).

In some embodiments, while displaying the first view of the completed three-dimensional model in the first user interface (e.g., after the scan is just completed, or completed for some time) (e.g., optionally, with the representation of the field of view including a respective view of the physical environment that corresponds to the current viewpoint of the user (e.g., the first viewpoint, the second viewpoint of the user, or another viewpoint different from the first and second viewpoints)), the computer system detects (678) third input directed to the first view of the completed three-dimensional model in the first user interface (e.g., a swipe input on a touch-sensitive surface or in the air; or an air gesture that specifies a direction of movement or rotation) (e.g., the third input is determined to be directed to the completed three-dimensional model because the view of the three-dimensional model has input focus, or the location of the first input corresponds to the position of the view of the three-dimensional model in the first user interface). In response to detecting the third input directed to the first view of the completed three-dimensional model in the first user interface: the computer system updates the first view of the completed three-dimensional model in the first user interface in accordance with the third input, including, in accordance with a determination that the third input meets the first criteria (e.g., the third input includes a swipe input in a first direction, a pinch and drag air gesture, or another analogous input of a different input type, while the view of the completed three-dimensional model has input focus), rotating the completed three-dimensional model from a fourth orientation (e.g., a respective orientation that corresponds to a current viewpoint of the user, and/or a preset orientation) to a fifth orientation different from the fourth orientation in accordance with the third input. For example, as shown in FIGS. 5X-5Y, after the completed three-dimensional model 634 is displayed in user interface 636, device 100 detects a swipe input by contact 638 that is directed to the completed three-dimensional model 634 (as shown in FIG. 5X). In response to detecting the swipe input, device 100 rotates the completed three-dimensional model 634 in user interface 636 to a new orientation in accordance with the swipe input (as shown in FIG. 5Y). In some embodiments, after the scan is completed and the completed three-dimensional model of the physical environment is displayed in the first user interface (e.g., with or without concurrent displayed of the representation of the field of view of the one or more cameras), the computer system allows the user to rotate (e.g., freely, or under preset angular constraints) the model around one or more rotational axes (e.g., rotate around x-, y-, z-, axis, and/or tilt, yaw, pan, the view of the model) to view the three-dimensional model from different angles. Rotating the completed three-dimensional model from a fourth orientation to a fifth orientation different from the fourth orientation in accordance with the third input, in response to detecting the third input directed to the first view of the completed three-dimensional model in the first user interface, provides improved visual feedback to the user (e.g., improved visual feedback regarding the appearance of the three-dimensional model, as viewed with different orientations).

In some embodiments, after the completed three-dimensional model is rotated to the fifth orientation in accordance with the third input (e.g., in accordance with a magnitude, duration, and/or direction of the third input), the computer system detects (680) a termination of the third input. In response to detecting the termination of the third input, the computer system forgoes updating the first view of the completed three-dimensional model in the first user interface, including, maintaining the completed three-dimensional model in the fifth orientation (e.g., irrespective to the current viewpoint, movement of the display generation component, and/or the movement of the one or more cameras). For example, as shown in FIGS. 5Y-5AA, after the three-dimensional model 634 of room 520 is rotated in accordance with swipe input by contact 638 to a new orientation (e.g., as shown in FIG. 5Z), device 100 detects termination of the swipe input. In response to detecting the termination of the swipe input, device 100 does not rotate the three-dimensional model 634 further, does not rotate the three-dimensional model 634 back to the orientation shown before the swipe input (e.g., the orientations of three-dimensional model 634 shown in FIGS. 5X and 5Y), and maintains the three-dimensional model 634 at the current orientation (as shown in FIGS. 5Z and 5AA). In some embodiments, maintaining a changed orientation of the completed three-dimensional model after detecting termination of the third input that rotated the model allows the user to have time to inspect the model from a desired viewing angle, deciding whether to rotate the model further to inspect the model from another viewing angle and providing the proper input to do so as desired. Forgoing updating the first view of the completed three-dimensional model in the first user interface, including maintaining the completed three-dimensional model in the fifth orientation, in response to detecting termination of the third input, reduces the number of inputs needed to interact with the completed three-dimensional model (e.g., the computer system does not change the orientation of the completed three-dimensional model (e.g., to reflect a current viewpoint of the user), and so the user does not need to perform additional user inputs to constantly re-adjust the orientation of the completed three-dimensional model back to the fifth orientation).

In some embodiments, the completed three-dimensional model includes (682) a respective graphical representation of a first structural element that is detected in the physical environment and respective graphical representations of one or more physical objects that are detected in the physical environment. Displaying the first view of the completed three-dimensional model includes: in accordance with a determination that a current orientation of the completed three-dimensional model in the first user interface (e.g., when the model is stationary and/or is being rotated according to user input) would cause the respective graphical representation of the first structural element (e.g., a wall, a floor, or another structural element in the physical environment) to occlude a view of the respective graphical representations of the one or more objects (e.g., physical objects that are in the interior portion of the physical environment, such as furniture, physical objects, smart home appliances, people, and/or pets), reducing an opacity of (e.g., while still displaying at least a portion of the graphical representation of the first structural element) or ceasing to display the graphical representation of the first structural element (e.g., forgoing display of the respective graphical representation of the first structural element with the respective representations of the one or more objects in the first view of the three-dimensional model) (e.g., the graphical representation of the first structural element is not displayed when the complete three-dimensional model is rotated in accordance with the third input); and in accordance with a determination that the current orientation of the completed three-dimensional model would not cause the respective graphical representation of the first structural element (e.g., a wall, a floor, or other structural element in the physical environment) to occlude the view of respective graphical representations of one or more objects (e.g., physical objects that are in the interior portion of the physical environment, such as furniture, physical objects, smart home appliances, people, and/or pets), concurrently display the respective graphical representation of the first structural element with the respective representations of the one or more objects in the first view of the three-dimensional model (e.g., the graphical representation of the first structural element is displayed when the complete three-dimensional model is rotated in accordance with the third input). For example, as shown in FIGS. 5X-5AA, the three-dimensional model 634 in user interface 636 includes representations of multiple structural elements, such as wall 530, wall 532, wall 534, wall 536, and floor 540. The representation 534" of wall 534 is not displayed in the view of the three-dimensional model 634 in FIG. 5X (e.g., optionally, an outline of the representation is displayed while the fill material of the representation is made transparent) because it would occlude representations of physical objects detected in the interior of room 520, such as representation 560" of TV 560, representation 556" of floor lamp 556, representation 552" of couch 552, representation 554" of side table 554, and representations of one or more other objects (e.g., boxes 562, and table lamp 558) that have been detected in room 520. In another example, after the completed three-dimensional model 634 is rotated in user interface 636, as shown in FIG. 5Y, representation 536" of wall 536 and representation 534" of wall 534 are removed or made transparent or partially transparent (optionally leaving an outline without a fill material), because they would have occluded the representations of the objects that have been detected in room 520 (e.g., as representation 560" of TV 560, representation 556" of floor lamp 556, representation 552" of couch 552, representation 554" of side table 554, and representations of one or more other objects (e.g., boxes 562, and table lamp 558)). In FIG. 5X, representation 530" of wall 530 is displayed concurrently with representations of objects detected in room 520 because representation 530" would not occlude any of the objects with the current orientation of the completed three-dimensional model 634 in user interface 636. In another example, in FIGS. 5Z and 5AA, representation 532" of wall 532 is displayed concurrently with representations of objects detected in room 520 because representation 532" would not occlude any of the objects with the current orientation of the completed three-dimensional model 634 in user interface 636. Forgoing display of the respective graphical representation of the first structural element with the respective representations of the one or more objects in the first view of the three-dimensional model, in accordance with a determination that a current orientation of the completed three-dimensional model in the first user interface would cause the respective graphical representation of the first structural element to occlude a view of the respective graphical representations of the one or more objects, and concurrently displaying the respective graphical representation of the first structural element with the respective representations of the one or more objects in the first view of the three-dimensional model, in accordance with a determination that the current orientation of the completed three-dimensional model would not cause the respective graphical representation of the first structural element to occlude the view of respective graphical representations of one or more objects, reduces the number of inputs needed to display an appropriate view of the completed three-dimensional model (e.g., the user does not need to perform additional user inputs to adjust the orientation of the completed three-dimensional model if one or more objects in the three-dimensional model are occluded).

In some embodiments, prior to displaying the first user interface, the computer system displays (684) a respective user interface of a third-party application (e.g., any of a plurality of third-party applications that implements an application program interface for the room scanning capability described herein). While displaying the respective user interface of the third-party application, the computer system detects a respective input that is directed to the respective user interface of the third-party application, wherein the first user interface is displayed in response to detecting the respective input that is directed to the respective user interface of the third-party application and in accordance with a determination that the respective input corresponds to a request to scan the physical environment (e.g., meets the requirements of a system application programming interface (API) for the scanning of the physical environment). For example, as shown in FIGS. 5B and 5C followed by FIG. 5D, the user interface 522 for scanning and modeling a physical environment can be displayed in response to activation of the "start scan" button 512 in either of the user interfaces of the browser application and the paint design application. In some embodiments, the same scanning process described herein is triggered in response to a user input directed to a respective user interface of another, different third-party application, wherein the user input corresponds to the request to scan the physical environment (e.g., meets the requirements of the system application programming interface (API) for the scanning of the physical environment). Updating the preview of the three-dimensional model in the first user interface in accordance with the first movement of the one or more cameras, and rotating the partially completed three-dimensional model from the second orientation that corresponds to the second viewpoint of the user to a third orientation that does not correspond to the second viewpoint of the user, in accordance with a determination that the first input meets first criteria and in response to detecting the first input directed to the preview of the three-dimensional model in the first user interface, wherein the first user interface is displayed in response to detecting the respective input that is directed to the respective user interface of the third-party application and in accordance with a determination that the respective input corresponds to a request to scan the physical environment, provides improved visual feedback to the user (e.g., improved visual feedback regarding the progress of the partially completed three-dimensional model, and/or improved visual feedback regarding the appearance of the three-dimensional model, as viewed with different orientations).

In some embodiments, in accordance with a determination that generation of the three-dimensional model meets preset criteria (e.g., a complete three-dimensional model meeting preset criteria has been obtained based on the scan of the physical environment, and/or a user request for terminating the scan of the physical environment has been detected), the computer system redisplays (686) the third-party application (e.g., displaying the completed three-dimensional model in a user interface of the third-party application, and/or displaying content from the third-party application (e.g., a respective set of user interface objects corresponding to a respective plurality of actions in the third-party application) with at least a portion of the three-dimensional model, based on spatial information contained in the three-dimensional model). For example, as shown in FIG. 5AA followed by FIG. 5AB or 5AC, after the three-dimensional model has been generated, selection of a "Done" button 638 causes the device 100 to redisplay the user interface of the application (e.g., user interface 644 of the browser application, or user interface 646 of the paint design application) from which the scan and modeling process was initiated. For example, in some embodiments, multiple different third-party applications may utilize the scanning user interface and process described herein to obtain a three-dimensional model of the physical environment, and at the end of the scan, the computer system redisplays the third-party application from which the scanning process was initiated, and optionally, displays a user interface of the third-party application that provides one or more options to interact with the model and utilize the model to accomplish one or more tasks of the third-party application. In some embodiments, the user interfaces and the functions provided by different third-party applications are different from one another. Redisplaying the third-party application, in accordance with a determination that the generation of the three-dimensional model meets preset criteria, reduces the number of user inputs needed to redisplay the third-party application (e.g., the user does not need to perform additional user inputs to redisplay the third-party application).

In some embodiments, displaying the preview of the three-dimensional model including the partially completed three-dimensional model includes (688) displaying a graphical representation of a first structural element (e.g., a wall, a floor, an entryway, a window, a door, or a ceiling) that is detected in the physical environment in a first direction relative to respective graphical representations of one or more objects (e.g., physical objects that are in the interior portion of the physical environment, such as furniture, physical objects, people, and/or pets) that have been detected in the physical environment; and rotating the partially completed three-dimensional model (e.g., from the second orientation to the third orientation, or from the third orientation to another orientation) includes: in accordance with a determination that, a respective rotation of the partially completed three-dimensional model (e.g., the respective rotation is caused by the movement of the camera that changes the viewpoint of the user, and/or caused by user input) to be executed by the partially completed three-dimensional model would cause the graphical representation of the first structural element to occlude a view of the respective graphical representations of the one or more objects in the preview of the three-dimensional model (e.g., the representation of a wall, floor, or ceiling would block the view of one or more interior objects in the model from the current viewpoint of the user), reducing an opacity of (e.g., while still displaying at least a portion of the graphical representation of the first structural element) or ceasing to display the graphical representation of the first structural element while displaying the respective representations of the one or more objects in the preview of the three-dimensional model when executing the respective rotation of the partially completed three-dimensional model. For example, as shown in FIGS. 5K-5L, if the partially completed three-dimensional model in preview 568 already included a representation of wall 534, then device 100 would reduce the opacity or cease to display the representation of wall 534 when the partially completed model is rotated by the user input (e.g., from the orientation shown in FIG. 5K to the orientation shown in FIG. 5L) because the representation of wall 534 would occlude representations of physical objects that have been detected in the interior of room 520, such as representation 560" of TV 560, and representation 548" of cabinet 548. In some embodiments, rotating the partially completed three-dimensional model (e.g., from the second orientation to the third orientation, or from the third orientation to another orientation) includes: in accordance with a determination that, the respective rotation of the partially completed three-dimensional model (e.g., the respective rotation is caused by the movement of the camera that changes the viewpoint of the user, and/or caused by user input) to be executed by the partially completed three-dimensional model would not cause the graphical representation of the first structural element to occlude the view of the respective graphical representations of the one or more objects in the preview of the three-dimensional model (e.g., the representation of a wall, floor, doorway, door, window, or ceiling would not block the view of one or more interior objects in the model from the current viewpoint of the user), displaying the graphical representation of the first structural element while displaying the respective representations of the one or more objects in the preview of the three-dimensional model when executing the respective rotation of the partially completed three-dimensional model. Reducing an opacity of or ceasing to display the graphical representation of the first structural element while displaying the respective representations of the one or more objects in the preview of the three-dimensional model when executing the respective rotation of the partially completed three-dimensional model, in accordance with a determination that, a respective rotation of the partially completed three-dimensional model to be executed by the partially completed three-dimensional model would cause the graphical representation of the first structural element to occlude a view of the respective graphical representations of the one or more objects in the preview of the three-dimensional model, reduces the number of inputs needed to display an appropriate view of the three-dimensional model (e.g., the user does not need to perform additional user inputs to adjust an opacity, or to cease to display, the first structural element, if the first structural element occludes one or more objects, and/or the user does not need to perform additional user inputs to adjust an orientation of the completed three-dimensional model (e.g., to prevent the first structural element from occluding the one or more objects)).

In some embodiments, ceasing to display the graphical representation of the first structural element while displaying the respective representations of the one or more objects in the preview of the three-dimensional model when executing the respective rotation of the partially completed three-dimensional model includes (690), replacing display of the graphical representation of the first structural element with display of a first visual indication at a location of the graphical representation of the first structural element, wherein the first visual indication causes less visual occlusion of the respective graphical representations of the one or more objects in the preview of the three-dimensional model during the respective rotation of the partially completed three-dimensional model, as compared to an amount of visual occlusion that would have been caused by the graphical representation of the first structural element. For example, an indication of an outline or top edge of the representation 530" of wall 530 remains displayed after device 100 ceases to display the representation 530" of wall 530, if the partially completed model were rotated to this orientation shown in FIG. 5S in accordance with a swipe input directed to the partially completed model, while the camera view 524 showed a different portion of the physical environment than that shown in FIG. 5S in accordance with a current viewpoint of the user. For example, in some embodiments, the first visual indication is a more translucent version of the graphical representation of the first structural element through which the representations of the interior objects can be visible to the user from the current viewpoint of the user. In some embodiments, the first visual indication is an outline of the graphical representation of the first structural element without a fill material, or with a more transparent fill material of the graphical representation of the first structural element. Replacing display of the graphical representation of the first structural element with display of a first visual indication at a location of the graphical representation of the first structural element, wherein the first visual indication causes less visual occlusion of the respective graphical representations of the one or more objects in the preview of the three-dimensional model during the respective rotation of the partially completed three-dimensional model, as compared to an amount of visual occlusion that would have been caused by the graphical representation of the first structural element, reduces the number of inputs needed to display an appropriate view of the three-dimensional model (e.g., the user does not need to perform additional user inputs to adjust an opacity, or to cease to display, the first structural element, if the first structural element occludes one or more objects, and/or the user does not need to perform additional user inputs to adjust an orientation of the completed three-dimensional model (e.g., to prevent the first structural element from occluding the one or more objects)), without sacrificing visual clarity (e.g., the computer system continues to provide visual feedback to the user regarding the location of the first structural element, while simultaneously mitigating the occlusion of the one or more objects).

In some embodiments, ceasing to display the graphical representation of the first structural element while displaying the respective representations of the one or more objects in the preview of the three-dimensional model when executing the respective rotation of the partially completed three-dimensional model includes (692), in accordance with a determination that the first structural element include one or more openings (e.g., windows, doors, and/or entryways), ceasing to display respective graphical representations of the one or more openings in the first structural element (e.g., along with the graphical representation of the first structural element), while displaying the respective representations of the one or more objects in the preview of the three-dimensional model when executing the respective rotation of the partially completed three-dimensional model. In some embodiments, graphical representations of the one or more openings are replaced with more transparent versions thereof or with outlines of the graphical representations, rather than completed removed from view. For example, if device 100 ceases to display the representation 530" of wall 530 in response to a rotation of the partially completed model shown in FIG. 5S in accordance with a swipe input directed to the partially completed model (e.g., while the camera view 524 showed a different portion of the physical environment than that shown in FIG. 5S in accordance with a current viewpoint of the user), representations of window 542 and entryway 544 are optionally removed from view as well. Ceasing to display respective graphical representations of the one or more openings in the first structural element, while displaying the respective representations of the one or more objects in the preview of the three-dimensional model when executing the respective rotation of the partially completed three-dimensional model, reduces the number of inputs needed to display an appropriate view of the three-dimensional model (e.g., the user does not need to perform additional user inputs to cease to display the respective graphical representation of the one or more openings in the first structural element).

In some embodiments, the computer system displays (694) the preview of the three-dimensional model with virtual lighting (e.g., direction, position, and/or brightness of virtual lighting) that is generated based on detected (e.g., actual and/or physical) lighting (e.g., direction, position, brightness of detected lighting) in the physical environment. For example, in FIGS. 5F-5W, as the partially completed model of room 520 in preview 568 is rotated in accordance with the movement of the viewpoint of the user during the scanning process, the partially completed model is shown with virtual lighting effects that are generated based on the detected lighting in room 520 during the scanning process. For example, in some embodiments, the computer system displays virtual shadows, virtual highlights, and/or virtual hues on surfaces in the model that have shapes and directions that are generated based on the direction, intensity, and/or positions of physical lighting in the physical environment. In some embodiments, as the user moves in the physical environment that cause rotation of the model in the first user interface, and/or as the user rotates the model using an input directed to the model, the computer system changes shapes, intensities, and/or directions of the virtual shadows, virtual highlights, and/or virtual hues on the surfaces in the model according to the characteristics of the physical lighting (e.g., location, intensity, color, and/or direction) in the physical environment. In some embodiments, in accordance with changes in the lighting in the physical environment, the computer system changes the virtual lighting in the model (e.g., by changing the virtual shadows, virtual highlights, and/or virtual hues) on the surfaces in the model. Displaying the preview of the three-dimensional model with virtual lighting that is generated based on detected lighting in the physical environment, provides improved visual feedback to the user (e.g., improved visual feedback regarding the appearance of the three-dimensional model under the detected lighting).

In some embodiments, the computer system displays (696) the preview of the three-dimensional model with preset virtual lighting (e.g., direction, position, color, color temperature, brightness and/or other optical property) that is different from (e.g., independent of) detected (e.g., actual and/or physical) lighting (e.g., direction, position, color, color temperature, brightness and/or other optical properties) in the physical environment. For example, in FIGS. 5F-5W, as the partially completed model of room 520 in preview 568 is rotated in accordance with the movement of the viewpoint of the user during the scanning process, the partially completed model is shown with virtual lighting effects that are generated based on a virtual light source that is independent and/or different from the detected lighting in room 520 during the scanning process. For example, in some embodiments, the computer system displays virtual shadows, virtual highlights, and/or virtual hues on surfaces in the model that have shapes and directions that are generated based on the direction, intensity, and/or positions of a predetermined virtual light source that is independent of physical lighting in the physical environment. In some embodiments, as the user moves in the physical environment that cause rotation of the model in the first user interface, and/or as the user rotates the model using an input directed to the model, the computer system optionally maintains the shapes, intensities, and/or directions of the virtual shadows, virtual highlights, and/or virtual hues on the surfaces in the model according to the characteristics of the predetermined virtual light source. In some embodiments, in accordance with changes in the predetermined virtual lighting, the computer system changes the virtual lighting in the model (e.g., by changing the virtual shadows, virtual highlights, and/or virtual hues) on the surfaces in the model. Displaying the preview of the three-dimensional model with preset virtual lighting that is different from detected lighting in the physical environment, provides improved visual feedback to the user (e.g., improved visual feedback regarding the appearance of the three-dimensional model under different lighting).

In some embodiments, in response to detecting the first movement of the one or more cameras: the computer system updates (698) the representation of the field of view in the first user interface in accordance with the first movement of the one or more cameras, including augmenting the representation of the field of view with respective graphical objects that correspond to the additional information that is added to the partially completed three-dimensional model. As shown in FIGS. 5I-5L, for example, camera view 524 is continually updated with new graphical objects corresponding to newly detected objects (e.g., graphical object 592 corresponding to TV 560, and graphical object 598 corresponding to floor lamp 556), while representations of newly detected objects (e.g., representation 560" for TV 560 and representation 556" for floor lamp 556) are added to the partially completed three-dimensional model in preview 568. For example, in some embodiments, as the scan of the physical environment progresses, depth information of more objects and/or surfaces in the physical environment are obtained by the one or more cameras, and the computer system gains more knowledge of the spatial and identity information of the structural elements (e.g., walls, ceiling, windows, doors, entryways, and/or floors) and non-structural elements (e.g., furniture, appliances, household items, home décor, smart home appliances, and/or people and pets)

in the physical environment, graphical representations of these structural elements and the non-structural elements are added to the representation of the field of view as well as the partially completed three-dimensional model in the first user interface in a substantially synchronous manner. Updating the representation of the field of view in the first user interface in accordance with the first movement of the one or more cameras, including augmenting the representation of the field of view with respective graphical objects that correspond to the additional information that is added to the partially completed three-dimensional model, provides improved visual feedback to the user (e.g., by adding the additional information to the partially completed three-dimensional model (e.g., as additional information is received from the one or more cameras)).

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, and 900) are also applicable in an analogous manner to method 650 described above with respect to FIGS. 6A-6F. For example, the user interfaces, user interface elements, physical environments and features and objects therein, feature types, annotations, representations of measurements, measurement types, and scale markers described above with reference to method 800 optionally have one or more of the characteristics of the user interfaces, user interface elements, physical environments and features and objects therein, feature types, annotations, representations of measurements, measurement types, and scale markers described herein with reference to other methods described herein (e.g., methods 700, 800, and 900). For brevity, these details are not repeated here.

FIGS. 7A-7D are flow diagrams of a method of displaying representations of objects identified in an environment during scanning and modeling of the environment, in accordance with some embodiments. Method 700 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 900 are, optionally, combined and/or the order of some operations is, optionally, changed.

As described below, the method 700 is a method of displaying representations of objects identified in an environment during scanning and modeling of the environment. By displaying representation of identified objects during scanning and modeling, the computer system makes it easy for the user of the computer system to identify which object in the environment the computer system has identified while scanning, and to avoid cluttering a representation of a field of view of one or more cameras of the computer system with full size representation of each identified object. This provides improved visual feedback to the user (e.g., improved visual feedback regarding the location and/or type of objects identified by the computer system), and minimizes the number of user inputs needed to display an appropriate representation of the field of view (e.g., the user does not need to constantly adjust a rotation and/or orientation of the field of view to view portions of the representation of the field of view that may be occluded or otherwise obstructed by a full size representation of each identified object).

In the method 700, the computer system displays (702), via the display generation component, a first user interface (e.g., a scan user interface that is displayed to show progress of an initial scan of a physical environment to build a three-dimensional model of the physical environment, a camera user interface, and/or a user interface that is displayed in response to a user's request to perform a scan of a physical environment or to start an augmented reality session in a physical environment), wherein the first user interface includes a representation of a field of view of one or more cameras (e.g., images or video of a live feed from the camera(s), or a view of the physical environment through a transparent or semitransparent display), the representation of the field of view including a respective view of a physical environment that corresponds to a current viewpoint of a user in the physical environment (e.g., the current viewpoint of the user corresponds to a direction, position and/or vantage point from which the physical environment is being viewed by the user), and In some embodiments, the first user interface further includes a preview of a three-dimensional model of the physical environment that is being generated based on the depth information captured by the one or more cameras. For example, as shown in FIGS. 5G, device 100 displays user interface 522 which includes camera view 524 capturing a first portion of room 520.

In the method 700, while displaying the first user interface (e.g., while the scan is ongoing, and/or not completed), in accordance with a determination that a first object (e.g., a structural element such as a wall, floor, and/or ceiling, a non-structural element such as a piece of furniture, an appliance, and/or a household item) has been detected in the field of view of the one or more cameras (704): the computer system displays (706), at a first time (e.g., immediately after the first object is detected, and/or before the first object is recognized as an instance of a particular object type), a first representation of the first object at a position in the representation of the field of view that corresponds to a location of the first object in the physical environment, wherein one or more spatial properties (e.g., size, length, height, and/or thickness) of the first representation of the first object have values that correspond to one or more spatial dimensions (e.g., size, length, height, and/or thickness) of the first object in the physical environment (e.g., the first representation of the first object includes a virtual outline of the first object, a bounding box of the first object, and/or a translucent mask of the first object overlaid on a pass-through view of the first object in the representation of the field of view of the cameras (e.g., camera view, or a view through a transparent or semi-transparent display generation component)). For example, as shown in FIG. 5H, while displaying user interface 522 including camera view 524, device 100 detects cabinet 548 in the portion of room 520 that is currently in camera view 524; and in response to detecting cabinet 548, device 100 displays graphical object 580 at a location of cabinet 548 in camera view 524, wherein graphical object 580 is a bounding box with spatial properties that have values corresponding to the spatial dimensions of cabinet 548 in room 520.

In method 700, at a second time later than the first time (e.g., after the object type of the first object is determined, after the first object is recognized, and/or after one or more properties of the first object other than its spatial dimensions are determined), the computer system replaces (708) display of the first representation of the first object with display of a second representation of the first object (e.g., a label, an icon, a token, and/or a short textual description) in the representation of the field of view, wherein the second representation of the first object does not spatially indicate (e.g., does not use spatial properties of the first representation of the first object to indicate) the one or more spatial dimensions (e.g., size, length, height, and/or thickness) of the first object in the physical environment. For example, as shown in FIG. 5I, after detecting cabinet 548 in room 520, device 100 further identifies cabinet 548 and displays representation 596 that identifies cabinet 548 but does not spatially indicate the spatial dimensions of cabinet 548. In some embodiments, as shown in FIGS. 5I and 5J, after representation 596 is displayed at the location of cabinet 548 in camera view 524, device 100 ceases to display graphical object 580 at the location of cabinet 548 in the camera view. For example, in some embodiments, the second representation of the first object is an icon that graphically and/or schematically specifying the object type of the first object. In some embodiments, the second representation of the first object is a textual label specifying the object type, name, and/or model number of the first object. In some embodiments, the first object is an object (e.g., a non-structural element, such as a lamp, furniture, and/or smart home devices) that is distinct from any of the structural elements (e.g., walls, ceiling, floor, door, window) in the physical environment. In some embodiments, the second representation of the first object occupies a much smaller region in the representation of the field of view than the first object and the first representation of the first object. In some embodiments, the second representation of the first object creates less visual clutter in the field of view of the one or more cameras as compared to the first representation of the first object. In some embodiments, the second representation of the first object indicates one or more spatial dimensions of the first object using non-spatial properties of the representation, such as textual content (e.g., Table-medium, or Bed-King), numerical values (e.g., 32×22×50 inches, or 20 cm dia.), descriptors (e.g., largest, smallest, medium, large, and/or XXL) that do not spatially indicate the one or more spatial dimensions of the first object in the physical environment.

In some embodiments, the first representation of the first object includes (710) an outline that is displayed around a boundary of the first object in the representation of the field of view of the one or more cameras. For example, as shown in FIG. 5H, graphical object 580 that is displayed at the location of cabinet 548 that spatially represents the spatial dimensions of cabinet 548 is a three-dimensional bounding box that outlines the boundaries of cabinet 548. For example, in some embodiments, the first representation of the first object includes a virtual outline of the first object, a two-dimensional or three-dimensional bounding box of the first object, and/or a translucent mask of the first object overlaid on a pass-through view of the first object in the representation of the field of view of the cameras (e.g., camera view, and/or a view through a transparent or semi-transparent display generation component). Displaying, at the first time, the first representation of the first object that includes an outline that is displayed around a boundary of the first object in the representation of the field of view of the one or more cameras, provides improved visual feedback to the user (e.g., improved visual feedback regarding the spatial dimensions of the first object).

In some embodiments, the first time and the second time are (712) different time points during a scan of the physical environment that obtains depth information in the physical environment using the one or more cameras (e.g., during the scan of the physical environment, the computer system automatically updates the representation of the field of view based on movement of the one or more cameras that change the current viewpoint of the user and augments the representation of the field of view with the representations of objects that have spatial characteristics that spatially indicate the spatial dimensions of the objects; and then replacing those representations with non-spatial representations (e.g., icons, labels, or other types of non-spatial representations) as objects are gradually identified), and in the method 700: prior to the first time (e.g., after the scan has been started, and when the first object first enters the field of view of the one or more cameras): the computer system displays a first portion, less than all, of the first representation of the first object (e.g., a partial outline, and/or a partial mask or overlay that are displayed on the pass-through view of the first object in the representation of the field of view) based on first depth information available from the scan of the physical environment; and after displaying the first portion, less than all, of the first representation of the first object, the computer system displays a second portion, less than all, of the first representation of the first object (e.g., a partial outline, and/or a partial mask or overlay that are displayed on the pass-through view of the first object in the representation of the field of view) based on second depth information available from the scan of the physical environment, wherein the second portion of the first representation includes the first portion of the first representation and additional portion of the first representation (e.g., the partial outline and/or partial mask or overlay that are displayed on the pass-through view of the first object grows and/or expands as the scan progresses and more depth information is obtained), and wherein the second depth information includes the first depth information and additional depth information obtained after the first depth information during the scan. For example, as shown in FIGS. 5F-5H, graphical object 580 that is initially displayed at the location of cabinet 548 includes segments 580-2 and 580-3 (e.g., as shown in FIG. 5F) that extend partially along the edges of cabinet 548; and as the scan continues, graphical object 580 is updated to include segments 580-2 and 580-3 (e.g., as shown in FIG. 5G) that extend along the entirety of the two front edges of cabinet 548.

In some embodiments, replacing display of the first representation of the first object with display of the second representation of the first object in the representation of the field of view includes (714) fading out (e.g., reducing visual prominence, increasing translucency, and/or reducing line thickness) the first representation of the first object after the second representation of the first object is displayed, wherein the second representation of the first object identifies the first object (e.g., identifies the object type, name, model no., and/or product serial number of the first object in the representation of the field of view). For example, as shown in FIGS. 5H-5J, initially, graphical object 580 is displayed at the location of cabinet 548 to spatially indicate the spatial dimensions of cabinet 548 (e.g., as shown in FIG. 5H); after cabinet 548 is identified by device 100, graphical object 580 starts to fade out (e.g., as shown in FIG. 5I) while representation 596 that does not spatially indicate the spatial dimensions of cabinet 548 is displayed at the location of cabinet 548; and later, graphical object 580 ceases to be displayed while representation 596 remains displayed at the location of cabinet 548 (e.g., as shown in FIG. 5J). In some embodiments, the first representation of the first object and the second representation of the second object are concurrently displayed for a brief period of time before the first representation of the first object is removed from the representation of the field of view in the first user interface. Fading out the first representation of the first object after the second representation of the first object is displayed, wherein the second representation of the first object identifies the first object, reduces the number of inputs needed to display an appropriate representation of the first object (e.g., the user does not need to perform additional user inputs to cease displaying the first representation of the first object).

In some embodiments, the first representation of the first object is (716) displayed while the representation of the field of view in the first user interface includes a first view of the physical environment that corresponds to a first viewpoint of the user in the physical environment, the second representation of the first object is displayed while the representation of the field of view in the first user interface includes a second view of the physical environment that corresponds to a second viewpoint of the user in the physical environment, and the first object is identified based, at least partially, on depth information obtained during movement of the one or more cameras that changed the current viewpoint of the user from the first viewpoint to the second viewpoint. For example, as shown in FIGS. 5H and 5I, graphical object 580 is first displayed at the location of cabinet 548 before cabinet 548 is identified and while the camera view 524 includes a first portion of room 520 corresponding to a first viewpoint (e.g., as shown in FIG. 5H); and after the viewpoint changes and a second portion of room 520 is included in camera view 524 (e.g., as shown in FIG. 5I), more image and depth information is captured from the second portion of room 520 and cabinet 548 is identified. After cabinet 548 is identified, representation 596 is displayed at the location of cabinet 548, as shown in FIG. 5I. In some embodiments, scan of the physical environment is not instant, and detection and identification of objects within a current field of view of the one or more cameras may take a finite amount of time within which the first representation of the first object is gradually completed over time and eventually replaced by the second representation of the first object. In some embodiments, the first representation of the first object is gradually completed over time and replaced by the second representation of the first object while the field of view is continuously updated with the movement of the one or more cameras in the physical environment. Identifying the first object, at least partially, based on depth information obtained during movement of the one or more cameras, provides improved visual feedback to the user (e.g., improved visual feedback identifying the first object, as the one or more cameras are moved).

In some embodiments, the second representation of the first object indicates (718) an object type (e.g., the type of furniture, the type of art piece, the style of furniture, the type of appliance, the type of smart home device, a model number of the first object, the name of the first object, and/or the type of physical object) of the first object. For example, as shown in FIG. 5I, representation 596 displayed at the location of cabinet 548 indicates an object type of cabinet using text "cab." In another example, in FIG. 5K, representation 612 that is displayed at the location of TV 592 indicates the object type of TV 592 using text "TV." In some embodiments, instead of text, the representations optionally include graphics, icons, serial numbers, model number, names and/or text descriptions to indicate the object type of the identified objects. Replacing display of the first representation of the first object with display of a second representation of the first object that indicates an object type of the first object, provides improved visual feedback to the user (e.g., improved visual feedback regarding the object type of the first object).

In some embodiments, the second representation of the first object includes (720) an icon or image that does not spatially indicate the one or more spatial dimensions (e.g., does not spatially indicate any of the spatial dimensions, or does not spatially indicate at least one of the spatial dimensions) of the first object. In some embodiments, the icon or image is a schematic representation that identifies the object type of the first object but does not spatially indicate the spatial dimensions of the first object. For example, as shown in FIG. 5I, representation 596 displayed at the location of cabinet 548 indicates an object type of cabinet using text "cab." However, in some embodiments, instead of text, the representations optionally include graphics or icons that includes a schematic or stylized image of the identified object type of the identified objects (e.g., a stylized image of a cabinet, a box, or another simplified graphics that convey the object type of cabinet 548). Replacing display of the first representation of the first object with display of a second representation of the first object that includes an icon or image that does not spatially indicate the one or more spatial dimensions of the first object, provides improved visual feedback to the user (e.g., improved visual feedback, conveyed through the icon or image, regarding information other than spatial dimensions (e.g., an object type)).

In some embodiments, the second representation of the first object is (722) smaller than the first object (e.g., a footprint of the second representation of the first object is smaller in the first user interface than the footprint of the first object in the first user interface in all dimensions or is smaller in at least one dimension and is no larger than the first object in any other dimension). For example, as shown in FIG. 5I, representation 596 that indicates the object type of cabinet 548 is smaller than cabinet 548 and smaller than its corresponding spatial representation, graphical object 580. Replacing display of the first representation of the first object with display of a second representation of the first object that is smaller than the first object, provides improved visual feedback to the user (e.g., improved visual feedback, that occupies less virtual space than a full-sized representation of the first object, regarding the location and/or object type of the first object).

In some embodiments, while displaying the first user interface including the representation of the field of view of the one or more cameras and including the second representation of the first object, the computer system detects (724) first movement of the one or more cameras that changes the current viewpoint of the user from a first viewpoint to a second viewpoint. In response to detecting the first movement of the one or more cameras that changes the current viewpoint of the user from the first viewpoint to the second viewpoint, the computer system moves the second representation of the first object from a first position to a second position relative to the representation of the field of view, wherein the first position relative to the field of view and the second position relative to the field of view correspond to substantially the same location in the physical environment (e.g., the location of the first object, and/or the surface or plane that supports the first object). In some embodiments, the second representation of the first object is optionally turned to face toward the current viewpoint, as the current viewpoint is changed due to the movement of the one or more cameras in the physical environment. For example, as shown in FIG. 5P-5R, representation 596 that identify the object type of cabinet 548 is displayed at a location of cabinet 548 in camera view 524, and moves with the cabinet 548 relative to the camera view 524 while the representation of the cabinet 548 moves in accordance with the movement of viewpoint of the user (e.g., representation 596 is moved from the left side of the camera view 524 in FIG. 5P to right side of the camera view 524 in FIG. 5Q, and then to the middle of camera view 524 in FIG. 5R, as the cameras move in the physical environment and change the viewpoint of the user). Moving the second representation of the first object from a first position to a second position relative to the representation of the field of view, in response to detecting the first movement of the one or more cameras that changes the current viewpoint of the user from a first viewpoint to a second viewpoint, wherein the first position and the second position correspond to substantially the same location in the physical environment, reduces the number of inputs needed to display the second representation of the first object at the appropriate position (e.g., the user does not need to perform additional user inputs to readjust the position of the second representation of the first object, each time the user's current viewpoint changes (e.g., due to movement of the user)).

In some embodiments, while displaying the first user interface (e.g., while the scan is ongoing, not completed), in accordance with a determination that a second object different from the first object has been detected in the field of view of the one or more cameras: the computer system displays (726), at a third time (e.g., immediately after the second object is detected, and/or before the second object is recognized as an instance of a particular object type) (e.g., the third time is the same as the first time, same as the second time, or different from the first and second time), a third representation of the second object at a position in the representation of the field of view that corresponds to a location of the second object in the physical environment, wherein one or more spatial properties (e.g., size, length, height, and/or thickness) of the third representation of the second object have values that correspond to one or more spatial dimensions (e.g., size, length, height, and/or thickness) of the second object in the physical environment (e.g., the third representation of the second object include a virtual outline of the second object, a bounding box of the second object, and/or a translucent mask of the second object overlaid on a pass-through view of the second object in the representation of the field of view of the cameras (e.g., camera view, or a view through a transparent or semi-transparent display generation component)). At a fourth time later than the third time (e.g., after the object type of the second object is determined, after the second object is recognized, and/or after one or more properties of the second object other than its spatial dimensions are determined) (e.g., the fourth time is the same as the first time, same as the second time, or different from the first and second time), the computer system replaces display of the third representation of the second object with display of a fourth representation of the second object in the representation of the field of view, wherein the fourth representation of the first object does not spatially indicate (e.g., does not use spatial properties of the fourth representation of the second object to indicate) the one or more spatial dimensions (e.g., size, length, height, and/or thickness) of the second object in the physical environment. For example, as shown in FIGS. 5J-5M, after graphical object 580 and representation 596 have been displayed for cabinet 548, device 100 detects stool 546 in the field of view of the cameras and displays graphical object 590 at a location of stool 546 to spatially indicate spatial dimensions of stool 546 (e.g., as shown in FIGS. 5J and 5K); and later stool 546 is identified by device 100, and device 100 displays representation 614 at the location of stool 546 to replace graphical object 590 (as shown in FIGS. 5L-5M). For example, in some embodiments, the fourth representation of the second object is an icon that graphically and/or schematically specifying the object type of the second object. In some embodiments, the fourth representation of the second object is a textual label specifying the object type, name, and/or model number of the second object. In some embodiments, the second object is an object (e.g., a non-structural element, such as a lamp, furniture, and/or smart home devices) that is distinct from any of the structural elements (e.g., walls, ceiling, floor, door, and/or window) in the physical environment. In some embodiments, the fourth representation of the second object occupies a much smaller region in the representation of the field of view than the second object and the third representation of the second object. In some embodiments, the fourth representation of the second object creates less visual clutter in the field of view of the one or more cameras as compared to the third representation of the second object. In some embodiments, the fourth representation of the second object indicates one or more spatial dimensions of the second object using non-spatial properties of the representation, such as textual content (e.g., Table-medium, or Bed-King), numerical values (e.g., 32×22×50 inches, or 20 cm dia.), descriptors (e.g., largest, smallest, medium, large, and/or XXL) that do not spatially indicate the one or more spatial dimensions of the second object in the physical environment. In some embodiments, the first representation of the first object and the third representation of the second object are concurrently displayed in the first user interface. In some embodiments, the first representation of the first object and the fourth representation of the second object are concurrently displayed in the first user interface. In some embodiments, the second representation of the first object and the third representation of the second object are concurrently displayed in the first user interface. In some embodiments, the second representation of the first object and the fourth representation of the second object are concurrently displayed in the first user interface. In some embodiments, at a given moment in time, the representation of the field of view of the cameras is optionally concurrently overlaid with detailed graphical objects that spatially indicate spatial dimensions of one or more detected objects and schematical representations that do not spatially indicate spatial dimensions of one or more identified objects. In some embodiments, at a given moment in time, the representation of the field of view of the cameras is overlaid with one or more first detailed graphical object that spatially indicates spatial dimensions of one or more detected objects and one or more first schematic objects that do not spatially indicate spatial dimensions of one or more identified objects, where at least one of the first detailed graphical objects was initially displayed earlier than at least one of the first schematic objects, and/or wherein at least one of the first detailed graphical objects was initially displayed later than at least one of the first schematic objects. Displaying, at a third time, a third representation of the second object at a position in the representation of the field of view that corresponds to a location of the second object in the physical environment, wherein one or more spatial properties of the third representation of the second object have values that correspond to one or more spatial dimensions of the second object in the physical environment, and replacing display of the third representation of the second object with display of a fourth representation of the second object in the representation of the field of view at a fourth time later than the third time, wherein the fourth representation of the first object does not spatially indicate the one or more spatial dimensions of the second object in the physical environment, provides improved visual feedback to the user (e.g., improved visual feedback regarding the position of the second object, without indicating one or more spatial dimension of the second object).

In some embodiments, the second representation of the first object and the fourth representation of the second object have the same appearance (e.g., the same icon or label is used by the computer system) if the first object and the second object are of the same object type (e.g., are different instances of the same object type). For example, if there is another cabinet in room 520, after both cabinets in room 520 are detected and identified, a representation that has the same appearance as representation 596 would be displayed at the location of the second cabinet in camera view 524. In another example, if stool 546 were another cabinet, after the second cabinet is identified, representation 614 displayed in FIG. 5M would have the same appearance as representation 596, because both would be representing cabinets and indicating the object type of the detected objects as "cabinet." In some example scenarios, the second representation of the first object and the fourth representation of the second object are concurrently displayed in the representation of the field of view (e.g., both objects are identified and both objects are in the field of view at the same time). Displaying the second representation of the first object and the fourth representation of the second object with the same appearance, if the first object and the second object are of the same object type, provides improved visual feedback (e.g., objects of the same type are displayed with the same appearance, making it easier to identify object of that object type).

In some embodiments, the second representation of the first object and the fourth representation of the second object have (730) different appearances (e.g., different icons or labels are used by the computer system) if the first object and the second object are of different object types (e.g., are not different instances of the same object type). For example, as shown in FIG. 5M, representation 596 indicating the object type of cabinet 548 and representation 614 indicating the object type of stool 546 have different appearances in camera view 524. In some example scenarios, the second representation of the first object and the fourth representation of the second object are concurrently displayed in the representation of the field of view (e.g., both objects are identified and both objects are in the field of view at the same time). Displaying the second representation of the first object and the fourth representation of the second object with the different appearance, if the first object and the second object are of different object types, provides improved visual feedback (e.g., improved visual feedback regarding the object type of the first object and the second object).

In some embodiments, while displaying the first user interface including the representation of the field of view of the one or more cameras and including the fourth representation of the second object, the computer system detects (732) second movement of the one or more cameras that changes the current viewpoint of the user from a third viewpoint to a fourth viewpoint (e.g., the third viewpoint is same as the first viewpoint and the fourth viewpoint is the same as the second viewpoint, or the third viewpoint is different from the first viewpoint and the fourth viewpoint is different from the second viewpoint). In response to detecting the second movement of the one or more cameras that changes the current viewpoint of the user from the third viewpoint to the fourth viewpoint, the computer system moves the fourth representation of the second object from a third position to a fourth position relative to the representation of the field of view, wherein the third position relative to the field of view and the fourth position relative to the field of view correspond to substantially the same location in the physical environment (e.g., the location of the second object, and/or the surface or plane that supports the second object). In some embodiments, the fourth representation of the second object is optionally turned to face toward the current viewpoint, as the current viewpoint is changed due to the movement of the one or more cameras in the physical environment. For example, as shown in FIG. 5P-5R, representation 614 that identify the object type of stool 546 is displayed at a location of stool 546 in camera view 524, and moves with the stool 546 relative to the camera view 524 while the representation of the stool 546 moves in accordance with the movement of viewpoint of the user (e.g., representation 614 is moved from the left side of the camera view 524 in FIG. 5P to right side of the camera view 524 in FIG. 5Q, and then to the bottom right of camera view 524 in FIG. 5R, as the cameras move in the physical environment and change the viewpoint of the user). Moving the fourth representation of the second object from a third position to a fourth position relative to the representation of the field of view, in response to detecting the second movement of the one or more cameras that changes the current viewpoint of the user from a third viewpoint to a fourth viewpoint, wherein the third position and the fourth position correspond to substantially the same location in the physical environment, reduces the number of inputs needed to display the fourth representation of the second object at the appropriate position (e.g., the user does not need to perform additional user inputs to readjust the position of the fourth representation of the second object, each time the user's current viewpoint changes (e.g., due to movement of the user and/or the one or more cameras)).

In some embodiments, the second representation of the first object changes (734) its orientation during movement of the one or more cameras that changes the current viewpoint of the user (e.g., the second representation of the first object turns and/or translates relative to the representation of the field of view during the movement of the cameras that cause the pass-through view of the first object to shift in the representation of the field of view, so that the second representation of the first object is anchored to the pass-through view of the first object and continues to face toward the current viewpoint as the current viewpoint of the user changes in the physical environment). For example, as shown in FIGS. 5P-5R, representation 614 that identify the object type of stool 546 is displayed at a location of stool 546 in camera view 524, and moves with the stool 546 relative to the camera view 524 while the representation of the stool 546 moves in accordance with the movement of viewpoint of the user (e.g., representation 614 is moved from the left side of the camera view 524 in FIG. 5P to right side of the camera view 524 in FIG. 5Q, and then to the bottom right of camera view 524 in FIG. 5R, as the cameras move in the physical environment and change the viewpoint of the user), and the orientation of representation 614 is continuously updated such that it continues to face toward the viewpoint of the user (as shown in FIGS. 5P-5Q). Changing the orientation of the second representation of the first object during movement of the one or more cameras that changes the current viewpoint of the user, reduces the number of inputs needed to display the second representation of the first object with the appropriate orientation (e.g., the user does not need to perform additional user inputs to adjust the orientation of the second representation of the first object each time the user's current viewpoint changes (e.g., due to movement of the user and/or the one or more cameras)).

In some embodiments, the first user interface concurrently includes (736) the representation of the field of view and respective representations of a plurality of objects that are detected in the physical environment, the respective representations of the plurality of objects do not spatially indicate respective physical dimensions of the plurality of objects, and the respective representations of the plurality of objects change their respective orientations to face toward the current viewpoint of the user during movement of the one or more cameras that changes the current viewpoint of the user. For example, as shown in FIGS. 5P-5R, representation 614 that identify the object type of stool 546 is displayed at a location of stool 546 in camera view 524, and moves with the stool 546 relative to the camera view 524 while the representation of the stool 546 moves in accordance with the movement of viewpoint of the user (e.g., representation 614 is moved from the left side of the camera view 524 in FIG. 5P to right side of the camera view 524 in FIG. 5Q, and then to the bottom right of camera view 524 in FIG. 5R, as the cameras move in the physical environment and change the viewpoint of the user), and the orientation of representation 614 is continuously updated such that it continues to face toward the viewpoint of the user (as shown in FIGS. 5P-5Q). Furthermore, representation 596 that identify the object type of cabinet 548 is displayed at a location of cabinet 548 in camera view 524, and moves with the cabinet 548 relative to the camera view 524 while the representation of the cabinet 548 moves in accordance with the movement of viewpoint of the user (e.g., representation 596 is moved from the left side of the camera view 524 in FIG. 5P to right side of the camera view 524 in FIG. 5Q, and then to the middle of camera view 524 in FIG. 5R, as the cameras move in the physical environment and change the viewpoint of the user). In FIGS. 5P-5R, both representation 614 and representation 596 turns to face toward the current viewpoint of the user, as the cameras move to change the viewpoint of the user. In some embodiments, the respective representations of the objects in the field of view rotate and translate by different amounts due to the movement of the current viewpoint, so that the respective representations of the objects are respectively anchored to the pass-through view of their corresponding objects and continue to face toward the current viewpoint as the current viewpoint of the user changes in the physical environment. Changing the respective orientations of the plurality of objects during movement of the one or more cameras that changes the current viewpoint of the user, reduces the number of inputs needed to display the representation of the plurality of objects with the appropriate orientations (e.g., the user does not need to perform additional user inputs to adjust the orientation of each representation of the respective representations of the plurality of objects each time the user's current viewpoint changes (e.g., due to movement of the user and/or the one or more cameras)).

It should be understood that the particular order in which the operations in FIGS. 7A-7D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 650, 800, and 900) are also applicable in an analogous manner to method 700 described above with respect to FIGS. 7A-7D. For example, the user interfaces, user interface elements, physical environments and features and objects therein, feature types, guides, animations, and annotations described above with reference to method 700 optionally have one or more of the characteristics of the user interfaces, user interface elements, physical environments and features and objects therein, feature types, guides, animations, and annotations described herein with reference to other methods described herein (e.g., methods 650, 800, and 900). For brevity, these details are not repeated here.

FIGS. 8A-8D are flow diagrams of a method 800 of providing guidance indicating location of a missed portion of a presumably completed portion of an environment during scanning and modeling of the environment, in accordance with some embodiments. Method 800 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1000 are, optionally, combined and/or the order of some operations is, optionally, changed.

As described below, the method 800 is a method of providing guidance indicating location of a missed portion of a presumably completed portion of an environment during scanning and modeling of the environment. By indicating locations of missed portions of the environment during scanning and modeling of the environment, the computer system improves the efficiency of the scan. For example, the computer system can alert the user as soon as the missed portion is detected, so the user can scan the missed portion. This prevents the user from changing locations (e.g., moving away from the missed portion to scan further portions of the environment), and later having to return to the original location to scan the missed portion.

In the method 800, during a scan of a physical environment to obtain depth information of at least a portion of the physical environment (e.g., wherein the depth information of objects and surfaces in the physical environment are obtained during the scan and is used to generate a three-dimensional model of the physical environment, optionally, in real-time during the scan) (802): the computer system displays (804), via the display generation component, a first user interface (e.g., a scan user interface that is displayed to show progress of an initial scan of a physical environment to build a three-dimensional model of the physical environment, a camera user interface, and/or a user interface that is displayed in response to a user's request to perform a scan of a physical environment or to start an augmented reality session in a physical environment), wherein the first user interface includes a representation of a field of view of one or more cameras (e.g., images or video of a live feed from the camera(s), or a view of the physical environment through a transparent or semitransparent display), the representation of the field of view including a respective view of a physical environment that corresponds to a current viewpoint of a user in the physical environment (e.g., the current viewpoint of the user corresponds to a direction, position and/or vantage point from which the physical environment is being viewed by the user either via a head mounted XR device or via a handheld device such as a smartphone or tablet that displays a representation of the field of view of the one or more cameras on a display of the handheld device for a handheld device, the viewpoint of the handheld device is a proxy for the viewpoint of the user and shifting the handheld device in the physical environment shifts the viewpoint of the user). In some embodiments, the first user interface further includes a preview of a three-dimensional model of the physical environment that is being generated based on the depth information captured by the one or more cameras. For example, as shown in FIGS. 5E-5R, user interface 522 is displayed and includes camera view 524 of room 520. In the method 800, while displaying the first user interface (e.g., while the scan is ongoing, and/or not completed), the computer system detects (806) movement of the one or more cameras in the physical environment, including detecting first movement that changes the current viewpoint of the user from a first viewpoint in the physical environment to a second viewpoint (e.g., the first movement includes translation from a first location to a second location distinct from the first location, away from the first location, and/or not on a looped path that starts from or passes the first location; and/or the first movement includes panning left and/or right at a fixed location) in the physical environment (e.g., including back and forth movement between the first location and the second location, including a single pass movement between the first location and the second location). For example, in FIGS. 5H and 5I, the cameras moved in room 520 causing the viewpoint to change from a first viewpoint to a second viewpoint. In some embodiments, the first movement is not required for triggering display of the first visual indication (described below) that prompts the user to rescan a missed portion of the physical environment between two portions of the physical environment that have been scanned (e.g., camera moved passed the portion but did not obtain sufficient depth information for that portion of the environment).

In the method 800, in response to detecting the movement of the one or more cameras in the physical environment that includes the first movement that changes the current viewpoint of the user from the first viewpoint in the physical environment to the second viewpoint in the physical environment, in accordance with a determination that there is a respective portion of the physical environment that has not been scanned (e.g., depth information is not sufficiently obtained by the cameras for the respective portion of the physical environment) that is between a first portion of the physical environment that has been scanned and a second portion of the physical environment that has been scanned (808) (e.g., the respective portion of the physical environment is passed by the cameras and presumably scanned by the user from the current viewpoint of the user, but the obtained depth information is not sufficient to generate a model of the respective portion of the environment due to occlusion by another object or structural elements in the first portion, the second portion, and/or the respective portion of the physical environment from the current viewpoint(s) of the user during the scan), the computer system displays (810), in the first user interface (e.g., while the scan is ongoing, and/or not completed), a first visual indication overlaying the representation of the field of view of the one or more cameras (e.g., next to a detected wall, a detected object, and/or a detected doorway in the field of view), wherein the first visual indication indicates a location of the respective portion of the physical environment in the field of view of the one or more cameras (e.g., the visual indication is an arrow pointing toward the direction of the respective portion of the physical environment, a textual prompt of how to get to the respective portion of the physical environment from the current location, and/or a visual description of how to get the respective portion of the physical environment into the field of view), while the respective portion of the physical environment is not visible in representation of the field of view of the one or more cameras (e.g., while the respective portion of the physical environment is visually obscured by the objects and surfaces in the portion of the physical environment that is currently in the field of view; or while the respective portion of the physical environment is completely outside of the region of the physical environment that is facing the one or more cameras). For example, as shown in FIG. 5J, after moving the one or more cameras and changing the viewpoint of the user from a first viewpoint (e.g., as shown in FIG. 5H) to a second viewpoint (e.g., as shown in FIG. 5I), device 100 determines that a portion of wall 530 that is visually occluded by cabinet 548 (e.g., as shown in FIGS. 5H and 5I) has not been scanned during the scanning of a first portion of room 520 (e.g., as shown in FIGS. 5E-5H) and the scanning of the second portion of room 520 (e.g., as shown in Figure I); and in response, device 100 displays object 604 to indicate the location of the missed portion of wall 530 and the region in front of it, so that the user can locate and scan the missed portion of room 520.

In some embodiments, the determination that there is a respective portion of the physical environment that has not been scanned that is between a first portion of the physical environment that has been scanned and a second portion of the physical environment that has been scanned includes (812): a determination that first depth information that has been obtained during the first movement of the one or more cameras meets first criteria with respect to the first portion of the physical environment (e.g., a portion of the environment in the field of view corresponding to the first viewpoint) and the second portion of the physical environment (e.g., a portion of the environment corresponding to the second viewpoint). For example, in some embodiments, the first criteria include requirements for the amount and accuracy of depth information obtained in order to generate a three-dimensional model of a scanned portion of the physical environment.

In some embodiments, when the obtained depth information for a portion of the physical environment meets the first criteria, the scan for that portion of the physical environment is considered completed. In some embodiments, the determination that there is a respective portion of the physical environment that has not been scanned that is between a first portion of the physical environment that has been scanned and a second portion of the physical environment that has been scanned further includes (812): a determination that the first depth information indicates existence of a third portion of the physical environment between the first portion and the second portion of the physical environment. For example, the existence of a gap in the scan is predicted when there is sufficient data to generate a first portion of the model for the first portion of the physical environment and a second portion of the model for the second portion of the physical environment, but the first portion and the second portion of the model cannot be joined correctly, smoothly, and/or logically based on the scanned depth data. For example, the existence of a gap in the scan is predicted in accordance with a determination that the third portion of the physical environment entered into the field of view after the first portion of the physical environment had entered the field of view and the that the third portion of the physical environment had exited the field of view before the second portion of the physical environment exited the field of view. For example, the existence of a gap in the scan between the first portion of the physical environment and the second portion of the physical environment is determined in accordance with a determination that the cameras moved passed the first portion of the physical environment, followed by the third portion of the physical environment, and then followed by the second portion of the physical environment.

In some embodiments, the determination that there is a respective portion of the physical environment that has not been scanned that is between a first portion of the physical environment that has been scanned and a second portion of the physical environment that has been scanned further includes (812): a determination that depth information that has been obtained during the scan (e.g., during the first movement of the one or more cameras, or during all prior movement of the cameras during the scan) does not meet the first criteria with respect to the third portion of the physical environment. For example, in some embodiments, the existence of a gap in the scan is predicted when there is insufficient data to generate a third portion of the model for the third portion of the physical environment that can join the first portion and the second portion of the model correctly, smoothly, and/or logically. For example, in some embodiments, the existence of the gap in the scan is predicted when there is insufficient data to generate the third portion of the model for the third portion of the physical environment to a preset degree of accuracy, particularly when some depth data for the third portion of the physical environment has been obtained when the one or more cameras moved past the third portion of the physical environment during the scan (e.g., during the first movement of the one or more cameras, or during all prior movements of the cameras during the scan). For example, in FIGS. 5H-5J, device first scans a first portion of room 520 (e.g., as shown in FIG. 5H) and generates a model for the first portion of room 520; after the scan of the first portion of room 520 is completed and the user moves the cameras to scan a second portion of room 520 (e.g., as shown in FIG. 5I); after at least some portion of the second portion of room 520 has been modeled, device 100 determines that there is a missing portion between the first portion of room 520 and the second portion of room 520 (e.g., because the two portions of room 520 as modeled by device 100 cannot be joined satisfactorily); and as a result of these determination, device 100 displays objects 604 and object 606 to indicate the location of the missed portion of room 520 in the already scanned first portion of room 520. When the objects 604 and 606 are displayed, as shown in FIG. 5J, the missed portion of room 520 is not visible in the camera view 524.

Displaying a first visual indication overlaying the representation of the field of view of the one or more cameras, that indicates a location of a third portion of the physical environment in the field of view of the one or more cameras, in accordance with a determination that the first depth information indicates existence of a third portion of the physical environment between the first portion and the second portion of the physical environment, and a determination that depth information that has been obtained during the scan does not meet the first criteria with respect to the third portion of the physical environment, provides improved visual feedback to the user (e.g., improved visual feedback regarding the location of the third portion of the physical environment, and/or improved visual feedback that the obtained depth information does not meet the first criteria with respect to the third portion of the physical environment).

In some embodiments, the first visual indication overlaying the representation of the field of view of the one or more cameras includes (814) an graphical objects (e.g., an arrow, a pointer, or another analogous user interface object) that points out a direction of the location of the respective portion of the physical environment relative to other objects in the field of view of the one or more cameras (e.g., the respective portion of the physical environment is not visible in the field of view, hidden behind other objects in the field of view). For example, as shown in FIG. 5J, the object 604 that points the direction of the missed portion of room 520 is an arrow that points toward the portion of wall 530 that is visually obscured by cabinet 548 in camera view 524. In some embodiments, the first visual indication includes an arrow that points toward the location of the respective portion of the physical environment. In some embodiments, the first visual indication includes an arrow that points toward the location of the respective portion of the physical environment. In some embodiments, the first visual indication is a pointer (e.g., a finger, a moving triangle, or another analogous user interface object) that points toward the location of the respective portion of the physical environment. Displaying a first visual indication that includes an graphical objects that points out a direction of the location of the respective portion of the physical environment relative to other objects in the field of view of the one or more cameras and that indicates a location of a respective portion of the physical environment in the field of view of the one or more cameras, in accordance with a determination that the respective portion of the physical environment has not been scanned, provides improved visual feedback to the user (e.g., improved visual feedback regarding the location of the respective portion of the physical environment, and/or improved visual feedback that the respective portion of the physical environment has not been scanned).

In some embodiments, in response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, the computer system displays (816), in the first user interface (e.g., while the scan is ongoing, not completed), a second visual indication in a preview of a three-dimensional model of the physical environment (e.g., next to a model of a detected wall, a detected object, and/or a detected doorway in the preview of the three-dimensional model of the physical environment that is concurrently displayed with the representation of the field of view in the first user interface), wherein the second visual indication indicates the location of the respective portion of the physical environment in the preview of the three-dimensional model (e.g., the second visual indication is an arrow pointing toward the direction of the respective portion of the physical environment in the preview of the three-dimensional model of the physical environment, and/or a dot at a location to gain better view of the respective portion of the physical environment in the preview of the three-dimensional model of the physical environment). For example, as shown in FIG. 5J, in addition to displaying object 604 in camera view 524 in response to determining that there is a missed portion of room in the already scanned first portion of room 520, device 100 also displays object 608 in the partially completed model of room 520 in preview 568, to indicate the location of the missed portion of room 520 that needs to be scanned. Displaying a second visual indication in a preview of a three-dimensional model of the physical environment, wherein the second visual indication indicates the location of the respective portion of the physical environment in the preview of the three-dimensional model, in accordance with the determination that the respective portion of the physical environment that has not been scanned, provides improved visual feedback to the user (e.g., improved visual feedback regarding the location of the respective portion of the physical environment, and/or improved visual feedback that the respective portion of the physical environment has not been scanned).

In some embodiments, the first visual indication and the second visual indication are (818) concurrently displayed in the first user interface. For example, as shown in FIG. 5J, object 604 and object 608 respectively indicate the location of the missed portion of room 520 in camera view 524 and in preview 568, where camera view 524 and preview 568 are both included in user interface 522. Displaying a second visual indication that indicates the location of the respective portion of the physical environment in a preview of the three-dimensional model, and displaying a first visual indication that indicates a location of the respective portion of the physical environment in the field of view of one or more cameras, overlaying a representation of the field of view of the one or more cameras, in accordance with the determination that the respective portion of the physical environment that has not been scanned, provides improved visual feedback to the user (e.g., improved visual feedback regarding the location of the respective portion of the physical environment, and/or improved visual feedback that the respective portion of the physical environment has not been scanned), and reduces the number of inputs needed to identify the respective portion of the physical environment in the preview of the three-dimensional model and/or representation of the field of view of the one or more cameras (e.g., if the computer system displays the first visual indication in the representation of the field of view of the one or more cameras, the user does not need to perform additional user inputs to manually add the second visual indication in the preview of the three-dimensional model).

In some embodiments, displaying the first visual indication overlaying the representation of the field of view of the one or more cameras includes (820) animating the first visual indication with movements that are independent of movement of the field of view of the one or more cameras. For example, object 604 displayed in FIGS. 5J and 5Q are animated to move in a manner that points out the location of the missed portion of wall 530, while the camera view 524 is updated based on movement of the one or more cameras. In some embodiments, displaying the second visual indication overlaying the preview of the three-dimensional model of the physical environment includes animating the second visual indication with movements that are independent of movement of the partially completed three-dimensional model of the one or more cameras. In some embodiments, the animation of the first and/or second visual indication(s) draw attention of the user toward the visual indication(s) and the location of the respective portion of the physical environment in the representation of the field of view and/or in the preview of the three-dimensional model. Displaying a first visual indication that indicates a location of a third portion of the physical environment in the field of view of one or more cameras, and that is animated with movement that are independent of movement of the field of view of the one or more cameras, overlaying a representation of the field of view of the one or more cameras, in accordance with a determination that the respective portion of the physical environment has not been scanned, provides improved visual feedback to the user (e.g., improved visual feedback regarding the location of the respective portion of the physical environment, that draws the user's attention with animated movement).

In some embodiments, displaying the first visual indication overlaying the representation of the field of view of the one or more cameras includes (822) displaying the first visual indication at a respective position overlaying the representation of the field of view, wherein the respective position corresponds to a respective depth of the respective portion of the physical environment from the second viewpoint in the physical environment. For example, as shown in FIGS. 5P and 5Q, object 604 is displayed at a first depth relative to camera view 524 to indicate that the depth of the missed portion of wall 530 is the first depth in camera view 524 (e.g., as shown in FIG. 5P); and object 604 is displayed at a second depth relative to camera view 524 to indicate that the depth of the missed portion of wall 530 is the second depth in camera view 524 (e.g., as shown in FIG. 5Q), wherein the depth of the missed portion of wall 530 changed due to the movement of the one or more cameras. For example, in some embodiments, the respective position of the first visual indication corresponds to a location in the physical environment that is substantially the same depth/distance away from the user as the respective portion of the physical environment that needs to be rescanned. Displaying the first visual indication overlaying the representation of the field of view of the one or more cameras, including displaying the first visual indication at a respective position overlaying the representation of the field of view, and that corresponds to a respective depth of the respective portion of the physical environment from the second viewpoint in the physical environment, provides improved visual feedback to the user (e.g., improved visual feedback conveying depth information to the user).

In some embodiments, the computer system scans (824) the first portion of the physical environment during a first period of time to obtain respective depth information corresponding to the first portion of the physical environment; and the computer system scans the second portion of the physical environment during a second period of time after the first period of time to obtain respective depth information corresponding to the second portion of the physical environment, wherein the first visual indication overlaying the representation of the field of view is displayed after scanning the first portion of the physical environment and scanning the second portion of the physical environment. For example, in FIGS. 5H-5J, object 604 is displayed to indicate the missed (e.g., unscanned) portion of wall 530 in a first portion of room 520 (e.g., as shown in FIG. 5J), after the first portion of room 520 is scanned (e.g., as shown in FIG. 5H) and after the second portion of room 520 is scanned (e.g., as shown in FIG. 5I) (e.g., at least the left portion of the wall 532 is scanned in FIG. 5I). For example, the first visual indication is displayed after the user has presumably finished scanning the first portion of the physical environment, the respective portion of the physical environment, and the second portion of the physical environment. In other words, the first visual indication is displayed after the computer system determines that the user has finished scanning the respective portion of the physical environment and moved on to the next portion of the physical environment and requests to the user to rescan the respective portion of the physical environment, as opposed to prompting the user to keep going forward to scan a new, unscanned portion of the physical environment, or to return to an origin of the scan after scanning additional portions of the physical environment to complete a scan loop around the whole physical environment. Displaying a first visual indication that indicates a location of a third portion of the physical environment in the field of view of one or more cameras, overlaying the representation of the field of view of the one or more cameras, in accordance with the determination that the respective portion of the physical environment that is between the first portion of the physical environment and the second portion of the physical environment has not been scanned, and after scanning the first portion of the physical environment and scanning the second portion of the physical environment, reduces the amount of time needed to accurately scan the physical environment and/or the amount of user movement needed to completely scan the physical environment (e.g., the computer system displays the first visual indication after the first and second portions of the physical environment are scanned, so the user is immediately alerted to re-scan the third portion of the physical environment (e.g., without proceeding with scanning new, unscanned portions of the physical environment, different from the first, second, and third portions of the physical environment, which would require the user to later return to an earlier position where the user scanned the first and second portions of the physical environment)).

In some embodiments, displaying the first visual indication includes (826): displaying the first graphical object at a first position relative to the representation of the field of view, wherein the first position corresponds to a first spatial region at a first depth from a current viewpoint of the user in the physical environment; and forgoing display of a respective portion of the first graphical object in accordance with a determination that a respective portion of the first spatial region is behind a first physical feature (e.g., a wall, a corner of a wall, a structural element, or a non-structural element of the physical environment) that is currently visible in the representation of the field of view of the one or more cameras, relative to the current viewpoint of the user in the physical environment. For example, as shown in FIGS. 5J and 5Q, if the display location of object 604 would not be visually occluded by other objects in the camera view 524, object 604 is fully displayed (e.g., as shown in FIG. 5J); and if due to the movement of the cameras and change in the viewpoint of the user, the intended displayed location of object 604 would be at least partially occluded by other objects in the camera view, object 604 is displayed in a manner as if it is visually occluded by the object(s) (e.g., as shown in FIG. 5Q, the tip of object 604 is not shown, and appears to be blocked by cabinet 548 in camera view 524). For example, when the field of view moves with the movement of the one or more cameras, the arrow that points out the missed portion of the physical environment may be visually occluded by one or more objects and/or structural features that are visible in the current field of view and may become visible again when the field of view continues to move. Forgoing display of a respective portion of the first graphical object in accordance with a determination that a respective portion of the first spatial region is behind a first physical feature that is currently visible in the representation of the field of view of the one or more cameras, relative to the current viewpoint of the user in the physical environment, reduces the number of inputs needed to display an appropriate representation of the field of view (e.g., the user does not need to perform additional user inputs to cease display of the first graphical object (or a portion of the first graphical object), to prevent the first graphical object from obscuring or occluding the first physical feature in the representation of the field of view, when the first graphical object is behind the first physical feature).

In some embodiments, in response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, the computer system displays (828), in the first user interface (e.g., while the scan is ongoing, and/or not completed), a third visual indication overlaying the representation of the field of view of the one or more cameras (e.g., next to a detected wall, a detected object, and/or a detected doorway in the field of view), wherein the third visual indication indicates a location from which the respective portion of the physical environment will become visible in the field of view of the one or more cameras (e.g., the visual indication is a dot overlaying a representation of a location on the floor, where if the user stands at that location and look in the direction specified by the first visual indication, the respective portion of the physical environment would be in the field of view of the one or more cameras). For example, as shown in FIG. 5J, in response to determining that there is a missing portion of wall 530 in the already scanned first portion of room 520, device 100 displays object 606 at a location in camera view 524 to indicate the location in the physical environment from which the missed portion of wall 530 would become visible in the camera view 524. Displaying a third visual indication that indicates a location from which the respective portion of the physical environment will become visible in the field of view of the one or more cameras, overlaying the representation of the field of view of the one or more cameras, in accordance with the determination that the respective portion of the physical environment has not been scanned, provides improved visual feedback to the user (e.g., improved visual feedback regarding the location where the respective portion of the physical environment can be scanned) and reduces amount of movement needed to complete the scan of the physical environment (e.g., the user does not need to move to different locations in the physical environment to first determine if the respective portion of the physical environment can be scanned from a particular location).

In some embodiments, in response to detecting the movement of the one or more cameras in the physical environment that includes the first movement that changes the current viewpoint of the user from the first viewpoint in the physical environment to the second viewpoint in the physical environment, in accordance with the determination that there is a respective portion of the physical environment that has not been scanned that is between a first portion of the physical environment that has been scanned and a second portion of the physical environment that has been scanned, the computer system displays (830), in the first user interface (e.g., while the scan is ongoing, and/or not completed), a fourth visual indication in a preview of a three-dimensional model of the physical environment (e.g., next to a model of a detected wall, a detected object, and/or a detected doorway in the preview of the three-dimensional model of the physical environment that is concurrently displayed with the representation of the field of view in the first user interface), wherein the fourth visual indication indicates, in the preview of the three-dimensional model, a location from which the respective portion of the physical environment will become visible in the field of view of the one or more cameras (e.g., the visual indication is a dot overlaying a representation of a location on the floor, where if the user stands at that location and look in the direction specified by the first visual indication, the respective portion of the physical environment would be in the field of view of the one or more cameras). For example, as shown in FIG. 5J, in response to determining that there is a missing portion of wall 530 in the already scanned first portion of room 520, device 100 displays object 610 at a location in the partially completed model in preview 568 to indicate the location in the physical environment from which the missed portion of wall 530 would become visible in the camera view 524. Displaying a fourth visual indication that indicates a location from which the respective portion of the physical environment will become visible in the field of view of the one or more cameras, in the preview of a three-dimensional model of the physical environment, in accordance with the determination that the respective portion of the physical environment has not been scanned, provides improved visual feedback to the user (e.g., improved visual feedback regarding the location where the respective portion of the physical environment can be scanned) and reduces amount of movement needed to complete the scan of the physical environment (e.g., the user does not need to move to different locations in the physical environment to first determine if the respective portion of the physical environment can be scanned from a particular location).

In some embodiments, the third visual indication and the fourth visual indication are (832) concurrently displayed in the first user interface. For example, as shown in FIG. 5J, objects 608 and 610 are concurrently displayed in the partially completed model of room 520 in preview 568. For example, in some embodiments, the computer system displays, via the display generation component, a dot overlaying the representation of the field of view and a dot overlaying the preview of the three-dimensional model of the physical environment, where the dot overlaying the representation of the field of view and the dot overlaying the preview of the three-dimensional model are both displayed at respective positions (e.g., in the field of view, and in the preview of the model, respectively) that correspond to the physical location from which the respective portion of the physical environment that needs to be rescanned would become visible in the field of view of the one or more cameras. Displaying a third visual indication that indicates a location from which the respective portion of the physical environment will become visible in the field of view of the one or more cameras, overlaying the representation of the field of view of the one or more cameras, and displaying a fourth visual indication that indicates a location from which the respective portion of the physical environment will become visible in the field of view of the one or more cameras, in the preview of a three-dimensional model of the physical environment, in accordance with the determination that the respective portion of the physical environment has not been scanned, provides improved visual feedback to the user (e.g., improved visual feedback regarding the location where the respective portion of the physical environment can be scanned) and reduces amount of movement needed to complete the scan of the physical environment (e.g., the user does not need to move to different locations in the physical environment to first determine if the respective portion of the physical environment can be scanned from a particular location), and reduces the number of inputs needed to identify the location from which the respective portion of the physical environment will become visible in the representation of the field of view of the one or more cameras and/or in the preview of the three-dimensional model (e.g., if the computer system displays the third visual indication in the representation of the field of view of the one or more cameras, the user does not need to perform additional user inputs to manually add the fourth visual indication in the preview of the three-dimensional model).

In some embodiments, in response to detecting the movement of the one or more cameras in the physical environment that includes the first movement that changes the current viewpoint of the user from the first viewpoint in the physical environment to the second viewpoint in the physical environment, in accordance with the determination that there is a portion of the physical environment that has not been scanned that is between a first portion of the physical environment that has been scanned and a second portion of the physical environment that has been scanned, the computer system displays (834), in the first user interface (e.g., while the scan is ongoing, and/or not completed), one or more prompts (e.g., textual banners, pop-up windows, and/or another analogous user interface object) that guide a user to move to a location from which the respective portion of the physical environment will become visible in the field of view of the one or more cameras (e.g., the location that is indicated by the dots shown in the field of view and the preview of the three-dimensional model). For example, in FIGS. 5J and 5Q, device 100 displays banner 602 that includes prompts (e.g., "Scan the missed spot" and "Move forward and face left") to guide the user to move to a location from which the missed portion of wall 530 would become visible in camera view 524, so that the user can scan that missed portion of wall 530 and the region in front of it. In some embodiments, the third visual indication displayed in the preview of the three-dimensional model remains displayed when the first visual indication displayed in the representation of the field of view are no longer displayed (e.g., due to the movement of the field of view), and the prompts help to guide the user to the location from which to scan the missed portion of the physical environment without the aid of the first visual indication. In some embodiments, the one or more prompts include a prompt for the user to move farther away from the current portion of the physical environment that is in the field of view of the one or more cameras, a prompt for the user to keep moving the one or more cameras in a current direction of the movement of the one or more cameras, a prompt for the user to search for and include a plane in the physical environment in the field of view of the one or more cameras, a prompt for the user to bring the floor into the field of view of the one or more cameras, a prompt for the user to bring the ceiling into the field of view of the one or more cameras, and/or a prompt to move closer toward the current portion of the physical environment that is in the field of view of the one or more cameras. In some embodiments, these prompts are displayed to guide to the user to scan new, unscanned portion of the physical environment, as well as missed, and/or scanned portion of the physical environment that need to be rescanned. Displaying one or more prompts that guide a user to move to a location from which a portion of the physical environment will become visible in the field of view of the one or more cameras, in accordance with the determination that the portion of the physical environment has not been scanned, provides improved visual feedback to the user (e.g., improved visual feedback regarding the location where the respective portion of the physical environment can be scanned).

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 650, 700, and 900) are also applicable in an analogous manner to method 800 described above with respect to FIGS. 8A-8D. For example, the user interfaces, user interface elements, physical environments and features and objects therein, feature types, guides, animations, and annotations described above with reference to method 800 optionally have one or more of the characteristics of the described herein with reference to other methods described herein (e.g., methods 650, 700, and 900). For brevity, these details are not repeated here.

FIGS. 9A-9E are flow diagrams of a method 900 of displaying scan progress indication during scanning and modeling of an environment, in accordance with some embodiments. Method 900 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1100 are, optionally, combined and/or the order of some operations is, optionally, changed.

As described below, the method 900 is a method of displaying scan progress indication during scanning and modeling of an environment, and indicating one or more estimated spatial properties, along with a predicted accuracy of the estimated spatial properties, of a detected physical feature. By providing progress indication during scanning and modeling, the computer system makes it easy for a user of the computer system to identify when a scan is complete or incomplete. This helps reduce mistakes made during scanning, resulting from a user from changing the field of view of one or more cameras of the computer system (e.g., away from an object being scanned) before the scan finishes. This also provides improved visual feedback to the user (e.g., improved visual feedback regarding detected physical features, scan progress of the detected physical features, and predicted accuracy of estimated spatial properties of the detected physical features).

In the method 900, during a scan of a physical environment to obtain depth information of at least a portion of the physical environment (e.g., wherein the depth information of objects and surfaces in the physical environment are objected during the scan and is used to generate a three-dimensional model of the physical environment, optionally, in real-time during the scan) (902): the computer system displays (904), via the display generation component, a first user interface (e.g., a scan user interface that is displayed to show progress of an initial scan of a physical environment to build a three-dimensional model of the physical environment, a camera user interface, or a user interface that is displayed in response to a user's request to perform a scan of a physical environment or to start an augmented reality session in a physical environment), wherein the first user interface includes a representation of a field of view of one or more cameras (e.g., images or video of a live feed from the camera(s), or a view of the physical environment through a transparent or semitransparent display). In some embodiments, the representation of the field of view including a respective view of a physical environment that corresponds to a current viewpoint of a user in the physical environment (e.g., the current viewpoint of the user corresponds to a direction, position and/or vantage point from which the physical environment is being viewed by the user). In some embodiments, the first user interface further includes a preview of a three-dimensional model of the physical environment that is being generated based on the depth information captured by the one or more cameras.

In the method 900, the computer system displays (906) a plurality of graphical objects overlaying the representation of the field of view of the one or more cameras, including displaying at least a first graphical object at a first location that represents (e.g., spatially represents) one or more estimated spatial properties (e.g., position, orientation, and/or size estimated based on one or more sensor measurements) of to a first physical feature (e.g., a first object and/or surface) that has been detected in a respective portion of the physical environment in the field of view of the one or more cameras, and a second graphical object at a second location that represents (e.g., spatially represents) one or more estimated spatial properties (e.g., position, orientation, and/or size estimated based on one or more sensor measurements) of a second physical feature (e.g., a second object and/or surface) that has been detected in the respective portion of the physical environment in the field of view of the one or more cameras (e.g., the two or more graphical objects include outlines of boundaries, edges, and/or bounding boxes of discrete objects and surfaces, such as walls, ceilings, doors, windows, furniture, lamp, appliances, and/or fixtures that have been detected and recognized in the scanned portion of the physical environment). For example, in FIG. 5I, graphical object 590 is displayed at a location of stool 546, where graphical object 590 represents one or more estimated spatial properties of stool 546 that have been estimated based on the captured depth information, and object 592 is displayed at a location of TV 560, where graphical object 592 represents one or more estimated spatial properties of TV 560.

In the method 900, while displaying the plurality of graphical objects overlaying the representation of the field of view of the one or more cameras, the computer system changes (908) one or more visual properties (e.g., opacity, sharpness, and/or amount of feathering) of the first graphical object in accordance with variations in a respective predicted accuracy of the estimated spatial properties of the first physical feature, and the computer system changes the one or more visual properties (e.g., opacity, sharpness, and/or amount of feathering) of the second graphical object in accordance with variations in a respective predicted accuracy of the estimated spatial properties of the second physical feature. For example, as shown in FIGS. 5I and 5J, as the scan continues for the second portion of room 520, the display properties of graphical object 590 representing the estimated spatial properties of stool 546 and the display properties of graphical object 592 representing the estimated spatial properties of TV 560 are respectively changed (e.g., extended, and/or made more solid, opaque, and/or with less feathering) in accordance with the respective changing predicted accuracies of the estimated spatial properties of stool 546 and TV 560.

In some embodiments, the first graphical object includes (910) a first set of one or more lines that represents (e.g., spatially represents) the one or more estimated spatial properties (e.g., position, orientation, and/or size estimated based on one or more sensor measurements) of the first physical feature (e.g., the first object and/or surface), and the second graphical object includes a second set of one or more lines that represents (e.g., spatially represents) the one or more estimated spatial properties (e.g., position, orientation, and/or size estimated based on one or more sensor measurements) of the second physical feature (e.g., the second object and/or surface). For example, as shown in FIG. 5I, graphical object 590 includes a first set of lines that represents the estimated spatial properties of stool 546 (e.g., height and width of stool 560) and graphical object 592 includes a second set of lines that represents the estimated spatial properties of TV 560 (e.g., height and width of TV 560). For example, in some embodiments, during the scan, a first set of lines are added to the field of view and extends along the edges and/or surfaces of a first physical feature or surface when the first physical feature is within the field of view of the cameras; and a second set of lines are added to the field of view and extends along the edges and/or surfaces of a second physical feature when the second physical feature is within the field of view of the cameras. In some embodiments, the first object and the second object may enter the field of view at different points in times, remain concurrently visible in the field of view for some time, and/or may exit the field of view at different points in time. Displaying a first graphical object that includes a first set of one or more lines that represents one or more estimated spatial properties of the first physical feature, and displaying a second graphical object that includes a second set of one or more lines that represents one or more estimated spatial properties of the second physical feature, provides improved visual feedback to the user (e.g., improves visual feedback regarding the estimated spatial properties of the first physical feature and second physical feature).

In some embodiments, displaying the first graphical object includes extending respective lengths of the first set of one or more lines (e.g., with speed(s) that are selected) in accordance with the respective predicted accuracy (e.g., an initial predicted accuracy, and/or an average predicted accuracy) of the one or more estimated spatial properties of the first physical feature. For example, as shown in FIGS. 5F and 5G, graphical object 580 is displayed at the location of cabinet 548 to represent the estimated spatial properties of cabinet 548, and segments of graphical object 580 are extended at a faster speed when the predicted accuracies of the estimated spatial properties are low (e.g., as shown in FIG. 5F, faster line drawing around cabinet 548 in the beginning of the scan), and are extended at a lower speed when the predicted accuracies of the estimated spatial properties are high (e.g., as shown in FIG. 5G, slower line drawing around cabinet 548 as scan continues). In some embodiments, displaying the second graphical object includes extending respective lengths of the second set of one or more lines with speed(s) that are selected in accordance with the respective predicted accuracy (e.g., an initial predicted accuracy, and/or an average predicted accuracy) of the one or more estimated spatial properties of the second physical feature. In some embodiments, the predicted accuracies of the one or more estimated spatial properties of the different physical features (e.g., the first physical feature, the second physical feature, and/or another physical feature different from the first and second physical features) are not the same, do not change with the same rate, and/or do not change at the same time; and as a result, the speeds with which the first set of lines and the second set of lines, and/or the respective lines within the first set and/or second set of lines are drawn are not the same at a given moment in time. In some embodiments, the rates of extending the respective lengths of the first set of one or more lines are based on (e.g., proportional to, and/or positively correlated to) the predicted accuracy of the one or more estimated spatial properties of the first physical feature. In some embodiments, the rates of extending the respective lengths of the second set of one or more lines is based on (e.g., proportional to, and/or positively correlated to) the predicted accuracy of the one or more estimated spatial properties of the second physical feature. In some embodiments, the speed(s) with which the first set of lines are extended increase over time, as the respective predicted accuracy of the one or more estimated spatial properties of the first physical feature increases over time as the scan progresses and more depth information is obtained and processed. In some embodiments, the speed(s) with which the second set of lines are extended increase over time, as the respective predicted accuracy of the one or more estimated spatial properties of second physical feature increases over time as the scan progresses and more depth information is obtained and processed. Displaying a first graphical object, including extending respective lengths of a first set of one or more lines that represent one or more estimated spatial properties of the first physical feature, in accordance with the respective predicted accuracy of the one or more estimated spatial properties of the first physical feature, provides improved visual feedback to the user (e.g., improves visual feedback regarding the predicated accuracy of estimated spatial properties of the first physical feature).

In some embodiments, the first graphical object includes (914) a first filled area that represents (e.g., spatially represents) the one or more estimated spatial properties (e.g., position, orientation, and/or size estimated based on one or more sensor measurements) of the first physical feature (e.g., the first object and/or surface), and the second graphical object includes a second filled area that represents (e.g., spatially represents) the one or more estimated spatial properties (e.g., position, orientation, and/or size estimated based on one or more sensor measurements) of the second physical feature (e.g., the second object and/or surface). For example, in some embodiments, a first overlay is displayed at the location of wall 530 in FIG. 5F to represent the estimated spatial properties of wall 530, and a second overlay is displayed at the location of the surfaces of cabinet 548 to represent the estimated spatial properties of the surfaces of cabinet 548. In some embodiments, displaying the first graphical object includes expanding the first fill area in accordance with the respective predicted accuracy (e.g., an initial predicted accuracy, and/or an average predicted accuracy) of the one or more estimated spatial properties of the first physical feature. In some embodiments, displaying the second graphical object includes expanding the second fill area in accordance with the respective predicted accuracy (e.g., an initial predicted accuracy, and/or an average predicted accuracy) of the one or more estimated spatial properties of the second physical feature. In some embodiments, the respective predicted accuracies of the one or more estimated spatial properties of the different physical features (e.g., the first physical feature, the second physical feature, and/or another physical feature different from the first and second physical features) are not the same, do not change with the same rate, and/or do not change at the same time; and as a result, the speeds with which the first fill area and the second fill area are expanded are not the same at a given moment in time. In some embodiments, the rates of expanding the first fill area are based on (e.g., proportional to, and/or positively correlated to) the predicted accuracy of the one or more estimated spatial properties of the first physical feature. In some embodiments, the rates of expanding the second fill area are based on (e.g., proportional to, and/or positively correlated to) the predicted accuracy of the one or more estimated spatial properties of the second physical feature. Displaying a first graphical object that includes a first filled area that represents the one or more estimated spatial properties of the first physical feature, and displaying a second graphical object that includes a second filled area that represents the one or more estimated spatial properties of the second physical feature, provides improved visual feedback to the user (e.g., improves visual feedback regarding the estimated spatial properties of the first physical feature and second physical feature).

In some embodiments, changing the one or more visual properties of the first graphical object in accordance with the variations in the respective predicted accuracy of the estimated spatial properties of the first physical feature includes changing a respective opacity of the first graphical object in accordance with changes in the respective predicted accuracy of the estimated spatial properties of the first physical feature. For example, in some embodiments, an overlay is displayed at a location of wall 530 to represent the estimated spatial properties of wall 530 in FIG. 5F, and as the predicted accuracies of the estimated spatial properties of wall 530 change during the scan of wall 530, device 100 changes the opacity of the overlay that is displayed at the location of wall 530. In some embodiments, changing the one or more visual properties of the second graphical object in accordance with the variations in the respective predicted accuracy of the estimated spatial properties of the second physical feature includes changing a respective opacity of the second graphical object in accordance with changes in the respective predicted accuracy of the estimated spatial properties of the second physical feature. In some embodiments, the predicted accuracies of the one or more estimated spatial properties of the different physical features (e.g., the first physical feature, the second physical feature, and/or another physical feature different from the first and second physical features) do not change with the same rate, and/or do not change at the same time; and as a result, the respective opacities and/or the rate of changes in the respective opacities of the first graphical object and the second graphical object are not the same at a given moment in time. In some embodiments, the rate of changing the opacity of the first graphical object is based on (e.g., proportional to, and/or positively correlated to) the predicted accuracy of the one or more estimated spatial properties of the first physical feature. In some embodiments, the rate of changing the opacity of the second graphical object is based on (e.g., proportional to, and/or positively correlated to) the respective predicted accuracy of the one or more estimated spatial properties of the second physical feature. Changing a respective opacity of the first graphical object in accordance with changes in the respective predicted accuracy of the estimated spatial properties of the first physical feature, provides improved visual feedback to the user (e.g., improved visual feedback regarding changes to the predicted accuracy of the estimated spatial properties of the first physical feature).

In some embodiments, changing the one or more visual properties of the first graphical object in accordance with the variations in the respective predicted accuracy of the estimated spatial properties of the first physical feature includes (918) changing a respective amount of feathering (e.g., computer-generated smoothing and/or blur) applied to edges of the first graphical object in accordance with changes in the respective predicted accuracy of the estimated spatial properties of the first physical feature. For example, as shown in FIGS. 5F-5H, graphical object 580 that is displayed to represent the estimated spatial properties of cabinet 548 is displayed with different amounts of feathering along different segments of graphical object 580 and/or as scan of cabinet 548 progresses, where the amount of feathering that is applied is based on the predicted accuracies of the estimated spatial properties of different portions of the cabinet 548 and/or at different times during the scan. In some embodiments, changing the one or more visual properties of the second graphical object in accordance with the variations in the respective predicted accuracy of the estimated spatial properties of the second physical feature includes changing a respective amount of feathering applied to edges of the second graphical object in accordance with changes in the respective predicted accuracy of the estimated spatial properties of the second physical feature. In some embodiments, the respective predicted accuracies of the one or more estimated spatial properties of the different physical features (e.g., the first physical feature, the second physical feature, and/or another physical feature that is different from the first and second physical features) do not change with the same rate, and/or do not change at the same time; and as a result, the respective amounts of feathering and/or the rate of changes in the respective amounts of feathering applied to the edges of the first graphical object and the second graphical object are not the same at a given moment in time. In some embodiments, the rate of changing the amount of feathering applied to the first graphical object is based on (e.g., proportional to, and/or positively correlated to) the respective predicted accuracy of the one or more estimated spatial properties of the first physical feature. In some embodiments, the rate of changing the amount of feathering applied to the edges of the second graphical object is based on (e.g., proportional to, and/or positively correlated to) the respective predicted accuracy of the one or more estimated spatial properties of the second physical feature. Changing a respective amount of feathering applied to edges of the first graphical object, in accordance with changes in the respective predicted accuracy of the estimated spatial properties of the first physical feature, provides improved visual feedback to the user (e.g., improved visual feedback regarding changes to the predicted accuracy of the estimated spatial properties of the first physical feature).

In some embodiments, changing the respective amount (e.g., magnitude and/or radius) of feathering (e.g., computer-generated smoothing and/or blur) applied to edges of the first graphical object in accordance with changes in the respective predicted accuracy of the estimated spatial properties of the first physical feature includes (920): in accordance with a determination that scanning of a corner corresponding to the first graphical object meets first criteria (e.g., two or more detected edges of the first physical feature meet at a corner, detected edges of two or more physical features meet at a corner, indicating consistencies and higher confidence in the detected edges), the computer system decreases the respective amount of feathering applied to the edges of the first graphical object (e.g., reducing the amount of feathering due to increased predicted accuracy in the estimated spatial properties of the first physical feature); and in accordance with a determination that scanning of the corner corresponding to the first graphical object has not met the first criteria (e.g., two or more detected edges of the first physical feature failed to meet at a corner, detected edges of two or more physical features failed to meet at a corner, indicating inconsistencies and lower confidence in the detected edges), the computer system increases the respective amount (e.g., magnitude and/or radius) of feathering applied to the edges of the first graphical object (e.g., increasing the amount of feathering due to decreased predicted accuracy in the estimated spatial properties of the first physical feature). For example, as shown in FIGS. 5E-5G, as the edges between wall 530, wall 532, and ceiling 538 are detected and characterized during the scan of the first portion of room 520, graphical objects 572, 578, and 574 are displayed respectively along the those detected edges. Initially, graphical objects 572, 578, and 574 are displayed with a greater amount of featuring due to the lower predicted accuracies of the estimated spatial properties of the edges (e.g., as shown in FIGS. 5E and 5F). In FIG. 5G, a corner between the three detected edges is detected and shown to be consistent with the estimated spatial properties of the three edges; and as a result, the predicted accuracies of the spatial properties of the three edges are increased and the amounts of feathering applied to the graphical objects 572, 578, and 574 are reduced (as shown in FIG. 5G). Changing a respective amount of feathering applied to edges of the first graphical object, in accordance with changes in the respective predicted accuracy of the estimated spatial properties of the first physical feature, including decreasing the respective amount of feathering applied to edges of the first graphical object, in accordance with a determination that scanning of a corner corresponding to the first graphical object meets first criteria, and increasing the respective amount of feathering applied to the edges of the first graphical object, in accordance with a determination that scanning of the corner corresponding to the first graphical object has not met the first criteria, provides improved visual feedback to the user (e.g., improved visual feedback regarding changes to the predicted accuracy of the estimated spatial properties of the first physical feature).

In some embodiments, increasing the respective amount of feathering and decreasing the respective amount of feathering the first criteria are (922) executed in accordance with a determination that the first graphical object includes a structural object (e.g., a wall, a floor, and/or a ceiling) and not a non-structural object (e.g., not furniture, not appliance, and not other types of non-structural elements of the physical environment). For example, the change in the amount of feathering when a corner is detected applies to the edges between wall 530, wall 532, and ceiling 538 in FIG. 5G, but does not apply to the detection of corner between different faces of cabinet 548. Changing a respective amount of feathering applied to edges of the first graphical object, in accordance with changes in the respective predicted accuracy of the estimated spatial properties of the first physical feature, and in accordance with a determination that the first graphical object includes a structural object and not a non-structural object, provides improved visual feedback to the user (e.g., improved visual feedback regarding changes to the predicted accuracy of the estimated spatial properties of the first physical feature).

In some embodiments, changing the one or more visual properties of the first graphical object in accordance with the variations in the respective predicted accuracy of the estimated spatial properties of the first physical feature includes (924) changing a respective sharpness (e.g., resolution, contrast, focus, and/or acutance) of the first graphical object in accordance with changes in the respective predicted accuracy of the estimated spatial properties of the first physical feature. For example, as shown in FIGS. 5F-5H, graphical object 580 that is displayed to represent the estimated spatial properties of cabinet 548 is displayed with different levels of sharpness along different segments of graphical object 580 and/or as scan of cabinet 548 progresses, where the levels of sharpness that are used is based on the predicted accuracies of the estimated spatial properties of different portions of the cabinet 548 and/or at different times during the scan. In some embodiments, changing the one or more visual properties of the second graphical object in accordance with the variations in the respective predicted accuracy of the estimated spatial properties of the second physical feature includes changing a respective sharpness (e.g., resolution, contrast, focus, and/or acutance) of the second graphical object in accordance with changes in the respective predicted accuracy of the estimated spatial properties of the second physical feature. In some embodiments, the respective predicted accuracies of the one or more estimated spatial properties of the different physical features (e.g., the first physical feature, the second physical feature, and/or another physical feature that is different from the first and second physical features) do not change with the same rate, and/or do not change at the same time; and as a result, the respective sharpness and/or the rate of changes in the respective sharpness of the first graphical object and the second graphical object are not the same at a given moment in time. In some embodiments, the rate of changing the sharpness of the first graphical object is based on (e.g., proportional to, and/or positively correlated to) the respective predicted accuracy of the one or more estimated spatial properties of the first physical feature. In some embodiments, the rate of changing the sharpness of the second graphical object is based on (e.g., proportional to, and/or positively correlated to) the respective predicted accuracy of the one or more estimated spatial properties of the second physical feature. Changing a respective sharpness of the first graphical object in accordance with changes in the respective predicted accuracy of the estimated spatial properties of the first physical feature, provides improved visual feedback to the user (e.g., improved visual feedback regarding changes to the predicted accuracy of the estimated spatial properties of the first physical feature).

In some embodiments, changing the one or more visual properties of the first graphical object in accordance with variations in the respective predicted accuracy of the estimated spatial properties of the first physical feature includes (926): at a first time: in accordance with a determination that the respective predicted accuracy of the estimated spatial properties of the first physical feature is a first accuracy value (e.g., 30% confidence, and/or x error range) for a first portion of the first physical feature, displaying a first portion of the first graphical object (e.g., the portion of the first graphical object that corresponds to the first portion of the first physical feature) with a first property value for a first visual property of the one or more visual properties (e.g., a first opacity value, a first amount of feathering, and/or a first line thickness), and at a second time later than the first time: in accordance with a determination that the respective predicted accuracy of the estimated spatial properties of the first physical feature is a second accuracy value (e.g., 50% confidence, and/or 0.5×error range) for the first portion of the first physical feature, displaying the first portion of the first graphical object with a second property value for the first visual property of the one or more visual properties (e.g., a second opacity value, a second amount of feathering, and/or a second line thickness), wherein the second accuracy value is different from (e.g., less than, or greater than) the first accuracy value, and the second property value is different from (e.g., less than, or greater than) the first property value. For example, as shown in FIGS. 5F-5H, graphical object 580 that is displayed to represent the estimated spatial properties of cabinet 548 is displayed with different values for a set of display properties, where the values change over time as scan of cabinet 548 progresses and the predicted accuracies of the estimated spatial properties of cabinet 548 change over time during the scan. Displaying, at a first time, a first portion of the first graphical object with a first property value for a first visual property of the one or more visual properties, and displaying, at a second time later than the first time, the first portion of the first graphical object with a second property value for the first visual property of the one or more visual properties, wherein the second accuracy value is different from the first accuracy value, and the second property value is different from the first property value, provides improved visual feedback to the user (e.g., improved visual feedback regarding the predicted accuracy of the estimated spatial properties of the first physical feature changes over time).

In some embodiments, at a third time, in accordance with a determination that the respective predicted accuracy of the estimated spatial properties of the first physical feature is a third accuracy value for a third portion of the first physical feature, and a fourth accuracy value for a fourth portion of the first physical feature, the computer system displays (928) a third portion of the first graphical object (e.g., the portion of the first graphical object that corresponds to the third portion of the first physical feature) with a third property value for a second visual property of the one or more visual properties, and the computer system displays a fourth portion of the first graphical object (e.g., the portion of the first graphical object that corresponds to the fourth portion of the first physical feature) with a fourth property value for the second visual property of the one or more visual properties, wherein the fourth portion of the first physical feature is different from the third portion of the first physical feature, the fourth accuracy value is different from the third accuracy value, and the fourth property value is different from the third property value. For example, as shown in FIGS. 5F-5H, graphical object 580 that is displayed to represent the estimated spatial properties of cabinet 548 is displayed with different values for a set of display properties along different segments of graphical object 580, where different values are selected based on the predicted accuracies of the estimated spatial properties of different portions of the cabinet 548 at a given time. For example, in some embodiments, the values of a respective visual property are not uniform across the entirety of the first graphical objects, because the values of the predicted accuracy for an estimated spatial property of the first physical feature are not uniform across the entirety of the first physical feature at any given time during the scan. In addition, the values of the respective visual property for different portions of the first graphical object continue to change in accordance with the values of the predicted accuracy of the respective spatial property for the different portions of the first physical feature. Displaying a third portion of the first graphical object with a third property value for a second visual property of the one or more visual properties, and displaying a fourth portion, different from the third portion, of the first graphical object with a fourth property value, different from the third property value, for the second visual property of the one or more visual properties, in accordance with a determination that the respective predicted accuracy of the estimated spatial properties of the first physical feature is the third accuracy value for the third portion of the first physical feature, and the fourth accuracy value, different from the third accuracy value, for the fourth portion of the first physical feature, provides improved visual feedback to the user (e.g., improved visual feedback regarding the predicted accuracy of the estimated spatial properties for different portions of the first physical feature).

In some embodiments, the first physical feature includes (930) a fifth portion of the first physical feature and a sixth portion of the first physical feature, the fifth portion of the first physical feature is not visually occluded by another object in the field of view of the one or more cameras, and the sixth portion of the first physical feature is visually occluded by another object in the field of view of the one or more cameras, and displaying the first graphical object includes: displaying a fifth portion of the first graphical object corresponding to the fifth portion of the first physical feature with a fifth property value that corresponds to a fifth accuracy value of the respective predicted accuracy of the one or more estimated spatial properties of the first physical feature, and displaying a sixth portion of the first graphical object corresponding to the sixth portion of the first physical feature with a sixth property value corresponding to a sixth accuracy value of the respective predicted accuracy of the one or more estimated spatial properties of the first physical feature, wherein the sixth property value corresponds to a lower visibility than the fifth property value does in the first user interface. For example, in some embodiments, when a portion of a physical feature is behind another physical object, the portion of the graphical object corresponding to the portion of the physical feature that is behind other physical objects is displayed with visual property values for the one or more visual properties that correspond to lower predicted accuracies for the one or more estimated spatial properties. For example, in some embodiments, as shown in FIG. 5U, graphical object 632 is displayed to represent the spatial properties of the edge between wall 534 and floor 540, and the two end portions of graphical object 632 that correspond to portions of the edge that are not obscured by couch 552 and side table 554 are displayed with higher visibility, as compared to the middle portion of graphical object 632 that corresponds to a portion of the edge that is obscured by couch 552 and side table 554. Displaying the fifth portion of the first graphical object corresponding to the fifth portion of the first physical feature with a fifth property value corresponding to a fifth accuracy value of the respective predicted accuracy of the one or more estimated spatial properties of the first physical feature, and displaying a sixth portion of the first graphical object corresponding to the sixth portion of the first physical feature with a sixth property value corresponding to a sixth accuracy value of the respective predicted accuracy of the one or more estimated spatial properties of the first physical feature, wherein the sixth property value corresponds to a lower visibility than the fifth property value does in the first user interface, provides improved visual feedback to the user (e.g., improved visual feedback regarding the predicted accuracies for different portions of the first physical feature).

In some embodiments, in accordance with a determination that scanning of the first physical feature is completed (e.g., the respective predicted accuracy of the estimated spatial properties of the first physical feature meets a preset threshold estimated accuracy, and/or the amount of information that has been obtained for the first physical feature exceeds a threshold amount of information) (932): displaying a respective change in the one or more visual properties of the first graphical object (e.g., displaying a respective animation such as a sudden increase followed by a decrease of luminance, and/or an increase followed by a decrease of opacity) to indicate completion of the scan for the first physical feature; and ceasing to change the one or more visual properties of the first graphical object in accordance with the variations in the respective predicted accuracy of the estimated spatial properties of the first physical feature. For example, as shown in FIGS. 5F-5G, graphical object 580 is displayed to represent the estimated spatial properties of cabinet 548, and values of one or more display properties of graphical object 580 changes based on the changes in the predicted accuracies of the estimated spatial properties of cabinet 548; and in FIG. 5H, after the scan of cabinet is completed, a visual effect or animated change 586 is displayed to indicate the completion of the scan for cabinet 548 and a final state of graphical object 580 is displayed. Displaying a respective change in the one or more visual properties of the first graphical object to indicate completion of the scan for the first physical feature, and ceasing to change the one or more visual properties of the first graphical object in accordance with the variations in the respective predicted accuracy of the estimated spatial properties of the first physical feature, provides improved visual feedback to the user (e.g., improved visual feedback that the computer system has completed the scan for the first physical feature).

In some embodiments, displaying the respective change in the one or more visual properties of the first graphical object (e.g., displaying a respective animation such as a sudden increase followed by a decrease of luminance, and/or an increase followed by a decrease of opacity) includes (934): in accordance with a determination that the first physical feature is of a first feature type (e.g., a line, an edge, or another feature type), displaying a first type of change in the one or more visual properties of the first graphical object (e.g., changing from a line with feathering to a solid line) to indicate completion of scanning of the first physical feature; and in accordance with a determination that the first physical feature is of a second feature type (e.g., a surface, a plane, or another feature type) different from the first feature type, displaying a second type of change, different from the first type of change, in the one or more visual properties of the first graphical object (e.g., displaying a sudden increase of intensity or brightness followed by a decrease of intensity or brightness on the surface) to indicate completion of scanning of the first physical feature. For example, in FIG. 5H, when the scan of cabinet 548 is completed, a first animated change is applied to the lines of graphical object 580; and when the scan of wall 530 is completed, a second animated change is applied to an overlay applied to wall 530, because cabinet 548 and wall 530 are two different types of physical features (e.g., edges vs. surface). Displaying a first type of change in the one or more visual properties of the first graphical object to indicate completion of the scan of the first physical feature, in accordance with a determination that the first physical feature is of a first feature type, and displaying a second type of change different from the first type of change, in the one or more visual properties of the first graphical object to indicate completion of the scan of the first physical feature, in accordance with a determination that the first physical feature is of a second feature type different from the first feature type, provides improved visual feedback to the user (e.g., improved visual feedback regarding the feature type of the first physical feature).

In some embodiments, the first graphical object includes (936) a set of one or more lines and displaying the first type of change in the one or more visual properties of the first graphical object to indicate completion of the scan of the first physical feature includes reducing an amount (e.g., magnitude and/or radius) of feathering (e.g., switching from displaying the set of one or more lines with feathering to displaying a set of solid lines). For example, in FIG. 5H, when the scan of cabinet 548 is completed, the graphical object 580 which includes a set of lines along the detected edges of cabinet 548 is changed by reducing the amount of feathering applied to the lines. Displaying a first type of change, including reducing an amount of feathering, in the one or more visual properties of the first graphical object to indicate completion of the scan of the first physical feature, in accordance with a determination that the first physical feature is of a first feature type, and displaying a second type of change different from the first type of change, in the one or more visual properties of the first graphical object to indicate completion of the scan of the first physical feature, in accordance with a determination that the first physical feature is of a second feature type different from the first feature type, provides improved visual feedback to the user (e.g., improved visual feedback regarding the feature type of the first physical feature), provides improved visual feedback to the user (e.g., improved visual feedback regarding the feature type of the first physical feature, and improved visual feedback that the computer system has completed the scan of the first physical feature).

In some embodiments, the first graphical object includes (e.g., 938) a surface, and displaying the second type of change in the one or more visual properties of the first graphical object to indicate completion of the scan of the first physical feature includes displaying a preset change sequence in one or more visual properties (e.g., intensity, luminance, brightness, opacity, and/or color) in the surface. For example, in FIG. 5H, when the scan of cabinet 548 is completed, an overlay applied to the detected surfaces of cabinet 548 is changed by increasing luminance and then decreasing luminance of the overlay. In another example, when the scan of wall 530 is completed, an overlay applied to the detected surface of wall 530 is changed by increasing luminance and then decreasing luminance of the overlay. Displaying a first type of change in the one or more visual properties of the first graphical object to indicate completion of the scan of the first physical feature, in accordance with a determination that the first physical feature is of a first feature type, and displaying a second type of change that includes displaying a preset change sequence in one or more visual properties in the surface, in the one or more visual properties of the first graphical object to indicate completion of the scan of the first physical feature, in accordance with a determination that the first physical feature is of a second feature type different from the first feature type, provides improved visual feedback to the user (e.g., improved visual feedback regarding the feature type of the first physical feature), provides improved visual feedback to the user (e.g., improved visual feedback regarding the feature type of the first physical feature, and improved visual feedback that the computer system has completed the scan of the first physical feature).

In some embodiments, the computer system detects (940) that scanning of the first physical feature is completed (e.g., the predicted accuracy of the estimated spatial properties of the first physical feature meets a preset threshold accuracy, and/or the amount of information that has been obtained for the first physical feature exceeds a threshold amount of information). In response to detecting that scanning of the first physical feature is completed, the computer system reduces visual prominence of the first graphical object from a first visibility level to a second visibility level lower than the first visibility level. For example, in FIG. 5H, after the detection of cabinet 548 is completed, graphical object 580 that indicate the estimated spatial properties of cabinet 548 is displayed with reduced visibility as compared to graphical object 580 that is displayed initially (e.g., in FIG. 5G). In some embodiments, when a graphical object is initially displayed in the first user interface to show the progress of the scan of a corresponding physical feature, the graphical object is displayed with an enhanced visibility (e.g., greater luminance, and/or with a greater line thickness) to alert the user that which region in the physical environment is being scanned (e.g., to guide to user to focus the field of view on that region of the physical environment); and as the scan continues, the graphical object is displayed with reduced visibility as compared to their initial appearance to guide the user to move the field of view onto newer portions of the physical environment (e.g., glowing lines around the object fade after object has been detected). Reducing visual prominence of the first graphical object from a first visibility level to a second visibility level lower than the first visibility level, in response to detecting that scanning of the first physical feature is completed, provides improved visual feedback to the user (e.g., improved visual feedback that the computer system has completed the scan of the first physical feature).

It should be understood that the particular order in which the operations in FIGS. 9A-9E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 650, 700, and 800) are also applicable in an analogous manner to method 900 described above with respect to FIGS. 9A-9E. For example, the user interfaces, user interface elements, physical environments and features and objects therein, feature types, annotation modes, and mode indications described above with reference to method 900 optionally have one or more of the characteristics of the user interfaces, user interface elements, physical environments and features and objects therein, feature types, annotation modes, and mode indications described herein with reference to other methods described herein (e.g., methods 650, 700, and 800). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system that is in communication with a display generation component, one or more input devices, and one or more cameras:
displaying, via the display generation component, a first user interface, wherein the first user interface concurrently includes:
a representation of a field of view of the one or more cameras, the representation of the field of view including a first view of a physical environment that corresponds to a first viewpoint of a user in the physical environment, and
a preview of a three-dimensional model of the physical environment that is being generated during a scan of the physical environment, wherein the preview includes the three-dimensional model of the physical environment that is not completed and that is displayed with a first orientation that corresponds to the first viewpoint of the user;
while displaying the first user interface, detecting first movement of the one or more cameras in the physical environment that changes a current viewpoint of the user in the physical environment from the first viewpoint to a second viewpoint; and
in response to detecting the first movement of the one or more cameras:
updating the preview of the three-dimensional model while the three-dimensional model is not completed, in accordance with the first movement of the one or more cameras, including adding additional information to the three-dimensional model in the preview, and rotating the three-dimensional model from the first orientation that corresponds to the first viewpoint of the user to a second orientation that corresponds to the second viewpoint of the user, in the preview;
while displaying the first user interface, with the representation of the field of view including a second view of the physical environment that corresponds to the second viewpoint of the user, and with the preview of the three-dimensional model including the three-dimensional model with the second orientation while the three-dimensional model in the preview is not completed, detecting first input directed to the preview of the three-dimensional model in the first user interface; and
in response to detecting the first input directed to the preview of the three-dimensional model in the first user interface:
updating the preview of the three-dimensional model in the first user interface in accordance with the first input, including, in accordance with a determination that the first input meets first criteria, rotating the three-dimensional model from the second orientation that corresponds to the second viewpoint of the user to a third orientation that does not correspond to the second viewpoint of the user, in the preview, while the three-dimensional model in the preview is not completed.

2. The method of claim 1, including:
while displaying the first user interface, including the representation of the field of view and the preview of the three-dimensional model, adding, to the representation of the field of view, respective graphical objects at positions that correspond to one or more physical features that have been detected in a respective portion of the physical environment that is visible in the representation of the field of view.

3. The method of claim 2, wherein the one or more physical features include at least a first physical object, and the respective graphical objects include at least a first graphical object that is displayed at a first position on the representation of the field of view that corresponds to the first physical object.

4. The method of claim 2, wherein the one or more physical features include at least a first physical surface, and the respective graphical objects include at least a second graphical object that is displayed at a second position on the representation of the field of view that corresponds to the first physical surface.

5. The method of claim 1, including:
after the three-dimensional model in the preview is rotated to the third orientation in accordance with the first input, detecting a termination of the first input; and
in response to detecting the termination of the first input:
updating the preview of the three-dimensional model in the first user interface, including, rotating the three-dimensional model from the third orientation to a fourth orientation that corresponds to a current viewpoint of the user, in the preview, while the three-dimensional model is not completed.

6. The method of claim 1, including:
while displaying the first user interface, with the representation of the field of view including the second view of the physical environment that corresponds to the second viewpoint of the user, and with the preview of the three-dimensional model including the three-dimensional model with the second orientation while the three-dimensional model in the preview is not completed, detecting second input directed to the preview of the three-dimensional model in the first user interface; and
in response to detecting the second input directed to the preview of the three-dimensional model in the first user interface:
updating the preview of the three-dimensional model in the first user interface in accordance with the second input, including, in accordance with a determination that the second input meets second criteria different from the first criteria, changing a scale of the three-dimensional model relative to the representation of the field of view in accordance with the second input, in the preview, while the three-dimensional model in the preview is not completed.

7. The method of claim 1, wherein the preview of the three-dimensional model of the physical environment includes respective three-dimensional representations of one or more surfaces that have been detected in the physical environment.

8. The method of claim 1, wherein the preview of the three-dimensional model of the physical environment includes respective representations of one or more physical objects that have been detected in the physical environment.

9. The method of claim 1, including:
after adding the additional information to the three-dimensional model in the preview of the three-dimensional model while the three-dimensional model was not completed, in accordance with a determination that the three-dimensional model of the physical environment meets preset criteria, replacing display of the preview of the three-dimensional model with display of a first view of the three-dimensional model of the physical environment, wherein the first view of the three-dimensional model includes an enlarged copy of the three-dimensional model that meets the preset criteria.

10. The method of claim 9, including:
while displaying the first view of the three-dimensional model in the first user interface, detecting third input directed to the first view of the three-dimensional model in the first user interface; and
in response to detecting the third input directed to the first view of the three-dimensional model in the first user interface:
updating the first view of the three-dimensional model in the first user interface in accordance with the third input, including, in accordance with a determination that the third input meets the first criteria, rotating the three-dimensional model from a fourth orientation to a fifth orientation different from the fourth orientation in accordance with the third input, in the first view.

11. The method of claim 10, including:
after the three-dimensional model in the first view is rotated to the fifth orientation in accordance with the third input, detecting a termination of the third input; and
in response to detecting the termination of the third input, forgoing updating the first view of the three-dimensional model in the first user interface, including, maintaining the three-dimensional model in the first view in the fifth orientation.

12. The method of claim 10, wherein:
the three-dimensional model includes a respective graphical representation of a first structural element that is detected in the physical environment and respective graphical representations of one or more physical objects that are detected in the physical environment, and
displaying the first view of the three-dimensional model includes:
in accordance with a determination that a current orientation of the three-dimensional model in the first view in the first user interface would cause the respective graphical representation of the first structural element to occlude a view of the respective graphical representations of the one or more physical objects, forgoing display of the respective graphical representation of the first structural element with the respective graphical representations of the one or more physical objects in the first view of the three-dimensional model; and
in accordance with a determination that the current orientation of the three-dimensional model in the first view would not cause the respective graphical representation of the first structural element to occlude the view of the respective graphical representations of the one or more physical objects, concurrently displaying the respective graphical representation of the first structural element with the respective graphical representations of the one or more physical objects in the first view of the three-dimensional model.

13. The method of claim 1, including:
prior to displaying the first user interface, displaying a respective user interface of a third-party application; and
while displaying the respective user interface of the third-party application, detecting a respective input that is directed to the respective user interface of the third-party application, wherein the first user interface is displayed in response to detecting the respective input that is directed to the respective user interface of the third-party application and in accordance with a determination that the respective input corresponds to a request to scan the physical environment.

14. The method of claim 13, including:
in accordance with a determination that generation of the three-dimensional model meets preset criteria, redisplaying the third-party application.

15. The method of claim 1, wherein:
displaying the preview of the three-dimensional model while the three-dimensional model is not completed includes displaying a graphical representation of a first structural element that is detected in the physical environment in a first direction relative to respective graphical representations of one or more objects that have been detected in the physical environment; and
rotating the three-dimensional model in the preview includes:
in accordance with a determination that, a respective rotation of the three-dimensional model in the preview, while the three-dimensional model is not completed, would cause the graphical representation of the first structural element to occlude a view of the respective graphical representations of the one or more objects in the preview of the three-dimensional model, reducing an opacity of or ceasing to display the graphical representation of the first structural element while displaying the respective graphical representations of the one or more objects in the preview of the three-dimensional model when executing the respective rotation of the three-dimensional model, in the preview, while the three-dimensional model is not completed.

16. The method of claim 15, wherein ceasing to display the graphical representation of the first structural element while displaying the respective graphical representations of the one or more objects in the preview of the three-dimensional model when executing the respective rotation of the three-dimensional model in the preview includes, replacing display of the graphical representation of the first structural element with display of a first visual indication at a location of the graphical representation of the first structural element, wherein the first visual indication causes less visual occlusion of the respective graphical representations of the one or more objects in the preview of the three-dimensional model during the respective rotation of the three-dimensional model while the three-dimensional model in the preview is not completed, as compared to an amount of visual occlusion that would have been caused by the graphical representation of the first structural element.

17. The method of claim 15, wherein ceasing to display the graphical representation of the first structural element while displaying the respective graphical representations of the one or more objects in the preview of the three-dimensional model when executing the respective rotation of the three-dimensional model while the three-dimensional model in the preview is not completed includes, in accordance with a determination that the first structural element includes one or more openings, ceasing to display respective graphical representations of the one or more openings in the first structural element, while displaying the respective graphical representations of the one or more objects in the preview of the three-dimensional model when executing the respective rotation of the three-dimensional model, in the preview, while the three-dimensional model in the preview is not completed.

18. The method of claim 1, including:
displaying the preview of the three-dimensional model with virtual lighting that is generated based on detected lighting in the physical environment.

19. The method of claim 1, including:
displaying the preview of the three-dimensional model with preset virtual lighting that is different from detected lighting in the physical environment.

20. The method of claim 1, including:
in response to detecting the first movement of the one or more cameras:
updating the representation of the field of view in the first user interface in accordance with the first movement of the one or more cameras, including augmenting the representation of the field of view with respective graphical objects that correspond to the additional information that is added to the three-dimensional model in the preview.

21. A computer system in communication with a display generation component, one or more input devices, and one or more cameras, comprising:
one or more processors; and
memory storing one or more programs, wherein the one or more programs are configured to be executed by the one or more processors, the one or more programs including instructions for:
displaying, via the display generation component, a first user interface, wherein the first user interface concurrently includes:
a representation of a field of view of the one or more cameras, the representation of the field of view including a first view of a physical environment that corresponds to a first viewpoint of a user in the physical environment, and
a preview of a three-dimensional model of the physical environment that is being generated during a scan of the physical environment, wherein the preview includes the three-dimensional model of the physical environment that is not completed and that is displayed with a first orientation that corresponds to the first viewpoint of the user;
while displaying the first user interface, detecting first movement of the one or more cameras in the physical environment that changes a current viewpoint of the user in the physical environment from the first viewpoint to a second viewpoint; and
in response to detecting the first movement of the one or more cameras:
updating the preview of the three-dimensional model while the three-dimensional model is not completed, in accordance with the first movement of the one or more cameras, including adding additional information to the three-dimensional model in the preview, and rotating the three-dimensional model from the first orientation that corresponds to the first viewpoint of the user to a second orientation that corresponds to the second viewpoint of the user, in the preview;
while displaying the first user interface, with the representation of the field of view including a second view of the physical environment that corresponds to the second viewpoint of the user, and with the preview of the three-dimensional model including the three-dimensional model with the second orientation while the three-dimensional model in the preview is not completed, detecting first input directed to the preview of the three-dimensional model in the first user interface; and in response to detecting the first input directed to the preview of the three-dimensional model in the first user interface:

updating the preview of the three-dimensional model in the first user interface in accordance with the first input, including, in accordance with a determination that the first input meets first criteria, rotating the three-dimensional model from the second orientation that corresponds to the second viewpoint of the user to a third orientation that does not correspond to the second viewpoint of the user, in the preview, while the three-dimensional model in the preview is not completed.

22. The computer system of claim 21, wherein the one or more programs include instructions for:

while displaying the first user interface, including the representation of the field of view and the preview of the three-dimensional model, adding, to the representation of the field of view, respective graphical objects at positions that correspond to one or more physical features that have been detected in a respective portion of the physical environment that is visible in the representation of the field of view.

23. The computer system of claim 22, wherein the one or more physical features include at least a first physical object, and the respective graphical objects include at least a first graphical object that is displayed at a first position on the representation of the field of view that corresponds to the first physical object.

24. The computer system of claim 22, wherein the one or more physical features include at least a first physical surface, and the respective graphical objects include at least a second graphical object that is displayed at a second position on the representation of the field of view that corresponds to the first physical surface.

25. The computer system of claim 21, wherein the one or more programs include instructions for:

after the three-dimensional model in the preview is rotated to the third orientation in accordance with the first input, detecting a termination of the first input; and in response to detecting the termination of the first input:

updating the preview of the three-dimensional model in the first user interface, including, rotating the three-dimensional model from the third orientation to a fourth orientation that corresponds to a current viewpoint of the user, in the preview, while the three-dimensional model is not completed.

26. The computer system of claim 21, wherein the one or more programs include instructions for:

while displaying the first user interface, with the representation of the field of view including the second view of the physical environment that corresponds to the second viewpoint of the user, and with the preview of the three-dimensional model including the three-dimensional model with the second orientation while the three-dimensional model in the preview is not completed, detecting second input directed to the preview of the three-dimensional model in the first user interface; and in response to detecting the second input directed to the preview of the three-dimensional model in the first user interface:

updating the preview of the three-dimensional model in the first user interface in accordance with the second input, including, in accordance with a determination that the second input meets second criteria different from the first criteria, changing a scale of the three-dimensional model relative to the representation of the field of view in accordance with the second input, in the preview, while the three-dimensional model in the preview is not completed.

27. The computer system of claim 21, wherein the preview of the three-dimensional model of the physical environment includes respective three-dimensional representations of one or more surfaces that have been detected in the physical environment.

28. The computer system of claim 21, wherein the preview of the three-dimensional model of the physical environment includes respective representations of one or more physical objects that have been detected in the physical environment.

29. The computer system of claim 21, wherein the one or more programs include instructions for:

after adding the additional information to the three-dimensional model in the preview of the three-dimensional model while the three-dimensional model was not completed, in accordance with a determination that the three-dimensional model of the physical environment meets preset criteria, replacing display of the preview of the three-dimensional model with display of a first view of the three-dimensional model of the physical environment, wherein the first view of the three-dimensional model includes an enlarged copy of the three-dimensional model that meets the preset criteria.

30. The computer system of claim 29, wherein the one or more programs include instructions for:

while displaying the first view of the three-dimensional model in the first user interface, detecting third input directed to the first view of the three-dimensional model in the first user interface; and in response to detecting the third input directed to the first view of the three-dimensional model in the first user interface:

updating the first view of the three-dimensional model in the first user interface in accordance with the third input, including, in accordance with a determination that the third input meets the first criteria, rotating the three-dimensional model from a fourth orientation to a fifth orientation different from the fourth orientation in accordance with the third input, in the first view.

31. The computer system of claim 30, wherein the one or more programs include instructions for:

after the three-dimensional model in the first view is rotated to the fifth orientation in accordance with the third input, detecting a termination of the third input; and in response to detecting the termination of the third input, forgoing updating the first view of the three-dimensional model in the first user interface, including, maintaining the three-dimensional model in the first view in the fifth orientation.

32. The computer system of claim 30, wherein:

the three-dimensional model includes a respective graphical representation of a first structural element that is detected in the physical environment and respective graphical representations of one or more physical objects that are detected in the physical environment, and displaying the first view of the three-dimensional model includes:
- in accordance with a determination that a current orientation of the three-dimensional model in the first view in the first user interface would cause the respective graphical representation of the first structural element to occlude a view of the respective graphical representations of the one or more physical objects, forgoing display of the respective graphical representation of the first structural element with the respective graphical representations of the one or more physical objects in the first view of the three-dimensional model; and
- in accordance with a determination that the current orientation of the three-dimensional model in the first view would not cause the respective graphical representation of the first structural element to occlude the view of the respective graphical representations of the one or more physical objects, concurrently displaying the respective graphical representation of the first structural element with the respective graphical representations of the one or more physical objects in the first view of the three-dimensional model.

33. The computer system of claim 21, wherein the one or more programs include instructions for:
- prior to displaying the first user interface, displaying a respective user interface of a third-party application; and
- while displaying the respective user interface of the third-party application, detecting a respective input that is directed to the respective user interface of the third-party application, wherein the first user interface is displayed in response to detecting the respective input that is directed to the respective user interface of the third-party application and in accordance with a determination that the respective input corresponds to a request to scan the physical environment.

34. The computer system of claim 33, wherein the one or more programs include instructions for:
- in accordance with a determination that generation of the three-dimensional model meets preset criteria, redisplaying the third-party application.

35. The computer system of claim 21, wherein:
displaying the preview of the three-dimensional model while the three-dimensional model is not completed includes displaying a graphical representation of a first structural element that is detected in the physical environment in a first direction relative to respective graphical representations of one or more objects that have been detected in the physical environment; and
rotating the three-dimensional model in the preview includes:
- in accordance with a determination that, a respective rotation of the three-dimensional model in the preview, while the three-dimensional model in the preview is not completed, would cause the graphical representation of the first structural element to occlude a view of the respective graphical representations of the one or more objects in the preview of the three-dimensional model, reducing an opacity of or ceasing to display the graphical representation of the first structural element while displaying the respective graphical representations of the one or more objects in the preview of the three-dimensional model when executing the respective rotation of the three-dimensional model, in the preview, while the three-dimensional model in the preview is not completed.

36. A non-transitory computer readable storage medium storing one or more programs, the one or more programs comprising instructions that, when executed by a computer system in communication with a display generation component, one or more input devices, and one or more cameras cause the computer system to:
display, via the display generation component, a first user interface, wherein the first user interface concurrently includes:
- a representation of a field of view of the one or more cameras, the representation of the field of view including a first view of a physical environment that corresponds to a first viewpoint of a user in the physical environment, and
- a preview of a three-dimensional model of the physical environment that is being generated during a scan of the physical environment, wherein the preview includes the three-dimensional model of the physical environment that is not completed and that is displayed with a first orientation that corresponds to the first viewpoint of the user;

while displaying the first user interface, detect first movement of the one or more cameras in the physical environment that changes a current viewpoint of the user in the physical environment from the first viewpoint to a second viewpoint; and
in response to detecting the first movement of the one or more cameras:
- update the preview of the three-dimensional model while the three-dimensional model is not completed, in accordance with the first movement of the one or more cameras, including adding additional information to the three-dimensional model in the preview, and rotating the three-dimensional model from the first orientation that corresponds to the first viewpoint of the user to a second orientation that corresponds to the second viewpoint of the user, in the preview;
while displaying the first user interface, with the representation of the field of view including a second view of the physical environment that corresponds to the second viewpoint of the user, and with the preview of the three-dimensional model including the three-dimensional model with the second orientation while the three-dimensional model in the preview is not completed, detect first input directed to the preview of the three-dimensional model in the first user interface; and
in response to detecting the first input directed to the preview of the three-dimensional model in the first user interface:
- update the preview of the three-dimensional model in the first user interface in accordance with the first input, including, in accordance with a determination that the first input meets first criteria, rotating the three-dimensional model from the second orientation that corresponds to the second viewpoint of the user to a third orientation that does not correspond to the second viewpoint of the user, in the preview, while the three-dimensional model in the preview is not completed.

37. The non-transitory computer readable storage medium of claim 36, wherein the one or more programs include instructions that, when executed by the computer system, cause the computer system to:

while displaying the first user interface, including the representation of the field of view and the preview of the three-dimensional model, add, to the representation of the field of view, respective graphical objects at positions that correspond to one or more physical features that have been detected in a respective portion of the physical environment that is visible in the representation of the field of view.

38. The non-transitory computer readable storage medium of claim 37, wherein the one or more physical features include at least a first physical object, and the respective graphical objects include at least a first graphical object that is displayed at a first position on the representation of the field of view that corresponds to the first physical object.

39. The non-transitory computer readable storage medium of claim 37, wherein the one or more physical features include at least a first physical surface, and the respective graphical objects include at least a second graphical object that is displayed at a second position on the representation of the field of view that corresponds to the first physical surface.

40. The non-transitory computer readable storage medium of claim 36, wherein the one or more programs include instructions that, when executed by the computer system, cause the computer system to:

after the three-dimensional model in the preview is rotated to the third orientation in accordance with the first input, detect a termination of the first input; and in response to detecting the termination of the first input:
update the preview of the three-dimensional model in the first user interface, including, rotating the three-dimensional model from the third orientation to a fourth orientation that corresponds to a current viewpoint of the user, in the preview, while the three-dimensional model is not completed.

41. The non-transitory computer readable storage medium of claim 36, wherein the one or more programs include instructions that, when executed by the computer system, cause the computer system to:

while displaying the first user interface, with the representation of the field of view including the second view of the physical environment that corresponds to the second viewpoint of the user, and with the preview of the three-dimensional model including the three-dimensional model with the second orientation while the three-dimensional model in the preview is not completed, detect second input directed to the preview of the three-dimensional model in the first user interface; and in response to detecting the second input directed to the preview of the three-dimensional model in the first user interface:
update the preview of the three-dimensional model in the first user interface in accordance with the second input, including, in accordance with a determination that the second input meets second criteria different from the first criteria, changing a scale of the three-dimensional model relative to the representation of the field of view in accordance with the second input, in the preview, while the three-dimensional model in the preview is not completed.

42. The non-transitory computer readable storage medium of claim 36, wherein the preview of the three-dimensional model of the physical environment includes respective three-dimensional representations of one or more surfaces that have been detected in the physical environment.

43. The non-transitory computer readable storage medium of claim 36, wherein the preview of the three-dimensional model of the physical environment includes respective representations of one or more physical objects that have been detected in the physical environment.

44. The non-transitory computer readable storage medium of claim 36, wherein the one or more programs include instructions that, when executed by the computer system, cause the computer system to:

after adding the additional information to the three-dimensional model in the preview of the three-dimensional model while the three-dimensional model was not completed, in accordance with a determination that the three-dimensional model of the physical environment meets preset criteria, replace display of the preview of the three-dimensional model with display of a first view of the three-dimensional model of the physical environment, wherein the first view of the three-dimensional model includes an enlarged copy of the three-dimensional model that meets the preset criteria.

45. The non-transitory computer readable storage medium of claim 44, wherein the one or more programs include instructions that, when executed by the computer system, cause the computer system to:

while displaying the first view of the three-dimensional model in the first user interface, detect third input directed to the first view of the three-dimensional model in the first user interface; and in response to detecting the third input directed to the first view of the three-dimensional model in the first user interface:
update the first view of the three-dimensional model in the first user interface in accordance with the third input, including, in accordance with a determination that the third input meets the first criteria, rotating the three-dimensional model from a fourth orientation to a fifth orientation different from the fourth orientation in accordance with the third input, in the first view.

46. The non-transitory computer readable storage medium of claim 45, wherein the one or more programs include instructions that, when executed by the computer system, cause the computer system to:

after the three-dimensional model in the first view is rotated to the fifth orientation in accordance with the third input, detect a termination of the third input; and in response to detecting the termination of the third input, forgo updating the first view of the three-dimensional model in the first user interface, including, maintaining the three-dimensional model in the first view in the fifth orientation.

47. The non-transitory computer readable storage medium of claim 45, wherein:

the three-dimensional model includes a respective graphical representation of a first structural element that is detected in the physical environment and respective graphical representations of one or more physical objects that are detected in the physical environment, and displaying the first view of the three-dimensional model includes:
in accordance with a determination that a current orientation of the three-dimensional model in the first view in the first user interface would cause the respective graphical representation of the first structural element to occlude a view of the respective graphical representations of the one or more physical objects, forgoing display of the respective graphical representation of the first structural element with the respective graphical representations of the one or more physical objects in the first view of the three-dimensional model; and in accordance with a determination that the current orientation of the three-dimensional model in the first view would not cause the respective graphical representation of the first structural element to occlude the view of the respective graphical representations of the one or more physical objects, concurrently displaying the respective graphical representation of the first structural element with the respective graphical representations of the one or more physical objects in the first view of the three-dimensional model.

48. The non-transitory computer readable storage medium of claim 36, wherein the one or more programs include instructions that, when executed by the computer system, cause the computer system to:

prior to displaying the first user interface, display a respective user interface of a third-party application; and while displaying the respective user interface of the third-party application, detect a respective input that is directed to the respective user interface of the third-party application, wherein the first user interface is displayed in response to detecting the respective input that is directed to the respective user interface of the third-party application and in accordance with a determination that the respective input corresponds to a request to scan the physical environment.

49. The non-transitory computer readable storage medium of claim 48, wherein the one or more programs include instructions that, when executed by the computer system, cause the computer system to:

in accordance with a determination that generation of the three-dimensional model meets preset criteria, redisplay the third-party application.

50. The non-transitory computer readable storage medium of claim 36, wherein:

displaying the preview of the three-dimensional model while the three-dimensional model is not completed includes displaying a graphical representation of a first structural element that is detected in the physical environment in a first direction relative to respective graphical representations of one or more objects that have been detected in the physical environment; and rotating the three-dimensional model in the preview includes:

in accordance with a determination that, a respective rotation of the three-dimensional model in the preview, while the three-dimensional model in the preview is not completed, would cause the graphical representation of the first structural element to occlude a view of the respective graphical representations of the one or more objects in the preview of the three-dimensional model, reducing an opacity of or ceasing to display the graphical representation of the first structural element while displaying the respective graphical representations of the one or more objects in the preview of the three-dimensional model when executing the respective rotation of the three-dimensional model, in the preview, while the three-dimensional model in the preview is not completed.

* * * * *